(12) United States Patent
Hipp et al.

(10) Patent No.: US 12,528,879 B2
(45) Date of Patent: *Jan. 20, 2026

(54) MULTI-SPECIFIC BINDING PROTEINS FOR CANCER TREATMENT

(71) Applicant: Boehringer Ingelheim International GmbH, Ingelheim am Rhein (DE)

(72) Inventors: Susanne Hipp, Vienna (AT); Paul Adam, Vienna (AT); Michael Dziegelewski, Newburgh, NY (US); Rajkumar Ganesan, Blue Bell, PA (US); Philip Nicholas Gorman, Prospect, CT (US); Pankaj Gupta, Scarsdale, NY (US); Priyanka Gupta, Danbury, CT (US); Justin Scheer, Ridgefield, CT (US); Vladimir H. Voynov, Danbury, CT (US)

(73) Assignee: Boehringer Ingelheim International GmbH, Ingelheim am Rhein (DE)

( * ) Notice: Subject to any disclaimer, the term of this patent is extended or adjusted under 35 U.S.C. 154(b) by 183 days.

This patent is subject to a terminal disclaimer.

(21) Appl. No.: 18/327,456

(22) Filed: Jun. 1, 2023

(65) Prior Publication Data
US 2023/0295337 A1 Sep. 21, 2023

Related U.S. Application Data

(60) Continuation of application No. 17/686,453, filed on Mar. 4, 2022, now Pat. No. 12,173,083, which is a division of application No. 16/434,188, filed on Jun. 7, 2019, now Pat. No. 11,332,541.

(30) Foreign Application Priority Data

Jun. 9, 2018 (EP) .................... 18176888
Jun. 9, 2018 (EP) .................... 18176889
Feb. 26, 2019 (EP) .................... 19159321

(51) Int. Cl.
*A61K 39/395* (2006.01)
*A61P 35/00* (2006.01)
*C07K 1/14* (2006.01)
*C07K 16/22* (2006.01)
*C07K 16/24* (2006.01)
*C07K 16/28* (2006.01)
*C07K 16/30* (2006.01)
*C12N 5/10* (2006.01)
*C12N 15/63* (2006.01)
*G01N 33/577* (2006.01)
*A61K 39/00* (2006.01)
*A61K 45/06* (2006.01)

(52) U.S. Cl.
CPC .......... *C07K 16/30* (2013.01); *A61K 39/3955* (2013.01); *A61P 35/00* (2018.01); *C07K 1/14* (2013.01); *C07K 16/22* (2013.01); *C07K 16/2809* (2013.01); *C12N 5/10* (2013.01); *C12N 15/63* (2013.01); *G01N 33/577* (2013.01); *A61K 2039/505* (2013.01); *A61K 45/06* (2013.01); *C07K 2317/24* (2013.01); *C07K 2317/31* (2013.01); *C07K 2317/52* (2013.01); *C07K 2317/54* (2013.01); *C07K 2317/55* (2013.01); *C07K 2317/56* (2013.01); *C07K 2317/565* (2013.01); *C07K 2317/622* (2013.01); *C07K 2317/92* (2013.01); *C07K 2319/00* (2013.01)

(58) Field of Classification Search
CPC .......... A61K 2039/505; A61K 39/3955; A61K 39/39558; A61K 2039/507; A61K 2039/572; C07K 2317/31; C07K 16/22; C07K 16/2809; C07K 2317/73; C07K 2317/56; C07K 2317/565; C07K 2319/30; C07K 2317/92; C07K 2319/00
See application file for complete search history.

(56) References Cited

U.S. PATENT DOCUMENTS

| | | | |
|---|---|---|---|
| 4,676,980 A | 6/1987 | Segal et al. | |
| 5,731,168 A | 3/1998 | Carter et al. | |
| 5,945,311 A | 8/1999 | Lindhofer et al. | |
| 6,649,138 B2 | 11/2003 | Adams et al. | |
| 6,682,596 B2 | 1/2004 | Zehnder et al. | |
| 6,815,064 B2 | 11/2004 | Treadway et al. | |
| 6,821,505 B2 | 11/2004 | Ward | |
| 8,586,713 B2 | 11/2013 | Davis et al. | |
| 11,332,541 B2 * | 5/2022 | Hipp | C07K 16/2809 |
| 12,084,501 B2 * | 9/2024 | Zwolak | C12N 15/85 |

(Continued)

FOREIGN PATENT DOCUMENTS

| CA | 2892623 A1 | 6/2014 |
|---|---|---|
| WO | 1988001649 A1 | 3/1988 |

(Continued)

OTHER PUBLICATIONS

Colcher et al. Effects of genetic engineering on the pharmacokinetics of antibodies. Q J Nucl Med 43: 132-139, 1999.*

(Continued)

*Primary Examiner* — Bridget E Bunner
(74) *Attorney, Agent, or Firm* — Wendy M. Gombert

(57) ABSTRACT

The present invention relates to novel DLL3/CD3 binding proteins. The invention also relates to nucleic acids encoding such proteins; to methods for preparing such proteins; to host cells expressing or capable of expressing such proteins; to compositions comprising such proteins; and to uses of such proteins or such compositions, in particular for therapeutic purposes in the field of cancer diseases.

23 Claims, 64 Drawing Sheets

Specification includes a Sequence Listing.

(56) References Cited

U.S. PATENT DOCUMENTS

| | | | |
|---|---|---|---|
| 12,173,083 | B2* | 12/2024 | Hipp .................. C07K 16/22 |
| 2002/0051780 | A1 | 5/2002 | Lindhofer et al. |
| 2002/0098193 | A1 | 7/2002 | Ward |
| 2007/0274985 | A1 | 11/2007 | Dubel et al. |
| 2010/0322935 | A1 | 12/2010 | Croasdale et al. |
| 2012/0328642 | A1 | 12/2012 | Zdanovsky |
| 2014/0072581 | A1 | 3/2014 | Dixit |
| 2014/0364590 | A1 | 12/2014 | Stull et al. |
| 2015/0016666 | A1 | 1/2015 | Chen |
| 2016/0032006 | A1 | 2/2016 | Hudson |
| 2016/0194399 | A1* | 7/2016 | Irving ................ A61K 47/6831 |
| 2017/0002097 | A1 | 1/2017 | Ganesan et al. |
| 2017/0029502 | A1 | 2/2017 | Raum et al. |
| 2017/0037130 | A1 | 2/2017 | Raum et al. |
| 2017/0275373 | A1 | 9/2017 | Kufer et al. |
| 2019/0330366 | A1 | 10/2019 | Eckelman et al. |

FOREIGN PATENT DOCUMENTS

| | | |
|---|---|---|
| WO | 9005144 A1 | 5/1990 |
| WO | 1991019739 A1 | 12/1991 |
| WO | 1992010209 A1 | 6/1992 |
| WO | 9308829 A1 | 5/1993 |
| WO | 1993011161 A1 | 6/1993 |
| WO | 9404678 A1 | 3/1994 |
| WO | 1995009917 A1 | 4/1995 |
| WO | 1996027011 A1 | 9/1996 |
| WO | 9634103 A1 | 10/1996 |
| WO | 1997034631 | 9/1997 |
| WO | 1998050431 A2 | 11/1998 |
| WO | 2000042072 A2 | 7/2000 |
| WO | 2002060919 A2 | 8/2002 |
| WO | 2005004809 A2 | 1/2005 |
| WO | 200710954 A1 | 1/2007 |
| WO | 2007042309 A2 | 4/2007 |
| WO | 2007111733 A2 | 10/2007 |
| WO | 08016893 A1 | 2/2008 |
| WO | 2007042261 | 1/2009 |
| WO | 2009089004 A1 | 7/2009 |
| WO | 20100040508 A1 | 4/2010 |
| WO | 2010136172 A1 | 12/2010 |
| WO | 2010151792 A1 | 12/2010 |
| WO | 2011028753 A1 | 3/2011 |
| WO | 2011075861 A1 | 6/2011 |
| WO | 2011117330 A1 | 9/2011 |
| WO | 2011147986 A1 | 12/2011 |
| WO | 2012016227 A2 | 2/2012 |
| WO | 2012106578 A1 | 8/2012 |
| WO | 2012123949 A1 | 9/2012 |
| WO | 2012143523 A1 | 10/2012 |
| WO | 2012143524 A2 | 10/2012 |
| WO | 2012175741 A2 | 12/2012 |
| WO | 2013024059 A2 | 2/2013 |
| WO | 2013055958 A1 | 4/2013 |
| WO | 2013060867 A2 | 5/2013 |
| WO | 2013096291 A2 | 6/2013 |
| WO | 2013126746 A2 | 8/2013 |
| WO | 2013157953 A1 | 10/2013 |
| WO | 2013157954 A1 | 10/2013 |
| WO | 2014018572 A2 | 1/2014 |
| WO | 2014125273 A1 | 8/2014 |
| WO | 2014165771 A2 | 10/2014 |
| WO | 2014177459 A2 | 11/2014 |
| WO | 2014184350 A1 | 11/2014 |
| WO | 2015118057 A1 | 8/2015 |
| WO | 2015171822 A1 | 11/2015 |
| WO | 2016026943 A1 | 2/2016 |
| WO | 2016036918 A1 | 3/2016 |
| WO | 2016071377 A1 | 5/2016 |
| WO | 2017021349 A1 | 2/2017 |
| WO | 2017030926 A1 | 2/2017 |
| WO | 2017198741 A1 | 11/2017 |
| WO | 2019131988 A1 | 7/2019 |

OTHER PUBLICATIONS

Mix et al. Immunoglobulins—Basic considerations. J Neurol 253(Suppl V): V/9-V/17, 2006.*
Altschul, Basic local alignment search tool, J. Mol. Biology, vol. 215, 1990, p. 403-410.
Altschul, Gapped BLAST and PSI-BLAST: a new generation of protein database search programs, Nucleic Acids research, vol. 25, No. 17, 1997, p. 3389-3402.
Atwell, Stable Heterodimers from Remodeling thr Domain interface of a Homodimer using a Phage Display Library, J. Mol. Biol, vol. 270, 1997, p. 26-35.
Billetta, Chimeric Antibodies, International Reviews of Immunology, vol. 10, No. 2, 1993, p. 165-176.
Bruggeman, Production of human antibody repertoires in transgenic mice, Current opinion in biotechnology, 1997, p. 455-458.
Bruyns, Bacterial and Plant-produced dc-Fv proteins have similar antigen-binding properties, FEBS Letters, 1996, p. 5-10.
Carmen, Concepts in antibody phage display, Briefings in Functional Genomics and Proteomics, vol. 1, No. 2, 2002, p. 189-203.
Chapman, Notch inhibition by the ligand Delta-like 3 defines the mechanism of abnormal vertebral segmentation, Human molecular genetics, vol. 20, No. 5, 2011, p. 905-916.
Chothia, Canonical Structures for the hypervariable regions of immunoglobulins, J. Mol. biol., vol. 196, 1987, p. 901-917.
Chothia, Domain Association in Immunoglobulin Molecules the Packing of Variable Domains, J. Mol. Biol., vol. 186, 1985, p. 651-663.
Dall-Acqua, Properties of Human IgG1s Engineered for Enhanced Binding to the Neonatal Fc Receptor, The J. of Biological Chem., vol. 281, 2006, p. 1-11.
Darling, Kinetic Exclusion Assay Technology, Assay and Drug Development Technologies, vol. 2, 2004, p. 647-656.
Deisenhofer, Crustyllographic Refinement and Atomic Models of a Human Fc Fragment and Its Complex with Fragment B of Protein A, Biochemistry, vol. 20, 1981, pp. 2361-2370.
Dimasi, The Deisgn and Characterization of Oligospecific Antibodies, J. Mol. Biol. vol. 293, 2009, pp. 672-692.
Duhamel, pH Gradient Elution of Human IgG1, IgG2 and IgG4 from Protein A—Sepharose, Journal of Immunological Methods, vol. 31, 1979, p. 211-217.
Dylla, Toppling high-grade pulmonary neuroendocrine tumors with a DLL-3-targeted trojan horse, Molecular & Cellular Oncology, vol. 3, 2016, p. 1-2, e1101515.
Edelman, The covalent structure of an entire gG Immunoglobulin Molecule*, Biochemistry, vol. 63, 1969, p. 78-85.
Giudicelli, IMGT/V-Quest:IMGT Standardized Analysis of the Immunoglobulin (IG) and T cell receptor Nucelotide Sequence, Retrieved online Dec. 15, 2021, Http://cshprotocols.cshlp.org, Cold Spring Harbor Protoc 2011; doi: 10.1101/pdb.prot5633.
Gruber, Efficient tumor cell lysis mediated by a bispecific single chain antibody expressed in *Escherichia coli*, J. of Immunology, vol. 152, 1994, p. 5368-5374.
Hezareh, Effector Function Activities of a panel of mutants of a broadly neutralizing antibody against human immunodefieciency Virus type 2, Journal of Virology, 2001, p. 12161-12168.
Higgins, Clustal for multiple sequence alignments, Methods in Enzymology, vol. 266. 2006, p. 383-402.
Hipp, Abstract 549: , A novel T cell engaging bispecific antibody induces specific and efficacious lysis of small cell lung cancer cells in vitro and potent T cell re-directed anti-tumor activity in vivo, Cancer Research, DOI: 10/1158/1538-7445-AM2019-549, Published 2019, 79(Suppl 13) : 549, Mar. 2019 (2 total pages).
Hollinger, Diabodies, Proc. Natl. Acad. Sci, vol. 90, 1993, p. 6444-6448.
Hust, Single Chain (scFAB) Fragment, BMC Biotechnology, vol. 7, 2017, p. 7-14.
Inoue, Efficient production of functional mouse/human chimeric fab against human urokinase-type plasminogen activator by Bacillus brevis, Appl. Micobiol. Biotechnol. 1997., p. 487-492.
Jendeberg, Engineering of Fc1 and Fc3 from human immunoglobulin G to analyse sublass specificity for staphlococcal protein A, Journal od Immunological Methods, 1997, p. 25-34.

(56) References Cited

OTHER PUBLICATIONS

Karlin, Applications and statistics for multiple high-scoring segments in molecular sequences, Proc. Natl. Acad. Sci., vol. 90, 1993, p. 5873-5877.
Karlin, Methods for assessing the statistical significance of molecular sequence features by using general scoring themes, Proc. Natl. Acad. Sci., vol. 87, 1990, p. 2264-2268.
Kipriyanov, Generation and Production of Engineered Antibodies, Molecular Biotech., vol. 26, 2004, p. 39-60.
Knappik, Fully Synthetic Human Combinatorial Antibody Libraries based on Modular Consensus Frameworks and CDRs Randomized with Trinucleotides, JMB, vol. 296, 2000, p. 57-86.
Koehler, Continuous cultures of fused cells secreting antibody of predefined specificitym Nature, vol. 256, 1975, p. 495-497.
Kostelny, Formation of a bispecific antibody by the use of leucine zippers, The J. of Immunology, Retreived online Oct. 18, 2021, http:/www.jimmunol.org/content/148/5/1547, 148: 1547-1553, 1992.
Kufer, A revival of bispecific antibodies, Trends in Biotechnology, 2004 22(5): 238-244.
Lefranc, IMGT unique numbering for immunoglobulin and T cell receptor variable domains, Developmental and comparitive immunology, vol. 27, 2003, p. 55-77.
Li, Membrane-Proximal Epitope Facilitates Eficent T cell synapse formation by Anti-FcRH5/CD3 and is a Requirement for myeloma Cell Killing, Cancer Cell, vol. 31, 2017, p. 383-395.
Lindhofer, Preferential Species-Restricted Heavy/Light Chain Pairing in Rat/Mouse Quadromas, Journal of Immunology, 155: 219-225, 1995.
Liu, The Role of DLLs in Cancer, OncoTargets and Therapy, vol. 13, 2020, p. 3881-3901.
Lonberg, Human Antibodies from transgenic mice, Int. Rev. Immunol., 1995, vol. 13, p. 65-93.
Lu, Construction and Production of an IgG-like tetravalent Bispecific Antibody, IgG-Single-Chain Fv Fusion, Methods of Molecular Biol, 2014, Chapter 11, p. 185-213.
Mallender, Comparative Properties of the Single Chain Antibody and Fv Derivatives, Journal of Biological Chem., vol. 271, 1996, p. 5338-5346.
Malmqvist, Surface plasmon resonance for detection and measurement of antibody-antigen affinity and kinetics, Current Opinion in Immunology, 1993, p. 282-286.
Marks, By Passing Immunization, Human Antibodies from V-gene Libraries Displayed on Phage, J. Mole. Biol., vol. 222, 1992, p. 581-597.
McCall, Isolation and characerization of an anti-CD16 single cain Fv fragment and construction of an anti-HER2/neu/anti-CD16 bispecific scFV that triggers CD-16-dependent tumor cytolysis, Mol. Immunology, 1999, p. 433-446.
Merchant, An efficient route to human bispecific IgG, Molecular Oncology, 1998, vol. 16: 677-681.
Michaelsen, The amino acid sequence of a human immunoglobulin, Journal of Immunology, 1977, vol. 119, pp. 558-563.
Michaelson, Anti-tumor activity of stability-engineered IgG-like bispecific antibodies targeting Trail-R2, Landes Bioscience, 2009, p. 128-141, vol. 1, issue 2.
Millstein, Hybrid hybrididomas and their use in immunohistochemistry, Nature, vol. 2, 1983, p. 537-540.
Natsume, Engineered Antibodies of IG1/lgG3 Mixed Isotype with Enhanced Cytotoxic Activities, Cancer Research, 2008, vol. 68, pp. 3863-3872.
Norderhaug, Versatile vectors for transient and stable expression of recombinant antibody molecules, J. of Immunological Methods, vol. 204, 1996, p. 77-87.
Ohaegbulam, Human Cancer immunotherapy with antibodies to the PD-1 and PD-L1 pathway, CellPress, vol. 21, 2015, pp. 24-33.
Owen, DLL3:, an emerging target in small cell lung cancer, J. of Hematology & Oncology, 2019, 12:61.

Pearson, Improved tools for biological sequence comparison, Proc. Natl. Acad. Sci., vol. 85, 1988, p. 2444-2448.
Pessano, The T3/T cell receptor complex: antigenic distinction between the two 20-kd T3 (T3-,d and T3-Î) subunits), The EMBO Journal, vol. 4, No. 2, 1985, p. 337-344.
Pluckthun, In the Pharmacology of monoclonal antibodies, Rosenberg and Moore, 1994, vol. 113, p. 269-315.
Recht, Structural Studies of a Human y3 Myleloma protein (GOE) that binds staph protein A, Journal of immunology, vol. 127, 1981, pp. 917-923.
Reichmann,, Reshaping human antibodies for therapy, Nature, vol. 332, 1988, pp. 323-327.
Ridgway, Knobs-into-holes engineering of antibody CH3 domains for heavy chain heterodimerization, Protein Engineering, vol. 9, 1996, p. 617-621.
Salmeron, A conformational epitope expressed upon association of CD-3epsilon with either CD-3 delta od CD-3 gamma, J. of Immunology, Retreived online Oct. 21, 2021, http://www.jimmunol.org/content/14719.3047, 147: 3047-3052, 1991.
Saunders, A DLL-3 targeted antibody-drug conjugate eradicates high grade pulmonary neuroendocrine tumor-inititating cells in vivo, Sci. Transl. Med. 2015, 7(302): 302ra136.
Saunders, A DLL3-targeted antibody-drug conjugate eradicates high-grade pulmonary neuroendocrine tumor-initiating cells in vivo, Sci. Transl. Med., vol. 7, No. 302, 2015, p. 22-28, presentation with Figures; presented at Apr. 1-5, 2017 meeting.
Shields, High Resolution Mapping of the binding site of Human IgG1 for FcγRI, FcγRII, FcγRIII and FcRN and Design of IgG1 Variants with Improved Binding to the FcγR*, The J. of Biological Chem., vol. 276, 2001, p. 6591-6604.
Silva, The S228P mutation prevents in Vivo and in Vitro IgG4 Fab-arm Exchangw as demonstrated using a combination of novel quantitative immunoassays and Pysiological matrix preparation, Journal of Biological Chem., vol. 290, 2015, p. 5462-5469.
Singh, Selective targeting of IL23 pathway: Generation and characterization of a novel high affinity humanized anti-IL-23A antibody, MABS,vol. 7, 2015, p. 778-791.
Strohl, Optimization of Fc-mediated effector functions of monoclonal antibodies, Current Opinion in Biotechnology, 2009, vol. 20, p. 685-691.
Torelli, Advance and Adam: two algorithms for the analysis of global similarity between homologous informational sequences, Comput. Appl. Biosci., vol. 10, 1994, p. 3-5.
Traunecker, Bispecific single chain molecules target cytotoxic lymphocites on HOV infectic cells, The EMBO Journal, vol. 10, No. 2, 1991, p. 3655-3659.
Tutt Trispecific F(ab')3 derivatives that use cooperative signaling via the TVR/CD3 complex and CD2 to activate and redirect resting cytotoxic T cells, The J. of Immunology, vol. 147, 2021, p. 60-69.
Van Kamp, IgA Contamination of IgG Prepared on a Protein a Column, Jour. of Immunological Methods, vol. 27, 1979, p. 301-305.
Van Loghem, Staphlococcal Protein A and Human IgG Subclasses and Allotypes, Scand. J. immunol. vol. 15, 1982, p. 275-278.
Walker, Efficient recovery of High-Affinity Antibodies from a Single-Chain Fab Yeast Display Library, J. Mol. Biol, 2009, vol. 389, p. 365-375.
Wolfenstein, The amino acid structure of "heavy chain Disease" protwin Zuc structure of the Fc fragment of immunoglobulin G3, Biochemical and Biophysical research communications, 1976, vol. 71, pp. 907-914.
Zhu, Remodeling domain interfaces to enhance heterodimer formation, Protein Science, 1997, vol. 6, p. 781-788.
Giese, Bispecific antibody process development: Assembly and purification of knob and hole bispecific antibodies, Biotechnol. Prog., vol. 34, 2018, p. 397-404.

* cited by examiner

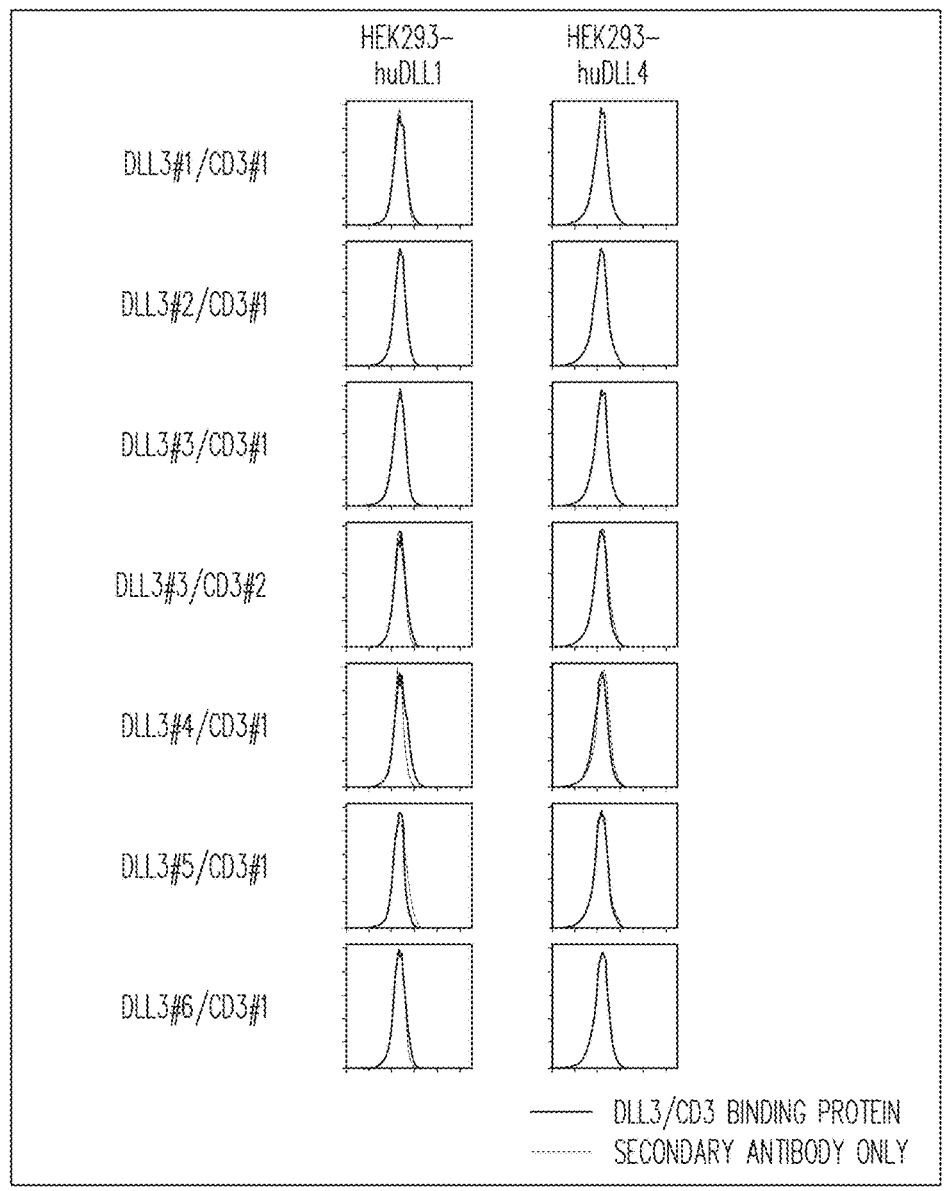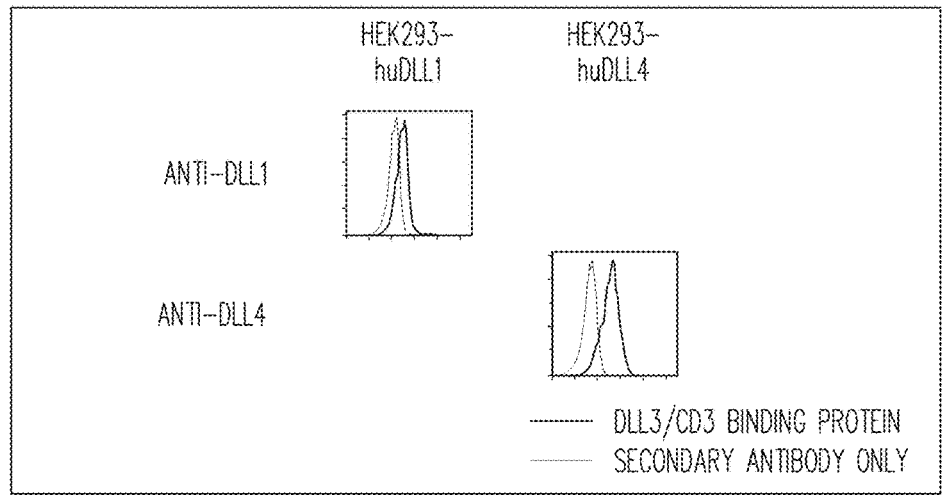
FIG. 5

MULTI-SPECIFIC BINDING PROTEINS FOR CANCER TREATMENT

This application is a continuation of U.S. application Ser. No. 17/686,453 filed Mar. 4, 2022, which is a continuation of U.S. application Ser. No. 16/434,188, now issued U.S. Pat. No. 11,332,541, filed Jun. 7, 2019, which claims the benefit of application EP19159321.9 filed Feb. 26, 2019, which claims the benefit of application EP18176889.6 filed Jun. 9, 2018, which claims the benefit of application EP18176888.8 filed Jun. 9, 2018, each of which is hereby incorporated by reference herein in its entirety.

SEQUENCE LISTING

The instant application contains a Sequence Listing which has been submitted electronically in XML file format and is hereby incorporated by reference in its entirety. Said XML copy, created on May 30, 2023 is named 12-0431-US-3_SL.xml and is 376,898 bytes in size.

TECHNICAL FIELD

Background of the Invention

The present invention relates to multi-specific binding proteins comprising a first antigen binding unit specific for DLL3 and a second antigen binding unit specific for CD3. The invention also relates to nucleic acids encoding such binding proteins, to methods for preparing such binding proteins; host cells expressing or capable of expressing such binding proteins, compositions comprising such binding proteins and to uses of such binding proteins or such compositions, in particular for therapeutic purposes in the field of cancer diseases.

BACKGROUND INFORMATION

DLL3 is a type I transmembrane protein that belongs to the Notch ligand family DLL3 is primarily involved in somitogenesis, where it predominantly is localized in the Golgi apparatus and acts as an inhibitor of Notch signalling, in contrast to the other DLL family members, DLL1 and DLL4, which are localized on the cell surface. Only in cancer cells, where DLL3 is overexpressed, some DLL3 molecules escape to the cell surface (Dylla, Molecular & Cellular Oncology 2016, Vol. 3, No. 2). DLL3 has been identified as a tumor-specific target by using several methods, e.g. LC/MS analysis of tumor tissues (WO 2014/125273), RNA sequencing (WO 2017/021349), and immunohistochemistry (Saunders et al., Sci Transl Med. 2015 Aug. 26; 7(302):302ra136; Saunders et al., AACR 2017; WO 2013/126746) analysis.

DLL3 expression has been described in neuroendocrine tumors such as large cell neuroendocrine carcinoma (LCNEC), small cell lung cancer (SCLC), small cell bladder cancer, neuroendocrine prostate cancer, neuroendocrine pancreatic cancer and glioblastoma (Saunders et al., Sci Transl Med. 2015 Aug. 26; 7(302):302ra136; Saunders et al., AACR 2017).

SCLC represents an indication of extremely high medical need. SCLC accounts for 13% of Lung Cancer diagnoses and has a worse prognosis than NSCLC. Conventional treatments for these cancers mainly include chemotherapy, radiotherapy, surgery or combinations thereof, there are no targeted therapies available yet. While the initial response rate to chemotherapy is high, many patients quickly relapse with chemo-resistant disease, for which there are no treatment options available. Although there have been improvements in treating these cancers over the last years, overall survival rates for these tumor types remain unchanged, thus, there is an unmet medical need for more targeted and potent therapies.

One approach for a targeted therapy is provided by antibody drug conjugates (ADCs) However, for DLL3 this strategy is not preferred due to low cell surface expression of DLL3 and high rate of resistance to chemotherapy. As the majority of patients relapse after chemotherapy treatment and due to the low expression of DLL3 on the cell surface, targeting DLL3 with ADCs might have limitations. In addition ADC approaches often have off-target toxicities caused by free drug as a result of linker instability or degradation.

There have been attempts to combine DLL3 targeting with targeting of other proteins. For example, WO2017/021349 describes a bispecific antibody construct combining binding to human DLL3 on the surface of a target cell and binding to human CD3 on the surface of a T cell. It is however unproven whether such approaches will be successful and to date, no targeted therapies for SCLC and glioblastoma as well as other DLL3 expressing tumors are available.

In view of the poor outlook for such cancer patients, there is a need to identify more efficacious therapies, particularly efficacious therapies with improved tolerability. Thus, it is an object of the invention to provide pharmacologically active agents, compositions and/or methods of treatment that provide certain advantages compared to the agents, compositions and/or methods currently used and/or known in the art. These advantages include in vivo efficacy, improved therapeutic and pharmacological properties, increased specificity, improved safety profile, less side effects, reduced immunogenicity, and other advantageous properties such as improved ease of preparation or reduced costs of goods, higher stability/longer half-life, need for less frequent administration regimens especially as compared to candidate drugs already known in the art.

BRIEF SUMMARY OF THE INVENTION

The present invention is based on a bispecific T cell engaging approach employing multi-specific binding proteins with a binding arm to CD3 on T cells and a binding arm to DLL3 on the cell surface of tumor cells. Through simultaneously binding to T cells and tumor cells, the T cell engagers force formation of a cytolytic synapse between the two cells and so, redirect the T cell activity selectively to the targeted tumor cells.

In one aspect, the invention provides a multi-specific binding protein comprising a first antigen binding unit specifically binding to DLL3 and a second antigen binding unit specifically binding to CD3, said first antigen binding unit specifically binding to DLL3 selected from the group consisting of i) to xviii):
  i) an antigen binding unit comprising light chain CDRs comprising the amino acid sequences of SEQ ID NO:1 (CDR1), SEQ ID NO:2 (CDR2) and SEQ ID NO:3 (CDR3) and heavy chain CDRs comprising the amino acid sequences of SEQ ID NO:4 (CDR1), SEQ ID NO:5 (CDR2) and SEQ ID NO:6 (CDR3);
  ii) an antigen binding unit comprising light chain CDRs comprising the amino acid sequences of SEQ ID NO:7 (CDR1), SEQ ID NO:8 (CDR2) and SEQ ID NO:9 (CDR3) and heavy chain CDRs comprising the amino acid sequences of SEQ ID NO:10 (CDR1), SEQ ID NO:11 (CDR2) and SEQ ID NO:12 (CDR3);

iii) an antigen binding unit comprising light chain CDRs comprising the amino acid sequences of SEQ ID NO:13 (CDR1), SEQ ID NO:14 (CDR2) and SEQ ID NO:15 (CDR3) and heavy chain CDRs comprising the amino acid sequences of SEQ ID NO:16 (CDR1), SEQ ID NO:17 (CDR2) and SEQ ID NO:18 (CDR3);

iv) an antigen binding unit comprising light chain CDRs comprising the amino acid sequences of SEQ ID NO:19 (CDR1), SEQ ID NO:20 (CDR2) and SEQ ID NO:21 (CDR3) and heavy chain CDRs comprising the amino acid sequences of SEQ ID NO:22 (CDR1), SEQ ID NO:23 (CDR2) and SEQ ID NO:24 (CDR3);

v) an antigen binding unit comprising light chain CDRs comprising the amino acid sequences of SEQ ID NO:25 (CDR1), SEQ ID NO:26 (CDR2) and SEQ ID NO:27 (CDR3) and heavy chain CDRs comprising the amino acid sequences of SEQ ID NO:28 (CDR1), SEQ ID NO:29 (CDR2) and SEQ ID NO:30 (CDR3);

vi) an antigen binding unit comprising light chain CDRs comprising the amino acid sequences of SEQ ID NO:31 (CDR1), SEQ ID NO:32 (CDR2) and SEQ ID NO:33 (CDR3) and heavy chain CDRs comprising the amino acid sequences of SEQ ID NO:34 (CDR1), SEQ ID NO:35 (CDR2) and SEQ ID NO:36 (CDR3);

vii) an antigen binding unit comprising light chain CDRs comprising the amino acid sequences of SEQ ID NO:133 (CDR1), SEQ ID NO:134 (CDR2) and SEQ ID NO:135 (CDR3) and heavy chain CDRs comprising the amino acid sequences of SEQ ID NO:136 (CDR1), SEQ ID NO:137 (CDR2) and SEQ ID NO:138 (CDR3);

viii) an antigen binding unit comprising light chain CDRs comprising the amino acid sequences of SEQ ID NO:139 (CDR1), SEQ ID NO:140 (CDR2) and SEQ ID NO:141 (CDR3) and heavy chain CDRs comprising the amino acid sequences of SEQ ID NO:142 (CDR1), SEQ ID NO:143 (CDR2) and SEQ ID NO:144 (CDR3);

ix) an antigen binding unit comprising light chain CDRs comprising the amino acid sequences of SEQ ID NO:145 (CDR1), SEQ ID NO:146 (CDR2) and SEQ ID NO:147 (CDR3) and heavy chain CDRs comprising the amino acid sequences of SEQ ID NO:148 (CDR1), SEQ ID NO:149 (CDR2) and SEQ ID NO:150 (CDR3);

x) an antigen binding unit comprising light chain CDRs comprising the amino acid sequences of SEQ ID NO:151 (CDR1), SEQ ID NO:152 (CDR2) and SEQ ID NO:153 (CDR3) and heavy chain CDRs comprising the amino acid sequences of SEQ ID NO:154 (CDR1), SEQ ID NO:155 (CDR2) and SEQ ID NO:156 (CDR3);

xi) an antigen binding unit comprising light chain CDRs comprising the amino acid sequences of SEQ ID NO:157 (CDR1), SEQ ID NO:158 (CDR2) and SEQ ID NO:159 (CDR3) and heavy chain CDRs comprising the amino acid sequences of SEQ ID NO:160 (CDR1), SEQ ID NO:161 (CDR2) and SEQ ID NO:162 (CDR3);

xii) an antigen binding unit comprising light chain CDRs comprising the amino acid sequences of SEQ ID NO:163 (CDR1), SEQ ID NO:164 (CDR2) and SEQ ID NO:165 (CDR3) and heavy chain CDRs comprising the amino acid sequences of SEQ ID NO:166 (CDR1), SEQ ID NO:167 (CDR2) and SEQ ID NO:168 (CDR3);

xiii) an antigen binding unit comprising light chain CDRs comprising the amino acid sequences of SEQ ID NO:169 (CDR1), SEQ ID NO:170 (CDR2) and SEQ ID NO:171 (CDR3) and heavy chain CDRs comprising the amino acid sequences of SEQ ID NO:172 (CDR1), SEQ ID NO:173 (CDR2) and SEQ ID NO:174 (CDR3);

xiv) an antigen binding unit comprising light chain CDRs comprising the amino acid sequences of SEQ ID NO:175 (CDR1), SEQ ID NO:176 (CDR2) and SEQ ID NO:177 (CDR3) and heavy chain CDRs comprising the amino acid sequences of SEQ ID NO:178 (CDR1), SEQ ID NO:179 (CDR2) and SEQ ID NO:180 (CDR3);

xv) an antigen binding unit comprising light chain CDRs comprising the amino acid sequences of SEQ ID NO:181 (CDR1), SEQ ID NO:182 (CDR2) and SEQ ID NO:183 (CDR3) and heavy chain CDRs comprising the amino acid sequences of SEQ ID NO:184 (CDR1), SEQ ID NO:185 (CDR2) and SEQ ID NO:186 (CDR3);

xvi) an antigen binding unit comprising light chain CDRs comprising the amino acid sequences of SEQ ID NO:187 (CDR1), SEQ ID NO:188 (CDR2) and SEQ ID NO:189 (CDR3) and heavy chain CDRs comprising the amino acid sequences of SEQ ID NO:190 (CDR1), SEQ ID NO:191 (CDR2) and SEQ ID NO:192 (CDR3);

xvii) an antigen binding unit comprising light chain CDRs comprising the amino acid sequences of SEQ ID NO:193 (CDR1), SEQ ID NO:194 (CDR2) and SEQ ID NO:195 (CDR3) and heavy chain CDRs comprising the amino acid sequences of SEQ ID NO:196 (CDR1), SEQ ID NO:197 (CDR2) and SEQ ID NO:198 (CDR3); and xviii) an antigen binding unit comprising light chain CDRs comprising the amino acid sequences of SEQ ID NO:199 (CDR1), SEQ ID NO:200 (CDR2) and SEQ ID NO:201 (CDR3) and heavy chain CDRs comprising the amino acid sequences of SEQ ID NO:202 (CDR1), SEQ ID NO:203 (CDR2) and SEQ ID NO:204 (CDR3).

In some embodiments of the binding protein of the invention, the first antigen binding unit specifically binding to DLL3 comprises a first light chain variable domain and a first heavy chain variable domain and is selected from the group consisting of i) to xviii):

i) an antigen binding unit comprising a light chain variable domain comprising the amino acid sequence of SEQ ID NO:37 and heavy chain variable domain comprising the amino acid sequence of SEQ ID NO:38;

ii) an antigen binding unit comprising a light chain variable domain comprising the amino acid sequences of SEQ ID NO:39 and heavy chain variable domain comprising the amino acid sequences of SEQ ID NO:40;

iii) an antigen binding unit comprising a light chain variable domain comprising the amino acid sequence of SEQ ID NO:41 and heavy chain variable domain comprising the amino acid sequence of SEQ ID NO:42;

iv) an antigen binding unit comprising a light chain variable domain comprising the amino acid sequence of SEQ ID NO:43 and heavy chain variable domain comprising the amino acid sequence of SEQ ID NO:44;

v) an antigen binding unit comprising a light chain variable domain comprising the amino acid sequence of SEQ ID NO:45 and heavy chain variable domain comprising the amino acid sequence of SEQ ID NO:46;

vi) an antigen binding unit comprising a light chain variable domain comprising the amino acid sequence of SEQ ID NO:47 and heavy chain variable domain comprising the amino acid sequence of SEQ ID NO:48;

vii) an antigen binding unit comprising a light chain variable domain comprising the amino acid sequence of SEQ ID NO:205 and heavy chain variable domain comprising the amino acid sequence of SEQ ID NO:206;

viii) an antigen binding unit comprising a light chain variable domain comprising the amino acid sequence of SEQ ID NO:207 and heavy chain variable domain comprising the amino acid sequence of SEQ ID NO:208;

ix) an antigen binding unit comprising a light chain variable domain comprising the amino acid sequence of SEQ ID NO:209 and heavy chain variable domain comprising the amino acid sequence of SEQ ID NO:210;

x) an antigen binding unit comprising a light chain variable domain comprising the amino acid sequence of SEQ ID NO:211 and heavy chain variable domain comprising the amino acid sequence of SEQ ID NO:212;

xi) an antigen binding unit comprising a light chain variable domain comprising the amino acid sequence of SEQ ID NO:213 and heavy chain variable domain comprising the amino acid sequence of SEQ ID NO:214;

xii) an antigen binding unit comprising a light chain variable domain comprising the amino acid sequence of SEQ ID NO:215 and heavy chain variable domain comprising the amino acid sequence of SEQ ID NO:216;

xiii) an antigen binding unit comprising a light chain variable domain comprising the amino acid sequence of SEQ ID NO:217 and heavy chain variable domain comprising the amino acid sequence of SEQ ID NO:218;

xiv) an antigen binding unit comprising a light chain variable domain comprising the amino acid sequence of SEQ ID NO:219 and heavy chain variable domain comprising the amino acid sequence of SEQ ID NO:220;

xv) an antigen binding unit comprising a light chain variable domain comprising the amino acid sequence of SEQ ID NO:221 and heavy chain variable domain comprising the amino acid sequence of SEQ ID NO:222;

xvi) an antigen binding unit comprising a light chain variable domain comprising the amino acid sequence of SEQ ID NO:223 and heavy chain variable domain comprising the amino acid sequence of SEQ ID NO:224;

xvii) an antigen binding unit comprising a light chain variable domain comprising the amino acid sequence of SEQ ID NO:225 and heavy chain variable domain comprising the amino acid sequence of SEQ ID NO:226; and xviii) an antigen binding unit comprising a light chain variable domain comprising the amino acid sequence of SEQ ID NO:227 and heavy chain variable domain comprising the amino acid sequence of SEQ ID NO:228.

In some embodiments of the binding protein of the invention, the second antigen binding unit specifically binding to CD3 is selected from the group consisting of i) to iii):

i) an antigen binding unit comprising light chain CDRs comprising the amino acid sequences of SEQ ID NO:55 (CDR1), SEQ ID NO:56 (CDR2) and SEQ ID NO:57 (CDR3) and heavy chain CDRs comprising the amino acid sequences of SEQ ID NO:58 (CDR1), SEQ ID NO:59 (CDR2) and SEQ ID NO:60 (CDR3);

ii) an antigen binding unit comprising light chain CDRs comprising the amino acid sequences of SEQ ID NO:61 (CDR1), SEQ ID NO:62 (CDR2) and SEQ ID NO:63 (CDR3) and heavy chain CDRs comprising the amino acid sequences of SEQ ID NO:64 (CDR1), SEQ ID NO:65 (CDR2) and SEQ ID NO:66 (CDR3); and iii) an antigen binding unit comprising light chain CDRs comprising the amino acid sequences of SEQ ID NO:96 (CDR1), SEQ ID NO:97 (CDR2) and SEQ ID NO:98 (CDR3) and heavy chain CDRs comprising the amino acid sequences of SEQ ID NO:99 (CDR1), SEQ ID NO:100 (CDR2) and SEQ ID NO:101 (CDR3).

In some embodiments of the binding protein of the invention, the second antigen binding unit specifically binding to CD3 comprises a second light chain variable domain and a second heavy chain variable domain and is selected from the group consisting of:

i) an antigen binding unit comprising a light chain variable domain comprising the amino acid sequence of SEQ ID NO:67 and a heavy chain variable domain comprising the amino acid sequence of SEQ ID NO:68;

ii) an antigen binding unit comprising a light chain variable domain comprising the amino acid sequence of SEQ ID NO:69 and a heavy chain variable domain comprising the amino acid sequence of SEQ ID NO:70; and iii) an antigen binding unit comprising a light chain variable domain comprising the amino acid sequence of SEQ ID NO:102 and a heavy chain variable domain comprising the amino acid sequence of SEQ ID NO:103.

In some embodiments of the invention, the first antigen binding unit specifically binding to DLL3 comprises from its N- to C-terminus: a first light chain variable domain, a first light chain constant domain, a first peptide linker, a first heavy chain variable domain and a first heavy chain constant CH1 domain; and the second antigen binding unit specifically binding to CD3 comprises from its N- to C-terminus: a second light chain variable domain, a second light chain constant domain, a second peptide linker, a second heavy chain variable domain and a second heavy chain constant CH1 domain. In some embodiments of the invention, the first and/or second peptide linker comprises 26 to 42 amino acids, preferably any one of 30 to 40 amino acids, 34 to 40 amino acids, or 36 to 39 amino acids, more preferably 38 amino acids. In some embodiments of the invention, the first linker and/or second linker is a Gly-Ser linker, preferably comprising the amino acid sequence of SEQ ID NO:89, more preferably said first and second peptide linker comprise the same sequence.

In some embodiments, the binding protein of the invention further comprises a first and a second Fc domain, said first Fc domain covalently linked to said first antigen binding unit, and said second Fc domain covalently linked to said second antigen binding unit.

In some embodiments of the invention,
i) the first Fc domain comprises a tyrosine (Y) at position 366 [T366Y], and the second Fc domain comprises a threonine (T) at position 407 [Y407T], or
ii) the first Fc domain comprises a tryptophan (W) at position 366 [T366W], and the second Fc domain comprises a serine (S) at position 366 [T366S], an alanine (A) at position 368 [L368A] and a valine (V) at position 407 [Y407V], or
iii) the second Fc domain comprises a tyrosine (Y) at position 366 [T366Y], and the first Fc domain comprises a threonine (T) at position 407 [Y407T], or
iv) the second Fc domain comprises a tryptophan (W) at position 366 [T366W], and the first Fc domain comprises a serine (S) at position 366 [T366S], an alanine (A) at position 368 [L368A] and a valine (V) at position 407 [Y407V], preferably the first or the second Fc domain further comprises an arginine at position 435 [H435R] and a phenylalanine at position 436 [Y436F]. In some embodiments, the first and/or second Fc domain further comprises an alanine at position 234[L234A] and at position 235 [L235A]. In some embodiments, the first light chain constant domain and the second light chain constant domain comprise a human kappa or lambda domain.

In preferred embodiments, the binding protein of the invention comprises a first polypeptide chain specifically binding to DLL3 comprising an amino acid sequence selected from the group consisting of SEQ ID NO:73, SEQ ID NO:74, SEQ ID NO:75, SEQ ID NO:76, SEQ ID NO:77, SEQ ID NO:78, SEQ ID NO:241, SEQ ID NO; 242, SEQ ID NO:243, SEQ ID NO:244, SEQ ID NO: 245, SEQ ID NO: 246, SEQ ID NO: 247, SEQ ID NO: 248, SEQ ID NO: 249, SEQ ID NO: 250, SEQ ID NO: 251, and SEQ ID NO: 252 and a second polypeptide chain specifically binding to CD3 comprising the amino acid sequence of SEQ ID NO:79, SEQ ID NO:80 or SEQ ID NO:105.

In a further aspect, the invention provides an isolated nucleic acid molecule i) encoding a first antigen binding unit and/or a second antigen binding unit of a protein of the invention, optionally further encoding a first and/or a second Fc domain, or ii) encoding a first and/or a second polypeptide chain of a protein of the invention. In further aspects provided herein are expression vectors comprising the nucleic acid molecule of the invention, host cells transfected with such expression vectors, and methods of manufacturing a protein of the invention.

In a further aspect of the invention, provided herein is a multi-specific binding protein comprising a first polypeptide chain specifically binding to DLL3 and a second polypeptide chain specifically binding to CD3, where the first polypeptide chain comprises a first light chain, a first linker, and a first heavy chain and the second polypeptide chain comprises a second light chain, a second linker, and a second heavy chain, preferably the C-terminus of said first light chain is covalently bound to the N-terminus of said first heavy chain via said first peptide linker and the C-terminus of said second light chain is covalently bound to the N-terminus of said second heavy chain via said second peptide linker.

In some embodiments of the binding protein of the invention, the first polypeptide chain specifically binding to DLL3 comprises a light chain variable domain and heavy chain variable domain comprising CDR sequences and/or VH/VL sequences as defined for the antigen binding units of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17, or DLL3 #18 described herein. In some embodiments, the second polypeptide chain specifically binding to CD3 comprises a light chain variable and heavy chain variable domain comprising CDR sequences and/or VH/VL sequences as defined for the antigen binding units of CD3 #1, CD3 #2, or CD3 #3 described herein.

Further aspects, embodiments, uses and methods involving the binding proteins of the invention will become clear from the following detailed description of the invention and from the appended claims.

The invention provides for novel binding proteins that allow a more efficient treatment of DLL3 expressing cancers, such as SCLC, glioblastoma or a DLL3 expressing neuroendocrine tumor.

BRIEF DESCRIPTION OF THE DRAWINGS

FIG. 5: Binding of seven exemplary DLL3/CD3 binding proteins to cell lines expressing human DLL1 and DLL4, no binding to human DLL1 and DLL4 detected. The y-axis depicts counts, the x-axis depicts PE-A (phycoerythrin signal area).

FIG. 6 C: Binding of exemplary DLL3/CD3 binding proteins (directed against the DSL domain) to SHP77 cells.

FIG. 6 D: Binding of exemplary DLL3/CD3 binding proteins (directed against the EGF1 domain) to SHP77 cells.

FIG. 6 E: Binding of exemplary DLL3/CD3 binding proteins (directed against the EGF3 domain) to SHP77 cells.

FIG. 6 F: Binding of exemplary DLL3/CD3 binding proteins (directed against the EGF4 domain) to SHP77 cells.

FIG. 6 G: Binding of exemplary DLL3/CD3 binding proteins (directed against the DSL domain) to SHP77 cells.

FIG. 6 H: Binding of exemplary DLL3/CD3 binding proteins (directed against the membrane proximal peptide domain) to SHP77 cells.

FIG. 6 I: Binding of exemplary DLL3/CD3 binding proteins (directed to a peptide that is neither the DSL nor the EGF1-6 nor the membrane proximal peptide) to NCI-H82 cells.

FIG. 6 J: Binding of exemplary DLL3/CD3 binding proteins (directed against the DSL domain) to NCI-H82 cells.

FIG. 6 K: Binding of exemplary DLL3/CD3 binding proteins (directed against the EGF1 domain) to NCI-H82 cells.

FIG. 6 L: Binding of exemplary DLL3/CD3 binding proteins (directed against the EGF3 domain) to NCI-H82 cells.

FIG. 6 M: Binding of exemplary DLL3/CD3 binding proteins (directed against the EGF4 domain) to NCI-H82 cells.

FIG. 6 N: Binding of exemplary DLL3/CD3 binding proteins (directed against the DSL domain) to NCI-H82 cells.

FIG. 6 O: Binding of exemplary DLL3/CD3 binding proteins (directed against the membrane proximal peptide domain) to NCI-H82 cells.

FIG. 6 P: Binding of exemplary DLL3/CD3 binding proteins (directed to a peptide that is neither the DSL nor the EGF1-6 nor the membrane proximal peptide) to T cells.

FIG. 6 Q: Binding of exemplary DLL3/CD3 binding proteins (directed against the DSL domain) to T cells.

FIG. 6 R: Binding of exemplary DLL3/CD3 binding proteins (directed against the EGF1 domain) to T cells.

FIG. 6 S: Binding of exemplary DLL3/CD3 binding proteins (directed against the EGF3 domain) to T cells.

FIG. 6 T: Binding of exemplary DLL3/CD3 binding proteins (directed against the EGF4 domain) to T cells.

FIG. 6 U: Binding of exemplary DLL3/CD3 binding proteins (directed against the EGF6 domain) to T cells.

FIG. 6 V: Binding of exemplary DLL3/CD3 binding proteins (directed against the membrane proximal peptide domain) to T cells.

FIG. 7 C: Potency in lysing cells of exemplary DLL3/CD3 binding proteins (directed against the DSL domain) redirecting non-stimulated T cells towards human SHP77 cells.

FIG. 7 D: Potency in lysing cells of exemplary DLL3/CD3 binding proteins (directed against the EGF1 domain redirecting non-stimulated T cells towards human SHP77 cells.

FIG. 7 E: Potency in lysing cells of exemplary DLL3/CD3 binding proteins (directed against the EGF3 domain) redirecting non-stimulated T cells towards human SHP77 cells.

FIG. 7 F: Potency in lysing cells of exemplary DLL3/CD3 binding proteins (directed against the EGF4 domain) redirecting non-stimulated T cells towards human SHP77 cells.

FIG. 7 G: Potency in lysing cells of exemplary DLL3/CD3 binding proteins (directed against the EGF6 domain) redirecting non-stimulated T cells towards human SHP77 cells.

FIG. 7 H: Potency in lysing cells of exemplary DLL3/CD3 binding proteins (directed against the membrane proximal peptide redirecting non-stimulated T cells towards human SHP77 cells.

FIG. 7 I: Potency in lysing cells of exemplary DLL3/CD3 binding proteins (directed to a peptide that is neither the DSL nor the EGF1-6 nor the membrane proximal peptide) redirecting non-stimulated T cells towards human NCI-H82 cells.

FIG. 7 J: Potency in lysing cells of exemplary DLL3/CD3 binding proteins (directed against the DSL domain) redirecting non-stimulated T cells towards human NCI-H82 cells.

FIG. 7 K: Potency in lysing cells of exemplary DLL3/CD3 binding proteins (directed against the EGF1 domain redirecting non-stimulated T cells towards human NCI-H82 cells.

FIG. 7 L: Potency in lysing cells of exemplary DLL3/CD3 binding proteins (directed against the EGF3 domain) redirecting non-stimulated T cells towards human NCI-H82 cells.

FIG. 7 M: Potency in lysing cells of exemplary DLL3/CD3 binding proteins (directed against the EGF4 domain) redirecting non-stimulated T cells towards human NCI-H82 cells.

FIG. 7 N: Potency in lysing cells of exemplary DLL3/CD3 binding proteins (directed against the EGF6 domain) redirecting non-stimulated T cells towards human NCI-H82 cells.

FIG. 7 O: Potency in lysing cells of exemplary DLL3/CD3 binding proteins (directed against the membrane proximal peptide redirecting non-stimulated T cells towards human NCI-H82 cells.

FIGS. 25A, C, and E show cell pellets stained with anti-DLL3 antibody DLL3 #5, and FIGS. 25 B, D, and F are the respective cell lines stained with an isotype matched control.

DETAILED DESCRIPTION OF THE INVENTION

Used Terms and Definitions

Figure 1:
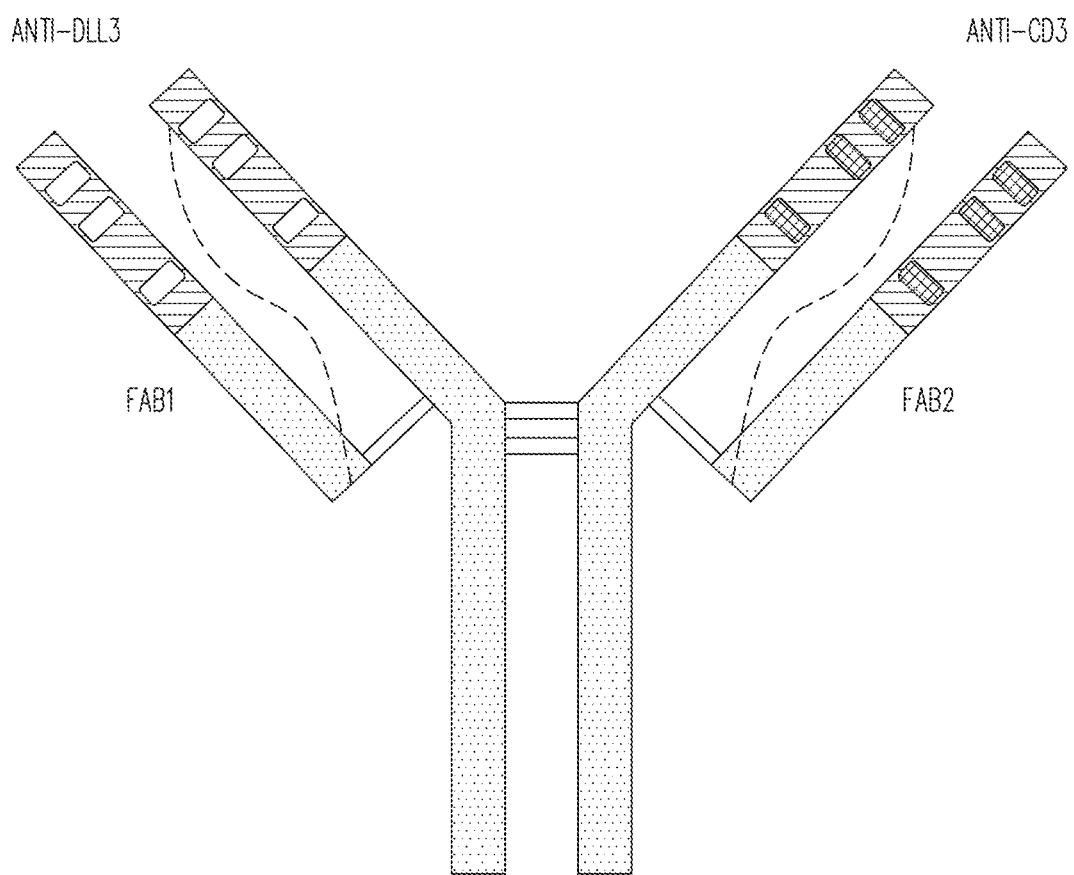
FIG. 1: Schematic representation of a bispecific binding protein of the invention

The above and other aspects and embodiments of the invention will become clear from the further description herein, in which:

Unless indicated or defined otherwise, all terms used have their usual meaning in the art, which will be clear to the skilled person. Reference is for example made to the standard handbooks, such as Sambrook et al, "Molecular Cloning: A Laboratory Manual" (2nd Ed.), Vols. 1-3, Cold Spring Harbor Laboratory Press (1989); Lewin, "Genes IV", Oxford University Press, New York, (1990), and Roitt et al., "Immunology" ($2^{nd}$ Ed.), Gower Medical Publishing, London, New York (1989), as well as to the general background art cited herein. Furthermore, unless indicated otherwise, all methods, steps, techniques and manipulations that are not specifically described in detail can be performed and have been performed in a manner known per se, as will be clear to the skilled person. Reference is for example again made to the standard handbooks, to the general background art referred to above and to the further references cited therein.

When used herein the term "comprising" and variations thereof such as "comprises" and "comprise" can be substituted with the term "containing" or "including" or "having."

The term "sequence" as used herein (for example in terms like "heavy/light chain sequence", "antibody sequence", "variable domain sequence", "constant domain sequence" or "protein sequence"), should generally be understood to include both the relevant amino acid sequence as well as nucleic acid sequences or nucleotide sequences encoding the same, unless the context requires a more limited interpretation.

An "antigen binding unit" as used herein refers to a polypeptide capable of binding to its specific target or antigen and comprising the minimal structural requirements derived from an antibody (typically present in an antibody) which allow for target binding. Thus, an antigen binding unit comprises at least the presence of three light chain and three heavy chain CDR sequences, preferably at least a light chain variable domain and a heavy chain variable domain.

The generalized structure of an antibody or immunoglobulin is well known to those of skill in the art. These molecules are heterotetrameric glycoproteins, typically of about 150,000 daltons, composed of two identical light (L) chains and two identical heavy (H) chains and are typically referred to as full length antibodies. Each light chain is covalently linked to a heavy chain by one disulfide bond to form a heterodimer, and the heterotetrameric molecule is formed through a covalent disulfide linkage between the two identical heavy chains of the heterodimers. Although the light and heavy chains are linked together by one disulfide bond, the number of disulfide linkages between the two heavy chains varies by immunoglobulin isotype. Each heavy and light chain also has regularly spaced intrachain disulfide bridges. Each heavy chain has at the N-terminus a variable domain (VH), followed by three or four (in case of IgE) constant domains (CH1, CH2, CH3, and CH4), as well as a hinge region between CH1 and CH2. Each light chain has two domains, an N-terminal variable domain (VL) and a C-terminal constant domain (CL). The VL domain associates non-covalently with the VH domain, whereas the CL domain is commonly covalently linked to the CH1 domain via a disulfide bond. Particular amino acid residues are believed to form an interface between the light and heavy chain variable domains (Chothia et al., 1985, J. Mol. Biol. 186:651-663). Variable domains are also referred to herein as variable regions or Fv and denote the part that confers specificity to an antibody for the antigen by carrying the antigen-binding site.

The "light chain variable domain" (or "light chain variable region") and "heavy chain variable domain" (or "heavy chain variable region") as used herein have the same general structure and each domain essentially consists of four framework (FR) regions whose sequences are widely conserved, which are referred to in the art and hereinbelow as "framework region 1" or "FR1"; as "framework region 2" or "FR2"; as "framework region 3" or "FR3"; and as "framework region 4" or "FR4", respectively; which framework regions are interrupted by three hypervariable regions, HVRs (or CDRs), which are referred to in the art and herein below as "complementarity determining region 1" or "CDR1"; as "complementarity determining region 2" or "CDR2"; and as "complementarity determining region 3" or "CDR3", respectively. Thus, the general structure or sequence of an immunoglobulin variable domain can be indicated as follows: FR1-CDR1-FR2-CDR2-FR3-CDR3-FR4. The framework regions adopt a beta-sheet conformation and the CDRs may form loops connecting the beta-sheet structure. The CDRs in each chain are held in their three-dimensional structure by the framework regions and form together with the CDRs from the other chain the antigen binding site.

Within the context of this invention, reference to CDR's is based on the definition of CCG, also referred to as IMGT (Lefranc M P, Pommié C, Ruiz M, Giudicelli V, Foulquier E, Truong L, Thouvenin-Contet V, Lefranc G. "IMGT unique numbering for immunoglobulin and T cell receptor variable domains and Ig superfamily V-like domains." Dev Comp Immunol. 2003 January; 27(1):55-77; Giudicelli V, Brochet X, Lefranc M P. "IMGT/V-QUEST: IMGT standardized analysis of the immunoglobulin (IG) and T cell receptor (TR) nucleotide sequences". Cold Spring Harb Protoc. 2011; 2011(6):695-715. An alternative definition of CDRs known in the art is based on Chothia (Chothia and Lesk, J. Mol. Biol. 1987, 196: 901-917), together with Kabat (E. A. Kabat, T. T. Wu, H. Bilofsky, M. Reid-Miller and H. Perry, Sequence of Proteins of Immunological Interest, National Institutes of Health, Bethesda (1983)).

The term "constant domains" or "constant region" as used within the current application denotes the sum of the domains of an antibody other than the variable region. Such constant domains and regions are well known in the state of the art and e.g. described by Kabat et al. ("Sequence of proteins of immunological interest", US Public Health Services, NIH Bethesda, MD, Publication No. 91).

The "Fc part" or "Fc domain" of an antibody is not involved directly in binding of an antibody to an antigen, but exhibits various effector functions. An "Fc part/domain of an antibody" is a term well known to the skilled artisan and defined on the basis of papain cleavage of antibodies. Depending on the amino acid sequence of the constant region of their heavy chains, antibodies or immunoglobulins are divided in the classes: IgA, IgD, IgE, IgG and IgM. According to the heavy chain constant regions the different classes of immunoglobulins are called α, δ, ε, γ, and μ respectively. Several of these may be further divided into subclasses (isotypes), e.g. IgG1, IgG2, IgG3, and IgG4, IgA1, and IgA2. The Fc part of an antibody is directly involved in ADCC (antibody dependent cell-mediated cytotoxicity) and CDC (complement-dependent cytotoxicity) based on complement activation, C1q binding and Fc receptor binding. Complement activation (CDC) is initiated by binding of complement factor C1q to the Fc part of most IgG antibody subclasses. While the influence of an antibody on the complement system is dependent on certain conditions, binding to C1q is caused by defined binding sites in the Fc part. Such binding sites are e.g. L234, L235, D270, N297, E318, K320, K322, P331 and P329 (numbering according to EU numbering (Edelman et al, Proc Natl Acad Sci USA. 1969 May; 63(1):78-85)). Most crucial among these residues in mediating C1q and Fcgamma receptor binding in IgG1 are L234 and L235 (Hezareh et al., J. Virology 75 (2001) 12161-12168, Shields et al (2001) JBC, 276 (9): 6591-6604). Antibodies of subclass IgG1 and IgG3 usually show complement activation and C1q and C3 binding, whereas IgG2 and IgG4 do not activate the complement system and do not bind C1q and C3.

The term "antibody" or "antibody molecule" (used synonymously herein) encompasses a monoclonal antibody, a polyclonal antibody, a human antibody, a humanized antibody, a chimeric antibody, multispecific antibodies (e.g., bispecific antibodies), a fragment of an antibody, in particular a Fv, Fab, Fab', or F(ab')2 fragment, a single chain antibody, in particular a single chain variable fragment (scFv), a single chain Fab fragment (scFab), a Small Modular Immunopharmaceutical (SMIP), a domain antibody, a nanobody, a diabody. The antibody may have an effector function, such as ADCC or CDC, that is usually mediated by the Fc part (antibody constant region) of the antibody, or it may have no effector function, e.g. by lacking a Fc part or having a blocked, masked Fc part, in essence a Fc part that is not or insufficiently recognized by immune cells or immune system components, like the complement system.

Monoclonal antibodies (mAb) are monospecific antibodies that are identical in amino acid sequence. They may be produced by hybridoma technology from a hybrid cell line (called hybridoma) representing a clone of a fusion of a specific antibody-producing B cell with a myeloma (B cell cancer) cell (Kohler G, Milstein C. Continuous cultures of fused cells secreting antibody of predefined specificity. Nature 1975; 256:495-7.). Alternatively, monoclonal antibodies may be produced by recombinant expression in host cells (Norderhaug L, Olafsen T, Michaelsen T E, Sandlie I. (May 1997). "Versatile vectors for transient and stable expression of recombinant antibody molecules in mammalian cells." J Immunol Methods 204 (1): 77-87; see also below). A "recombinant antibody" or "recombinant binding protein" is an antibody or binding protein which has been produced by a recombinantly engineered host cell. It is optionally isolated or purified.

Full length antibodies can be treated with enzymes such as papain or pepsin to generate useful antibody fragments. Papain digestion is used to produces two identical antigen-binding antibody fragments called "Fab" fragments, each with a single antigen-binding site, and a residual "Fc" fragment. The Fab fragment also contains the constant domain of the light chain and the CH1 domain of the heavy chain. Pepsin treatment yields a F(ab')2 fragment that has two antigen-binding sites and is still capable of cross-linking antigen.

Fab' fragments differ from Fab fragments by the presence of additional residues including one or more cysteines from the antibody hinge region at the C-terminus of the CH1 domain. F(ab')2 antibody fragments are pairs of Fab' fragments linked by cysteine residues in the hinge region. Other chemical couplings of antibody fragments are also known.

"Fv" fragment contains a complete antigen-recognition and binding site consisting of a dimer of one heavy and one light chain variable domain in tight, non-covalent association. In this configuration, the three CDRs of each variable domain interact to define an antigen-biding site on the surface of the VH-VL dimer. Collectively, the six CDRs confer antigen-binding specificity to the antibody.

A "single-chain Fv" or "scFv" antibody fragment is a single chain Fv variant comprising the VH and VL domains of an antibody where the domains are present in a single polypeptide chain. The single chain Fv is capable of recognizing and binding an antigen. The scFv polypeptide may optionally also contain a polypeptide linker positioned between the VH and VL domains in order to facilitate formation of a desired three-dimensional structure for antigen binding by the scFv (see, e.g., Pluckthun, 1994, In The Pharmacology of monoclonal Antibodies, Vol. 113, Rosenburg and Moore eds., Springer-Verlag, New York, pp. 269-315).

A "single-chain Fab" or "scFab" antibody fragment is a single chain Fab variant comprising the VL, CL, VH and CH1 domains of an antibody where the domains are present in a single polypeptide chain. The single chain Fab is capable of recognizing and binding an antigen. The scFab polypeptide may optionally also contain a polypeptide linker positioned between the CL and VH domains (Hust et al (2007) BMC Biotechnology).

For application in man, it is often desirable to reduce immunogenicity of therapeutic molecules, such as antibodies or binding proteins comprising an antigen binding unit as described herein, originally derived from other species, like mouse. This can be done by construction of chimeric antibodies/binding proteins, or by a process called "humanization". In this context, a "chimeric antibody"; or "chimeric antigen binding unit" is understood to be an antibody or an antigen binding unit comprising a sequence part (e.g. a variable domain) derived from one species (e.g. mouse) fused to a sequence part (e.g. the constant domains) derived from a different species (e.g. human) In this context, a "humanized antibody", "a humanized binding protein" or a "humanized antigen binding unit" is an antibody, a protein or antigen binding unit comprising a variable domain originally derived from a non-human species, wherein certain amino acids have been mutated to make the overall sequence of that variable domain more closely resemble a sequence of a human variable domain. Methods of humanization of antibodies are well-known in the art (Billetta R, Lobuglio A F. "Chimeric antibodies". Int Rev Immunol. 1993; 10(2-3): 165-76; Riechmann L, Clark M, Waldmann H, Winter G (1988). "Reshaping human antibodies for therapy". Nature: 332:323).

An "optimized antibody" or an "optimized antigen binding unit or protein" is a specific type of humanized antibody or humanized antigen binding unit/protein which includes an immunoglobulin amino acid sequence variant, or fragment thereof, which is capable of binding to a predetermined antigen and which comprises one or more FRs having substantially the amino acid sequence of a human immunoglobulin and one or more CDRs having substantially the amino acid sequence of a non-human immunoglobulin. This non-human amino acid sequence often referred to as an "import" sequence is typically taken from an "import" antibody domain, particularly a variable domain. In general, an optimized antibody includes at least the CDRs (or HVLs) of a non-human antibody or derived from a non-human antibody, inserted between the FRs of a human heavy or light chain variable domain. It will be understood that certain mouse FR residues may be important to the function of the optimized antibodies and therefore certain of the human germline sequence heavy and light chain variable domains residues are modified to be the same as those of the corresponding mouse sequence. During this process undesired amino acids may also be removed or changed, for example to avoid deamidation, undesirable charges or lipophilicity or non-specific binding. An "optimized antibody", an "optimized antibody fragment" or "optimized" may sometimes be referred to as "humanized antibody", "humanized antibody fragment" or "humanized", or as "sequence-optimized".

Furthermore, technologies have been developed for creating antibodies or VH/VL domains based on sequences derived from the human genome, for example by phage display or use of transgenic animals (WWW.Ablexis.com/technology-alivamab.php; WO 90/05144; D. Marks, H. R. Hoogenboom, T. P. Bonnert, J. McCafferty, A. D. Griffiths and G. Winter (1991) "By-passing immunisation. Human antibodies from V-gene libraries displayed on phage." J. Mol. Biol., 222, 581-597; Knappik et al., J. Mol. Biol. 296: 57-86, 2000; S. Carmen and L. Jermutus, "Concepts in antibody phage display". Briefings in Functional Genomics and Proteomics 2002 1(2):189-203; Lonberg N, Huszar D. "Human antibodies from transgenic mice". Int Rev Immunol. 1995; 13(1):65-93.; Bruggemann M, Taussig M J. "Production of human antibody repertoires in transgenic mice". Curr Opin Biotechnol. 1997 August; 8(4):455-8.). Such antibodies or antigen binding units or VH/VL domains are "human antibodies," "human antigen binding units," or "human VH/VL domains" in the context of the present invention.

The term "human antibody", "human antigen binding unit", or "human VH/VL domain" as used herein, is intended to include antibodies, antigen binding units or VH/VL domains having variable (and constant, if applicable) regions derived from human germline immunoglobulin sequences. The human antibodies, antigen binding units, proteins or VH/VL domains of the present technology may include amino acid residues not encoded by human germline immunoglobulin sequences (e.g., mutations introduced by random or site-specific mutagenesis in vitro or by somatic mutation in vivo). However, the term "human antibody", "human antigen binding unit", or "human VH/VL domain" as used herein, is not intended to include antibodies in which CDR sequences derived from the germline of another (mammalian species), such as a mouse, rat or rabbit, have been grafted onto human framework sequences. Thus, as used herein, the term "human antibody", "human antigen binding unit", or "human VH/VL domain" refer to an antibody, antigen binding unit or VH/VL domain in which substantially every part of the protein (e.g., CDR, framework, CL, CH domains (e.g., CHI, CH2, CH3), hinge, VL, VH) is substantially non-immunogenic in humans, with only minor sequence changes or variations. Such changes or variations optionally and preferably retain or reduce the immunogenicity in humans or other species relative to non-modified antibodies or antigen binding units.

Thus, a human antibody, human antigen binding unit or human VH/VL domain is distinct from e.g., a chimeric or humanized antibody. It is pointed out that a human antibody, human antigen binding unit or human VH/VL domain can be produced by a non-human animal or prokaryotic or eukaryotic cell that is capable of expressing functionally rearranged human immunoglobulin (e.g., heavy chain and/or light chain) genes.

The term "monomer" refers to a homogenous form of an antibody or a multispecific protein as described herein. For example, for a full-length antibody, monomer means a monomeric antibody having two identical heavy chains and two identical light chains. In the context of the present invention, a monomer means a protein of the present invention having a single antigen binding unit specific for DLL3, and a single antigen binding unit specific for CD3 as described herein. For example, a monomer of a binding protein described herein may have two chains, a first chain comprising a single chain Fab with a first antigen binding unit and optionally a first Fc domain and a second chain comprising a single chain Fab with a second antigen binding unit and optionally a second Fc domain.

An epitope is a region of an antigen that is bound by an antibody or antigen binding moiety (e.g. the antigen binding unit of the proteins described herein). The term "epitope" includes any polypeptide determinant capable of specific binding to an antibody or antigen binding moiety. In certain embodiments, epitope determinants include chemically active surface groupings of molecules such as amino acids, glycan side chains, phosphoryl, or sulfonyl, and, in certain embodiments, may have specific three dimensional structural characteristics, and/or specific charge characteristics. Conformational and non-conformational epitopes are distinguished in that the binding to the former but not the latter is lost in the presence of denaturing solvents.

An antigen binding molecule/protein (such as an immunoglobulin, an antibody, an antigen binding unit, or a fragment of such antigen binding molecule/protein) that can "bind", "bind to", "specifically bind", or "specifically bind to", that "has affinity for", "is specific for" and/or that "has specificity for" a certain epitope, antigen or protein (or for at least one part, fragment or epitope thereof) is said to be "against" or "directed against" said epitope, antigen or protein or is a "binding" molecule/protein with respect to such epitope, antigen or protein.

As used herein, the terms "binding" and "specific binding" refer to the binding of the antibody or antigen binding moiety (such as an immunoglobulin, an antibody, an antigen binding unit, or a fragment of such antigen binding molecule/protein) to an epitope of the antigen in an in vitro assay, preferably in a plasmon resonance assay ((Malmqvist M., "Surface plasmon resonance for detection and measurement of antibody-antigen affinity and kinetics.", Curr Opin Immunol. 1993 April; 5(2):282-6.)) with purified wild-type antigen. Antibody affinity can also be measured using kinetic exclusion assay (KinExA) technology (Darling, R. J., and Brault P-A., "Kinetic exclusion assay technology: Characterization of Molecular Interactions." ASSAY and Drug Development Technologies. 2004, Dec. 2(6): 647-657).

Generally, the term "specificity" refers to the number of different types of antigens or epitopes to which a particular antigen binding molecule/protein (such as an immunoglobulin, an antibody, an antigen binding unit, or a fragment of such antigen binding molecule/protein) can bind. The specificity of an antigen-binding molecule/protein can be determined based on its affinity and/or avidity. The affinity, represented by the equilibrium constant for the dissociation of an antigen with an antigen-binding protein ($K_D$), is a measure for the binding strength between an epitope and an antigen-binding site on the antigen-binding molecule/protein: the lesser the value of the $K_D$, the stronger the binding strength between an epitope and the antigen-binding molecule/protein (alternatively, the affinity can also be expressed as the affinity constant ($K_A$), which is $1/K_D$). As will be clear to the skilled person (for example on the basis of the further disclosure herein), affinity can be determined in a manner known per se, depending on the specific antigen of interest. Avidity is the measure of the strength of binding between an antigen-binding molecule/protein (such as an immunoglobulin, an antibody, an antigen binding unit, or fragment of such antigen binding molecule/protein) and the pertinent antigen. Avidity is related to both the affinity between an epitope and its antigen binding site on the antigen-binding molecule/protein and the number of pertinent binding sites present on the antigen-binding molecule/protein.

The term "isolated," as used herein, refers to material that is removed from its original or native environment (e.g. the natural environment if it is naturally occurring). For example, a naturally-occurring polynucleotide or polypeptide present in a living animal is not isolated, but the same polynucleotide or polypeptide, separated by human intervention from some or all of the co-existing materials in the natural system, is isolated. Such polynucleotides could be part of a vector and/or such polynucleotides or polypeptides could be part of a composition, and still be isolated in that such vector or composition is not part of the environment in which it is found in nature. For example, a nucleic acid, protein/polypeptide molecule is considered to be "(in) essentially isolated (form)"—when compared to its native biological source and/or the reaction medium or cultivation medium from which it has been obtained—when it has been separated from at least one other component with which it is usually associated in said source or medium, such as another nucleic acid, another protein/polypeptide, another biological component or macromolecule or at least one contaminant, impurity or minor component. In particular, a nucleic acid or protein/polypeptide molecule is considered "essentially isolated" when it has been purified at least 2-fold, in particular at least 10-fold, more in particular at least 100-fold, and up to 1000-fold or more. A nucleic acid or protein/polypeptide molecule that is "in essentially isolated form" is preferably essentially homogeneous, as determined using a suitable technique, such as a suitable chromatographical technique, e.g., polyacrylamide-gelelectrophoresis.

As used herein, the terms "identical" or "percent identity," in the context of two or more nucleic acids or polypeptide sequences, refer to two or more sequences or subsequences that are the same or have a specified percentage of nucleotides or amino acid residues that are the same, when compared and aligned for maximum correspondence. To determine the percent identity, the sequences are aligned for optimal comparison purposes (e.g., gaps can be introduced in the sequence of a first amino acid or nucleic acid sequence for optimal alignment with a second amino or nucleic acid sequence). The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position. The percent identity between the two sequences is a function of the number of identical positions shared by the sequences (i.e., % identity=# of identical positions/total # of positions (e.g., overlapping positions)×100). In some embodiments, the two sequences that are compared are the same length after gaps are introduced within the sequences, as appropriate (e.g., excluding additional sequence extending beyond the sequences being compared). For example, when variable region sequences are compared, the leader and/or constant domain sequences are not considered.

For sequence comparisons between two sequences, a "corresponding" CDR refers to a CDR in the same location in both sequences (e.g., CDR-H1 of each sequence).

The determination of percent identity or percent similarity between two sequences can be accomplished using a mathematical algorithm. A preferred, non-limiting example of a mathematical algorithm utilized for the comparison of two sequences is the algorithm of Karlin and Altschul, 1990, Proc. Natl. Acad. Sci. USA 87:2264-2268, modified as in Karlin and Altschul, 1993, Proc. Natl. Acad. Sci. USA 90:5873-5877. Such an algorithm is incorporated into the NBLAST and XBLAST programs of Altschul et al., 1990, J. Mol. Biol. 215:403-410. BLAST nucleotide searches can be performed with the NBLAST program, score=100, wordlength=12, to obtain nucleotide sequences homologous to a nucleic acid encoding a protein of interest. BLAST protein searches can be performed with the XBLAST program, score=50, wordlength=3, to obtain amino acid sequences homologous to a protein of interest. To obtain gapped alignments for comparison purposes, Gapped BLAST can be utilized as described in Altschul et al., 1997, Nucleic Acids Res. 25:3389-3402. Alternatively, PSI-Blast can be used to perform an iterated search which detects distant relationships between molecules (Id.). When utilizing BLAST, Gapped BLAST, and PSI-Blast programs, the default parameters of the respective programs (e.g., XBLAST and NBLAST) can be used. Another preferred, non-limiting example of a mathematical algorithm utilized for the comparison of sequences is the algorithm of Myers and Miller, CABIOS (1989). Such an algorithm is incorporated into the ALIGN program (version 2.0) which is part of the GCG sequence alignment software package. When utilizing the ALIGN program for comparing amino acid sequences, a PAM120 weight residue table, a gap length penalty of 12, and a gap penalty of 4 can be used. Additional algorithms for sequence analysis are known in the art and include ADVANCE and ADAM as described in Torellis and Robotti, 1994, Comput. Appl. Biosci. 10:3-5; and FASTA described in Pearson and Lipman, 1988, Proc. Natl. Acad. Sci. USA 85:2444-8. Within FASTA, ktup is a control option that sets the sensitivity and speed of the search. If ktup=2, similar regions in the two sequences being compared are found by looking at pairs of aligned residues; if ktup=1, single aligned amino acids are examined ktup can be set to 2 or 1 for protein sequences, or from 1 to 6 for DNA sequences. The default if ktup is not specified is 2 for proteins and 6 for DNA. Alternatively, protein sequence alignment may be carried out using the CLUSTAL W algorithm, as described by Higgins et al., 1996, Methods Enzymol. 266:383-402.

The term "covalently linked" as used herein means either a direct covalent bond between residues, or an indirect association where two residues are not directly bonded but are both covalently bonded to an intermediate molecule or domain, e.g. an intermediate domain of an immunoglobulin.

The terms "compete" or "cross-compete" are used interchangeably herein to refer to the ability of an antibody molecule to interfere with binding of an antibody molecule, e.g., an anti-DLL3 antibody molecule of the invention, to a target, e.g., human DLL3. The interference with binding can be direct or indirect (e.g., through an allosteric modulation of the antibody molecule or the target). The extent to which an antibody molecule is able to interfere with the binding of another antibody molecule to the target, and therefore whether it can be said to compete, can be determined using a competition binding assay, for example, a FACS assay, an ELISA or BIACORE assay. In some embodiments, a competition binding assay is a quantitative competition assay. In some embodiments, a first anti-DLL3 antibody molecule is said to compete for binding to the target with a second anti-DLL3 antibody molecule when the binding of the first antibody molecule to the target is reduced by 10% or more, e.g., 20% or more, 30% or more, 40% or more, 50% or more, 55% or more, 60% or more, 65% or more, 70% or more, 75% or more, 80% or more, 85% or more, 90% or more, 95% or more, 98% or more, 99% or more in a competition binding assay (e.g., a competition assay described herein).

It is to be inferred without explicit recitation and unless otherwise intended, that when the present technology relates to a polypeptide, protein, polynucleotide or antibody, an equivalent or a biologically equivalent of such is intended within the scope of the present technology.

As used herein, the term "biological equivalent thereof" is intended to be synonymous with "equivalent thereof" when referring to a reference protein, antibody, polypeptide, polynucleotide or nucleic acid, and intends those having minimal homology while still maintaining desired structure or functionality. Unless specifically recited herein, it is contemplated that any nucleic acid, polynucleotide, polypeptide, protein or antibody mentioned herein also includes equivalents thereof. For example, an equivalent intends at least about 80% homology or identity and alternatively, at least about 85%, or alternatively at least about 90%, or alternatively at least about 95%, or alternatively 98% percent homology or identity and exhibits substantially equivalent biological activity to the reference protein, polypeptide, antibody or nucleic acid.

As used herein, the term "detectable label" refers to a molecule, compound or composition that can produce a detectable signal, i.e. physical or chemical signal including a colorimetric, fluorescent, electrical, radioactive and chemiluminescent signal, which can be measured by visual or instrumental methods, and which indicates the presence and/or quantity/concentration of the label in a sample.

A "detectable signal" can be generated by various mechanism including absorption, emission and/or scattering of a photon (including radio frequency, microwave frequency, infrared frequency, visible frequency and ultra-violet frequency photons) and includes but is not limited to colorimetric, fluorescent, electrical, radioactive and chemiluminescent signals.

As used herein, "expression" refers to the process by which polynucleotides are transcribed into mRNA and/or the process by which the transcribed mRNA is subsequently being translated into peptides, polypeptides, or proteins. If the polynucleotide is derived from genomic DNA, expression may include splicing of the mRNA in an eukaryotic cell. The expression level of a gene may be determined by measuring the amount of mRNA or protein in a cell or tissue sample.

As used herein the term "biological sample" means a sample material derived from or contacted by living cells. The term is intended to include tissues, cells and biological fluids isolated from a subject. As used herein, the term "tissue sample" shall refer to a cellular sample that preserves the cross-sectional spatial relationship between the cells as they existed within the subject from which the sample was obtained. Biological samples can also be obtained from biopsies of internal organs or from cancers.

"Histochemistry" and cytochemistry" are techniques used to identify a molecule within the context of intact cells by labeling the samples with an agent that binds specifically to the molecule in a manner than can be visualized on a microscope "Immunohistochemistry" and "immunocytochemistry" are types of histochemistry and cytochemistry that use antibodies to label the molecules.

Multi-Specific Binding Proteins of the Invention

The present invention provides multi-specific binding proteins comprising at least one antigen binding unit specifically binding to DLL3 (a first antigen binding unit), and at least one antigen binding unit specifically binding to CD3 (a second antigen binding unit). Such (multi-specific) binding proteins are also referred to herein as (multi-specific) binding molecules or DLL3/CD3 binding proteins or DLL3/CD3 binding molecules.

The inventors have surprisingly found that multi-specific binding proteins of the invention induce selective lysis of DLL3-positive SCLC cell lines in the presence of T cells and are already active at low effector to target cell ratios. Importantly, the binding proteins of the invention do not cause T cell activation, T cell proliferation, and Cytokine secretion in the absence of DLL3-positive cells or lysis of DLL3-negative cells.

For avoidance of doubt, DLL3 as used herein refers to human DLL3 of UniProt Q9NYJ7 and the nucleic acid sequence encoding that protein. CD3 as used herein refers to human CD3epsilon (UniProt P07766) and CD3 gamma (Uniprot: P09693) complexes (human CD3εγ complexes).

Targeting DLL3 with a bispecific T cell engaging approach is expected to provide advantages over an ADC approach, as redirecting T cells is not influenced by resistance to chemotherapy and low expression levels on the cell surface are less critical for this mode of action. T cell engagers are multi-specific binding proteins with binding arms to CD3 on T cells and binding arms to an antigen on the cell surface of tumor cells. Through simultaneously binding to T cells and tumor cells, the T cell engagers force formation of a cytolytic synapse between the two cells and so, redirect the T cell activity selectively to the targeted tumor cells.

In one aspect, the multi-specific binding protein of the invention comprises a first antigen binding unit specifically binding to DLL3 and a second antigen binding unit specifically binding to CD3, wherein said first binding unit is selected from the group consisting of i) to xviii):

i) an antigen binding unit comprising light chain CDRs comprising the amino acid sequences of SEQ ID NO:1 (CDR1), SEQ ID NO:2 (CDR2) and SEQ ID NO:3 (CDR3) and heavy chain CDRs comprising the amino acid sequences of SEQ ID NO:4 (CDR1), SEQ ID NO:5 (CDR2) and SEQ ID NO:6 (CDR3) (antigen binding unit DLL3 #1);

ii) an antigen binding unit comprising light chain CDRs comprising the amino acid sequences of SEQ ID NO:7 (CDR1), SEQ ID NO:8 (CDR2) and SEQ ID NO:9 (CDR3) and heavy chain CDRs comprising the amino acid sequences of SEQ ID NO:10 (CDR1), SEQ ID NO:11 (CDR2) and SEQ ID NO:12 (CDR3) (antigen binding unit DLL3 #2);

iii) an antigen binding unit comprising light chain CDRs comprising the amino acid sequences of SEQ ID NO:13 (CDR1), SEQ ID NO:14 (CDR2) and SEQ ID NO:15 (CDR3) and heavy chain CDRs comprising the amino acid sequences of SEQ ID NO:16 (CDR1), SEQ ID NO:17 (CDR2) and SEQ ID NO:18 (CDR3) (antigen binding unit DLL3 #3);

iv) an antigen binding unit comprising light chain CDRs comprising the amino acid sequences of SEQ ID NO:19 (CDR1), SEQ ID NO:20 (CDR2) and SEQ ID NO:21 (CDR3) and heavy chain CDRs comprising the amino acid sequences of SEQ ID NO:22 (CDR1), SEQ ID NO:23 (CDR2) and SEQ ID NO:24 (CDR3) (antigen binding unit DLL3 #4);

v) an antigen binding unit comprising light chain CDRs comprising the amino acid sequences of SEQ ID NO:25 (CDR1), SEQ ID NO:26 (CDR2) and SEQ ID NO:27 (CDR3) and heavy chain CDRs comprising the amino acid sequences of SEQ ID NO:28 (CDR1), SEQ ID NO:29 (CDR2) and SEQ ID NO:30 (CDR3) (antigen binding unit DLL3 #5);

vi) an antigen binding unit comprising light chain CDRs comprising the amino acid sequences of SEQ ID NO:31 (CDR1), SEQ ID NO:32 (CDR2) and SEQ ID NO:33 (CDR3) and heavy chain CDRs comprising the amino acid sequences of SEQ ID NO:34 (CDR1), SEQ ID NO:35 (CDR2) and SEQ ID NO:36 (CDR3) (antigen binding unit DLL3 #6);

vii) an antigen binding unit comprising light chain CDRs comprising the amino acid sequences of SEQ ID NO:133 (CDR1), SEQ ID NO:134 (CDR2) and SEQ ID NO:135 (CDR3) and heavy chain CDRs comprising the amino acid sequences of SEQ ID NO:136 (CDR1), SEQ ID NO:137 (CDR2) and SEQ ID NO:138 (CDR3) (antigen binding unit DLL3 #7);

viii) an antigen binding unit comprising light chain CDRs comprising the amino acid sequences of SEQ ID NO:139 (CDR1), SEQ ID NO:140 (CDR2) and SEQ ID NO:141 (CDR3) and heavy chain CDRs comprising the amino acid sequences of SEQ ID NO:142 (CDR1), SEQ ID NO:143 (CDR2) and SEQ ID NO:144 (CDR3) (antigen binding unit DLL3 #8);

ix) an antigen binding unit comprising light chain CDRs comprising the amino acid sequences of SEQ ID NO:145 (CDR1), SEQ ID NO:146 (CDR2) and SEQ ID NO:147 (CDR3) and heavy chain CDRs comprising the amino acid sequences of SEQ ID NO:148 (CDR1), SEQ ID NO:149 (CDR2) and SEQ ID NO:150 (CDR3) (antigen binding unit DLL3 #9);

x) an antigen binding unit comprising light chain CDRs comprising the amino acid sequences of SEQ ID NO:151 (CDR1), SEQ ID NO:152 (CDR2) and SEQ ID NO:153 (CDR3) and heavy chain CDRs comprising the amino acid sequences of SEQ ID NO:154 (CDR1), SEQ ID NO:155 (CDR2) and SEQ ID NO:156 (CDR3) (antigen binding unit DLL3 #10);

xi) an antigen binding unit comprising light chain CDRs comprising the amino acid sequences of SEQ ID NO:157 (CDR1), SEQ ID NO:158 (CDR2) and SEQ ID NO:159 (CDR3) and heavy chain CDRs comprising the amino acid sequences of SEQ ID NO:160 (CDR1), SEQ ID NO:161 (CDR2) and SEQ ID NO:162 (CDR3) (antigen binding unit DLL3 #11);

xii) an antigen binding unit comprising light chain CDRs comprising the amino acid sequences of SEQ ID NO:163 (CDR1), SEQ ID NO:164 (CDR2) and SEQ ID NO:165 (CDR3) and heavy chain CDRs comprising the amino acid sequences of SEQ ID NO:166 (CDR1), SEQ ID NO:167 (CDR2) and SEQ ID NO:168 (CDR3) (antigen binding unit DLL3 #12);

xiii) an antigen binding unit comprising light chain CDRs comprising the amino acid sequences of SEQ ID NO:169 (CDR1), SEQ ID NO:170 (CDR2) and SEQ ID NO:171 (CDR3) and heavy chain CDRs comprising the amino acid sequences of SEQ ID NO:172 (CDR1), SEQ ID NO:173 (CDR2) and SEQ ID NO:174 (CDR3) (antigen binding unit DLL3 #13);

xiv) an antigen binding unit comprising light chain CDRs comprising the amino acid sequences of SEQ ID NO:175 (CDR1), SEQ ID NO:176 (CDR2) and SEQ ID NO:177 (CDR3) and heavy chain CDRs comprising the amino acid sequences of SEQ ID NO:178 (CDR1), SEQ ID NO:179 (CDR2) and SEQ ID NO:180 (CDR3) (antigen binding unit DLL3 #14);

xv) an antigen binding unit comprising light chain CDRs comprising the amino acid sequences of SEQ ID NO:181 (CDR1), SEQ ID NO:182 (CDR2) and SEQ ID NO:183 (CDR3) and heavy chain CDRs comprising the amino acid sequences of SEQ ID NO:184 (CDR1), SEQ ID NO:185 (CDR2) and SEQ ID NO:186 (CDR3) (antigen binding unit DLL3 #15);

xvi) an antigen binding unit comprising light chain CDRs comprising the amino acid sequences of SEQ ID NO:187 (CDR1), SEQ ID NO:188 (CDR2) and SEQ ID NO:189 (CDR3) and heavy chain CDRs comprising the amino acid sequences of SEQ ID NO:190 (CDR1), SEQ ID NO:191 (CDR2) and SEQ ID NO:192 (CDR3) (antigen binding unit DLL3 #16);

xvii) an antigen binding unit comprising light chain CDRs comprising the amino acid sequences of SEQ ID NO:193 (CDR1), SEQ ID NO:194 (CDR2) and SEQ ID NO:195 (CDR3) and heavy chain CDRs comprising the amino acid sequences of SEQ ID NO:196 (CDR1), SEQ ID NO:197 (CDR2) and SEQ ID NO:198 (CDR3) (antigen binding unit DLL3 #17); and xviii) an antigen binding unit comprising light chain CDRs comprising the amino acid sequences of SEQ ID NO:199 (CDR1), SEQ ID NO:200 (CDR2) and SEQ ID NO:201 (CDR3) and heavy chain CDRs comprising the amino acid sequences of SEQ ID NO:202 (CDR1), SEQ ID NO:203 (CDR2) and SEQ ID NO:204 (CDR3) (antigen binding unit DLL3 #18).

Preferably, the first antigen binding unit of the binding protein of the invention is any one of i) to iii) as defined by the CDR sequences above.

For the avoidance of doubt, each of the specific embodiments listed herein can also be considered independent aspects of the invention.

In some embodiments of the binding protein of the invention, said second antigen binding unit specifically binding to CD3 is selected from the group consisting of i) to iii):

i) an antigen binding unit comprising light chain CDRs comprising the amino acid sequences of SEQ ID NO:55 (CDR1), SEQ ID NO:56 (CDR2) and SEQ ID NO:57 (CDR3) and heavy chain CDRs comprising the amino acid sequences of SEQ ID NO:58 (CDR1), SEQ ID NO:59 (CDR2) and SEQ ID NO:60 (CDR3) (antigen binding unit CD3 #1);

ii) an antigen binding unit comprising light chain CDRs comprising the amino acid sequences of SEQ ID NO:61 (CDR1), SEQ ID NO:62 (CDR2) and SEQ ID NO:63 (CDR3) and heavy chain CDRs comprising the amino acid sequences of SEQ ID NO:64 (CDR1), SEQ ID NO:65 (CDR2) and SEQ ID NO:66 (CDR3) (antigen binding unit CD3 #2); and iii) an antigen binding unit comprising light chain CDRs comprising the amino acid sequences of SEQ ID NO:96 (CDR1), SEQ ID NO:97 (CDR2) and SEQ ID NO:98 (CDR3) and heavy chain CDRs comprising the amino acid sequences of SEQ ID NO:99 (CDR1), SEQ ID NO:100 (CDR2) and SEQ ID NO:101 (CDR3) (antigen binding unit CD3 #3).

The first antigen binding units i) to xviii) as outlined above are termed DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 and DLL3 #18, respectively and the second antigen binding units i) to iii) as outlined above are termed CD3 #1, CD3 #2 and CD3 #3, respectively. Provided herein is a sequence table which readily allows identification of individual amino acid sequences to specific antigen binding units and full length binding proteins of the present invention. A summary is provided in Table 1 in Example 2.

The terms "first" and "second" with respect to antigen binding units in general, as used herein, is solely intended to indicate that these units are two different units (as they bind to different target antigens). Thus, these terms shall not be understood to refer to the exact order or sequence of the units within the binding protein of the invention.

In some embodiments, the binding protein of the invention comprises a first antigen binding unit selected from the group consisting of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 and DLL3 #18 as defined by the respective CDR sequences described above and a second antigen binding unit of CD3 #1 as defined by the respective CDR sequences described above. In preferred embodiments, the binding protein of the invention comprises a first antigen binding unit selected from the group consisting of DLL3 #1, DLL3 #2, and DLL3 #3 as defined by the respective CDR sequences described above and a second antigen binding unit of CD3 #1 as defined by the respective CDR sequences described above.

In some embodiments, the binding protein of the invention comprises a first antigen binding unit selected from the group consisting of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 and DLL3 #18 as defined by the respective CDR sequences described above and a second antigen binding unit of CD3 #2 as defined by the respective CDR sequences described above. In preferred embodiments, the binding protein of the invention comprises a first antigen binding unit selected from the group consisting of DLL3 #1, DLL3 #2, and DLL3 #3 as defined by the respective CDR sequences described above and a second antigen binding unit of CD3 #2 as defined by the respective CDR sequences described above.

In some embodiments, the binding protein of the invention comprises a first antigen binding unit selected from the group consisting of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 and DLL3 #18 as defined by the respective CDR sequences described above and a second antigen binding unit of CD3 #3 as defined by the respective CDR sequences described above. In preferred embodiments, the binding protein of the invention comprises a first antigen binding unit selected from the group consisting of DLL3 #1, DLL3 #2, and DLL3 #3 as defined by the respective CDR sequences described above and a second antigen binding unit of CD3 #3 as defined by the respective CDR sequences described above.

In one preferred embodiment, the binding protein of the invention comprises a first antigen binding unit specifically binding to DLL3, comprising light chain CDRs comprising the amino acid sequences of SEQ ID NO:1 (CDR1), SEQ ID NO:2 (CDR2) and SEQ ID NO:3 (CDR3) and heavy chain CDRs comprising the amino acid sequences of SEQ ID NO:4 (CDR1), SEQ ID NO:5 (CDR2) and SEQ ID NO:6 (CDR3) and a second antigen binding unit specifically binding to CD3, comprising light chain CDRs comprising the amino acid sequences of SEQ ID NO:55 (CDR1), SEQ ID NO:56 (CDR2) and SEQ ID NO:57 (CDR3) and heavy chain CDRs comprising the amino acid sequences of SEQ ID NO:58 (CDR1), SEQ ID NO:59 (CDR2) and SEQ ID NO:60 (CDR3).

In one preferred embodiment, the binding protein of the invention comprises a first antigen binding unit specifically binding to DLL3, comprising light chain CDRs comprising the amino acid sequences of SEQ ID NO:7 (CDR1), SEQ ID NO:8 (CDR2) and SEQ ID NO:9 (CDR3) and heavy chain CDRs comprising the amino acid sequences of SEQ ID NO:10 (CDR1), SEQ ID NO:11 (CDR2) and SEQ ID NO:12 (CDR3) and a second antigen binding unit specifically binding to CD3, comprising light chain CDRs comprising the amino acid sequences of SEQ ID NO:55 (CDR1), SEQ ID NO:56 (CDR2) and SEQ ID NO:57 (CDR3) and heavy chain CDRs comprising the amino acid sequences of SEQ ID NO:58 (CDR1), SEQ ID NO:59 (CDR2) and SEQ ID NO:60 (CDR3).

In one preferred embodiment, the binding protein of the invention comprises a first antigen binding unit specifically binding to DLL3, comprising light chain CDRs comprising the amino acid sequences of SEQ ID NO:13 (CDR1), SEQ ID NO:14 (CDR2) and SEQ ID NO:15 (CDR3) and heavy chain CDRs comprising the amino acid sequences of SEQ ID NO:16 (CDR1), SEQ ID NO:17 (CDR2) and SEQ ID NO:18 (CDR3) and a second antigen binding unit specifically binding to CD3, comprising light chain CDRs comprising the amino acid sequences of SEQ ID NO:55 (CDR1), SEQ ID NO:56 (CDR2) and SEQ ID NO:57 (CDR3) and heavy chain CDRs comprising the amino acid sequences of SEQ ID NO:58 (CDR1), SEQ ID NO:59 (CDR2) and SEQ ID NO:60 (CDR3).

In one preferred embodiment, the binding protein of the invention comprises a first antigen binding unit specifically binding to DLL3, comprising light chain CDRs comprising the amino acid sequences of SEQ ID NO:1 (CDR1), SEQ ID NO:2 (CDR2) and SEQ ID NO:3 (CDR3) and heavy chain CDRs comprising the amino acid sequences of SEQ ID NO:4 (CDR1), SEQ ID NO:5 (CDR2) and SEQ ID NO:6 (CDR3) and a second antigen binding unit specifically binding to CD3 comprising light chain CDRs comprising the amino acid sequences of SEQ ID NO:61 (CDR1), SEQ ID NO:62 (CDR2) and SEQ ID NO:63 (CDR3) and heavy chain CDRs comprising the amino acid sequences of SEQ ID NO:64 (CDR1), SEQ ID NO:65 (CDR2) and SEQ ID NO:66 (CDR3).

In one preferred embodiment, the binding protein of the invention comprises a first antigen binding unit specifically binding to DLL3, comprising light chain CDRs comprising the amino acid sequences of SEQ ID NO:7 (CDR1), SEQ ID NO:8 (CDR2) and SEQ ID NO:9 (CDR3) and heavy chain CDRs comprising the amino acid sequences of SEQ ID NO:10 (CDR1), SEQ ID NO:11 (CDR2) and SEQ ID NO:12 (CDR3) and a second antigen binding unit specifically binding to CD3, comprising light chain CDRs comprising the amino acid sequences of SEQ ID NO:61 (CDR1), SEQ ID NO:62 (CDR2) and SEQ ID NO:63 (CDR3) and heavy chain CDRs comprising the amino acid sequences of SEQ ID NO:64 (CDR1), SEQ ID NO:65 (CDR2) and SEQ ID NO:66 (CDR3).

In one preferred embodiment, the binding protein of the invention comprises a first antigen binding unit specifically binding to DLL3, comprising light chain CDRs comprising the amino acid sequences of SEQ ID NO:13 (CDR1), SEQ ID NO:14 (CDR2) and SEQ ID NO:15 (CDR3) and heavy chain CDRs comprising the amino acid sequences of SEQ ID NO:16 (CDR1), SEQ ID NO:17 (CDR2) and SEQ ID NO:18 (CDR3) and a second antigen binding unit specifically binding to CD3, comprising light chain CDRs comprising the amino acid sequences of SEQ ID NO:61 (CDR1), SEQ ID NO:62 (CDR2) and SEQ ID NO:63 (CDR3) and heavy chain CDRs comprising the amino acid sequences of SEQ ID NO:64 (CDR1), SEQ ID NO:65 (CDR2) and SEQ ID NO:66 (CDR3).

In addition to the CDR sequences as set out herein, the antigen binding units of the binding proteins of the invention include immunoglobulin framework region (FR) sequences. These sequences are preferably not immunogenic in humans, and are therefore preferably human or humanized FR sequences. Suitable human or humanized FR sequences are known in the art. Specifically preferred FR sequences can be taken from the embodiments shown herein, disclosing the complete antigen binding units and thereby CDR sequences as well as FR sequences.

In preferred embodiments of the binding proteins of the invention, the first and the second binding unit each comprise a light chain variable domain and a heavy chain variable domain derived from an antibody molecule, said light/heavy chain variable domains defined by the CDR sequences of any one of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 or DLL3 #18 for the first antigen binding unit and said light/heavy chain variable domains defined by the CDR sequences of any one of CD3 #1, CD3 #2 or CD3 #3 for the second antigen binding unit. In some embodiments of the binding protein of the invention, the VH and/or VL domain of the antigen binding units of any one or more of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17, DLL3 #18, CD3 #1, CD3 #2 or CD3 #3 is a human or humanized VH and/or VL domain.

In preferred embodiments of the invention, the light/heavy chain variable domains of the first antigen binding unit are further defined as follows i) a light chain variable domain comprising the amino acid sequences of SEQ ID NO:37 and heavy chain variable domain comprising the amino acid sequences of SEQ ID NO:38 (antigen binding unit DLL3 #1); or ii) a light chain variable domain comprising the amino acid sequences of SEQ ID NO:39 and heavy chain variable domain comprising the amino acid sequences of SEQ ID NO:40 (antigen binding unit DLL3 #2); or iii) a light chain variable domain comprising the amino acid sequences of SEQ ID NO:41 and heavy chain variable domain comprising the amino acid sequences of SEQ ID NO:42 (antigen binding unit DLL3 #3); or iv) a light chain variable domain comprising the amino acid sequences of SEQ ID NO:43 and heavy chain variable domain comprising the amino acid sequences of SEQ ID NO:44 (antigen binding unit DLL3 #4); or v) a light chain variable domain comprising the amino acid sequences of SEQ ID NO:45 and heavy chain variable domain comprising the amino acid sequences of SEQ ID NO:46 (antigen binding unit DLL3 #5); or vi) a light chain variable domain comprising the amino acid sequences of SEQ ID NO:47 and heavy chain variable domain comprising the amino acid sequences of SEQ ID NO:48 (antigen binding unit DLL3 #6); or vii) a light chain variable domain comprising the amino acid sequence of SEQ ID NO:205 and heavy chain variable domain comprising the amino acid sequence of SEQ ID NO:206 (antigen binding unit DLL3 #7); or viii) a light chain variable domain comprising the amino acid sequence of SEQ ID NO:207 and heavy chain variable domain comprising the amino acid sequence of SEQ ID NO:208 (antigen binding unit DLL3 #8); or ix) a light chain variable domain comprising the amino acid sequence of SEQ ID NO:209 and heavy chain variable domain comprising the amino acid sequence of SEQ ID NO:210 (antigen binding unit DLL3 #9); or x) a light chain variable domain comprising the amino acid sequence of SEQ ID NO:211 and heavy chain variable domain comprising the amino acid sequence of SEQ ID NO:212 (antigen binding unit DLL3 #10); or xi) a light chain variable domain comprising the amino acid sequence of SEQ ID NO:213 and heavy chain variable domain comprising the amino acid sequence of SEQ ID NO:214 (antigen binding unit DLL3 #11); or xii) a light chain variable domain comprising the amino acid sequence of SEQ ID NO:215 and heavy chain variable domain comprising the amino acid sequence of SEQ ID NO:216 (antigen binding unit DLL3 #12); or xiii) a light chain variable domain comprising the amino acid sequence of SEQ ID NO:217 and heavy chain variable domain comprising the amino acid sequence of SEQ ID NO:218 (antigen binding unit DLL3 #13); or xiv) a light chain variable domain comprising the amino acid sequence of SEQ ID NO:219 and heavy chain variable domain comprising the amino acid sequence of SEQ ID NO:220 (antigen binding unit DLL3 #14); or xv) a light chain variable domain comprising the amino acid sequence of SEQ ID NO:221 and heavy chain variable domain comprising the amino acid sequence of SEQ ID NO:222 (antigen binding unit DLL3 #15); or xvi) a light chain variable domain comprising the amino acid sequence of SEQ ID NO:223 and heavy chain variable domain comprising the amino acid sequence of SEQ ID NO:224 (antigen binding unit DLL3 #16); or xvii) a light chain variable domain comprising the amino acid sequence of SEQ ID NO:225 and heavy chain variable domain comprising the amino acid sequence of SEQ ID NO:226 (antigen binding unit DLL3 #17); or xviii) comprising a light chain variable domain comprising the amino acid sequence of SEQ ID NO:227 and heavy chain variable domain comprising the amino acid sequence of SEQ ID NO:228 (antigen binding unit DLL3 #18).

Preferably, the first antigen binding unit of the binding protein of the invention is any one of i) to iii) as defined by the VL and VH sequences above.

In preferred embodiments of the invention, the light/heavy chain variable domains of the second antigen binding unit are further defined as follows i) a light chain variable domain comprising the amino acid sequence of SEQ ID NO:67 and a heavy chain variable domain comprising the amino acid sequence of SEQ ID NO:68 (antigen binding unit CD3 #1); or ii) a light chain variable domain comprising the amino acid sequence of SEQ ID NO:69 and a heavy chain variable domain comprising the amino acid sequence of SEQ ID NO:70 (antigen binding unit CD3 #2); or iii) a light chain variable domain comprising the amino acid sequence of SEQ ID NO:102 and a heavy chain variable domain comprising the amino acid sequence of SEQ ID NO:103 (antigen binding unit CD3 #3).

In some embodiments, the binding protein of the invention comprises a combination of a first and a second antigen binding unit selected from the group consisting of DLL3 #1/CD3 #1, DLL3 #2/CD3 #1, DLL3 #3/CD3 #1, DLL3 #4/CD3 #1, DLL3 #5/CD3 #1, DLL3 #6/CD3 #1, DLL3 #7/CD3 #1, DLL3 #8/CD3 #1, DLL3 #9/CD3 #1, DLL3 #10/CD3 #1, DLL3 #11/CD3 #1, DLL3 #12/CD3 #1, DLL3 #13/CD3 #1, DLL3 #14/CD3 #1, DLL3 #15/CD3 #1, DLL3 #16/CD3 #1, DLL3 #17/CD3 #1, DLL3 #18/CD3 #1, DLL3 #1/CD3 #2, DLL3 #2/CD3 #2, DLL3 #3/CD3 #2, DLL3 #4/CD3 #2, DLL3 #5/CD3 #2, DLL3 #6/CD3 #2, DLL3 #7/CD3 #2, DLL3 #8/CD3 #2, DLL3 #9/CD3 #2, DLL3 #10/CD3 #2, DLL3 #11/CD3 #2, DLL3 #12/CD3 #2, DLL3 #13/CD3 #2, DLL3 #14/CD3 #2, DLL3 #15/CD3 #2, DLL3 #16/CD3 #2, DLL3 #17/CD3 #2, DLL3 #18/CD3 #2, DLL3 #1/CD3 #3, DLL3 #2/CD3 #3, DLL3 #3/CD3 #3, DLL3 #4/CD3 #3, DLL3 #5/CD3 #3, DLL3 #6/CD3 #3, DLL3 #7/CD3 #3, DLL3 #8/CD3 #3, DLL3 #9/CD3 #3, DLL3 #10/CD3 #3, DLL3 #11/CD3 #3, DLL3 #12/CD3 #3, DLL3 #13/CD3 #3, DLL3 #14/CD3 #3, DLL3 #15/CD3 #3, DLL3 #16/CD3 #3, DLL3 #17/CD3 #3, DLL3 #18/CD3 #3, the first and second antigen binding unit being defined by the CDR and/or VH and VL sequences of the antigen binding units as described above. In preferred embodiments, the binding protein of the invention comprises a combination of a first and a second antigen binding unit selected from the group consisting of DLL3 #1/CD3 #1, DLL3 #2/CD3 #1, DLL3 #3/CD3 #1, DLL3 #1/CD3 #2, DLL3 #2/CD3 #2, DLL3 #3/CD3 #2, DLL3 #1/CD3 #3, DLL3 #2/CD3 #3, and DLL3 #3/CD3 #3, the first and second antigen binding unit being defined by the CDR and/or VH and VL sequences of the antigen binding units as described above.

In one preferred embodiment, the binding protein of the invention comprises (i) a first antigen binding unit specifically binding to DLL3 comprising a light chain variable domain comprising the amino acid sequences of SEQ ID NO:37 and a heavy chain variable domain comprising the amino acid sequences of SEQ ID NO:38 and (ii) a second antigen binding unit specifically binding to CD3 comprising a light chain variable domain comprising the amino acid sequence of SEQ ID NO:67 and a heavy chain variable domain comprising the amino acid sequence of SEQ ID NO:68.

In one preferred embodiment, the binding protein of the invention comprises (i) a first antigen binding unit specifically binding to DLL3 comprising a light chain variable domain comprising the amino acid sequences of SEQ ID NO:39 and a heavy chain variable domain comprising the amino acid sequences of SEQ ID NO:40 and (ii) a second antigen binding unit specifically binding to CD3 comprising a light chain variable domain comprising the amino acid sequence of SEQ ID NO:67 and a heavy chain variable domain comprising the amino acid sequence of SEQ ID NO:68.

In one preferred embodiment, the binding protein of the invention comprises (i) a first antigen binding unit specifically binding to DLL3 comprising a light chain variable domain comprising the amino acid sequences of SEQ ID NO:41 and heavy chain variable domain comprising the amino acid sequences of SEQ ID NO:42 and (ii) a second antigen binding unit specifically binding to CD3 comprising a light chain variable domain comprising the amino acid sequence of SEQ ID NO:67 and a heavy chain variable domain comprising the amino acid sequence of SEQ ID NO:68.

In one preferred embodiment, the binding protein of the invention comprises (i) a first antigen binding unit specifically binding to DLL3 comprising a light chain variable domain comprising the amino acid sequences of SEQ ID NO:37 and heavy chain variable domain comprising the amino acid sequences of SEQ ID NO:38 and (ii) a second antigen binding unit specifically binding to CD3 comprising a light chain variable domain comprising the amino acid sequence of SEQ ID NO:69 and a heavy chain variable domain comprising the amino acid sequence of SEQ ID NO:70.

In one preferred embodiment, the binding protein of the invention comprises (i) a first antigen binding unit specifically binding to DLL3 comprising a light chain variable domain comprising the amino acid sequences of SEQ ID NO:39 and heavy chain variable domain comprising the amino acid sequences of SEQ ID NO:40 and (ii) a second antigen binding unit specifically binding to CD3 comprising a light chain variable domain comprising the amino acid sequence of SEQ ID NO:69 and a heavy chain variable domain comprising the amino acid sequence of SEQ ID NO:70.

In one preferred embodiment, the binding protein of the invention comprises (i) a first antigen binding unit specifically binding to DLL3 comprising a light chain variable domain comprising the amino acid sequences of SEQ ID NO:41 and heavy chain variable domain comprising the amino acid sequences of SEQ ID NO:42 and a second antigen binding unit specifically binding to CD3 comprising a light chain variable domain comprising the amino acid sequence of SEQ ID NO:69 and a heavy chain variable domain comprising the amino acid sequence of SEQ ID NO:70.

In some embodiments, the binding protein of the invention comprises i) a first antigen binding unit specifically binding to DLL3 (e.g. any one of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 or DLL3 #18 as defined by the respective CDR or VH/VL sequences above) which comprises a first light chain variable domain covalently linked, either directly or indirectly, to a first heavy chain variable domain with a first peptide linker and/or ii) a second antigen binding unit specifically binding to CD3 (e.g. any one of CD3 #1, CD3 #2, or CD3 #3 as defined by the respective CDR or VH/VL sequences above) which comprises a second light chain variable domain covalently linked, either directly or indirectly, to a second heavy chain variable domain with a second peptide linker.

In some embodiments of the binding proteins of the invention, the first and/or the second antigen binding unit further comprises a CL and a CH1 domain like in a light/heavy Fab domain of a conventional antibody molecule, thus said first binding unit comprises a) a VL domain (e.g., defined by the light chain CDR (LCCDR) or VL sequences of any one of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 or DLL3 #18) covalently linked (directly or indirectly bound) to a first CL domain and b) a VH domain (e.g., defined by the heavy chain CDR (HCCDR) or VH sequences of any one of DLL3 #1, DLL3 #2, DLL3 #3, DLL3 #4, DLL3 #5, DLL3 #6 DLL3 #7, DLL3 #8, DLL3 #9, DLL3 #10, DLL3 #11, DLL3 #12, DLL3 #13, DLL3 #14, DLL3 #15, DLL3 #16, DLL3 #17 or DLL3 #18) covalently linked (directly or indirectly bound) to a first CH1 domain and/or said second antigen binding unit comprises a) a VL domain (e.g., defined by the LCCDR or VL sequences of any one of CD3 #1, CD3 #2 or CD3 #3) covalently linked (directly or indirectly bound) to a second CL domain and b) a VH domain (e.g., defined by HCCDR or VH sequences of any one of CD3 #1, CD3 #2 or CD3 #3) covalently linked (directly or indirectly bound) to a second CH1 domain.

In the context of the present invention, a CL domain is the constant domain of an antibody light chain, for example a kappa (κ) or a lambda (λ) light chain. An example of a constant region of a kappa light chain is shown in SEQ ID NO:87. An example of a constant region of a lambda light chain is shown in SEQ ID NO:88. In some embodiments, the first and the second CL domain are the same, e.g. the first and the second CL domain are both a kappa light chain constant domain or the first and the second CL domain are both a lambda light chain constant domain. In some embodiments, the first and the second CL domain are different, e.g., the first CL domain is a constant kappa domain and the second CL domain is a constant lambda domain or vice versa.

In the context of the present invention, a CH1 domain is the first constant domain of an antibody heavy chain. An example of a constant CH1 domain is shown in SEQ ID NO:253.

In preferred embodiments of the binding proteins of the invention, the first antigen binding unit (e.g., any one of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 or DLL3 #18 defined by the CDR and/or VH/VL sequences as outlined above) of the binding proteins of the invention comprises from N- to C-terminus: a first light chain variable domain, a first CL domain, a first linker peptide, a first VH domain and a first CH1 domain, and/or the second binding unit (e.g., any one of CD3 #1, CD3 #2 or CD3 #3 defined by the CDR and/or VH/VL sequences as outlined above) of the binding proteins of the invention comprises from N- to C-terminus: a second light chain variable domain, a second CL domain, a second linker peptide, a second VH domain and a second CH1 domain In this embodiment, the first and/or the second binding unit have the structure of a single chain Fab. For both, the first and/or the second antigen binding unit, when forming a single chain Fab, the order can be reversed such that from N- to C-terminus the antigen binding unit comprises: VH-CH1-[linker peptide]-VL-CL. In some embodiments of the protein of the invention when the first and/or second antigen binding unit comprise a Fab or a single chain Fab, the constant domains can be of the same type (e.g. both CL domains are kappa or lambda light chain constant domains) or of different types (the first CL domain is a kappa and the second CL domain is a lambda light chain constant domain or vice versa).

In one aspect, a linker used in a binding protein of the present invention comprises 26 to 42 amino acids, for example 30 to 40 amino acids. In a further aspect, a linker used in a protein of the present invention comprises 34 to 40 amino acids, for example 36 to 39 amino acids, for example 38 amino acids. In some embodiments, the linker comprises a sequence of any one of SEQ ID NOs: 89, 90, 91, 92, 93, 94, or 95, preferably SEQ ID NO: 89.

The linker sequence may be a naturally occurring sequence or a non-naturally occurring sequence. If used for therapeutic purposes, the linker is preferably non-immunogenic in the subject to which the binding protein of the invention is administered.

One useful group of linker sequences are linkers derived from the hinge region of heavy chain antibodies as described in WO1996/34103 and WO1994/04678. Other examples are poly-alanine linker sequences such as Ala-Ala-Ala.

Further preferred examples of linker sequences are Gly/Ser linkers of different length such as (glyxsery)z linkers, including e.g. (gly4ser)3 (SEQ ID NO: 266), (gly4ser)5 (SEQ ID NO: 267), (gly4ser)7 (SEQ ID NO: 268), (gly3ser)3 (SEQ ID NO: 269), (gly3ser)5 (SEQ ID NO: 270), (gly3ser)7 (SEQ ID NO: 271), (gly3ser2)3 (SEQ ID NO: 272), (gly3ser2)5 (SEQ ID NO: 273), and (gly3ser2)7 (SEQ ID NO: 274) or a linker of any one of SEQ ID Nos: 89 to 95.

In some embodiments of the binding proteins of the invention, the VL domain of the first antigen binding unit (e.g., defined by the light chain CDR (LCCDR) or VL sequences of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 or DLL3 #18) is covalently linked (e.g., directly bound) via a first Gly/Ser linker (e.g., Gly/Ser linker of any one of 26 to 42 amino acids, 30 to 40 amino acids, 34 to 40 amino acids, or 36 to 39 amino acids, preferably 38 amino acids) to the VH domain of the first antigen binding unit (e.g., defined by the heavy chain CDR (HCCDR) or VH sequences of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 or DLL3 #18); and the VL domain of the second antigen binding unit (e.g., defined by the light chain CDR (LCCDR) or VL sequences of CD3 #1, CD3 #2 or CD3 #3) is covalently linked (e.g. directly bound) via a second Gly/Ser linker (e.g., Gly/Ser linker of any one of 26 to 42 amino acids, 30 to 40 amino acids, 34 to 40 amino acids, or 36 to 39 amino acids, preferably 38 amino acids) to the VH domain of the second antigen binding unit (e.g., defined by the heavy chain CDR (HCCDR) or VH sequences of CD3 #1, CD3 #2 or CD3 #3). More preferably, the first and the second linker are the same. Even more preferably, the first and the second linker each comprise the amino acid sequence of SEQ ID NO:89.

In some embodiments, the binding protein of the invention comprises a first single chain Fab forming a first antigen binding unit specific for DLL3 and comprising the sequence selected from the group consisting of SEQ ID NO:49, SEQ ID NO:50, SEQ ID NO:51, SEQ ID NO:52, SEQ ID NO:53, SEQ ID NO:54, SEQ ID NO:229, SEQ ID NO:230, SEQ ID NO:231, SEQ ID NO:232, SEQ ID NO:233, SEQ ID NO:234, SEQ ID NO:235, SEQ ID NO:236, SEQ ID NO:237, SEQ ID NO:238, SEQ ID NO:239, and SEQ ID NO:240 and a second single chain Fab of SEQ ID NO:71 forming a second antigen binding unit specific for CD3. In a preferred embodiment, the binding protein of the invention comprises a first single chain Fab forming a first antigen binding unit comprising the sequence of SEQ ID NO:49 and a second single chain Fab comprising the sequence of SEQ ID NO:71 forming a second antigen binding unit. In a preferred embodiment, the binding protein of the invention comprises a first single chain Fab forming a first antigen binding unit comprising the sequence of SEQ ID NO:50 and a second single chain Fab comprising the sequence of SEQ ID NO:71 forming a second antigen binding unit. In a preferred embodiment, the binding protein of the invention comprises a first single chain Fab forming a first antigen binding unit comprising the sequence of SEQ ID NO:51 and a second single chain Fab comprising the sequence of SEQ ID NO:71 forming a second antigen binding unit.

In some embodiments, the binding protein of the invention comprises a first single chain Fab forming a first antigen binding unit specific for DLL3 and comprising the sequence selected from the group consisting of SEQ ID NO:49, SEQ ID NO:50, SEQ ID NO:51, SEQ ID NO:52, SEQ ID NO:53, SEQ ID NO:54 SEQ ID NO:229, SEQ ID NO:230, SEQ ID NO:231, SEQ ID NO:232, SEQ ID NO:233, SEQ ID NO:234, SEQ ID NO:235, SEQ ID NO:236, SEQ ID NO:237, SEQ ID NO:238, SEQ ID NO:239, and SEQ ID NO:240 and a second single chain Fab of SEQ ID NO:72 forming a second antigen binding unit specific for CD3. In a preferred embodiment, the binding protein of the invention comprises a first single chain Fab forming a first antigen binding unit comprising the sequence of SEQ ID NO:49 and a second single chain Fab comprising the sequence of SEQ ID NO:72 forming a second antigen binding unit. In a preferred embodiment, the binding protein of the invention comprises a first single chain Fab forming a first antigen binding unit comprising the sequence of SEQ ID NO:50 and a second single chain Fab comprising the sequence of SEQ ID NO:72 forming a second antigen binding unit. In a preferred embodiment, the binding protein of the invention comprises a first single chain Fab forming a first antigen binding unit comprising the sequence of SEQ ID NO:51 and a second single chain Fab comprising the sequence of SEQ ID NO:72 forming a second antigen binding unit.

In some embodiments, the binding protein of the invention comprises a first single chain Fab forming a first antigen binding unit specific for DLL3 and comprising the sequence selected from the group consisting of SEQ ID NO:49, SEQ ID NO:50, SEQ ID NO:51, SEQ ID NO:52, SEQ ID NO:53, SEQ ID NO:54 SEQ ID NO:229, SEQ ID NO:230, SEQ ID NO:231, SEQ ID NO:232, SEQ ID NO:233, SEQ ID NO:234, SEQ ID NO:235, SEQ ID NO:236, SEQ ID NO:237, SEQ ID NO:238, SEQ ID NO:239, and SEQ ID NO:240 and a second single chain Fab of SEQ ID NO:104 forming a second antigen binding unit specific for CD3. In a preferred embodiment, the binding protein of the invention comprises a first single chain Fab forming a first antigen binding unit comprising the sequence of SEQ ID NO:49 and a second single chain Fab comprising the sequence of SEQ ID NO:104 forming a second antigen binding unit. In a preferred embodiment, the binding protein of the invention comprises a first single chain Fab forming a first antigen binding unit comprising the sequence of SEQ ID NO:50 and a second single chain Fab comprising the sequence of SEQ ID NO:104 forming a second antigen binding unit. In a preferred embodiment, the binding protein of the invention comprises a first single chain Fab forming a first antigen binding unit comprising the sequence of SEQ ID NO:51 and a second single chain Fab comprising the sequence of SEQ ID NO:104 forming a second antigen binding unit.

In some embodiments, the first antigen binding unit (e.g., DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 or DLL3 #18 as defined by the CDR and/or VH/VL sequences outlined above) and/or the second antigen binding unit (e.g. CD3 #1, CD3 #2 or CD3 #3) comprises a VL domain covalently linked (e.g. directly bound) to a CL domain and a VH domain linked to a CH1 domain (i.e. together forming a Fab fragment derived from an antibody), and said CH1 domain is further covalently linked (e.g. directly bound) to an Fc domain thereby forming an arm of a conventional Y shaped antibody molecule with one light and one heavy chain. In some embodiments, the first and the second antigen binding unit each form a Fab fragment, i.e. a first and a second Fab fragment, which is covalently linked (e.g. directly bound) to a first and a second Fc domain, respectively, thereby forming a conventional heterotetrameric bispecific and bivalent antibody molecule.

In preferred embodiments, the first antigen binding unit (e.g., any one of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 or DLL3 #18 as defined by the CDR and/or VH/VL sequences outlined above) and/or the second antigen binding unit (e.g. any one of CD3 #1, CD3 #2 or CD3 #3) comprise a single chain Fab, i.e. an antibody light chain (VL-CL) covalently linked to the VH-CH1 domain of a heavy chain via a peptide linker (e.g., Gly/Ser linker of any one of 26 to 42 amino acids, 30 to 40 amino acids, 34 to 40 amino acids, or 36 to 39 amino acids, preferably 38 amino acids, even more preferably a linker of SEQ ID NO:89). In preferred embodiments, the binding protein of the invention comprises a first polypeptide chain comprising a first single chain Fab specifically binding to DLL3 (e.g., any one of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 or DLL3 #18 as defined by the respective CDR or VH/VL sequences above, preferably the first antigen binding unit is DLL3 #1, DLL3 #2, DLL3 #3) and a first Fc domain (this polypeptide chain herein referred to also as "DLL3 chain") and a second polypeptide chain comprising a second single chain Fab specifically binding to CD3 (e.g. any one of CD3 #1 CD3 #2 or CD3 #3 as defined by the respective CDR or VH/VL sequences above) and a second Fc domain (this polypeptide chain herein referred to herein also as "CD3 chain"). In some embodiments, the first and the second Fc domain are the same. In preferred embodiments, the first and the second Fc domains are different. The resulting binding proteins of the invention bear a full Fc and have two independent binding sites, a first binding unit for DLL3 and a second binding unit for CD3. In some embodiments, the first antigen binding unit consists of a single polypeptide chain (a DLL3 chain). In some embodiments, the second antigen binding unit consists of a single polypeptide chain (a CD3 chain). In some embodiments, both the first and the second antigen binding unit consist of a single polypeptide chain, respectively.

In some embodiments, the first antigen binding unit of the protein of the invention is formed by a first polypeptide chain (a DLL3 chain) and the second antigen binding unit is formed by a second polypeptide chain (a CD3 chain). Thus, in some embodiments, the binding protein of the invention comprises two different polypeptide chains, each comprising an antigen binding unit with different specificity, the polypeptide chains covalently linked to each other, either via disulfide bonds or potentially via a peptide linker. In some embodiments, the binding protein of the invention is a bispecific, bivalent heterodimeric protein comprising two polypeptide chains, one polypeptide chain (a first polypeptide chain or DLL3 chain) comprising an antigen binding unit specifically binding to DLL3 (e.g. any one of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 or DLL3 #18 defined by the respective CDR and/or VH/VL sequences) and another polypeptide chain (a second polypeptide chain or CD3 chain) comprising an antigen binding unit specifically binding to CD3 (e.g. any one of CD3 #1, CD3 #2 or CD3 #3).

In the context of the present invention, an Fc domain is for example derived from the heavy chain of an IgG, for example an $IgG_1$, $IgG_2$ or $IgG_4$. For example, an Fc domain of the present invention is a Fc domain of a heavy chain of an $IgG_1$ or $IgG_4$ and comprises a hinge region and two constant domains ($C_{H2}$ and $C_{H3}$). Examples of Fc domains (including a hinge region) are shown in SEQ ID NOs:81 and 84.

The numbering of the amino acids in the amino acid chains of a protein of the present invention is herein according to the EU numbering system (Edelman, Cunningham et al. 1969), unless otherwise specified. This means that the amino acid numbers indicated herein correspond to the positions in a heavy chain of the corresponding sub-type (e.g. $IgG_1$ or $IgG_4$), according to the EU numbering system, unless otherwise specified.

In some embodiments, the first Fc domain and the second Fc domain in a protein of the present invention each comprises one or more amino acid changes which reduce the formation of homodimers of the first or second polypeptide chains instead of heterodimers of a first and a second polypeptide chain. Through these changes, a "protrusion" is generated in one of the Fc domains by replacing one or more, small amino acid side chains from the interface of one of the heavy chains with larger side chains (e.g. tyrosine or tryptophan). Compensatory "cavities" of identical or similar size are created on the interface of the other Fc domain by replacing large amino acid side chains with smaller ones (e.g. alanine or threonine). This provides a mechanism for increasing the yield of the heterodimer over other unwanted end-products such as homodimers, in particular homodimers of the Fc domain with the "protrusion" (see for example Ridgway et al. Protein Eng, 1996. 9(7): p. 617-21; Atwell et al, JMB, 1997, 270, 26-35). In some embodiments, such amino acid changes are a tyrosine (Y) at position 366 [T366Y] of the first Fc domain and a threonine (T) at position 407 [Y407T] of the second Fc domain. In some embodiments, the first Fc domain comprises a serine (S) at position 366 [T366S] and the second Fc domain comprises a tryptophan (W) at position 366 [T366W], an alanine (A) at position 368 [L368A] and a valine (V) at position 407 [Y407V]. In preferred embodiments, the first Fc domain comprises a tryptophan (W) at position 366 [T366W] and the second Fc domain comprises a serine (S) at position 366 [T366S], an alanine (A) at position 368 [L368A] and a valine (V) at position 407 [Y407V]. For example, position 366 of the Fc domain according to EU numbering, corresponding to the amino acid position 146 in the human IgG1 Fc sequence of SEQ ID NO:81, is changed from T at position 146 in SEQ ID NO:81 to W at position 146 in SEQ ID NO:82; and positions 366, 368 and 407 according to EU numbering, corresponding to the amino acid positions 146, 148 and 187, respectively, in SEQ ID NO:81, are changed from T, L and Y at these positions in SEQ ID NO:81 to S, A and V at these positions in SEQ ID NO:83. In any of these embodiments, the amino acid changes described for the first Fc domain may be located in the second Fc domain and the respective amino acid changes for the second Fc domain may be located in the first Fc domain. In other words, the term "first" and "second" can be exchanged in these embodiments. In some embodiments, such a Fc domain is an Fc domain derived from the heavy chain of an $IgG_1$ or $IgG_4$.

In some embodiments, the first Fc domain comprises a cysteine (C) at position 354 [S354C] in addition to the tryptophan (W) at position 366 [T366W] and the second Fc domain comprises a cysteine (C) at position 349 [Y349C] in addition to the serine (S) at position 366 [T366S], the alanine (A) at position 368 [L368A] and the valine (V) at position 407 [Y407V]. In one aspect, such Fc domain is an Fc domain derived from the heavy chain of an IgG4.

In some embodiments, the first Fc domain or the second Fc domain in a binding protein of the present invention further comprises one or more amino acid changes which reduce the binding of the Fc domain to protein A. In some embodiments, such amino acid changes are an arginine at position 435 [H435R] and a phenylalanine at position 436 [Y436F] of one of the Fc domains. Both changes are derived from the sequence of human IgG3 (IgG3 does not bind to protein A). These two mutations are located in the CH3 domain and are incorporated in one of the Fc domains to reduce binding to Protein A (see for example Jendeberg et al. J Immunol Methods, 1997. 201(1): p. 25-34). These two changes facilitate the removal of homodimers of heavy chains comprising these changes during protein purification.

In some embodiments, in a binding protein of the present invention, the Fc domain, which comprises a threonine (T) at position 407 [Y407T], further comprises an arginine at position 435 [H435R] and a phenylalanine at position 436 [Y436F]. In this case, the other heavy chain comprises a tyrosine (Y) at position 366 [T366Y], but does not include the two changes at positions 435 and 436. Alternatively, in some embodiments, in a protein of the present invention, the Fc domain, which comprises a serine (S) at position 366 [T366S], an alanine (A) at position 368 [L368A] and a valine (V) at position 407 [Y407V], further comprises an arginine at position 435 [H435R] and a phenylalanine at position 436 [Y436F]. In this case, the other Fc domain comprises a tryptophan (W) at position 366 [T366W], but does not include the two changes at positions 435 and 436. Thus, the Fc domain comprising the amino acid change resulting in a "cavity" as described above also comprises the amino acid changes, which reduce binding to Protein A. Homodimers comprising this Fc domain are removed through reduced binding to Protein A. The production of homodimers of the other Fc domain, which comprises the "protrusion", is reduced by the presence of the "protrusion".

In some embodiments, the Fc domain of a protein of the present invention may or may not further comprises YTE mutations (M252Y/S254T/T256E, EU numbering (Dall'Acqua, Kiener et al. 2006)). These mutations have been shown to improve the pharmacokinetic properties of Fc domains through preferential enhancement of binding affinity for neonatal FcRn receptor at pH 6.0.

In some embodiments, the first and/or the second Fc domain of the present invention derived from an IgG1 also includes the "KO" mutations (L234A, L235A). In a further aspect, the first and/or the second Fc domain of the present invention derived from an IgG4 also includes the Pro hinge mutation (S228P).

In preferred embodiments of the invention, the binding protein comprises i) a first polypeptide chain comprising the amino acid sequence of SEQ ID NO:73 and a second polypeptide chain comprising the amino acid sequence of SEQ ID NO:79 (DLL3 #1/CD3 #1), or ii) a first polypeptide chain comprising the amino acid sequence of SEQ ID NO:74 and a second polypeptide chain comprising the amino acid sequence of SEQ ID NO:79 (DLL3 #2/CD3 #1), or iii) a first polypeptide chain comprising the amino acid sequence of SEQ ID NO:75 and a second polypeptide chain comprising the amino acid sequence of SEQ ID NO:79 (DLL3 #3/CD3 #1), or iv) a first polypeptide chain comprising the amino acid sequence of SEQ ID NO:76 and a second polypeptide chain comprising the amino acid sequence of SEQ ID NO:79 (DLL3 #4/CD3 #1), or v) a first polypeptide chain comprising the amino acid sequence of SEQ ID NO:77 and a second polypeptide chain comprising the amino acid sequence of SEQ ID NO:79 (DLL3 #5/CD3 #1), or vi) a first polypeptide chain comprising the amino acid sequence of SEQ ID NO:78 and a second polypeptide chain comprising the amino acid sequence of SEQ ID NO:79 (DLL3 #6/CD3 #1); or vii) a first polypeptide chain comprising the amino acid sequence of SEQ ID NO:241 and a second polypeptide chain comprising the amino acid sequence of SEQ ID NO:79 (DLL3 #7/CD3 #1); or viii) a first polypeptide chain comprising the amino acid sequence of SEQ ID NO:242 and a second polypeptide chain comprising the amino acid sequence of SEQ ID NO:79 (DLL3 #8/CD3 #1); or ix) a first polypeptide chain comprising the amino acid sequence of SEQ ID NO:243 and a second polypeptide chain comprising the amino acid sequence of SEQ ID NO:79 (DLL3 #9/CD3 #1); or x) a first polypeptide chain comprising the amino acid sequence of SEQ ID NO:244 and a second polypeptide chain comprising the amino acid sequence of SEQ ID NO:79 (DLL3 #10/CD3 #1); or xi) a first polypeptide chain comprising the amino acid sequence of SEQ ID NO:245 and a second polypeptide chain comprising the amino acid sequence of SEQ ID NO:79 (DLL3 #11/CD3 #1); or xii) a first polypeptide chain comprising the amino acid sequence of SEQ ID NO:246 and a second polypeptide chain comprising the amino acid sequence of SEQ ID NO:79 (DLL3 #12/CD3 #1); or xiii) a first polypeptide chain comprising the amino acid sequence of SEQ ID NO:247 and a second polypeptide chain comprising the amino acid sequence of SEQ ID NO:79 (DLL3 #13/CD3 #1); or xiv) a first polypeptide chain comprising the amino acid sequence of SEQ ID NO:248 and a second polypeptide chain comprising the amino acid sequence of SEQ ID NO:79 (DLL3 #14/CD3 #1); or xv) a first polypeptide chain comprising the amino acid sequence of SEQ ID NO:249 and a second polypeptide chain comprising the amino acid sequence of SEQ ID NO:79 (DLL3 #15/CD3 #1), or xvi) a first polypeptide chain comprising the amino acid sequence of SEQ ID NO:250 and a second polypeptide chain comprising the amino acid sequence of SEQ ID NO:79 (DLL3 #16/CD3 #1); or xvii) a first polypeptide chain comprising the amino acid sequence of SEQ ID NO:251 and a second polypeptide chain comprising the amino acid sequence of SEQ ID NO:79 (DLL3 #17/CD3 #1); or xviii) a first polypeptide chain comprising the amino acid sequence of SEQ ID NO:252 and a second polypeptide chain comprising the amino acid sequence of SEQ ID NO:79 (DLL3 #18/CD3 #1). Preferably, the first and second polypeptide chain are linked via one or more disulfide bonds and form an antibody like structure (FIG. 1) similar to a conventional Y-shaped antibody molecule.

In another preferred embodiment, the binding protein comprises a first polypeptide chain specific for DLL3 comprising an amino acid sequence selected from the group consisting of SEQ ID NO:73, SEQ ID NO:74, and SEQ ID NO:75, and a second polypeptide chain specific for CD3 comprising the amino acid sequence of SEQ ID NO:79.

In one preferred embodiment, the binding protein comprises a first polypeptide chain specific for DLL3 comprising an amino acid sequence of SEQ ID NO:73 and a second polypeptide chain specific for CD3 comprising the amino acid sequence of SEQ ID NO:79.

In one preferred embodiment, the binding protein comprises a first polypeptide chain specific for DLL3 comprising an amino acid sequence of SEQ ID NO:74 and a second polypeptide chain specific for CD3 comprising the amino acid sequence of SEQ ID NO:79.

In one preferred embodiment, the binding protein comprises a first polypeptide chain specific for DLL3 comprising an amino acid sequence of SEQ ID NO:75 and a second polypeptide chain specific for CD3 comprising the amino acid sequence of SEQ ID NO:79.

In preferred embodiments of the invention, the binding protein comprises i) a first polypeptide chain comprising the amino acid sequence of SEQ ID NO:73 and a second polypeptide chain comprising the amino acid sequence of SEQ ID NO:80 (DLL3 #1/CD3 #2), or ii) a first polypeptide chain comprising the amino acid sequence of SEQ ID NO:74 and a second polypeptide chain comprising the amino acid sequence of SEQ ID NO:80 (DLL3 #2/CD3 #2), or iii) a first polypeptide chain comprising the amino acid sequence of SEQ ID NO:75 and a second polypeptide chain comprising the amino acid sequence of SEQ ID NO:80 (DLL3 #3/CD3 #2), or iv) a first polypeptide chain comprising the amino acid sequence of SEQ ID NO:76 and a second polypeptide chain comprising the amino acid sequence of SEQ ID NO:80 (DLL3 #4/CD3 #2), or v) a first polypeptide chain comprising the amino acid sequence of SEQ ID NO:77 and a second polypeptide chain comprising the amino acid sequence of SEQ ID NO:80 (DLL3 #5/CD3 #2), or vi) a first polypeptide chain comprising the amino acid sequence of SEQ ID NO:78 and a second polypeptide chain comprising the amino acid sequence of SEQ ID NO:80 (DLL3 #6/CD3 #2); or vii) a first polypeptide chain comprising the amino acid sequence of SEQ ID NO:241 and a second polypeptide chain comprising the amino acid sequence of SEQ ID NO:80 (DLL3 #7/CD3 #2); or viii) a first polypeptide chain comprising the amino acid sequence of SEQ ID NO:242 and a second polypeptide chain comprising the amino acid sequence of SEQ ID NO:80 (DLL3 #8/CD3 #2); or ix) a first polypeptide chain comprising the amino acid sequence of SEQ ID NO:243 and a second polypeptide chain comprising the amino acid sequence of SEQ ID NO:80 (DLL3 #9/CD3 #2); or x) a first polypeptide chain comprising the amino acid sequence of SEQ ID NO:244 and a second polypeptide chain comprising the amino acid sequence of SEQ ID NO:80 (DLL3 #10/CD3 #2); or xi) a first polypeptide chain comprising the amino acid sequence of SEQ ID NO:245 and a second polypeptide chain comprising the amino acid sequence of SEQ ID NO:80 (DLL3 #11/CD3 #2); or xii) a first polypeptide chain comprising the amino acid sequence of SEQ ID NO:246 and a second polypeptide chain comprising the amino acid sequence of SEQ ID NO:80 (DLL3 #12/CD3 #2); or xiii) a first polypeptide chain comprising the amino acid sequence of SEQ ID NO:247 and a second polypeptide chain comprising the amino acid sequence of SEQ ID NO:80 (DLL3 #13/CD3 #2); or xiv) a first polypeptide chain comprising the amino acid sequence of SEQ ID NO:248 and a second polypeptide chain comprising the amino acid sequence of SEQ ID NO:80 (DLL3 #14/CD3 #2); or xv) a first polypeptide chain comprising the amino acid sequence of SEQ ID NO:249 and a second polypeptide chain comprising the amino acid sequence of SEQ ID NO:80 (DLL3 #15/CD3 #2), or xvi) a first polypeptide chain comprising the amino acid sequence of SEQ ID NO:250 and a second polypeptide chain comprising the amino acid sequence of SEQ ID NO:80 (DLL3 #16/CD3 #2); or xvii) a first polypeptide chain comprising the amino acid sequence of SEQ ID NO:251 and a second polypeptide chain comprising the amino acid sequence of SEQ ID NO:80 (DLL3 #17/CD3 #2); or xviii) a first polypeptide chain comprising the amino acid sequence of SEQ ID NO:252 and a second polypeptide chain comprising the amino acid sequence of SEQ ID NO:80 (DLL3 #18/CD3 #2). Preferably, the first and second polypeptide chain are linked via one or more disulfide bonds and form an antibody like structure (FIG. 1) similar to a conventional Y-shaped antibody molecule.

In another preferred embodiment, the binding protein comprises a first polypeptide chain specific for DLL3 comprising an amino acid sequence selected from the group consisting of SEQ ID NO:73, SEQ ID NO:74, and SEQ ID NO:75, and a second polypeptide chain specific for CD3 comprising the amino acid sequence of SEQ ID NO:80.

In one preferred embodiment, the binding protein comprises a first polypeptide chain specific for DLL3 comprising an amino acid sequence of SEQ ID NO:73 and a second polypeptide chain specific for CD3 comprising the amino acid sequence of SEQ ID NO:80.

In one preferred embodiment, the binding protein comprises a first polypeptide chain specific for DLL3 comprising an amino acid sequence of SEQ ID NO:74 and a second polypeptide chain specific for CD3 comprising the amino acid sequence of SEQ ID NO:80.

In one preferred embodiment, the binding protein comprises a first polypeptide chain specific for DLL3 comprising an amino acid sequence of SEQ ID NO:75 and a second polypeptide chain specific for CD3 comprising the amino acid sequence of SEQ ID NO:80.

In preferred embodiments of the invention, the binding protein comprises i) a first polypeptide chain comprising the amino acid sequence of SEQ ID NO:73 and a second polypeptide chain comprising the amino acid sequence of SEQ ID NO:105 (DLL3 #1/CD3 #3), or ii) a first polypeptide chain comprising the amino acid sequence of SEQ ID NO:74 and a second polypeptide chain comprising the amino acid sequence of SEQ ID NO:105 (DLL3 #2/CD3 #3), or iii) a first polypeptide chain comprising the amino acid sequence of SEQ ID NO:75 and a second polypeptide chain comprising the amino acid sequence of SEQ ID NO:105 (DLL3 #3/CD3 #3), or iv) a first polypeptide chain comprising the amino acid sequence of SEQ ID NO:76 and a second polypeptide chain comprising the amino acid sequence of SEQ ID NO:105 (DLL3 #4/CD3 #3), or v) a first polypeptide chain comprising the amino acid sequence of SEQ ID NO:77 and a second polypeptide chain comprising the amino acid sequence of SEQ ID NO:105 (DLL3 #5/CD3 #3), or vi) a first polypeptide chain comprising the amino acid sequence of SEQ ID NO:78 and a second polypeptide chain comprising the amino acid sequence of SEQ ID NO:105 (DLL3 #6/CD3 #3); or vii) a first polypeptide chain comprising the amino acid sequence of SEQ ID NO:241 and a second polypeptide chain comprising the amino acid sequence of SEQ ID NO:105 (DLL3 #7/CD3 #3); or viii) a first polypeptide chain comprising the amino acid sequence of SEQ ID NO:242 and a second polypeptide chain comprising the amino acid sequence of SEQ ID NO:105 (DLL3 #8/CD3 #3); or ix) a first polypeptide chain comprising the amino acid sequence of SEQ ID NO:243 and a second polypeptide chain comprising the amino acid sequence of SEQ ID NO:105 (DLL3 #9/CD3 #3); or x) a first polypeptide chain comprising the amino acid sequence of SEQ ID NO:244 and a second polypeptide chain comprising the amino acid sequence of SEQ ID NO:105 (DLL3 #10/CD3 #3); or xi) a first polypeptide chain comprising the amino acid sequence of SEQ ID NO:245 and a second polypeptide chain comprising the amino acid sequence of SEQ ID NO:105 (DLL3 #11/CD3 #3); or xii) a first polypeptide chain comprising the amino acid sequence of SEQ ID NO:246 and a second polypeptide chain comprising the amino acid sequence of SEQ ID NO:105 (DLL3 #12/CD3 #3); or xiii) a first polypeptide chain comprising the amino acid sequence of SEQ ID NO:247 and a second polypeptide chain comprising the amino acid sequence of SEQ ID NO:105 (DLL3 #13/CD3 #3); or xiv) a first polypeptide chain comprising the amino acid sequence of SEQ ID NO:248 and a second polypeptide chain comprising the amino acid sequence of SEQ ID NO:105 (DLL3 #14/CD3 #3); or xv) a first polypeptide chain comprising the amino acid sequence of SEQ ID NO:249 and a second polypeptide chain comprising the amino acid sequence of SEQ ID NO:105 (DLL3 #15/CD3 #3), or xvi) a first polypeptide chain comprising the amino acid sequence of SEQ ID NO:250 and a second polypeptide chain comprising the amino acid sequence of SEQ ID NO:105 (DLL3 #16/CD3 #3); or xvii) a first polypeptide chain comprising the amino acid sequence of SEQ ID NO:251 and a second polypeptide chain comprising the amino acid sequence of SEQ ID NO:105 (DLL3 #17/CD3 #3); or xviii) a first polypeptide chain comprising the amino acid sequence of SEQ ID NO:252 and a second polypeptide chain comprising the amino acid sequence of SEQ ID NO:105 (DLL3 #18/CD3 #3). Preferably, the first and second polypeptide chain are linked via one or more disulfide bonds and form an antibody like structure (FIG. 1) similar to a conventional Y-shaped antibody molecule.

In another preferred embodiment, the binding protein comprises a first polypeptide chain specific for DLL3 comprising an amino acid sequence selected from the group consisting of SEQ ID NO:73, SEQ ID NO:74, and SEQ ID NO:75, and a second polypeptide chain specific for CD3 comprising the amino acid sequence of SEQ ID NO:105.

In one preferred embodiment, the binding protein comprises a first polypeptide chain specific for DLL3 comprising an amino acid sequence of SEQ ID NO:73 and a second polypeptide chain specific for CD3 comprising the amino acid sequence of SEQ ID NO:105.

In one preferred embodiment, the binding protein comprises a first polypeptide chain specific for DLL3 comprising an amino acid sequence of SEQ ID NO:74 and a second polypeptide chain specific for CD3 comprising the amino acid sequence of SEQ ID NO:105.

In one preferred embodiment, the binding protein comprises a first polypeptide chain specific for DLL3 comprising an amino acid sequence of SEQ ID NO:75 and a second polypeptide chain specific for CD3 comprising the amino acid sequence of SEQ ID NO:105.

For all of the above embodiments it shall be understood that, by using the term "comprising", it is intended to also include an embodiment in which the respective domain or molecule "consists of" the amino acid sequence as indicated.

In a further aspect, the present invention provides a protein comprising a first polypeptide chain specifically binding to DLL3 and a second polypeptide chain specifically binding to CD3, wherein the first chain comprises a first light chain covalently linked (e.g. directly bound) to a first linker, which is itself covalently linked (e.g. directly bound) to a first heavy chain, and wherein the second chain specifically binding to CD3 comprises a second light chain covalently linked (e.g. directly bound) to a second linker, which is itself covalently linked (e.g. directly bound) to a second heavy chain.

In some embodiments, starting from its N-terminus, the first polypeptide chain comprises a first light chain variable region specifically binding to DLL3, a first light chain constant region, a first linker, a first heavy chain variable region specific for DLL3 and a first heavy chain constant region. In some embodiments, starting from its N-terminus, the second polypeptide chain comprises a second light chain variable region specifically binding to CD3, a second light chain constant region, a second linker, a second heavy chain variable region specific for CD3 and a second heavy chain constant region.

The resulting proteins bear a full Fc, which is marginally larger than an IgG and has two independent binding sites (e.g., each binding site being monovalent for the respective antigen), a first binding site for DLL3 and a second binding site for CD3. Preferably, the first and second polypeptide chain are linked via one or more disulfide bonds. As such, the proteins of the invention are antibody-like structures, having the Y shaped structure of a conventional full length antibody (see FIG. 1). This bispecific format greatly reduces heterogeneity after expression and purification (e.g. by avoiding mispairing of light and heavy variable domains with different binding specificities), while maintaining the functional properties of the binding moieties within a structure less likely to generate unwanted immunogenic reactions. This also enables good expression of heterodimeric proteins, e.g. in mammalian cells.

In some embodiments of the protein of the invention, the first polypeptide chain specifically binding to DLL3 comprises a first light chain variable domain and a first heavy chain variable domain, which comprise CDR sequences selected from the group consisting of i) to xviii):

i) light chain CDRs comprising the amino acid sequences of SEQ ID NO:1 (CDR1), SEQ ID NO:2 (CDR2) and SEQ ID NO:3 (CDR3) and a heavy chain CDRs comprising the amino acid sequences of SEQ ID NO:4 (CDR1), SEQ ID NO:5 (CDR2) and SEQ ID NO:6 (CDR3);

ii) light chain CDRs comprising the amino acid sequences of SEQ ID NO:7 (CDR1), SEQ ID NO:8 (CDR2) and SEQ ID NO:9 (CDR3) and heavy chain CDRs comprising the amino acid sequences of SEQ ID NO:10 (CDR1), SEQ ID NO:11 (CDR2) and SEQ ID NO:12 (CDR3);

iii) light chain CDRs comprising the amino acid sequences of SEQ ID NO:13 (CDR1), SEQ ID NO:14 (CDR2) and SEQ ID NO:15 (CDR3) and heavy chain CDRs comprising the amino acid sequences of SEQ ID NO:16 (CDR1), SEQ ID NO:17 (CDR2) and SEQ ID NO:18 (CDR3);

iv) light chain CDRs comprising the amino acid sequences of SEQ ID NO:19 (CDR1), SEQ ID NO:20 (CDR2) and SEQ ID NO:21 (CDR3) and heavy chain CDRs comprising the amino acid sequences of SEQ ID NO:22 (CDR1), SEQ ID NO:23 (CDR2) and SEQ ID NO:24 (CDR3);

v) light chain CDRs comprising the amino acid sequences of SEQ ID NO:25 (CDR1), SEQ ID NO:26 (CDR2) and SEQ ID NO:27 (CDR3) and heavy chain CDRs comprising the amino acid sequences of SEQ ID NO:28 (CDR1), SEQ ID NO:29 (CDR2) and SEQ ID NO:30 (CDR3); and vi) light chain CDRs comprising the amino acid sequences of SEQ ID NO:31 (CDR1), SEQ ID NO:32 (CDR2) and SEQ ID NO:33 (CDR3) and heavy chain CDRs com-prising the amino acid sequences of SEQ ID NO:34 (CDR1), SEQ ID NO:35 (CDR2) and SEQ ID NO:36 (CDR3);

vii) light chain CDRs comprising the amino acid sequences of SEQ ID NO:133 (CDR1), SEQ ID NO:134 (CDR2) and SEQ ID NO:135 (CDR3) and heavy chain CDRs comprising the amino acid sequences of SEQ ID NO:136 (CDR1), SEQ ID NO:137 (CDR2) and SEQ ID NO:138 (CDR3);

viii) light chain CDRs comprising the amino acid sequences of SEQ ID NO:139 (CDR1), SEQ ID NO:140 (CDR2) and SEQ ID NO:141 (CDR3) and heavy chain CDRs comprising the amino acid sequences of SEQ ID NO:142 (CDR1), SEQ ID NO:143 (CDR2) and SEQ ID NO:144 (CDR3);

ix) light chain CDRs comprising the amino acid sequences of SEQ ID NO:145 (CDR1), SEQ ID NO:146 (CDR2) and SEQ ID NO:147 (CDR3) and heavy chain CDRs comprising the amino acid sequences of SEQ ID NO:148 (CDR1), SEQ ID NO:149 (CDR2) and SEQ ID NO:150 (CDR3);

x) light chain CDRs comprising the amino acid sequences of SEQ ID NO:151 (CDR1), SEQ ID NO:152 (CDR2) and SEQ ID NO:153 (CDR3) and heavy chain CDRs comprising the amino acid sequences of SEQ ID NO:154 (CDR1), SEQ ID NO:155 (CDR2) and SEQ ID NO:156 (CDR3);

xi) light chain CDRs comprising the amino acid sequences of SEQ ID NO:157 (CDR1), SEQ ID NO:158 (CDR2) and SEQ ID NO:159 (CDR3) and heavy chain CDRs comprising the amino acid sequences of SEQ ID NO:160 (CDR1), SEQ ID NO:161 (CDR2) and SEQ ID NO:162 (CDR3);

xii) light chain CDRs comprising the amino acid sequences of SEQ ID NO:163 (CDR1), SEQ ID NO:164 (CDR2) and SEQ ID NO:165 (CDR3) and heavy chain CDRs comprising the amino acid sequences of SEQ ID NO:166 (CDR1), SEQ ID NO:167 (CDR2) and SEQ ID NO:168 (CDR3);

xiii) light chain CDRs comprising the amino acid sequences of SEQ ID NO:169 (CDR1), SEQ ID NO:170 (CDR2) and SEQ ID NO:171 (CDR3) and heavy chain CDRs comprising the amino acid sequences of SEQ ID NO:172 (CDR1), SEQ ID NO:173 (CDR2) and SEQ ID NO:174 (CDR3);

xiv) comprising light chain CDRs comprising the amino acid sequences of SEQ ID NO:175 (CDR1), SEQ ID NO:176 (CDR2) and SEQ ID NO:177 (CDR3) and heavy chain CDRs comprising the amino acid sequences of SEQ ID NO:178 (CDR1), SEQ ID NO:179 (CDR2) and SEQ ID NO:180 (CDR3);

xv) light chain CDRs comprising the amino acid sequences of SEQ ID NO:181 (CDR1), SEQ ID NO:182 (CDR2) and SEQ ID NO:183 (CDR3) and heavy chain CDRs comprising the amino acid sequences of SEQ ID NO:184 (CDR1), SEQ ID NO:185 (CDR2) and SEQ ID NO:186 (CDR3);

xvi) light chain CDRs comprising the amino acid sequences of SEQ ID NO:187 (CDR1), SEQ ID NO:188 (CDR2) and SEQ ID NO:189 (CDR3) and heavy chain CDRs comprising the amino acid sequences of SEQ ID NO:190 (CDR1), SEQ ID NO:191 (CDR2) and SEQ ID NO:192 (CDR3);

xvii) light chain CDRs comprising the amino acid sequences of SEQ ID NO:193 (CDR1), SEQ ID NO:194 (CDR2) and SEQ ID NO:195 (CDR3) and heavy chain CDRs comprising the amino acid sequences of SEQ ID NO:196 (CDR1), SEQ ID NO:197 (CDR2) and SEQ ID NO:198 (CDR3); and xviii) light chain CDRs comprising the amino acid sequences of SEQ ID NO:199 (CDR1), SEQ ID NO:200 (CDR2) and SEQ ID NO:201 (CDR3) and heavy chain CDRs comprising the amino acid sequences of SEQ ID NO:202 (CDR1), SEQ ID NO:203 (CDR2) and SEQ ID NO:204 (CDR3).

The respective light/heavy chain variable domains defined by these CDR sequences are termed DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17, and DLL3 #18, respectively. Preferably, the CDR sequences are selected from the group consisting of i) to iii) (DLL3 #1, DLL3 #2, DLL3 #3) as defined above.

In preferred embodiments of the binding protein of the invention, said second polypeptide chain specifically binding to CD3 comprises a second light chain variable domain and second heavy chain variable domain, which comprises CDR sequences selected from the group consisting of:

i) light chain CDRs comprising the amino acid sequences of SEQ ID NO:55 (CDR1), SEQ ID NO:56 (CDR2) and SEQ ID NO:57 (CDR3) and heavy chain CDRs com-prising the amino acid sequences of SEQ ID NO:58 (CDR1), SEQ ID NO:59 (CDR2) and SEQ ID NO:60 (CDR3);

ii) light chain CDRs comprising the amino acid sequences of SEQ ID NO:61 (CDR1), SEQ ID NO:62 (CDR2) and SEQ ID NO:63 (CDR3) and heavy chain CDRs com-prising the amino acid sequences of SEQ ID NO:64 (CDR1), SEQ ID NO:65 (CDR2) and SEQ ID NO:66 (CDR3); and iii) light chain CDRs comprising the amino acid sequences of SEQ ID NO:96 (CDR1), SEQ ID NO:97 (CDR2) and SEQ ID NO:98 (CDR3) and heavy chain CDRs com-prising the amino acid sequences of SEQ ID NO:99 (CDR1), SEQ ID NO:100 (CDR2) and SEQ ID NO:101 (CDR3).

The respective light/heavy chain variable domains defined by these CDR sequences are termed CD3 #1, CD3 #2 and CD3 #3, respectively.

In one preferred embodiment, the binding protein of the invention comprises (i) a first polypeptide chain specifically binding to DLL3, comprising a first light chain variable domain with light chain CDRs comprising the amino acid sequences of SEQ ID NO:1 (CDR1), SEQ ID NO:2 (CDR2) and SEQ ID NO:3 (CDR3) and a first heavy chain variable domain with heavy chain CDRs comprising the amino acid sequences of SEQ ID NO:4 (CDR1), SEQ ID NO:5 (CDR2) and SEQ ID NO:6 (CDR3); and (ii) a second polypeptide chain specifically binding to CD3, comprising a second light chain variable domain with light chain CDRs comprising the amino acid sequences of SEQ ID NO:55 (CDR1), SEQ ID NO:56 (CDR2) and SEQ ID NO:57 (CDR3) and a second heavy chain variable domain with heavy chain CDRs com-prising the amino acid sequences of SEQ ID NO:58 (CDR1), SEQ ID NO:59 (CDR2) and SEQ ID NO:60 (CDR3).

In one preferred embodiment, the binding protein of the invention comprises (i) a first polypeptide chain specifically binding to DLL3, comprising a first light chain variable domain with light chain CDRs comprising the amino acid sequences of SEQ ID NO:7 (CDR1), SEQ ID NO:8 (CDR2) and SEQ ID NO:9 (CDR3) and a first heavy chain variable domain with heavy chain CDRs comprising the amino acid sequences of SEQ ID NO:10 (CDR1), SEQ ID NO:11 (CDR2) and SEQ ID NO:12 (CDR3); and (ii) a second polypeptide chain specifically binding to CD3, comprising a second light chain variable domain with light chain CDRs comprising the amino acid sequences of SEQ ID NO:55 (CDR1), SEQ ID NO:56 (CDR2) and SEQ ID NO:57 (CDR3) and a second heavy chain variable domain with heavy chain CDRs com-prising the amino acid sequences of SEQ ID NO:58 (CDR1), SEQ ID NO:59 (CDR2) and SEQ ID NO:60 (CDR3).

In one preferred embodiment, the binding protein of the invention comprises (i) a first polypeptide chain specifically binding to DLL3, comprising a first light chain variable domain with light chain CDRs comprising the amino acid sequences of SEQ ID NO:13 (CDR1), SEQ ID NO:14 (CDR2) and SEQ ID NO:15 (CDR3) and a first heavy chain variable domain with heavy chain CDRs comprising the amino acid sequences of SEQ ID NO:16 (CDR1), SEQ ID NO:17 (CDR2) and SEQ ID NO:18 (CDR3); and (ii) a second polypeptide chain specifically binding to CD3, comprising a second light chain variable domain with light chain CDRs comprising the amino acid sequences of SEQ ID NO:55 (CDR1), SEQ ID NO:56 (CDR2) and SEQ ID NO:57 (CDR3) and a second heavy chain variable domain with heavy chain CDRs comprising the amino acid sequences of SEQ ID NO:58 (CDR1), SEQ ID NO:59 (CDR2) and SEQ ID NO:60 (CDR3).

In one preferred embodiment, the binding protein of the invention comprises (i) a first polypeptide chain specifically binding to DLL3, comprising a first light chain variable domain with light chain CDRs comprising the amino acid sequences of SEQ ID NO:1 (CDR1), SEQ ID NO:2 (CDR2) and SEQ ID NO:3 (CDR3) and a first heavy chain variable domain with heavy chain CDRs comprising the amino acid sequences of SEQ ID NO:4 (CDR1), SEQ ID NO:5 (CDR2) and SEQ ID NO:6 (CDR3); and (ii) a second polypeptide chain specifically binding to CD3, comprising a second light chain variable domain with light chain CDRs comprising the amino acid sequences of SEQ ID NO:61 (CDR1), SEQ ID NO:62 (CDR2) and SEQ ID NO:63 (CDR3) and a second heavy chain variable domain with heavy chain CDRs comprising the amino acid sequences of SEQ ID NO:64 (CDR1), SEQ ID NO:65 (CDR2) and SEQ ID NO:66 (CDR3).

In one preferred embodiment, the binding protein of the invention comprises (i) a first polypeptide chain specifically binding to DLL3, comprising a first light chain variable domain with light chain CDRs comprising the amino acid sequences of SEQ ID NO:7 (CDR1), SEQ ID NO:8 (CDR2) and SEQ ID NO:9 (CDR3) and a first heavy chain variable domain with heavy chain CDRs comprising the amino acid sequences of SEQ ID NO:10 (CDR1), SEQ ID NO:11 (CDR2) and SEQ ID NO:12 (CDR3); and (ii) a second polypeptide chain specifically binding to CD3, comprising a second light chain variable domain with light chain CDRs comprising the amino acid sequences of SEQ ID NO:61 (CDR1), SEQ ID NO:62 (CDR2) and SEQ ID NO:63 (CDR3) and a second heavy chain variable domain with heavy chain CDRs com-prising the amino acid sequences of SEQ ID NO:64 (CDR1), SEQ ID NO:65 (CDR2) and SEQ ID NO:66 (CDR3).

In one preferred embodiment, the binding protein of the invention comprises (i) a first polypeptide chain specifically binding to DLL3, comprising a first light chain variable domain with light chain CDRs comprising the amino acid sequences of SEQ ID NO:13 (CDR1), SEQ ID NO:14 (CDR2) and SEQ ID NO:15 (CDR3) and a first heavy chain variable domain with heavy chain CDRs comprising the amino acid sequences of SEQ ID NO:16 (CDR1), SEQ ID NO:17 (CDR2) and SEQ ID NO:18 (CDR3); and (ii) a second polypeptide chain specifically binding to CD3, comprising a second light chain variable domain with light chain CDRs comprising the amino acid sequences of SEQ ID NO:61 (CDR1), SEQ ID NO:62 (CDR2) and SEQ ID NO:63 (CDR3) and a second heavy chain variable domain with heavy chain CDRs com-prising the amino acid sequences of SEQ ID NO:64 (CDR1), SEQ ID NO:65 (CDR2) and SEQ ID NO:66 (CDR3).

In preferred embodiments of the protein of the invention, said first polypeptide chain specifically binding to DLL3 comprises a light chain variable domain (a first light chain variable domain) and a heavy chain variable domain (a first heavy chain variable domain) selected from the group consisting of i) to xviii):

i) a light chain variable domain comprising the amino acid sequences of SEQ ID NO:37 and heavy chain variable domain comprising the amino acid sequences of SEQ ID NO:38 (DLL3 #1);
ii) a light chain variable domain comprising the amino acid sequences of SEQ ID NO:39 and heavy chain variable domain comprising the amino acid sequences of SEQ ID NO:40 (DLL3 #2);
iii) a light chain variable domain comprising the amino acid sequences of SEQ ID NO:41 and heavy chain variable domain comprising the amino acid sequences of SEQ ID NO:42 (DLL3 #3);
iv) a light chain variable domain comprising the amino acid sequences of SEQ ID NO:43 and heavy chain variable domain comprising the amino acid sequences of SEQ ID NO:44 (DLL3 #4);
v) a light chain variable domain comprising the amino acid sequences of SEQ ID NO:45 and heavy chain variable domain comprising the amino acid sequences of SEQ ID NO:46 (DLL3 #5);
vi) a light chain variable domain comprising the amino acid sequences of SEQ ID NO:47 and heavy chain variable domain comprising the amino acid sequences of SEQ ID NO:48 (DLL3 #6);
vii) a light chain variable domain comprising the amino acid sequence of SEQ ID NO:205 and heavy chain variable domain comprising the amino acid sequence of SEQ ID NO:206 (DLL3 #7);
viii) a light chain variable domain comprising the amino acid sequence of SEQ ID NO:207 and heavy chain variable domain comprising the amino acid sequence of SEQ ID NO:208 (DLL3 #8);
ix) a light chain variable domain comprising the amino acid sequence of SEQ ID NO:209 and heavy chain variable domain comprising the amino acid sequence of SEQ ID NO:210 (DLL3 #9);
x) a light chain variable domain comprising the amino acid sequence of SEQ ID NO:211 and heavy chain variable domain comprising the amino acid sequence of SEQ ID NO:212 (DLL3 #10);
xi) a light chain variable domain comprising the amino acid sequence of SEQ ID NO:213 and heavy chain variable domain comprising the amino acid sequence of SEQ ID NO:214 (DLL3 #11);
xii) a light chain variable domain comprising the amino acid sequence of SEQ ID NO:215 and heavy chain variable domain comprising the amino acid sequence of SEQ ID NO:216 (DLL3 #12);
xiii) a light chain variable domain comprising the amino acid sequence of SEQ ID NO:217 and heavy chain variable domain comprising the amino acid sequence of SEQ ID NO:218 (DLL3 #13);
xiv) a light chain variable domain comprising the amino acid sequence of SEQ ID NO:219 and heavy chain variable domain comprising the amino acid sequence of SEQ ID NO:220 (DLL3 #14);
xv) a light chain variable domain comprising the amino acid sequence of SEQ ID NO:221 and heavy chain variable domain comprising the amino acid sequence of SEQ ID NO:222 (DLL3 #15);
xvi) a light chain variable domain comprising the amino acid sequence of SEQ ID NO:223 and heavy chain variable domain comprising the amino acid sequence of SEQ ID NO:224 (DLL3 #16);
xvii) a light chain variable domain comprising the amino acid sequence of SEQ ID NO:225 and heavy chain variable domain comprising the amino acid sequence of SEQ ID NO:226 (DLL3 #17); and
xviii) a light chain variable domain comprising the amino acid sequence of SEQ ID NO:227 and heavy chain variable domain comprising the amino acid sequence of SEQ ID NO:228 (DLL3 #18).

Preferably, the light chain variable and heavy chain variable domain sequences are selected from the group consisting of i) to iii) (DLL3 #1, DLL3 #2, DLL3 #3) as defined above.

In preferred embodiments of the protein of the invention, said second polypeptide chain specifically binding to CD3 comprises a light chain variable domain (a second light chain variable domain) and a heavy chain variable domain (a second heavy chain variable domain) selected from the group consisting of:

i) a light chain variable domain comprising the amino acid sequence of SEQ ID NO:67 and a heavy chain variable domain comprising the amino acid sequence of SEQ ID NO:68 (CD3 #1);
ii) a light chain variable domain comprising the amino acid sequence of SEQ ID NO:69 and a heavy chain variable domain comprising the amino acid sequence of SEQ ID NO:70 (CD3 #2); and iii) a light chain variable domain comprising the amino acid sequence of SEQ ID NO:102 and a heavy chain variable domain comprising the amino acid sequence of SEQ ID NO:103 (CD3 #3).

In some embodiments, the binding protein of the invention comprises a first and a second polypeptide chain comprising CDR and/or VH and VL sequences of the light/heavy chain variable domains selected from the list consisting of DLL3 #1/CD3 #1, DLL3 #2/CD3 #1, DLL3 #3/CD3 #1, DLL3 #4/CD3 #1, DLL3 #5/CD3 #1, DLL3 #6/CD3 #1, DLL3 #7/CD3 #1, DLL3 #8/CD3 #1, DLL3 #9/CD3 #1, DLL3 #10/CD3 #1, DLL3 #11/CD3 #1, DLL3 #12/CD3 #1, DLL3 #13/CD3 #1, DLL3 #14/CD3 #1, DLL3 #15/CD3 #1, DLL3 #16/CD3 #1, DLL3 #17/CD3 #1, DLL3 #18/CD3 #1, DLL3 #1/CD3 #2, DLL3 #2/CD3 #2, DLL3 #3/CD3 #2, DLL3 #4/CD3 #2, DLL3 #5/CD3 #2, DLL3 #6/CD3 #2, DLL3 #7/CD3 #2, DLL3 #8/CD3 #2, DLL3 #9/CD3 #2, DLL3 #10/CD3 #2, DLL3 #11/CD3 #2, DLL3 #12/CD3 #2, DLL3 #13/CD3 #2, DLL3 #14/CD3 #2, DLL3 #15/CD3 #2, DLL3 #16/CD3 #2, DLL3 #17/CD3 #2, DLL3 #18/CD3 #2, DLL3 #1/CD3 #3, DLL3 #2/CD3 #3, DLL3 #3/CD3 #3, DLL3 #4/CD3 #3, DLL3 #5/CD3 #3 and DLL3 #6/CD3 #3, DLL3 #7/CD3 #3, DLL3 #8/CD3 #3, DLL3 #9/CD3 #3, DLL3 #10/CD3 #3, DLL3 #11/CD3 #3, DLL3 #12/CD3 #3, DLL3 #13/CD3 #3, DLL3 #14/CD3 #3, DLL3 #15/CD3 #3, DLL3 #16/CD3 #3, DLL3 #17/CD3 #3, DLL3 #18/CD3 #3. In preferred embodiments, the binding protein of the invention comprises a first and a second polypeptide chain comprising CDR and/or VH and VL sequences of the light/heavy chain variable domains selected from the list consisting of DLL3 #1/CD3 #1, DLL3 #2/CD3 #1, DLL3 #3/CD3 #1, DLL3 #1/CD3 #2, DLL3 #2/CD3 #2, DLL3 #3/CD3 #2, DLL3 #1/CD3 #3, DLL3 #2/CD3 #3, and DLL3 #3/CD3 #3.

In one preferred embodiment, the binding protein of the invention comprises (i) a first polypeptide chain specifically binding to DLL3, comprising a light chain variable domain of SEQ ID NO:37 and heavy chain variable domain of SEQ ID NO:38; and (ii) a second polypeptide chain specifically binding to CD3, comprising a light chain variable domain of SEQ ID NO:67 and a heavy chain variable domain of SEQ ID NO:68.

In one preferred embodiment, the binding protein of the invention comprises (i) a first polypeptide chain specifically binding to DLL3, comprising a light chain variable domain of SEQ ID NO:39 and heavy chain variable domain of SEQ ID NO:40; and (ii) a second polypeptide chain specifically binding to CD3, comprising a light chain variable domain of SEQ ID NO:67 and a heavy chain variable domain of SEQ ID NO:68.

In one preferred embodiment, the binding protein of the invention comprises (i) a first polypeptide chain specifically binding to DLL3, comprising a light chain variable domain of SEQ ID NO:41 and heavy chain variable domain of SEQ ID NO:42; and (ii) a second polypeptide chain specifically binding to CD3, comprising a light chain variable domain of SEQ ID NO:67 and a heavy chain variable domain of SEQ ID NO:68.

In one preferred embodiment, the binding protein of the invention comprises (i) a first polypeptide chain specifically binding to DLL3, comprising a light chain variable domain of SEQ ID NO:37 and heavy chain variable domain of SEQ ID NO:38; and (ii) a second polypeptide chain specifically binding to CD3, comprising a light chain variable domain of SEQ ID NO:69 and a heavy chain variable domain of SEQ ID NO:70.

In one preferred embodiment, the binding protein of the invention comprises (i) a first polypeptide chain specifically binding to DLL3, comprising a light chain variable domain of SEQ ID NO:39 and heavy chain variable domain of SEQ ID NO:40; and (ii) a second polypeptide chain specifically binding to CD3, comprising a light chain variable domain of SEQ ID NO:69 and a heavy chain variable domain of SEQ ID NO:70.

In one preferred embodiment, the binding protein of the invention comprises (i) a first polypeptide chain specifically binding to DLL3, comprising a light chain variable domain of SEQ ID NO:41 and heavy chain variable domain of SEQ ID NO:42; and (ii) a second polypeptide chain specifically binding to CD3, comprising a light chain variable domain of SEQ ID NO:69 and a heavy chain variable domain of SEQ ID NO:70.

In some embodiments of the invention, the first and/or the second linker peptide comprise a linker as described above, e.g. a linker derived from a hinge region, a poly-alanine linker or a Gly/Ser linker, wherein the linker comprises 26 to 42 amino acids, for example any one of 30 to 40 amino acids, 34 to 40 amino acids, or 36 to 39 amino acids, preferably 38 amino acids.

In preferred embodiments, the first polypeptide chain specific for DLL3 comprises the amino acid sequence of any one of SEQ ID NO:49, SEQ ID NO:50, SEQ ID NO:51, SEQ ID NO:52, SEQ ID NO:53, SEQ ID NO:54, SEQ ID NO:229, SEQ ID NO:230, SEQ ID NO:231, SEQ ID NO:232, SEQ ID NO:233, SEQ ID NO:234, SEQ ID NO:235, SEQ ID NO:236, SEQ ID NO:237, SEQ ID NO:238, SEQ ID NO:239, or SEQ ID NO:240 and the second polypeptide chain specific for CD3 comprises the amino acid sequence of SEQ ID NO:71.

In some embodiments, the first polypeptide chain specific for DLL3 comprises the amino acid sequence of any one of SEQ ID NO:49, SEQ ID NO:50, SEQ ID NO:51, SEQ ID NO:52, SEQ ID NO:53, SEQ ID NO:54, SEQ ID NO:229, SEQ ID NO:230, SEQ ID NO:231, SEQ ID NO:232, SEQ ID NO:233, SEQ ID NO:234, SEQ ID NO:235, SEQ ID NO:236, SEQ ID NO:237, SEQ ID NO:238, SEQ ID NO:239, or SEQ ID NO:240 and the second polypeptide chain specific for CD3 comprises the amino acid sequence of SEQ ID NO:72.

In some embodiments, the first polypeptide chain specific for DLL3 comprises the amino acid sequence of any one of SEQ ID NO:49, SEQ ID NO:50, SEQ ID NO:51, SEQ ID NO:52, SEQ ID NO:53, SEQ ID NO:54, SEQ ID NO:229, SEQ ID NO:230, SEQ ID NO:231, SEQ ID NO:232, SEQ ID NO:233, SEQ ID NO:234, SEQ ID NO:235, SEQ ID NO:236, SEQ ID NO:237, SEQ ID NO:238, SEQ ID NO:239, or SEQ ID NO:240 and the second polypeptide chain specific for CD3 comprises the amino acid sequence of SEQ ID NO:104.

In one preferred embodiment, the first polypeptide chain specific for DLL3 comprises the amino acid sequence of SEQ ID NO:49 and the second polypeptide chain specific for CD3 comprises the amino acid sequence of SEQ ID NO:71.

In one preferred embodiment, the first polypeptide chain specific for DLL3 comprises the amino acid sequence of SEQ ID NO:50 and the second polypeptide chain specific for CD3 comprises the amino acid sequence of SEQ ID NO:71.

In one preferred embodiment, the first polypeptide chain specific for DLL3 comprises the amino acid sequence of SEQ ID NO:51 and the second polypeptide chain specific for CD3 comprises the amino acid sequence of SEQ ID NO:71.

In one preferred embodiment, the first polypeptide chain specific for DLL3 comprises the amino acid sequence of SEQ ID NO:49 and the second polypeptide chain specific for CD3 comprises the amino acid sequence of SEQ ID NO:72.

In one preferred embodiment, the first polypeptide chain specific for DLL3 comprises the amino acid sequence of SEQ ID NO:50 and the second polypeptide chain specific for CD3 comprises the amino acid sequence of SEQ ID NO:72.

In one preferred embodiment, the first polypeptide chain specific for DLL3 comprises the amino acid sequence of SEQ ID NO:51 and the second polypeptide chain specific for CD3 comprises the amino acid sequence of SEQ ID NO:72.

In some embodiments of binding protein of the invention, the first and second polypeptide chain comprises an Fc domain derived from the heavy chain of an IgG, for example an IgG1, IgG2 or IgG4. For example, an Fc domain of the present invention is a Fc domain of a heavy chain of an IgG1 or IgG4 and comprises a hinge region and two constant domains (CH2 and CH3). Examples of Fc domains of human IgGs are shown in SEQ ID NO:81 and 84.

In some embodiments of the binding protein of the invention, the heavy chain comprises one or more amino acid changes. For example, such amino acid changes are a tyrosine (Y) at position 366 [T366Y] of the first heavy chain and a threonine (T) at position 407 [Y407T] of the second heavy chain. In some embodiments, the first heavy chain comprises a serine (S) at position 366 [T366S] and the second heavy chain comprises a tryptophan (W) at position 366 [T366W], an alanine (A) at position 368 [L368A] and a valine (V) at position 407 [Y407V]. In preferred embodiments, the first heavy chain comprises a tryptophan (W) at position 366 [T366W] and the second heavy chain comprises a serine (S) at position 366 [T366S], an alanine (A) at position 368 [L368A] and a valine (V) at position 407 [Y407V]. For example, position 366 of the Fc domain according to EU numbering, corresponding to the amino acid position 146 in the human IgG1 Fc sequence of SEQ ID NO:81, is changed from T at position 146 in SEQ ID NO:81 to W at position 146 in SEQ ID NO:82; and positions 366, 368 and 407 according to EU numbering, corresponding to the amino acid positions 146, 148 and 187, respectively, in SEQ ID NO:81, are changed from T, L and Y at these positions in SEQ ID NO:81 to S, A and V at these positions in SEQ ID NO:83. In any of these embodiments, the amino acid changes described for the first heavy chain may be located in the second heavy chain and the respective amino acid changes for the second heavy chain may be located in the first heavy chain. In other words, the term "first" and "second" can be exchanged in these embodiments. In some embodiments, the heavy chain is derived from the heavy chain of an IgG$_1$ or IgG$_4$.

In some embodiments, the first heavy chain or the second heavy chain in a protein of the present invention further comprises one or more amino acid changes which reduce the binding of the heavy chain to protein A. In some embodiments, such amino acid changes are an arginine at position 435 [H435R] and a phenylalanine at position 436 [Y436F] of one of the heavy chains.

In some embodiments, in a protein of the present invention, the heavy chain, which comprises a threonine (T) at position 407 [Y407T], further comprises an arginine at position 435 [H435R] and a phenylalanine at position 436 [Y436F]. In this case, the other heavy chain comprises a tyrosine (Y) at position 366 [T366Y], but does not include the two changes at positions 435 and 436. Alternatively, in some embodiments, in a protein of the present invention, the heavy chain, which comprises a serine (S) at position 366 [T366S], an alanine (A) at position 368 [L368A] and a valine (V) at position 407 [Y407V], further comprises an arginine at position 435 [H435R] and a phenylalanine at position 436 [Y436F]. In this case, the other heavy chain comprises a tryptophan (W) at position 366 [T366W], but does not include the two changes at positions 435 and 436. Thus, the heavy chain comprising the amino acid change resulting in a "cavity" as described above also comprises the amino acid changes, which reduce binding to Protein A. Homodimers comprising these heavy chains are removed through reduced binding to Protein A. The production of homodimers of the other heavy chain, which comprises the "protrusion", is reduced by the presence of the "protrusion".

In some embodiments, the heavy chain of a protein of the present invention may or may not further comprise YTE mutations (M252Y/S254T/T256E, EU numbering (Dall'Acqua, Kiener et al. 2006)). These mutations have been shown to improve the pharmacokinetic properties of heavy chain through preferential enhancement of binding affinity for neonatal FcRn receptor at pH 6.0.

In some embodiments, the first and/or the second heavy chain of the present invention derived from an IgG1 also includes the "KO" mutations (L234A, L235A). In a further aspect, the first and/or the second heavy chain of the present invention derived from an IgG4 also includes the Pro hinge mutation (S228P).

In a further aspect, the proteins of the invention comprise a first antigen binding unit or polypeptide chain specific for DLL3 with an affinity of preferably ≤10 nM, more preferably ≤1 nM, even more preferable ≤0.1 nM, even more preferably ≤0.01 nM to human and cynomolgus monkey DLL3. The affinity can be measured in a SPR (BIAcore) assay using recombinant DLL3-protein, as described, e.g. in the examples or other methods that are well known for the skilled person. The proteins comprise a second antigen binding unit or polypeptide chain with an affinity of preferably ≤500 nM, more preferably ≤100 nM, even more preferably ≤10 nM to human and cynomolgus monkey CD3εγ complex.

In a further aspect, the DLL3/CD3 binding proteins of the invention do not bind to DLL3-negative cells and do not cross-react with the human and DLL3 paralogues DLL1 and DLL4, as shown in Example 5.

In a further aspect, the DLL3/CD3 binding proteins of the present invention comprise a first antigen binding unit or a first polypeptide chain specifically binding to the membrane proximal peptide of the DLL3 protein. In a further aspect, the proteins of the invention display weak binding to DLL3 protein expressing cells, e.g. no saturation of protein binding to the cell surface is achieved up to a concentration of 100 nM (see e.g. FIG. 6).

In a further aspect, the DLL3/CD3 binding proteins of the present invention are capable of mediating cytotoxicity against tumor cells by providing optimal steric conditions for the formation of a cytolytic synapse between a tumor cell expressing DLL3 and a T cell, in order to redirect the T cell activity selectively to the targeted tumor cells, leading to tumor cell lysis.

Various methods can be used to measure the cytotoxicity mediated by the DLL3/CD3 binding proteins of the present invention. For example, cytotoxicity can be measured using the method described in example 10. Effector cells can be e.g. stimulated or unstimulated (human or cynomolgus monkey) T cells or their subsets (e.g. CD4, CD8) or unstimulated (human or cynomolgus monkey) peripheral blood mononuclear cells (PBMCs). The target cells should express at least the extracellular domain of (human or cynomolgus monkey) DLL3 and can be cells with endogenous (natural) DLL3 expression, such as human small cell lung carcinoma cell lines SHP77, NCI-H82, alternatively also recombinant cells that express either the full-length DLL3 or the extracellular domain of DLL3. The effector to target cell ratio (E:T) is usually about 10:1 but can vary. Cytotoxic activity of DLL3/CD3 binding molecules can be determined e.g. in a LDH-release assay after 48 or 72 hours of incubation. Modifications in incubation time and read-out used for determination of cytotoxicity are possible and known to the skilled person. Read-out systems for cytotoxicity can comprise MTT/MTS assays, ATP-based assays, FACS-based assays, 51-Chromium release assays, sulforhodamine B (SRB) assays, colorimetric (WST) assays, clonogenic assays, ECIS technology and bioluminescent assays.

The cytotoxic activity mediated by DLL3/CD3 binding proteins of the present invention is preferably measured in a cell-based cytotoxicity assay. The cytotoxicity is represented by the $EC_{90}$ values measured in the cytotoxicity assay. The skilled person is aware that an $EC_{90}$ can be expected to be lower when purified T cells are used as effector cells, compared with PBMCs, the skilled person is also aware that the $EC_{90}$ can be even lower when stimulated T cells are used. It can furthermore expected that the $EC_{90}$ values are lower when the target cells express a high number of DLL3 on the cell surface compared to cell expressing a low number of DLL3 molecules on the cell surface. The $EC_{90}$ of the DLL3/CD3 binding protein is preferably ≤10 nM, more preferably ≤5 nM and even more preferably ≤1 nM.

s Preferably, the multi-specific binding proteins of the invention do not induce/mediate lysis of DLL3 negative cells. The term "do not induce/mediate lysis" of DLL3-negative cells means that an DLL3/CD3 binding molecule does not induce or mediate lysis of more than 30%, preferably not more than 20%, more preferably not more than 10% and particular not more than 5% or DLL3-negative cells, whereas lysis of the DLL3-positive lung carcinoma cell line is set to be 100%. This usually applies for concentrations of the binding protein of up to 1000 nM.

Preferably, the DLL3/CD3 binding proteins of the invention are not internalized by the targeted cells. The rate of internalization can be assayed e.g. as described in Example 11. Preferably, the internalization rate (e.g. measured as a decrease in cytotoxicity) is ≤50% after a 4 hour pre-incubation of the DLL3/CD3 binding proteins with the target cells, more preferably ≤40% and even more preferably ≤30%.

Furthermore, the DLL3/CD3 binding proteins of the invention are shown to be stable with a monomer content above 95% (e.g., at least 98%, see example 14), have favorable pharmacokinetic properties and good downstream manufacturability and are further expected to have good bio-distribution (see e.g., example 12). The proteins of the present invention furthermore have a favorable immunogenicity profile (see example 16) and have good stability in-vitro and in-vivo (see e.g., examples 12 and 15). Furthermore, the DLL3/CD3 binding proteins of the invention (e.g., DLL3 #3/CD3 #1, DLL3 #3/CD3 #2) show favorable efficacy in a humanized in vivo xenograft mouse model. DLL3/CD3 binding proteins induced strong tumor regression starting already after the first dose of DLL3/CD3 binding proteins. Furthermore the DLL3/CD3 binding proteins of the invention induce tumor regression at very low doses of 0.25 mg/kg administered once weekly (q7d), further supporting their therapeutic applicability. In particular, the DLL3/CD3 binding proteins of the invention induce selective T cell proliferation, T cell activation, T cell degranulation and cytokine secretion (see example 18) only in the presence of DLL3-positive target cells and not in the presence of DLL3-negative target cells, and further significantly increase T cell infiltration into tumor tissue (see example 20). Furthermore example 19 demonstrates that DLL3/CD3 binding proteins mediate CD4+ as well as CD8+ T cell redirected lysis. In particular, naïve T cells as well as $CD4^+$ effector memory, $CD4^+$ central memory, $CD8^+CD45RA^+$ effector and $CD8^+$ memory cells contribute to the T cell redirected lysis of DLL3-expression tumor cells.

s A further aspect of the present invention provides isolated nucleic acid molecules encoding the first and/or the second antigen binding unit of a multi-specific binding protein of the invention. In some embodiments, the nucleic acid molecules further encode a first and/or a second Fc domain as described herein, the first and/or second Fc domain linked to the 3' end of the nucleic acid molecule encoding the first and/or second antigen binding unit, respectively. In some embodiments, the nucleic acid molecule encodes i) a first polypeptide chain comprising a first single chain Fab specific for DLL3 (e.g. any one of DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 and DLL3 #18), and optionally a first Fc domain and/or ii) a second polypeptide chain comprising a second single chain Fab specific for CD3 (e.g., any one of CD3 #1, CD3 #2 and CD3 #3) and optionally a second Fc domain.

Preferably the nucleic acid molecule comprises a nucleotide sequence encoding a first single chain Fab of any one of SEQ ID NO:49, SEQ ID NO:50, SEQ ID NO:51, SEQ ID NO:52, SEQ ID NO:53, SEQ ID NO:54, SEQ ID NO:229, SEQ ID NO:230, SEQ ID NO:231, SEQ ID NO:232, SEQ ID NO:233, SEQ ID NO:234, SEQ ID NO:235, SEQ ID NO:236, SEQ ID NO:237, SEQ ID NO:238, SEQ ID NO:239, or SEQ ID NO:240 and/or a second single chain Fab of SEQ ID NO:71, SEQ ID NO:72 or SEQ ID NO:104. In some embodiments, the nucleic acid molecule comprises a nucleotide sequence encoding a first polypeptide chain of any one of SEQ ID NO:73, SEQ ID NO:74, SEQ ID NO:75, SEQ ID NO:76, SEQ ID NO:77, SEQ ID NO:78, SEQ ID NO:241, SEQ ID NO; 242, SEQ ID NO:243, SEQ ID NO:244, SEQ ID NO: 245, SEQ ID NO: 246, SEQ ID NO: 247, SEQ ID NO: 248, SEQ ID NO: 249, SEQ ID NO: 250, SEQ ID NO: 251, or SEQ ID NO: 252 and/or a second polypeptide chain specific for CD3 comprising the amino acid sequence of SEQ ID NO:79, SEQ ID NO:80 or SEQ ID NO:105.

A further aspect of the invention provides an expression vector containing a DNA molecule comprising the nucleotide sequence encoding the first and/or second antigen binding domain (e.g. a first and/or second single chain Fab of the invention). Preferably the expression vector comprises, in addition, a nucleic acid molecule, preferably a DNA molecule, encoding a first and/or second Fc domain, linked to the nucleic acid molecule, preferably the DNA molecule, encoding the first and/or second antigen binding domain (e.g. first and/or second single chain Fab, respectively). As such, the expression vector comprises a nucleotide sequence encoding a polypeptide chain comprising a first single chain Fab linked to a first Fc domain and/or a nucleotide sequence encoding a polypeptide chain comprising a second single chain Fab linked to a second Fc domain.

In a preferred embodiment, the expression vector contains a DNA molecule comprising the nucleotide sequence encoding the first and/or the second polypeptide chain of the invention. In a preferred embodiment, the expression vector comprises the nucleotide sequence encoding a first polypeptide chain of in any one of SEQ ID NO:73, SEQ ID NO:74, SEQ ID NO:75, SEQ ID NO:76, SEQ ID NO:77, SEQ ID NO:78, SEQ ID NO:241, SEQ ID NO; 242, SEQ ID NO:243, SEQ ID NO:244, SEQ ID NO: 245, SEQ ID NO: 246, SEQ ID NO: 247, SEQ ID NO: 248, SEQ ID NO: 249, SEQ ID NO: 250, SEQ ID NO: 251, or SEQ ID NO: 252 and/or a second polypeptide chain comprising SEQ ID NO:79.

In further preferred embodiments, the expression vector comprises the nucleotide sequence encoding a first polypeptide chain of any one of SEQ ID NO:73, SEQ ID NO:74, SEQ ID NO:75, SEQ ID NO:76, SEQ ID NO:77, SEQ ID NO:78, SEQ ID NO:241, SEQ ID NO; 242, SEQ ID NO:243, SEQ ID NO:244, SEQ ID NO: 245, SEQ ID NO: 246, SEQ ID NO: 247, SEQ ID NO: 248, SEQ ID NO: 249, SEQ ID NO: 250, SEQ ID NO: 251, or SEQ ID NO: 252 and/or a second polypeptide chain comprising SEQ ID NO:80.

In further preferred embodiments, the expression vector comprises the nucleotide sequence encoding a first polypeptide chain of any one of SEQ ID NO:73, SEQ ID NO:74, SEQ ID NO:75, SEQ ID NO:76, SEQ ID NO:77, SEQ ID NO:78, SEQ ID NO:241, SEQ ID NO; 242, SEQ ID NO:243, SEQ ID NO:244, SEQ ID NO: 245, SEQ ID NO: 246, SEQ ID NO: 247, SEQ ID NO: 248, SEQ ID NO: 249, SEQ ID NO: 250, SEQ ID NO: 251, or SEQ ID NO: 252 and/or a second polypeptide chain comprising SEQ ID NO:105.

In a specifically preferred embodiment, two expression vectors may be used, one of them for expression of the first polypeptide chain specific for DLL3, the other one for expression of the second polypeptide chain specific for CD3, which two expression vectors may then both be transfected into a host cell for recombinant protein expression.

Preferably, the expression vector will be a vector comprising said nucleic acid molecule or molecules, operably linked to at least one regulatory sequence, wherein such regulatory sequence may be a promoter, enhancer, or terminator sequence, and most preferably a heterologous promotor, enhancer, or terminator sequence.

In another aspect, the invention relates to a host cell having an expression vector encoding a first polypeptide chain specific for DLL3 of the invention and an expression vector encoding a second polypeptide chain specific for CD3 of the invention.

According to a particularly preferred embodiment, said host cells are eukaryotic cells such as mammalian cells. In another embodiment, such host cells are bacterial cells. Other useful cells are yeast cells or other fungal cells.

Suitable mammalian cells include for example CHO cells, BHK cells, HeLa cells, COS cells, and the like. However, amphibian cells, insect cells, plant cells, and any other cells used in the art for the expression of heterologous proteins can be used as well.

Anti-DLL3 Antibodies

DLL3 is normally expressed on intracellular membranes, including those of the Golgi apparatus in foetal brain, and plays a key role in somitogenesis in the paraxial mesoderm (Geffers et al., J Cell Biol. 2007; 178:465; Chapman et al., Hum. Mol. Genet. 2011; 20:905-916). Marked induction of DLL3 expression in some tumor types including SCLC, LCNEC and glioblastoma results in localization to the cell surface: this together with the absence of detectable cell surface DLL3 in non-malignant cells opens a new window of opportunity for tumour-cell specific therapy and for the use of anti-DLL3 antibodies as diagnostic and prognostic tools.

Several anti-DLL3 antibodies (such as LS-c167440, Lifespan; AP21739PU-N, Acris; LS-C148700, LSBio) are commercially available. However, these antibodies do not perform well in immunohistochemistry (IHC), FACS and ELISA assays and fail to specifically bind to DLL3 protein expressed on cells, particularly tumor cells. Anti-DLL3 antibodies have also been reported, e.g., in WO2007111733 and suggested for diagnostic use in glioma patients, but no data of IHC assays are shown. Thus, the use of anti-DLL3 antibodies as reliable diagnostic tools to accurately measure DLL3 expression in patients, e.g. in tumor cells/tissues and/or to assess the efficacy of DLL3 targeted therapies remains challenging.

Thus, there is a need to identify alternative anti-DLL3 antibodies, which can be used for accurate and specific detection of DLL3 protein expression in various assays such as FACS, ELISA, immunoprecipitation, Western blotting, ELISA, radioimmunoassay, flow cytometry, IHC and immunometric assays in any kind of biological sample and can be used as reliable diagnostic reagents.

Therefore, a further aspect of the invention provides anti-DLL3 antibody molecules comprising i) light chain CDRs comprising the amino acid sequences of SEQ ID NO:1 (CDR1), SEQ ID NO:2 (CDR2) and SEQ ID NO:3 (CDR3) and heavy chain CDRs comprising the amino acid sequences of SEQ ID NO:4 (CDR1), SEQ ID NO:5 (CDR2) and SEQ ID NO:6 (CDR3); or ii) light chain CDRs comprising the amino acid sequences of SEQ ID NO:7 (CDR1), SEQ ID NO:8 (CDR2) and SEQ ID NO:9 (CDR3) and heavy chain CDRs comprising the amino acid sequences of SEQ ID NO:10 (CDR1), SEQ ID NO:11 (CDR2) and SEQ ID NO:12 (CDR3); or iii) light chain CDRs comprising the amino acid sequences of SEQ ID NO:13 (CDR1), SEQ ID NO:14 (CDR2) and SEQ ID NO:15 (CDR3) and heavy chain CDRs comprising the amino acid sequences of SEQ ID NO:16 (CDR1), SEQ ID NO:17 (CDR2) and SEQ ID NO:18 (CDR3); or iv) light chain CDRs comprising the amino acid sequences of SEQ ID NO:19 (CDR1), SEQ ID NO:20 (CDR2) and SEQ ID NO:21 (CDR3) and heavy chain CDRs comprising the amino acid sequences of SEQ ID NO:22 (CDR1), SEQ ID NO:23 (CDR2) and SEQ ID NO:24 (CDR3); or v) light chain CDRs comprising the amino acid sequences of SEQ ID NO:25 (CDR1), SEQ ID NO:26 (CDR2) and SEQ ID NO:27 (CDR3) and heavy chain CDRs comprising the amino acid sequences of SEQ ID NO:28 (CDR1), SEQ ID NO:29 (CDR2) and SEQ ID NO:30 (CDR3); or vi) light chain CDRs comprising the amino acid sequences of SEQ ID NO:31 (CDR1), SEQ ID NO:32 (CDR2) and SEQ ID NO:33 (CDR3) and heavy chain CDRs comprising the amino acid sequences of SEQ ID NO:34 (CDR1), SEQ ID NO:35 (CDR2) and SEQ ID NO:36 (CDR3); or vii) light chain CDRs comprising the amino acid sequences of SEQ ID NO:133 (CDR1), SEQ ID NO:134 (CDR2) and SEQ ID NO:135 (CDR3) and heavy chain CDRs comprising the amino acid sequences of SEQ ID NO:136 (CDR1), SEQ ID NO:137 (CDR2) and SEQ ID NO:138 (CDR3); or viii) light chain CDRs comprising the amino acid sequences of SEQ ID NO:139 (CDR1), SEQ ID NO:140 (CDR2) and SEQ ID NO:141 (CDR3) and heavy chain CDRs comprising the amino acid sequences of SEQ ID NO:142 (CDR1), SEQ ID NO:143 (CDR2) and SEQ ID NO:144 (CDR3); or ix) light chain CDRs comprising the amino acid sequences of SEQ ID NO:145 (CDR1), SEQ ID NO:146 (CDR2) and SEQ ID NO:147 (CDR3) and heavy chain CDRs comprising the amino acid sequences of SEQ ID NO:148 (CDR1), SEQ ID NO:149 (CDR2) and SEQ ID NO:150 (CDR3); or x) light chain CDRs comprising the amino acid sequences of SEQ ID NO:151 (CDR1), SEQ ID NO:152 (CDR2) and SEQ ID NO:153 (CDR3) and heavy chain CDRs comprising the amino acid sequences of SEQ ID NO:154 (CDR1), SEQ ID NO:155 (CDR2) and SEQ ID NO:156 (CDR3); or xi) light chain CDRs comprising the amino acid sequences of SEQ ID NO:157 (CDR1), SEQ ID NO:158 (CDR2) and SEQ ID NO:159 (CDR3) and heavy chain CDRs comprising the amino acid sequences of SEQ ID NO:160 (CDR1), SEQ ID NO:161 (CDR2) and SEQ ID NO:162 (CDR3); or xii) light chain CDRs comprising the amino acid sequences of SEQ ID NO:163 (CDR1), SEQ ID NO:164 (CDR2) and SEQ ID NO:165 (CDR3) and heavy chain CDRs comprising the amino acid sequences of SEQ ID NO:166 (CDR1), SEQ ID NO:167 (CDR2) and SEQ ID NO:168 (CDR3); or xiii) light chain CDRs comprising the amino acid sequences of SEQ ID NO:169 (CDR1), SEQ ID NO:170 (CDR2) and SEQ ID NO:171 (CDR3) and heavy chain CDRs comprising the amino acid sequences of SEQ ID NO:172 (CDR1), SEQ ID NO:173 (CDR2) and SEQ ID NO:174 (CDR3); or xiv) comprising light chain CDRs comprising the amino acid sequences of SEQ ID NO:175 (CDR1), SEQ ID NO:176 (CDR2) and SEQ ID NO:177 (CDR3) and heavy chain CDRs comprising the amino acid sequences of SEQ ID NO:178 (CDR1), SEQ ID NO:179 (CDR2) and SEQ ID NO:180 (CDR3); or xv) light chain CDRs comprising the amino acid sequences of SEQ ID NO:181 (CDR1), SEQ ID NO:182 (CDR2) and SEQ ID NO:183 (CDR3) and heavy chain CDRs comprising the amino acid sequences of SEQ ID NO:184 (CDR1), SEQ ID NO:185 (CDR2) and SEQ ID NO:186 (CDR3); or xvi) light chain CDRs comprising the amino acid sequences of SEQ ID NO:187 (CDR1), SEQ ID NO:188 (CDR2) and SEQ ID NO:189 (CDR3) and heavy chain CDRs comprising the amino acid sequences of SEQ ID NO:190 (CDR1), SEQ ID NO:191 (CDR2) and SEQ ID NO:192 (CDR3); or xvii) light chain CDRs comprising the amino acid sequences of SEQ ID NO:193 (CDR1), SEQ ID NO:194 (CDR2) and SEQ ID NO:195 (CDR3) and heavy chain CDRs comprising the amino acid sequences of SEQ ID NO:196 (CDR1), SEQ ID NO:197 (CDR2) and SEQ ID NO:198 (CDR3); or xviii) light chain CDRs comprising the amino acid sequences of SEQ ID NO:199 (CDR1), SEQ ID NO:200 (CDR2) and SEQ ID NO:201 (CDR3) and heavy chain CDRs comprising the amino acid sequences of SEQ ID NO:202 (CDR1), SEQ ID NO:203 (CDR2) and SEQ ID NO:204 (CDR3).

The antibodies i) to xviii) as outlined above are termed DLL3 #1, DLL3 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17 or DLL3 #18 respectively. Provided herein is a sequence table which readily allows identification of individual amino acid sequences to specific antibodies of the present invention.

In preferred embodiments of the invention, the antibody molecule comprises CDR sequences as defined in i) or v) above corresponding to DLL3 #1 or DLL3 #5.

In some embodiments, the anti-DLL3 antibody of the invention is a chimeric, a humanized or a human antibody molecule. In some embodiments, the antibody molecule is a monoclonal antibody Fab, F(ab)2, Fv or scFv. In some embodiments, the anti-DLL3 antibody molecule of the invention comprises a heavy chain constant region selected from the group consisting of IgG1, IgG2, IgG3, IgG4, IgM, IgA and IgE constant regions. In some embodiments, the light chain constant region of the anti-DLL3 antibody molecule of the invention is kappa or lambda.

In some embodiments, the anti-DLL3 antibody of the invention has a heavy chain variable domain comprising an amino acid sequence at least 85% identical to any one of SEQ ID NOs:38, 40, 42, 44, 46, 48, 206, 208, 210, 212, 214, 216, 218, 220, 222, 224, 226, and 228. Preferably, the antibody molecule has a heavy chain variable domain comprising an amino acid sequence of SEQ ID NOs:38, 40, 42, 44, 46, 48, 206, 208, 210, 212, 214, 216, 218, 220, 222, 224, 226, or 228.

In some embodiments, the anti-DLL3 antibody molecule has a light chain variable domain comprising an amino acid sequence at least 85% identical to any one of SEQ ID NOs:37, 39, 41, 43, 45, 47, 205, 207, 209, 211, 213, 215, 217, 219, 221, 223, 225, and 227. Preferably, the antibody molecule has a light chain variable domain comprising an amino acid sequence of SEQ ID NOs:37, 39, 41, 43, 45, 47, 205, 207, 209, 211, 213, 215, 217, 219, 221, 223, 225, or 227.

Methods of calculating amino acid sequence identities are well known in the art and further discussed herein in the Definitions section of the specification.

In some embodiments, the anti-DLL3 antibody molecule has i) a heavy chain variable domain comprising the amino acid sequence of SEQ ID NO:38 and a light chain variable domain comprising the amino acid sequence of SEQ ID NO:37 (DLL3 #1), or ii) a heavy chain variable domain comprising the amino acid sequence of SEQ ID NO: 40 and a light chain variable domain comprising the amino acid sequence of SEQ ID NO: 39 (DLL3 #2); or iii) a heavy chain variable domain comprising the amino acid sequence of SEQ ID NO:42 and a light chain variable domain comprising the amino acid sequence of SEQ ID NO:41 (DLL3 #3), or iv) a heavy chain variable domain comprising the amino acid sequence of SEQ ID NO:44 and a light chain variable domain comprising the amino acid sequence of SEQ ID NO:43 (DLL3 #4); or v) a heavy chain variable domain comprising the amino acid sequence of SEQ ID NO:46 and a light chain variable domain comprising the amino acid sequence of SEQ ID NO:45 (DLL3 #5); or vi) a heavy chain variable domain comprising the amino acid sequence of SEQ ID NO:48 and a light chain variable domain comprising the amino acid sequence of SEQ ID NO:47 (DLL3 #6); or vii) a light chain variable domain comprising the amino acid sequence of SEQ ID NO:205 and heavy chain variable domain comprising the amino acid sequence of SEQ ID NO:206 (DLL3 #7); or viii) a light chain variable domain comprising the amino acid sequence of SEQ ID NO:207 and heavy chain variable domain comprising the amino acid sequence of SEQ ID NO:208 (DLL3 #8); or ix) a light chain variable domain comprising the amino acid sequence of SEQ ID NO:209 and heavy chain variable domain comprising the amino acid sequence of SEQ ID NO:210 (DLL3 #9); or x) a light chain variable domain comprising the amino acid sequence of SEQ ID NO:211 and heavy chain variable domain comprising the amino acid sequence of SEQ ID NO:212 (DLL3 #10); or xi) a light chain variable domain comprising the amino acid sequence of SEQ ID NO:213 and heavy chain variable domain comprising the amino acid sequence of SEQ ID NO:214 (DLL3 #11); or xii) a light chain variable domain comprising the amino acid sequence of SEQ ID NO:215 and heavy chain variable domain comprising the amino acid sequence of SEQ ID NO:216 (DLL3 #12); or xiii) a light chain variable domain comprising the amino acid sequence of SEQ ID NO:217 and heavy chain variable domain comprising the amino acid sequence of SEQ ID NO:218 (DLL3 #13); or xiv) a light chain variable domain comprising the amino acid sequence of SEQ ID NO:219 and heavy chain variable domain comprising the amino acid sequence of SEQ ID NO:220 (DLL3 #14); or xv) a light chain variable domain comprising the amino acid sequence of SEQ ID NO:221 and heavy chain variable domain comprising the amino acid sequence of SEQ ID NO:222 (DLL3 #15); or xvi) a light chain variable domain comprising the amino acid sequence of SEQ ID NO:223 and heavy chain variable domain comprising the amino acid sequence of SEQ ID NO:224 (DLL3 #16); or xvii) a light chain variable domain comprising the amino acid sequence of SEQ ID NO:225 and heavy chain variable domain comprising the amino acid sequence of SEQ ID NO:226 (DLL3 #17); or xviii) a light chain variable domain comprising the amino acid sequence of SEQ ID NO:227 and heavy chain variable domain comprising the amino acid sequence of SEQ ID NO:228 (DLL3 #18).

In some embodiments, the anti-DLL3 antibody of the invention is a mouse monoclonal antibody. In the context of this invention a mouse monoclonal antibody includes an antibody where the VH and VL are obtained from immunization of mice with human DLL3 protein, subsequent selection of suitable VH and VL sequences binding with certain affinity to human DLL3, and then further joining such VH and VL sequences to constant domains which are derived from mouse (e.g. from mouse IgG2a) by recombinant techniques; and which are produced by recombinant expression in host cells. Further encompassed by the invention are chimeric antibodies, e.g., comprising variable and constant regions from different species. In some embodiments, the antibody molecule of the invention is a chimeric antibody comprising VH and VL domains derived from mouse as described above and further comprising constant domains derived from another species such as human, rabbit, rat, goat, donkey. In some embodiments, the chimeric antibody comprises VH and VL domains derived from mouse and further humanized or sequence optimized as defined above and further comprises constant domains derived from another species. In some embodiments, the chimeric antibody comprises VH and VL domains derived from a transgenic animal (e.g. a mouse) comprising human IgG sequences, thus comprises human VH and VL sequences, and further comprises constant domains derived from another species. In any of the embodiments of chimeric antibodies as outlined above, the heavy chain constant region is a mouse, human, rabbit, rat, goat or donkey heavy chain region.

In some embodiments, the anti-DLL3 antibody molecule of the invention has a constant domain selected from the group consisting of IgG1, IgG2, IgG3, IgG4, IgM, IgA and IgE constant domains. In a preferred embodiment, the anti-DLL3 antibody has a constant domain of IgG2a, preferably comprising the sequence of SEQ ID NO:254. In some embodiments, the anti-DLL3 antibody molecule has a light chain constant domain which is kappa or lambda, preferably the light chain constant domain is a kappa light chain constant domain, preferably comprising the sequence of SEQ ID NO:255.

In some embodiments, the anti-DLL3 antibody molecule is capable of binding to human and cynomolgus monkey DLL3 with a dissociation constant (KD) of preferably ≤10 nM, more preferably ≤1 nM, even more preferable ≤0.1 nM, even more preferably ≤0.01 nM. The affinity (KD value) can be measured in a SPR (BIAcore) assay using recombinant DLL3-protein, as described, e.g. in the examples or other methods that are well known for the skilled person.

In some embodiments, the anti-DLL3 antibody molecule does not bind to mouse DLL3.

In some embodiments, the anti-DLL3 antibody molecule is capable of detecting DLL3 expression (e.g. cytoplasmic and surface protein expression) on tissue samples (e.g., paraffin embedded/formalin-fixed tissue samples) such as tumor tissue samples, or cultured cell lines. Optionally, the paraffin embedded/formalin fixed cell culture or tissue samples are further treated with an epitope retriever such as Proteinase K.

In some embodiments, the anti-DLL3 antibody molecule of the invention binds to the same epitope as any one of the DLL3 #1, DLL2 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17, or DLL3 #18 antibody. In some embodiments, the anti-DLL3 antibody molecule of the invention cross-competes for binding to human DLL3 with any one of the DLL3 #1, DLL2 #2, DLL3 #3, DLL3 #4, DLL3 #5, DLL3 #6, DLL3 #7, DLL3 #8, DLL3 #9, DLL3 #10, DLL3 #11, DLL3 #12, DLL3 #13, DLL3 #14, DLL3 #15, DLL3 #16, DLL3 #17, or DLL3 #18 antibody molecules.

Another aspect of the present invention provides isolated nucleic acid molecules encoding the heavy chain variable domain and/or the light chain variable domain of an anti-DLL3 antibody molecule of the invention.

Preferably the nucleic acid molecule comprises a nucleotide sequence encoding the heavy chain variable domain of any one of SEQ ID NOs:38, 40, 42, 44, 46, 48, 206, 208, 210, 212, 214, 216, 218, 220, 222, 224, 226, or 228. Preferably the nucleic acid molecule comprises a nucleotide sequence encoding the light chain variable domain of any one of SEQ ID NOs: 37, 39, 41, 43, 45, 47, 205, 207, 209, 211, 213, 215, 217, 219, 221, 223, 225, or 227.

A further aspect of the invention provides an expression vector containing a DNA molecule comprising the nucleotide sequence encoding the heavy chain variable domain and/or the light chain variable domain of an anti-DLL3 antibody molecule of the invention.

Preferably the expression vector comprises, in addition, a nucleic acid molecule, preferably a DNA molecule, encoding the constant domains of a heavy chain and/or the constant domain of a light chain, respectively, linked to the nucleic acid molecule, preferably the DNA molecule, encoding the heavy chain variable domain and/or the light chain variable domain, respectively.

In a specifically preferred embodiment, two expression vectors may be used, one of them for expression of the heavy chain, the other one for expression of the light chain, which two expression vectors may then both be transfected into a host cell for recombinant protein expression.

Preferably, the expression vector will be a vector comprising said nucleic acid molecule or molecules, operably linked to at least one regulatory sequence, wherein such regulatory sequence may be a promoter, enhancer, or terminator sequence, and most preferably a heterologous promotor, enhancer, or terminator sequence.

In another aspect, the invention relates to a host cell having an expression vector encoding a heavy chain of an anti-DLL3 antibody molecule of the invention and an expression vector encoding a light chain of an anti-DLL3 antibody molecule of the invention.

According to a particularly preferred embodiment, said host cells are eukaryotic cells such as mammalian cells. In another embodiment, such host cells are bacterial cells. Other useful cells are yeast cells or other fungal cells.

Suitable mammalian cells include for example CHO cells, BHK cells, HeLa cells, COS cells, and the like. However, amphibian cells, insect cells, plant cells, and any other cells used in the art for the expression of heterologous proteins can be used as well.

Methods of Manufacture and Purification

The invention further provides methods of manufacturing a multi-specific binding protein of the invention, such methods generally comprising the steps of:
culturing host cells comprising an expression vector comprising a nucleic acid encoding a binding protein of the invention under conditions that allow formation of the binding protein of the invention; and,
recovering the binding protein expressed by the host cells from the culture; and
optionally further purifying and/or modifying and/or formulating the binding protein of the invention.

The invention further provides methods of manufacturing an anti-DLL3 antibody of the invention, such methods generally comprising the steps of:
culturing host cells comprising an expression vector comprising a nucleic acid encoding an antibody molecule of the invention under conditions that allow formation of the antibody molecule; and,
recovering the antibody molecule expressed by the host cells from the culture; and
optionally further purifying and/or modifying and/or formulating the antibody molecule of the invention.

A nucleic acid of the invention can e.g. be a DNA molecule comprising coding sequences as well as regulatory sequences and optionally natural or artificial introns, or can be a cDNA molecule. It may have its original codons or may have an optimized codon usage that has been specifically adapted for expression in the intended host cell or host organism.

According to one embodiment of the invention, the nucleic acid of the invention is in essentially isolated form, as defined above.

The nucleic acids of the invention may be prepared or obtained in a manner known per se (e.g. by automated DNA synthesis and/or recombinant DNA technology), based on the information on the amino acid sequences for the proteins of the invention given herein.

The nucleic acid of the invention will typically be incorporated into an expression vector, i.e. a vector that can provide for expression of the protein when transfected into a suitable host cell or other expression system.

For manufacturing the binding proteins or antibodies of the invention, the skilled artisan may choose from a great variety of expression systems well known in the art, e.g. those reviewed by Kipriyanow and Le Gall, 2004.

Expression vectors include plasmids, retroviruses, cosmids, EBV derived episomes, and the like. The expression vector and expression control sequences are selected to be compatible with the host cell. The nucleotide sequence encoding the first antigen binding unit (e.g. the DLL3 specific single chain Fab or the full length DLL3 chain of the binding protein of the invention) and the nucleotide sequence encoding the second antigen binding unit (e.g. CD3 specific single chain Fab or the full length CD3 chain of the binding protein of the invention) of the DLL3/CD3 binding protein can be inserted into separate vectors. In certain embodiments, both DNA sequences are inserted into the same expression vector. The nucleotide sequence encoding the light chain of a DLL3 antibody and the nucleotide sequence encoding the heavy chain of a DLL3 antibody can be inserted into separate vectors. In certain embodiments, both DNA sequences are inserted into the same expression vector.

Convenient vectors are those that encode a functionally complete human CH (constant heavy) immunoglobulin sequence, with appropriate restriction sites engineered so that any antigen binding unit such as a single chain Fab sequence or any heavy/light chain variable domain can be easily inserted and expressed, as described above. For the antibody heavy chain, it can be, without limitation, any IgG isotype (IgG1, IgG2, IgG3, IgG4) or other immunoglobulins, including allelic variants.

The recombinant expression vector may also encode a signal peptide that facilitates secretion of the full length CD3 or DLL3 chain from a host cell or of the light/heavy chain of an anti-DLL3 antibody. The DNA encoding the protein chain may be cloned into the vector such that the signal peptide is linked in-frame to the amino terminus of the mature full length chain DNA. The signal peptide may be an immunoglobulin signal peptide or a heterologous peptide from a non-immunoglobulin protein. Alternatively, the DNA sequence encoding the full length chains of the protein of the invention may already contain a signal peptide sequence.

In addition to the DLL3/CD3 chain encoding DNA sequences or the heavy/light chain of a DLL3 antibody encoding DNA sequences, the recombinant expression vectors typically carries regulatory sequences, optionally heterologous regulatory sequences, including promoters, enhancers, termination and polyadenylation signals and other expression control elements that control the expression of the protein chains in a host cell. Examples for promoter sequences (exemplified for expression in mammalian cells) are promoters and/or enhancers derived from CMV (such as the CMV Simian Virus 40 (SV40) promoter/enhancer), adenovirus, (e. g., the adenovirus major late promoter (AdMLP)), polyoma and strong mammalian promoters such as native immunoglobulin and actin promoters. Examples for polyadenylation signals are BGH polyA, SV40 late or early polyA; alternatively, 3'UTRs of immunoglobulin genes etc. can be used.

The recombinant expression vectors may also carry sequences that regulate replication of the vector in host cells (e. g. origins of replication) and selectable marker genes. Nucleic acid molecules encoding the full length chain with the first antigen binding unit (single chain Fab and Fc domain) or an antigen-binding portion thereof and/or the full length chain with the second antigen binding unit (single chain Fab and Fc domain) or an antigen-binding portion thereof, and vectors comprising these DNA molecules can be introduced into host cells, e.g. bacterial cells or higher eukaryotic cells, e.g. mammalian cells, according to transfection methods well known in the art, including liposome-mediated transfection, polycation-mediated transfection, protoplast fusion, microinjections, calcium phosphate precipitation, electroporation or transfer by viral vectors.

Preferably, the DNA molecules encoding the DLL3 and CD3 chain of the protein of the invention are present on two expression vectors which are co-transfected into the host cell, preferably a mammalian cell.

Mammalian cell lines available as hosts for expression are well known in the art and include, inter alia, Chinese hamster ovary (CHO) cells, NS0, SP2/0 cells, HeLa cells, baby hamster kidney (BHK) cells, monkey kidney cells (COS), human carcinoma cells (e. g., Hep G2 and A-549 cells), 3T3 cells or the derivatives/progenies of any such cell line. Other mammalian cells, including but not limited to human, mice, rat, monkey and rodent cells lines, or other eukaryotic cells, including but not limited to yeast, insect and plant cells, or prokaryotic cells such as bacteria may be used.

The proteins of the invention are produced by culturing the host cells for a period of time sufficient to allow for expression of the protein in the host cells. Protein molecules are preferably recovered from the culture medium as a secreted polypeptide or it can be recovered from host cell lysates if for example expressed without a secretory signal. It is necessary to purify the protein molecules using standard protein purification methods used for recombinant proteins and host cell proteins in a way that substantially homogenous preparations of the protein are obtained. By way of example, state-of-the art purification methods useful for obtaining protein molecules of the invention include, as a first step, removal of cells and/or particulate cell debris from the culture medium or lysate. The protein is then purified from contaminant soluble proteins, polypeptides and nucleic acids, for example, by fractionation on immunoaffinity or ion-exchange columns, ethanol precipitation, reverse phase HPLC, Sephadex chromatography, chromatography on silica or on a cation exchange resin. As a final step in the process for obtaining a protein molecule preparation, the purified protein molecule may be dried, e.g. lyophilized, as described below for therapeutic applications.

The present invention relates to binding proteins that have binding specificities for at least two different targets. In relation to the present invention, the binding molecules are derived from antibodies. Techniques for making binding molecules include, but are not limited to, recombinant co-expression of two immunoglobulin chains having different specificities (see Milstein and Cuello, Nature 305: 537 (1983)), WO 93/08829, and Traunecker et al., EMBO J. 10: 3655 (1991)), and "knob-in-hole" engineering (see, e.g., U.S. Pat. No. 5,731,168; Atwell et al, JMB, 1997, 270, 26-35). Binding proteins of the invention may also be made by engineering electrostatic steering effects for making antibody Fc-heterodimeric molecules (WO 2009/089004A1); cross-linking two or more antibodies or fragments (see, e.g., U.S. Pat. No. 4,676,980, and Brennan et al., Science, 229: 81 (1985)); using leucine zippers to produce bi-specific proteins (see, e.g., Kostelny et al., Immunol., 148(5): 1547-1553 (1992)); using "diabody" technology for making bispecific antibody fragments (see, e.g., Hollinger et al., Proc. Natl. Acad. Sci. USA, 90:6444-6448 (1993)); and using single-chain Fv (sFv) dimers (see, e.g. Gruber et al., /. Immunol., 152:5368 (1994)); and preparing trispecific antibodies as described, e.g., in Tutt et al. /. Immunol. 147: 60 (1991).

The compositions (e.g., multi-specific binding proteins and anti-DLL3 antibodies) and methods disclosed herein encompass polypeptides and nucleic acids having the sequences specified, or sequences substantially identical or similar thereto, e.g., sequences at least 85%, 90%, 95% identical or higher to the sequence specified. In the context of an amino acid sequence, the term "substantially identical" is used herein to refer to a first amino acid sequence that contains a sufficient or minimum number of amino acid residues that are i) identical to, or ii) conservative substitutions of aligned amino acid residues in a second amino acid sequence such that the first and second amino acid sequences can have a common structural domain and/or common functional activity. For example, amino acid sequences that contain a common structural domain have at least about 85%, 90%, 91%, 92%, 93%, 94%, 95%, 96%, 97%, 98% or 99% identity to a reference sequence, e.g., a sequence provided herein. In the context of nucleotide sequence, the term "substantially identical" is used herein to refer to a first nucleic acid sequence that contains a sufficient or minimum number of nucleotides that are identical to aligned nucleotides in a second nucleic acid sequence such that the first and second nucleotide sequences encode a polypeptide having common functional activity, or encode a common structural polypeptide domain or a common functional polypeptide activity, for example, nucleotide sequences having at least about 85%, 90%, 91%, 92%, 93%, 94%, 95%, 96%, 97%, 98% or 99% identity to a reference sequence.

The nucleic acid molecules of the invention include, but are not limited to, the DNA molecules encoding the polypeptide sequences shown in the sequence listing. Also, the present invention also relates to nucleic acid molecules that hybridize to the DNA molecules encoding the polypeptide sequences shown in the sequence listing under high stringency binding and washing conditions, as defined in WO 2007/042309. Preferred molecules (from an mRNA perspective) are those that have at least 75% or 80% (preferably at least 85%, more preferably at least 90% and most preferably at least 95%) homology or sequence identity with one of the DNA molecules described herein. By way of example, in view of expressing the antibodies in eukaryotic cells, the DNA sequences shown in the sequence listing have been designed to match codon usage in eukaryotic cells. If it is desired to express the antibodies in E. coli, these sequences can be changed to match E. coli codon usage. Variants of DNA molecules of the invention can be constructed in several different ways, as described e.g. in WO 2007/042309.

The proteins of the invention may have a modified N-terminal sequence, e.g. a deletion of one or more of the N-terminal amino acids, or an exchange of e.g. the first, N-terminal amino acid (e.g. glutamate to alanine), to optimize the molecule for being expressed by using certain expression systems (such as specific vectors or host cells), or for being expressed as inclusion bodies or in soluble form, or for being secreted into the medium or the periplasmic space or for being contained within the cell, or for yielding a more homogenous product. The polypeptides of the invention may have a modified C-terminal sequence, such as an additional alanine, and/or further amino acid exchanges in the C-terminal part or at other defined positions within any of the framework regions, as explained e.g. in WO2012/

175741, WO2011/075861, or WO2013/024059, in order to e.g. further enhance stability or reduce immunogenicity of such polypeptides.

For the avoidance of doubt, all of the embodiments relating to pharmaceutical compositions, kits, treatment methods, medical uses, combinations, methods of administration and dosages as described herein are contemplated for any of the multi-specific binding proteins described herein, either alone or in combination with further therapeutic agents (as specified in more detail below).

Pharmaceutical Compositions; Methods of Administration; Dosages

The invention further relates to pharmaceutical compositions for the treatment of a disease (as specified in more detail below), wherein such compositions comprise at least one multi-specific binding protein of the invention. The invention further encompasses methods of treating a disease (as specified in more detail below) using at least one multi-specific protein of the invention or pharmaceutical composition as set out below, and further encompasses the preparation of a medicament for the treatment of such disease by using such binding protein of the invention or pharmaceutical composition.

The binding proteins of the invention (e.g., any one of DLL3 #1/CD3 #1, DLL3 #2/CD3 #1, DLL3 #3/CD3 #1, DLL3 #4/CD3 #1, DLL3 #5/CD3 #1, DLL3 #6/CD3 #1, DLL3 #7/CD3 #1, DLL3 #8/CD3 #1, DLL3 #9/CD3 #1, DLL3 #10/CD3 #1, DLL3 #11/CD3 #1, DLL3 #12/CD3 #1, DLL3 #13/CD3 #1, DLL3 #14/CD3 #1, DLL3 #15/CD3 #1, DLL3 #16/CD3 #1, DLL3 #17/CD3 #1, DLL3 #18/CD3 #1, DLL3 #1/CD3 #2, DLL3 #2/CD3 #2, DLL3 #3/CD3 #2, DLL3 #4/CD3 #2, DLL3 #5/CD3 #2, DLL3 #6/CD3 #2, DLL3 #7/CD3 #2, DLL3 #8/CD3 #2, DLL3 #9/CD3 #2, DLL3 #10/CD3 #2, DLL3 #11/CD3 #2, DLL3 #12/CD3 #2, DLL3 #13/CD3 #2, DLL3 #14/CD3 #2, DLL3 #15/CD3 #2, DLL3 #16/CD3 #2, DLL3 #17/CD3 #2, DLL3 #18/CD3 #2, DLL3 #1/CD3 #3, DLL3 #2/CD3 #3, DLL3 #3/CD3 #3, DLL3 #4/CD3 #3, DLL3 #5/CD3 #3 and DLL3 #6/CD3 #3, DLL3 #7/CD3 #3, DLL3 #8/CD3 #3, DLL3 #9/CD3 #3, DLL3 #10/CD3 #3, DLL3 #11/CD3 #3, DLL3 #12/CD3 #3, DLL3 #13/CD3 #3, DLL3 #14/CD3 #3, DLL3 #15/CD3 #3, DLL3 #16/CD3 #3, DLL3 #17/CD3 #3, DLL3 #18/CD3 #3, preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, DLL3 #3/CD3 #3) and/or the compositions comprising the same can be administered to a patient in need thereof in any suitable manner, depending on the specific pharmaceutical formulation or composition to be used. Thus, the binding proteins of the invention and/or the compositions comprising the same can for example be administered intravenously (i.v.), subcutaneously (s.c.), intramuscularly (i.m.), intraperitoneally (i.p.), transdermally, orally, sublingually (e.g. in the form of a sublingual tablet, spray or drop placed under the tongue and adsorbed through the mucus membranes into the capillary network under the tongue), (intra-)nasally (e.g. in the form of a nasal spray and/or as an aerosol), topically, by means of a suppository, by inhalation, or any other suitable manner in an effective amount or dose. The binding protein can be administered by infusion, bolus or injection. In preferred embodiments, the administration is by intravenous infusion or subcutaneous injection.

The binding proteins of the invention and/or the compositions comprising the same are administered according to a regimen of treatment that is suitable for treating and/or alleviating the disease, disorder or condition to be treated or alleviated. The clinician will generally be able to determine a suitable treatment regimen, depending on factors such as the disease, disorder or condition to be treated or alleviated, the severity of the disease, the severity of the symptoms thereof, the specific binding protein of the invention to be used, the specific route of administration and pharmaceutical formulation or composition to be used, the age, gender, weight, diet, general condition of the patient, and similar factors well known to the clinician. Generally, the treatment regimen will comprise the administration of one or more binding proteins of the invention, or of one or more compositions comprising the same, in therapeutically effective amounts or doses.

Generally, for the treatment and/or alleviation of the diseases, disorders and conditions mentioned herein and depending on the specific disease, disorder or condition to be treated, the potency of the specific binding protein of the invention to be used, the specific route of administration and the specific pharmaceutical formulation or composition used, the binding proteins of the invention will generally be administered in an amount between 0.005 and 20.0 mg per kilogram of body weight and dose, preferably between 0.05 and 10.0 mg/kg/dose, either continuously (e.g. by infusion) or more preferably as single doses (such as e.g. twice a week, weekly, or monthly doses; cf. below), but can significantly vary, especially, depending on the before-mentioned parameters. Thus, in some cases it may be sufficient to use less than the minimum dose given above, whereas in other cases the upper limit may have to be exceeded. When administering large amounts it may be advisable to divide them up into a number of smaller doses spread over the day.

Depending on the specific binding protein of the invention and its specific pharmacokinetic and other properties, it may be administered daily, every second, third, fourth, fifth or sixth day, weekly, monthly, and the like. An administration regimen could include long-term, weekly treatment. By "long-term" is meant at least two weeks and preferably months, or years of duration.

The efficacy of the multi-specific protein of the invention, and of compositions comprising the same, can be tested using any suitable in vitro assay, cell-based assay, in vivo assay and/or animal model known per se, or any combination thereof, depending on the specific disease involved. Suitable assays and animal models will be clear to the skilled person, and for example include the assays and animal models used in the Examples below.

Formulations

For pharmaceutical use, the binding proteins of the invention may be formulated as a pharmaceutical preparation comprising (i) at least one binding protein of the invention (e.g., any one of DLL3 #1/CD3 #1, DLL3 #2/CD3 #1, DLL3 #3/CD3 #1, DLL3 #4/CD3 #1, DLL3 #5/CD3 #1, DLL3 #6/CD3 #1, DLL3 #7/CD3 #1, DLL3 #8/CD3 #1, DLL3 #9/CD3 #1, DLL3 #10/CD3 #1, DLL3 #11/CD3 #1, DLL3 #12/CD3 #1, DLL3 #13/CD3 #1, DLL3 #14/CD3 #1, DLL3 #15/CD3 #1, DLL3 #16/CD3 #1, DLL3 #17/CD3 #1, DLL3 #18/CD3 #1, DLL3 #1/CD3 #2, DLL3 #2/CD3 #2, DLL3 #3/CD3 #2, DLL3 #4/CD3 #2, DLL3 #5/CD3 #2, DLL3 #6/CD3 #2, DLL3 #7/CD3 #2, DLL3 #8/CD3 #2, DLL3 #9/CD3 #2, DLL3 #10/CD3 #2, DLL3 #11/CD3 #2, DLL3 #12/CD3 #2, DLL3 #13/CD3 #2, DLL3 #14/CD3 #2, DLL3 #15/CD3 #2, DLL3 #16/CD3 #2, DLL3 #17/CD3 #2, DLL3 #18/CD3 #2, DLL3 #1/CD3 #3, DLL3 #2/CD3 #3, DLL3 #3/CD3 #3, DLL3 #4/CD3 #3, DLL3 #5/CD3 #3 and DLL3 #6/CD3 #3, DLL3 #7/CD3 #3, DLL3 #8/CD3 #3, DLL3 #9/CD3 #3, DLL3 #10/CD3 #3, DLL3 #11/CD3 #3, DLL3 #12/CD3 #3, DLL3 #13/CD3 #3, DLL3 #14/CD3 #3, DLL3 #15/CD3 #3, DLL3 #16/CD3 #3, DLL3 #17/CD3 #3, DLL3

18/CD3 #3, preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, DLL3 #3/CD3 #3) and (ii) at least one pharmaceutically acceptable carrier, diluent, excipient, adjuvant, and/or stabilizer, and (iii) optionally one or more further pharmacologically active polypeptides and/or compounds. By "pharmaceutically acceptable" is meant that the respective material does not show any biological or otherwise undesirable effects when administered to an individual and does not interact in a deleterious manner with any of the other components of the pharmaceutical composition (such as e.g. the pharmaceutically active ingredient) in which it is contained. Specific examples can be found in standard handbooks, such as e.g. Remington's Pharmaceutical Sciences, 18th Ed., Mack Publishing Company, USA (1990). For example, the binding proteins of the invention may be formulated and administered in any manner known per se for conventional antibodies and antibody fragments and other pharmaceutically active proteins. Thus, according to a further embodiment, the invention relates to a pharmaceutical composition or preparation that contains at least one binding protein of the invention and at least one pharmaceutically acceptable carrier, diluent, excipient, adjuvant and/or stabilizer, and optionally one or more further pharmacologically active substances, in the form of lyophilized or otherwise dried formulations or aqueous or non-aqueous solutions or suspensions.

Pharmaceutical preparations for parenteral administration, such as intravenous, intramuscular, subcutaneous injection or intravenous infusion may for example be sterile solutions, suspensions, dispersions, emulsions, or powders which comprise the active ingredient and which are suitable, optionally after a further dissolution or dilution step, for infusion or injection. Suitable carriers or diluents for such preparations for example include, without limitation, sterile water and pharmaceutically acceptable aqueous buffers and solutions such as physiological phosphate-buffered saline, Ringer's solutions, dextrose solution, and Hank's solution; water oils; glycerol; ethanol; glycols such as propylene glycol, as well as mineral oils, animal oils and vegetable oils, for example peanut oil, soybean oil, as well as suitable mixtures thereof.

Solutions of the binding proteins of the invention may also contain a preservative to prevent the growth of microorganisms, such as antibacterial and antifungal agents, for example, p-hydroxybenzoates, parabens, chlorobutanol, phenol, sorbic acid, thiomersal, (alkali metal salts of) ethylenediamine tetraacetic acid, and the like. In many cases, it will be preferable to include isotonic agents, for example, sugars, buffers or sodium chloride. Optionally, emulsifiers and/or dispersants may be used. The proper fluidity can be maintained, for example, by the formation of liposomes, by the maintenance of the required particle size in the case of dispersions or by the use of surfactants. Other agents delaying absorption, for example, aluminum monostearate and gelatin, may also be added. The solutions may be filled into injection vials, ampoules, infusion bottles, and the like.

In all cases, the ultimate dosage form must be sterile, fluid and stable under the conditions of manufacture and storage. Sterile injectable solutions are prepared by incorporating the active compound in the required amount in the appropriate solvent with various of the other ingredients enumerated above, as required, followed by filter sterilization. In the case of sterile powders for the preparation of sterile injectable solutions, the preferred methods of preparation are vacuum drying and the freeze drying techniques, which yield a powder of the active ingredient plus any additional desired ingredient present in the previously sterile-filtered solutions.

Usually, aqueous solutions or suspensions will be preferred. Generally, suitable formulations for therapeutic proteins such as the binding proteins of the invention are buffered protein solutions, such as solutions including the protein in a suitable concentration (such as from 0.001 to 400 mg/ml, preferably from 0.005 to 200 mg/ml, more preferably 0.01 to 200 mg/ml, more preferably 1.0-100 mg/ml, such as 1.0 mg/ml (i.v. administration) or 100 mg/ml (s.c. administration) and an aqueous buffer such as:
 phosphate buffered saline, pH 7.4,
 other phosphate buffers, pH 6.2 to 8.2,
 acetate buffers, pH 3.2 to 7.5, preferably pH 4.8 to 5.5
 histidine buffers, pH 5.5 to 7.0,
 succinate buffers, pH 3.2 to 6.6, and
 citrate buffers, pH 2.1 to 6.2,
 and, optionally, salts (e.g. NaCl) and/or sugars (such as e.g. sucrose and trehalose) and/or other polyalcohols (such as e g mannitol and glycerol) for providing isotonicity of the solution.

In addition, other agents such as a detergent, e.g. 0.02% Tween-20 or Tween-80, may be included in such solutions. Formulations for subcutaneous application may include significantly higher concentrations of the antibody of the invention, such as up to 100 mg/ml or even above 100 mg/ml. However, it will be clear to the person skilled in the art that the ingredients and the amounts thereof as given above do only represent one, preferred option. Alternatives and variations thereof will be immediately apparent to the skilled person, or can easily be conceived starting from the above disclosure. The above described formulations can optionally be provided as lyophilized formulation that is to be reconstituted in a solution, e.g. in water for injection (WFI).

According to a further aspect of the invention, a binding protein of the invention may be used in combination with a device useful for the administration of protein, such as a syringe, injector pen, micropump, or other device.

Method of Treatment

A further aspect of the invention provides a method of treating cancer comprising administering to a patient in need thereof a therapeutically effective amount of the binding protein of the invention.

A further aspect of the invention provides a binding protein of the invention for use in a method of treating cancer.

A further aspect of the invention is the use of the binding protein of the invention for preparing a pharmaceutical composition for treating cancer.

For the avoidance of doubt, the medical use aspects of the invention may comprise any of the specific binding proteins of the invention as described above (e.g., any one of DLL3 #1/CD3 #1, DLL3 #2/CD3 #1, DLL3 #3/CD3 #1, DLL3 #4/CD3 #1, DLL3 #5/CD3 #1, DLL3 #6/CD3 #1, DLL3 #7/CD3 #1, DLL3 #8/CD3 #1, DLL3 #9/CD3 #1, DLL3 #10/CD3 #1, DLL3 #11/CD3 #1, DLL3 #12/CD3 #1, DLL3 #13/CD3 #1, DLL3 #14/CD3 #1, DLL3 #15/CD3 #1, DLL3 #16/CD3 #1, DLL3 #17/CD3 #1, DLL3 #18/CD3 #1, DLL3 #1/CD3 #2, DLL3 #2/CD3 #2, DLL3 #3/CD3 #2, DLL3 #4/CD3 #2, DLL3 #5/CD3 #2, DLL3 #6/CD3 #2, DLL3 #7/CD3 #2, DLL3 #8/CD3 #2, DLL3 #9/CD3 #2, DLL3 #10/CD3 #2, DLL3 #11/CD3 #2, DLL3 #12/CD3 #2, DLL3 #13/CD3 #2, DLL3 #14/CD3 #2, DLL3 #15/CD3 #2, DLL3 #16/CD3 #2, DLL3 #17/CD3 #2, DLL3 #18/CD3 #2, DLL3 #1/CD3 #3, DLL3 #2/CD3 #3, DLL3 #3/CD3 #3, DLL3 #4/CD3 #3, DLL3 #5/CD3 #3 and DLL3 #6/CD3 #3, DLL3

7/CD3 #3, DLL3 #8/CD3 #3, DLL3 #9/CD3 #3, DLL3 #10/CD3 #3, DLL3 #11/CD3 #3, DLL3 #12/CD3 #3, DLL3 #13/CD3 #3, DLL3 #14/CD3 #3, DLL3 #15/CD3 #3, DLL3 #16/CD3 #3, DLL3 #17/CD3 #3, DLL3 #18/CD3 #3, preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, DLL3 #3/CD3 #3).

As used herein, the term "cancer" is meant to include all types of cancerous growths or oncogenic processes, metastatic tissues or malignantly transformed cells, tissues, or organs, irrespective of histopathologic type or stage of invasiveness.

Exemplary cancers whose growth can be inhibited using the multi-specific binding proteins described herein are any DLL3 expressing tumors, preferably SCLC, LCNEC, glioma, glioblastoma, melanoma, or other DLL3 expressing neuroendocrine tumors (e.g., neuroendocrine prostate cancer or neuroendocrine pancreatic cancer, small cell bladder cancer).

Neuroendocrine tumors (NETs) arise from the dispersed endocrine system and can occur in many different areas of the body. Traditionally, NETs have been classified by their anatomic site of origin and are typically highly aggressive. They are most often located in the gastrointestinal tract, pancreas or the (small cell lung carcinoma and large cell neuroendocrine carcinoma) as well as in kidneys, or in the genitourinary tract (bladder, prostate, ovary, cervix, and endometrium). NETs include certain tumors of the gastrointestinal tract and of the pancreatic islet cells, certain thymus and lung tumors, and medullary carcinoma of the parafollicular cells of the thyroid.

Additional cancers whose growth can be inhibited using the multi-specific binding proteins described herein are pseudo neuroendocrine tumors (pNETs) that share certain genotypic, phenotypic or biochemical characteristics with traditionally defined neuroendocrine tumors.

In some embodiments, the following cancers, tumors, and other proliferative diseases may be treated with multi-specific binding proteins of the invention: lung cancer; preferably SCLC, NSCLC or LCNEC; breast; cervical; colon; colorectal; endometrial; head and neck; liver (hepatoblastoma or hepatocellular carcinoma); ovarian; pancreatic; prostate; skin; gastric; testis; thyroid; adrenal; renal; bladder; uterine; esophageal; urothelial cancer; brain tumor; lymphoma; Ewing sarcoma; and other neuroendocrine and small blue round cell tumors.

In a preferred embodiment of the invention the cancer is small cell lung cancer (SCLC) or glioblastoma.

All cancers, tumors, neoplasms, etc., mentioned above which are characterized by their specific location/origin in the body are meant to include both the primary tumors and the metastatic tumors derived therefrom.

It is possible that a patient is more likely to respond to treatment with a binding protein of the invention (as described herein) if that patient has a cancer which is characterized by having a high expression of DLL3. Thus, in some embodiments, the cancer to be treated with the binding proteins of the invention is a cancer with high expression of DLL3, e.g., DLL3 expression is higher than the average expression in cancer cells of a population of patients suffering from the same type of a DLL3 expressing cancer.

The binding proteins of the invention may be used in therapeutic regimens in the context of first line, second line, or any further line treatments and maintenance treatment.

The binding proteins of the invention may be used for the prevention, short-term or long-term treatment of the above-mentioned diseases, optionally also in combination with radiotherapy, one or more additional therapeutic agents and/or surgery.

In preferred embodiments, the protein of the invention is used for the treatment of cancer in combination with a PD-1 antagonist, such as an anti-PD-1 antibody or an anti-PDL-1 antibody. Preferably said anti-PD-1 antibody is selected from the group consisting of pembrolizumab, nivolumab, pidilizumab, PD1-1, PD1-2, PD1-3, PD1-4, and PD1-5 as described herein (as defined by the sequences in Table A below) and in WO2017/198741 (incorporated herein by reference). Preferably said anti-PDL-1 antibody is selected from the group consisting of atezolizumab, avelumab and durvalumab. In particular preferred embodiments, the binding protein of the invention (preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, or DLL3 #3/CD3 #3) is used for the treatment of cancer in combination with PD1-1. In particular preferred embodiments, the binding protein of the invention (preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, or DLL3 #3/CD3 #3) is used for the treatment of cancer in combination with PD1-2. In particular preferred embodiments, the binding protein of the invention (preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, DLL3 #3/CD3 #3) is used for the treatment of cancer in combination with PD1-3. In particular preferred embodiments, the binding protein of the invention (preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, DLL3 #3/CD3 #3) is used for the treatment of cancer in combination with PD1-4. In particular preferred embodiments, the binding protein of the invention (preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, DLL3 #3/CD3 #3) is used for the treatment of cancer in combination with PD1-5.

TABLE A

Amino acid sequences and SEQ ID NOs of heavy chain and light chain sequences of anti-PD1 antibodies PD1-1, PD1-2, PD1-3, PD1-4, PD1-5.

| SEQ ID Number: | Brief description of sequence | Sequence |
| --- | --- | --- |
| SEQ ID NO: 256 | PD1-1 HC | EVMLVESGGGLVQPGGSLRLSCTASGFTFSASAMSWV RQAPGKGLEWVAYISGGGGDTYYSSSVKGRFTISRDN AKNSLYLQMNSLRAEDTAVYYCARHSNVNYYAMDY WGQGTLVTVSSASTKGPSVFPLAPCSRSTSESTAALGC |

TABLE A-continued

Amino acid sequences and SEQ ID NOs of heavy chain and light chain sequences of anti-PD1 antibodies PD1-1, PD1-2, PD1-3, PD1-4, PD1-5.

| SEQ ID Number: | Brief description of sequence | Sequence |
|---|---|---|
| | | LVKDYFPEPVTVSWNSGALTSGVHTFPAVLQSSGLYSL SSVVTVPSSSLGTKTYTCNVDHKPSNTKVDKRVESKYG PPCPPCPAPEFLGGPSVFLFPPKPKDTLMISRTPEVTCVV VDVSQEDPEVQFNWYVDGVEVHNAKTKPREEQFNST YRVVSVLTVLHQDWLNGKEYKCKVSNKGLPSSIEKTIS KAKGQPREPQVYTLPPSQEEMTKNQVSLTCLVKGFYPS DIAVEWESNGQPENNYKTTPPVLDSDGSFFLYSRLTVD KSRWQEGNVFSCSVMHEALHNHYTQKSLSLSLG |
| SEQ ID NO: 257 | PD1-1 LC | EIVLTQSPATLSLSPGERATMSCRASENIDTSGISFMNW YQQKPGQAPKLLIYVASNQGSGIPARFSGSGSGTDFTLT ISRLEPEDFAVYYCQQSKEVPWTFGQGTKLEIKRTVAA PSVFIFPPSDEQLKSGTASVVCLLNNFYPREAKVQWKV DNALQSGNSQESVTEQDSKDSTYSLSSTLTLSKADYEK HKVYACEVTHQGLSSPVTKSFNRGEC |
| SEQ ID NO: 258 | PD1-2 HC | EVMLVESGGGLVQPGGSLRLSCTASGFTFSASAMSWV RQAPGKGLEWVAYISGGGGDTYYSSSVKGRFTISRDN AKNSLYLQMNSLRAEDTAVYYCARHSNPNYYAMDY WGQGTLVTVSSASTKGPSVFPLAPCSRSTSESTAALGC LVKDYFPEPVTVSWNSGALTSGVHTFPAVLQSSGLYSL SSVVTVPSSSLGTKTYTCNVDHKPSNTKVDKRVESKYG PPCPPCPAPEFLGGPSVFLFPPKPKDTLMISRTPEVTCVV VDVSQEDPEVQFNWYVDGVEVHNAKTKPREEQFNST YRVVSVLTVLHQDWLNGKEYKCKVSNKGLPSSIEKTIS KAKGQPREPQVYTLPPSQEEMTKNQVSLTCLVKGFYPS DIAVEWESNGQPENNYKTTPPVLDSDGSPPLYSRLTVD KSRWQEGNVFSCSVMHEALHNHYTQKSLSLSLG |
| SEQ ID NO: 259 | PD1-2 LC | EIVLTQSPATLSLSPGERATMSCRASENIDTSGISFMNW YQQKPGQAPKLLIYVASNQGSGIPARFSGSGSGTDFTLT ISRLEPEDFAVYYCQQSKEVPWTFGQGTKLEIKRTVAA PSVFIFPPSDEQLKSGTASVVCLLNNFYPREAKVQWKV DNALQSGNSQESVTEQDSKDSTYSLSSTLTLSKADYEK HKVYACEVTHQGLSSPVTKSFNRGEC |
| SEQ ID NO: 260 | PD1-3 HC | EVMLVESGGGLVQPGGSLRLSCTASGFTFSKSAMSWV RQAPGKGLEWVAYISGGGGDTYYSSSVKGRFTISRDN AKNSLYLQMNSLRAEDTAVYYCARHSNVNYYAMDY WGQGTLVTVSSASTKGPSVFPLAPCSRSTSESTAALGC LVKDYFPEPVTVSWNSGALTSGVHTFPAVLQSSGLYSL SSVVTVPSSSLGTKTYTCNVDHKPSNTKVDKRVESKYG PPCPPCPAPEFLGGPSVFLFPPKPKDTLMISRTPEVTCVV VDVSQEDPEVQFNWYVDGVEVHNAKTKPREEQFNST YRVVSVLTVLHQDWLNGKEYKCKVSNKGLPSSIEKTIS KAKGQPREPQVYTLPPSQEEMTKNQVSLTCLVKGFYPS DIAVEWESNGQPENNYKTTPPVLDSDGSPPLYSRLTVD KSRWQEGNVFSCSVMHEALHNHYTQKSLSLSLG |
| SEQ ID NO: 261 | PD1-3 LC | EIVLTQSPATLSLSPGERATMSCRASENIDVSGISFMNW YQQKPGQAPKLLIYVASNQGSGIPARFSGSGSGTDFTLT ISRLEPEDFAVYYCQQSKEVPWTFGQGTKLEIKRTVAA PSVFIFPPSDEQLKSGTASVVCLLNNFYPREAKVQWKV DNALQSGNSQESVTEQDSKDSTYSLSSTLTLSKADYEK HKVYACEVTHQGLSSPVTKSFNRGEC |
| SEQ ID NO: 262 | PD1-4 HC | EVMLVESGGGLVQPGGSLRLSCTASGFTFSKSAMSWV RQAPGKGLEWVAYISGGGGDTYYSSSVKGRFTISRDN AKNSLYLQMNSLRAEDTAVYYCARHSNVNYYAMDY WGQGTLVTVSSASTKGPSVFPLAPCSRSTSESTAALGC LVKDYFPEPVTVSWNSGALTSGVHTFPAVLQSSGLYSL SSVVTVPSSSLGTKTYTCNVDHKPSNTKVDKRVESKYG PPCPPCPAPEFLGGPSVFLFPPKPKDTLMISRTPEVTCVV VDVSQEDPEVQFNWYVDGVEVHNAKTKPREEQFNST YRVVSVLTVLHQDWLNGKEYKCKVSNKGLPSSIEKTIS KAKGQPREPQVYTLPPSQEEMTKNQVSLTCLVKGFYPS DIAVEWESNGQPENNYKTTPPVLDSDGSPPLYSRLTVD KSRWQEGNVFSCSVMHEALHNHYTQKSLSLSLG |
| SEQ ID NO: 263 | PD1-4 LC | EIVLTQSPATLSLSPGERATMSCRASENIDVSGISFMNW YQQKPGQAPKLLIYVASNQGSGIPARFSGSGSGTDFTLT ISRLEPEDFAVYYCQQSKEVPWTFGQGTKLEIKRTVAA PSVFIFPPSDEQLKSGTASVVCLLNNFYPREAKVQWKV |

TABLE A-continued

Amino acid sequences and SEQ ID NOs of heavy chain and light chain sequences of anti-PD1 antibodies PD1-1, PD1-2, PD1-3, PD1-4, PD1-5.

| SEQ ID Number: | Brief description of sequence | Sequence |
|---|---|---|
| | | DNALQSGNSQESVTEQDSKDSTYSLSSTLTLSKADYEK HKVYACEVTHQGLSSPVTKSFNRGEC |
| SEQ ID NO: 264 | PD1-5 HC | EVMLVESGGGLVQPGGSLRLSCTASGFTFSKSAMSWV RQAPGKGLEWVAYISGGGGDTYYSSSVKGRFTISRDN AKNSLYLQMNSLRAEDTAVYYCARHSNVNYYAMDY WGQGTLVTVSSASTKGPSVFPLAPCSRSTSESTAALGC LVKDYFPEPVTVSWNSGALTSGVHTFPAVLQSSGLYSL SSVVTVPSSSLGTKTYTCNVDHKPSNTKVDKRVESKYG PPCPPCPAPEFLGGPSVFLFPPKPKDTLMISRTPEVTCVV VDVSQEDPEVQFNWYVDGVEVHNAKTKPREEQFNST YRVVSVLTVLHQDWLNGKEYKCKVSNKGLPSSIEKTIS KAKGQPREPQVYTLPPSQEEMTKNQVSLTCLVKGFYPS DIAVEWESNGQPENNYKTTPPVLDSDGSPPLYSRLTVD KSRWQEGNVFSCSVMHEALHNHYTQKSLSLSLG |
| SEQ ID NO: 265 | PD1-5 LC | EIVLTQSPATLSLSPGERATMSCRASENIDVSGISFMNW YQQKPGQAPKLLIYVASNQGSGIPARFSGSGSGTDFTLT ISRLEPEDFAVYYCQQSKEVPWTFGQGTKLEIKRTVAA PSVFIFPPSDEQLKSGTASVVCLLNNFYPREAKVQWKV DNALQSGNSQESVTEQDSKDSTYSLSSTLTLSKADYEK HKVYACEVTHQGLSSPVTKSFNRGEC |

According to these preferred embodiments and any other of the aspects of the present invention, antibodies PD1-1, PD1-2, PD1-3, PD1-4 and PD1-5 are antibody molecules as disclosed in WO2017/198741, and are defined by the sequences as shown in Table A above.

Accordingly, PD1-1 has a heavy chain comprising the amino acid sequence of SEQ ID NO:256 and a light chain comprising the amino acid sequence of SEQ ID NO:257;

PD1-2 has a heavy chain comprising the amino acid sequence of SEQ ID NO:258 and a light chain comprising the amino acid sequence of SEQ ID NO:259;

PD1-3 has a heavy chain comprising the amino acid sequence of SEQ ID NO:260 and a light chain comprising the amino acid sequence of SEQ ID NO:261;

PD1-4 has a heavy chain comprising the amino acid sequence of SEQ ID NO:262 and a light chain comprising the amino acid sequence of SEQ ID NO:263; and PD1-5 has a heavy chain comprising the amino acid sequence of SEQ ID NO:264 and a light chain comprising the amino acid sequence of SEQ ID NO:265.

The above also includes the use of the binding proteins of the invention in various methods of treating the above diseases by administering a therapeutically effective dose to a patient in need thereof, as well as the use of these binding proteins for the manufacture of medicaments for the treatment of such diseases, as well as pharmaceutical compositions including such binding proteins of the invention, as well as the preparation and/or manufacture of medicaments including such binding proteins of the invention, and the like.

Combinations with Other Active Substances or Treatments

A binding protein of the invention may be used on its own or in combination with one or more additional therapeutic agents, in particular in combination with a chemotherapeutic agent like DNA damaging agents, a therapeutically active compound that inhibits angiogenesis, a signal transduction pathway inhibitor, an EGFR inhibitor, an immune modulator, an immune checkpoint inhibitor, a mitotic checkpoint inhibitor or a hormonal therapy agent.

The additional therapeutic agent may be administered simultaneously with, optionally as a component of the same pharmaceutical preparation, or before or after administration of the DLL3/CD3 binding protein.

Cytostatic and/or cytotoxic active substances which may be administered in combination with binding molecules of the invention include, without being restricted thereto, hormones, hormone analogues and antihormones, aromatase inhibitors, LHRH agonists and antagonists, inhibitors of growth factors (growth factors such as for example platelet derived growth factor (PDGF), fibroblast growth factor (FGF), vascular endothelial growth factor (VEGF), epidermal growth factor (EGF), insulin-like growth factors (IGF), human epidermal growth factor (HER, e.g. HER2, HERS, HER4) and hepatocyte growth factor (HGF)), inhibitors are for example (anti-)growth factor antibodies, (anti-)growth factor receptor antibodies and tyrosine kinase inhibitors, such as for example cetuximab, gefitinib, afatinib, nintedanib, imatinib, lapatinib, bosutinib and trastuzumab; antimetabolites (e.g. antifolates such as methotrexate, raltitrexed, pyrimidine analogues such as 5-fluorouracil (5-FU), gemcitabine, irinotecan, doxorubicin, TAS-102, capecitabine and gemcitabine, purine and adenosine analogues such as mercaptopurine, thioguanine, cladribine and pentostatin, cytarabine (ara C), fludarabine); antitumor antibiotics (e.g. anthracyclins); platinum derivatives (e.g. cisplatin, oxaliplatin, carboplatin); alkylation agents (e.g. estramustin, meclorethamine, melphalan, chlorambucil, busulphan, dacarbazin, cyclophosphamide, ifosfamide, temozolomide, nitrosoureas such as for example carmustin and lomustin, thiotepa); antimitotic agents (e.g. Vinca alkaloids such as for example vinblastine, vindesin, vinorelbin and vincristine; and taxanes such as paclitaxel, docetaxel); angiogenesis inhibitors, including bevacizumab, ramucirumab and aflibercept, tubuline inhibitors; DNA synthesis inhibitors, PARP inhibitors, topoisomerase inhibitors (e.g. epipodophyllotoxins such as for example etoposide and etopophos, teniposide, amsacrin, topotecan, irinotecan, mitoxantrone), serine/threonine kinase inhibitors (e.g. PDK1 inhibitors, Raf inhibitors, A-Raf inhibitors, B-Raf inhibitors, C-Raf inhibitors, mTOR inhibitors, mTORC1/2 inhibitors, PI3K inhibitors, PI3Kα inhibitors, dual mTOR/PI3K inhibitors, STK33 inhibitors, AKT inhibitors, PLK1 inhibitors (such as volasertib), inhibitors of CDKs, including CDK9 inhibitors, Aurora kinase inhibitors), tyrosine kinase inhibitors (e.g. PTK2/FAK inhibitors), protein protein interaction inhibitors, MEK inhibitors, ERK inhibitors, FLT3 inhibitors, BRD4 inhibitors, IGF-1R inhibitors, Bcl-xL inhibitors, Bcl-2 inhibitors, Bcl-2/Bcl-xL inhibitors, ErbB receptor inhibitors, BCR-ABL inhibitors, ABL inhibitors, Src inhibitors, rapamycin analogs (e.g. everolimus, temsirolimus, ridaforolimus, sirolimus), androgen synthesis inhibitors, androgen receptor inhibitors, DNMT inhibitors, HDAC inhibitors, ANG1/2 inhibitors, CYP17 inhibitors, radiopharmaceuticals, immunotherapeutic agents such as immune checkpoint inhibitors (e.g. CTLA4, PD1, PD-L1, LAG3, and TIM3 binding molecules/immunoglobulins, such as ipilimumab, nivolumab, pembrolizumab) and various chemotherapeutic agents such as amifostin, anagrelid, clodronat, filgrastin, interferon, interferon alpha, leucovorin, rituximab, procarbazine, levamisole, mesna, mitotane, pamidronate and porfimer; proteasome inhibitors (such as Bortezomib); Smac and BH3 mimetics; agents restoring p53 functionality including mdm2-p53 antagonist; inhibitors of the Wnt/beta-catenin signaling pathway; and/or cyclin-dependent kinase 9 inhibitors.

Particularly preferred are treatments with the binding molecules of the invention in combination with one or more immunotherapeutic agents, including anti-PD-1 and anti-PD-L1 agents and anti LAG3 agents: Exemplary anti-PD1 agents include but are not limited to anti-PD-1 antibody PDR-001, pembrolizumab, nivolumab, pidilizumab and PD1-1, PD1-2, PD1-3, PD1-4 and PD1-5 as disclosed herein (Table A) and in WO2017/198741. Exemplary anti-PDL-1 agents include but are not limited to atezolizumab, avelumab and durvalumab. In preferred embodiments, the binding molecule of the invention (preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, DLL3 #3/CD3 #3) is combined with PD1-1. In preferred embodiments, the binding molecule of the invention (preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, DLL3 #3/CD3 #3) is combined with PD1-2. In preferred embodiments, the binding molecule of the invention (preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, DLL3 #3/CD3 #3) is combined with PD1-3. In preferred embodiments, the binding molecule of the invention (preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, DLL3 #3/CD3 #3) is combined with PD1-4. In preferred embodiments, the binding molecule of the invention (preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, DLL3 #3/CD3 #3) is combined with PD1-5.

In certain embodiments, the additional therapeutic agent may be a further immunotherapeutic agent, such as modulators of: TIM-1, TIM-3, TIM-4, PD-L2, LAG3, CTLA-4, Galectin 9, Galectin-1, CD69, CD113, GPR56, CD48, GARP, CAECAM-1, BTLA, TIGIT, CD160, LAIR1, 2B4, CEACAM, CD39, TGFβ, IL-10, Fas ligand, ICOS, B7 family (B7-1, B7-2, B7-H1 (PDL-1), B7-DC (PD-L2), B7-H2 (ICOS-L), B7-H3, B7-H4, B7-H5 (VISTA), or B7-H6).

In some embodiments, the additional immunotherapeutic agent is a member of the TNF family of molecules that bind to cognate TNF receptor family members, which include CD40 and CD40L, OX-40, OX-40L, CD70, CD27L, CD30, CD30L, 4-1BBL, CD137, GITR, TRAIL/Apo2-L, TRAILR1/DR4, TRAILR2/DR5, TRAILR3, TRAILR4, OPG, RANK, RANKL, TWEAKR/Fn14, TWEAK, BAFFR, EDAR, XEDAR, TACI, APRIL, BCMA, LIGHT, DcR3, HVEM, VEGI/TL1A, TRAMP/DR3, EDAR, EDA1, XEDAR, EDA2, TNFR1, Lymphotoxin α/TNFβ, TNFR2, TNFα, LTβR, Lymphotoxin α1β2, FAS, FASL, RELT, DR6, TROY, NGFR.

In some embodiments, the additional therapeutic agent is a SMAC mimetic. SMAC mimetics are compounds which bind to Inhibitor of Apoptosis Proteins (IAPs) and have immune modulatory function and mediate the induction of systemic cytokines (e.g. IL-6, TNFα etc.) and chemokines (e.g. MCP-1) when administered to animals or humans. In some embodiments, the SMAC mimetic is (i) LCL161, i.e. compound A in example 1 of WO 2008/016893 (page 28/29; [122]), or a pharmaceutically acceptable salt thereof; (ii) the SMAC mimetic known as Debio-1143, or a pharmaceutically acceptable salt thereof; (iii) the SMAC mimetic known as birinapant, or a pharmaceutically acceptable salt thereof; (iv) the SMAC mimetic known as ASTX-660, or a pharmaceutically acceptable salt thereof; or (v) the SMAC mimetic known as CUDC-427, or a pharmaceutically acceptable salt thereof.

In some embodiments, the additional immunotherapeutic agent is selected from (i) antagonists of cytokines that inhibit T cell activation (e.g., IL-6, IL-10, TGF-B, VEGF; "immunosuppressive cytokines") and/or (ii) agonists of cytokines that stimulate T cell activation and/or cytokines such as IL2, for stimulating an immune response, e.g., for treating proliferative diseases, such as cancer.

In some embodiments, the additional immunotherapeutic agent is an agonist of a protein that stimulates T cell activation, such as CD28, GITRL, OX40L, CD27, and CD28H.

The additional therapeutic agent is an oncolytic virus including but not limited to an oncolytic virus derived from vaccinia virus, adenovirus, (AdV), herpes simplex virus (HSV1 or HSV2), reovirus, myxoma virus (MYXV), poliovirus, vesicular stomatitis virus (VSV), Maraba virus, varicella virus, measles virus (MV), or Newcastle disease virus (NDV).

Diagnostic Uses

The anti-DLL3 antibody molecules of the invention are useful in diagnostic and prognostic methods and can be employed for labelling, localizing, or identifying cells or tissues expressing DLL3 (e.g. in ELISA assays, FACS analysis, immunohistology or the like) by attaching a dye, a drug or another molecule with binding specificity for a different antigen. For example, a detectable label can be conjugated to the anti-DLL3 antibody molecule of the invention or a secondary reagent binding specifically to the antibody molecule of the invention and being conjugated with a detectable label (e.g. a secondary antibody) can be used in such diagnostic methods. In some embodiments, DLL3 specific antibodies specifically bind to DLL3 expressed in cells, either in the cytoplasm and/or at the cell surface, and are used for localizing and/or identifying such cells. In some embodiments, the DLL3 specific antibodies provided herein are used for identifying cells or tissues expressing DLL3 (e.g. tumor cells).

Antibodies of the invention are selected such that they have a high level of epitope binding specificity and high binding affinity to the DLL3 polypeptide. In general, the higher the binding affinity of an antibody, the more stringent wash conditions can be performed in an immunoassay to remove nonspecifically bound material without removing the target polypeptide.

Thus, further provided herein are methods of detecting DLL3 in a biological sample. Specifically, in one aspect the invention provides a method of detecting DLL3 in a sample (e.g. a tissue sample, a tumor tissue sample) comprising
 (a) contacting the sample with an antibody of the invention; and
 (b) detecting anti-DLL3 antibody bound to DLL3.

A biological sample can be obtained/isolated from any tissue (including biopsies), cell or body fluid of a subject. In a preferred embodiment, the sample is a tissue sample, preferably a tumor tissue sample. In a specific embodiment, the sample is a fixed (tumor) tissue sample, preferably a formalin-fixed, paraffin-embedded (FFPE) tissue sample, more preferably a formalin-fixed, paraffin-embedded (FFPE) tumor tissue sample.

The samples are typically divided into several portions and affixed to a medium for microscopic analysis, such as a microscope slide. Where the sample is a tissue sample, the several portions may be tissue sections. In some embodiments, serial sections are taken from FFPE tissue samples. In some embodiments, serial sections are taken from a plurality of different sites of a FFPE block, which can be done to capture both intra-section heterogeneity and intra-block heterogeneity. In some embodiments, serial sections are taken from a plurality of different biopsy samples taken from different locations in the same tumor, which can be done to capture both intra-section heterogeneity and intra-tumor heterogeneity. Typically, tissue samples first undergo deparaffinization, antigen retrieval (e.g. with Proteinase K) before antigen detection. The tissue sample can be obtained/isolated from a variety of tissues (e.g. from a biopsy), specifically tissues obtained from tumors including but not limit to SCLC, LCNEC, glioma, glioblastoma, melanoma, or other neuroendocrine tumors (e.g., neuroendocrine prostate cancer or neuroendocrine pancreatic cancer, small cell bladder cancer).

Further exemplary tumors from which a (tissue) sample can be obtained/isolated include lung cancer; preferably SCLC, NSCLC or LCNEC; breast; cervical; colon; colorectal; endometrial; head and neck; liver (hepatoblastoma or hepatocellular carcinoma); ovarian; pancreatic; prostate; skin; gastric; testis; thyroid; adrenal; renal; bladder; uterine; esophageal; urothelial cancer; brain tumor; lymphoma; Ewing sarcoma; and other neuroendocrine (including pseudo-endocrine tumors) and small blue round cell tumors.

Exemplary methods of DLL3 detection in a sample are immunocytochemistry (ICC), immunohistochemistry (IHC), Western Blotting, Flow cytometry and/or ELISA.

In a preferred embodiment, DLL3 is detected using IHC.

In a specific aspect of the invention, the method of detecting DLL3 in a tissue sample comprises
 a) contacting a tissue sample (e.g. a tumor tissue such as SCLC, glioblastoma or neuroendocrine tumors), preferably said tissue sample is a fixed tissue sample (e.g., formalin-fixed and paraffin embedded), with an antibody of the invention (e.g. DLL3 #1 or DLL3 #5)
 b) permitting formation of antibody-antigen complexes in the sample, and
 c) detecting the anti-DLL3 antibody bound to DLL3.

In some embodiments of the methods of the invention, the anti-DLL3 antibody is detected by a detectable signal, preferably, the detectable signal is generated by a detectable label. In a preferred embodiment of the method of the invention, the detectable signal is detected in an IHC assay. In some embodiments, the detectable signal is detected in an ELISA assay, by flow cytometry or by Western blot. In some embodiments, the methods described herein can be used to detect DLL3 present on the cell surface of a cell (e.g. a tumor cell), for example using flow cytometry. In some embodiments, the methods described herein can be used to detect the presence of DLL3 in a tissue sample (e.g. tumor tissue sample) using ELISA, Western blot or IHC.

In some embodiments, the detectable label is directly conjugated to the anti-DLL3 antibody and thus is deposited on the sample upon binding of the anti-DLL3 antibody to DLL3, this is generally referred to as a direct labeling method). Direct labeling methods are often more directly quantifiable, but often suffer from a lack of sensitivity. In other embodiments, deposition of the detectable label is effected by the use of a secondary detection reagent binding specifically to the antibody molecule of the invention and being conjugated with a detectable label (e.g. a secondary antibody), this is generally referred to as an indirect labeling method. In some embodiments, the specific secondary detection reagent may be a species-specific secondary antibody, an anti-hapten antibody binding to a hapten-conjugated anti-DLL3 antibody, or a biotin-binding protein bound to a biotinylated anti-DLL3 antibody).

Particular examples of detectable labels that can be conjugated either to the anti-DLL3 antibody of the invention or to a secondary detection reagent, include chromogenic, fluorescent, phosphorescent, luminescent and radioactive molecules and materials, catalysts (such as enzymes) that convert one substance into another substance to provide a detectable difference (such as by converting a colorless substance into a colored substance or vice versa, or by producing a precipitate or increasing sample turbidity), haptens that can be detected through antibody-hapten binding interactions using additional detectably labeled antibody conjugates, and paramagnetic and magnetic molecules or materials.

For example, the detectable label can be an enzyme such as horseradish peroxidase (HRP), alkaline phosphatase (AP), acid phosphatase, glucose oxidase, β-galactosidase, β-glucuronidase, and β-lactamase; a fluorphore such as fluoresceins, luminophores, coumarins, BODIPY dyes, resorufins, and rhodamines; nanoparticles such as quantum dots (U.S. Pat. Nos. 6,815,064, 6,682,596 and 6,649,138); metal chelates such as DOTA and DPTA chelates of radioactive or paramagnetic metal ions like Gd<3+>; and liposomes, for example, liposomes containing trapped fluorescent molecules.

Where the detectable label includes an enzyme, a detectable substrate such as a chromogen, a fluorogenic compound, or a luminogenic compound can be used in combination with the enzyme to generate a detectable signal. Particular examples of chromogenic compounds include diaminobenzidine (DAB), 4-nitrophenylphospate (pNPP), fast red, bromochloroindolyl phosphate (BCIP), nitro blue tetrazolium (NBT), BCIP/NBT, fast red, AP Orange, AP blue, tetramethylbenzidine (TMB), 2,2'-azino-di-[3-ethyl-benzothiazoline sulphonate] (ABTS), o-dianisidine, 4-chloronaphthol (4-CN), nitrophenyl-D-galactopyranoside (ONPG), o-phenylenediamine (OPD), 5-bromo-4-chloro-3-indolyl-galactopyranoside (X-Gal), methylumbelliferyl-D-galactopyranoside (MU-Gal), p-nitrophenyl-a-D-galactopyranoside (PNP), 5-bromo-4-chloro-3-indolyl-D-glucuronide (X-Gluc), 3-amino-9-ethyl carbazol (AEC), fuchsin, iodonitrotetrazolium (INT), tetrazolium blue and tetrazolium violet.

In some examples, the detectable moiety is a fluorophore, which belongs to several common chemical classes including coumarins, fluoresceins (or fluorescein derivatives and analogs), rhodamines, resorufins, luminophores and cyanines.

In other embodiments, the detectable moiety is a molecule detectable via brightfield microscopy, such as dyes including diaminobenzidine (DAB), 4-(dimethylamino) azobenzene-4'-sulfonamide (DABSYL), tetramethylrhodamine (DISCOVERY Purple), N,N'-biscarboxypentyl-5,5'-disulfonato-indo-dicarbocyanine (Cy5), and Rhodamine 110 (Rhodamine).

Haptens are small molecules that are specifically bound by antibodies, although by themselves they will not elicit an immune response in an animal and must first be attached to a larger carrier molecule such as a protein to generate an immune response. Examples of haptens include di-nitrophenyl, biotin, digoxigenin, and fluorescein.

Further provided herein in one aspect are methods of diagnosing or identifying a tumor as DLL3 expressing tumor (expressing DLL3 in the cytoplasm and/or the cell surface), comprising detecting DLL3 in a sample (e.g. a tumor tissue sample) of the subject using the anti-DLL3 antibodies (e.g. DLL3 #1 or DLL3 #5) of the invention (e.g. using IHC on a tumor tissue sample). In a further aspect, provided herein are methods of selecting a DLL3 targeted therapy for a subject, comprising detecting DLL3 in a sample (e.g. a tumor tissue sample) of the subject using the anti-DLL3 antibodies (e.g. DLL3 #1 or DLL3 #5) of the invention (e.g. using IHC on a tumor tissue sample). In a further aspect, provided herein are methods of monitoring the therapeutic effect (e.g. of a DLL3-targeted therapy) in a subject, comprising detecting DLL3 in a sample (e.g. a tumor tissue sample) of the subject using the anti-DLL3 antibodies (e.g. DLL3 #1 or DLL3 #5) of the invention (e.g. using IHC on a tumor tissue sample).

The anti-DLL3 antibody molecules of the invention can also be used for targeting cells. In some embodiments, the DLL3 specific antibodies provided herein are used for delivering a drug or cytotoxic agent to a target cell (e.g. a tumor cell expressing DLL3) by attaching such drug or cytotoxic agent to said DLL3 antibody, thereby, for example, killing said target cell.

Kits

The invention also encompasses kits comprising at least a multi-specific binding protein of the invention (e.g., any one of DLL3 #1/CD3 #1, DLL3 #2/CD3 #1, DLL3 #3/CD3 #1, DLL3 #4/CD3 #1, DLL3 #5/CD3 #1, DLL3 #6/CD3 #1, DLL3 #7/CD3 #1, DLL3 #8/CD3 #1, DLL3 #9/CD3 #1, DLL3 #10/CD3 #1, DLL3 #11/CD3 #1, DLL3 #12/CD3 #1, DLL3 #13/CD3 #1, DLL3 #14/CD3 #1, DLL3 #15/CD3 #1, DLL3 #16/CD3 #1, DLL3 #17/CD3 #1, DLL3 #18/CD3 #1, DLL3 #1/CD3 #2, DLL3 #2/CD3 #2, DLL3 #3/CD3 #2, DLL3 #4/CD3 #2, DLL3 #5/CD3 #2, DLL3 #6/CD3 #2, DLL3 #7/CD3 #2, DLL3 #8/CD3 #2, DLL3 #9/CD3 #2, DLL3 #10/CD3 #2, DLL3 #11/CD3 #2, DLL3 #12/CD3 #2, DLL3 #13/CD3 #2, DLL3 #14/CD3 #2, DLL3 #15/CD3 #2, DLL3 #16/CD3 #2, DLL3 #17/CD3 #2, DLL3 #18/CD3 #2, DLL3 #1/CD3 #3, DLL3 #2/CD3 #3, DLL3 #3/CD3 #3, DLL3 #4/CD3 #3, DLL3 #5/CD3 #3 and DLL3 #6/CD3 #3, DLL3 #7/CD3 #3, DLL3 #8/CD3 #3, DLL3 #9/CD3 #3, DLL3 #10/CD3 #3, DLL3 #11/CD3 #3, DLL3 #12/CD3 #3, DLL3 #13/CD3 #3, DLL3 #14/CD3 #3, DLL3 #15/CD3 #3, DLL3 #16/CD3 #3, DLL3 #17/CD3 #3, DLL3 #18/CD3 #3, preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, DLL3 #3/CD3 #3) and optionally one or more other components selected from the group consisting of other drugs used for the treatment of the diseases and disorders as described above.

In one embodiment, the kit includes a composition containing an effective amount of a binding protein of the invention in unit dosage form.

The invention also encompasses kits comprising at least a multi-specific binding protein of the invention, and one or more other components selected from the group consisting of other drugs used for the treatment of the diseases and disorders as described above.

In one embodiment, the kit includes a composition containing an effective amount of a multi-specific binding protein of the invention in unit dosage form (preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, DLL3 #3/CD3 #3). In a further embodiment the kit includes both a composition containing an effective amount of a multi-specific binding protein of the invention in unit dosage form (preferably any one of DLL3 #1/CD3 #1, DLL3 #1/CD3 #2, DLL3 #1/CD3 #3, DLL3 #2/CD3 #1, DLL3 #2/CD3 #2, DLL3 #2/CD3 #3, DLL3 #3/CD3 #1, DLL3 #3/CD3 #2, DLL3 #3/CD3 #3) and a composition containing an effective amount of a PD-1 antagonist in unit dosage form, such as an anti PD-1 antibody, most preferably PD1-1, PD1-2, PD1-3, PD1-4, and PD1-5 as described herein (e.g. Table A) and in WO2017/198741.

In some embodiments, the kit comprises a sterile container which contains such a composition; such containers can be boxes, ampoules, bottles, vials, tubes, bags, pouches, blister-packs, or other suitable container forms known in the art. Such containers can be made of plastic, glass, laminated paper, metal foil, or other materials suitable for holding medicaments. Further, the kit may comprise the pharmaceutical composition in a first container with the binding protein of the invention in lyophilized form and a second container with a pharmaceutically acceptable diluent (e.g., sterile water) for injection. The pharmaceutically acceptable diluent can be used for reconstitution or dilution of the binding protein.

If desired, a multi-specific binding protein of the invention, is provided together with instructions for administering the multi-specific binding proteins to a subject having cancer. The instructions will generally include information about the use of the composition for the treatment or prevention of a cancer. In other embodiments, the instructions include at least one of the following: description of the therapeutic agent; dosage schedule and administration for treatment or prevention of cancer or symptoms thereof; precautions; warnings; indications; counter-indications; overdosage information; adverse reactions; animal pharmacology; clinical studies; and/or references. The instructions may be printed directly on the container (when present), or as a label applied to the container, or as a separate sheet, pamphlet, card, or folder supplied in or with the container.

As set forth herein, the present disclosure further provides diagnostic methods for determining the expression of DLL3 in a biological sample. In one aspect, the present disclosure provides kits for performing these methods as well as instructions for carrying out the methods of the present disclosure such as collecting tissue and/or performing the detection assay, and/or analyzing the results.

The kit comprises, or alternatively consists essentially of, or yet further consists of, a DLL3 antibody composition of the invention (e.g., monoclonal antibodies) and instructions for use. The kits are useful for detecting the presence of DLL3 polypeptides in a biological sample e.g., any body fluid or biopsy samples of body tissue. In some embodiments, the kit can comprise: one or more DLL3 antibodies capable of binding a DLL3 polypeptide in a sample (e.g., anti-DLL3 antibody DLL3 #1 or DLL3 #5); means for detecting the DLL3 polypeptide in the sample; and optionally means for comparing the signal/amount of the DLL3 polypeptide in the sample with a control. One or more of the anti-DLL3 antibodies of the invention may be labeled. The kit components, (e.g., reagents) can be packaged in a suitable container. The kit can further comprise instructions for using the kit to detect the DLL3 polypeptides. In certain embodiments, the kit comprises an anti-DLL3 antibody of the invention (a first antibody) and a second, different antibody which binds to either the DLL3 polypeptide or the first antibody and is conjugated to a detectable label.

The kit can also comprise, e.g., a buffering agent, a preservative or a protein-stabilizing agent. The kit can further comprise components necessary for detecting the detectable-label, e.g., an enzyme or a substrate. The kit can also contain a control sample or a series of control samples, which can be assayed and compared to the test sample. Each component of the kit can be enclosed within an individual container and all of the various containers can be within a single package, along with instructions for interpreting the results of the assays performed using the kit. The kits of the present disclosure may contain a written product on or in the kit container. The written product describes how to use the reagents contained in the kit.

As amenable, these suggested kit components may be packaged in a manner customary for use by those of skill in the art. For example, these suggested kit components may be provided in solution or as a liquid dispersion or the like.

Examples

The following examples illustrate the invention. These examples should not be construed as to limit the scope of this invention.

Example 1: Design and Construction of CD3/DLL3 Binding Proteins

The present inventors have developed multi-specific binding proteins that bind DLL3 and CD3 and that induce T-cell activation leading to lysis of DLL3-expressing tumor cells. The molecular design used has an IgG antibody scaffold and an IgG-like structure. It features knob-in-hole technology in the Fc for hetero-dimerization of the Knob (anti-DLL3) and Hole (anti-CD3) arms. In addition, the binding protein has flexible peptide sequences between the light and the corresponding heavy chain in each arm. Thus, the binding protein comprises two arms, one binding to CD3, the other one binding to DLL3, each arm comprising a single chain Fab and an Fc region.

Preferably the binding molecule is bispecific and bivalent (monovalent for each of the two targets).

Preparation of Binding Domains that Recognize DLL3 and CD3 Using High Throughput V Gene Recovery from Hybridomas and Cultured Single B Cells.

To obtain anti-DLL3 binders, hybridomas or single B cells derived from DLL3 immunized wild-type and AlivaMab humanized mice (Ablexis, San Francisco, CA, USA: AlivaMab transgenic mouse platform with human immunoglobulin loci) were cultured in vitro. Supernatants were screened for reactivity against recombinant human DLL3, by AlphaLISA (PerkinElmer, Waltham, MA, USA), and against SHP77 cells (ATCC®, CRL-2195™) expressing human DLL3, by Flow Cytometry.

Immunoglobulin (Ig) VH and VL genes were then amplified from identified positive clones. To isolate RNA from hybridomas, about $2 \times 10^6$ cells from single clones were pelleted and used as source material. For single B cells, 100 to 500 cells expanded from singularly isolated B cells were used as source material. RNA was isolated using RNeasy Plus (Qiagen, Hilden, Germany) cDNA was then synthesized using Smarter cDNA synthesis kit (Clontech, Mountain View, CA) according to manufacturer's instructions. To facilitate cDNA synthesis, oligodT was used to prime reverse transcription of all messenger RNAs followed by "5' capping" with a Smarter HA oligonucleotide. Subsequent amplification of the VH and VL fragments was performed using a 2-step PCR amplification using 5' primers targeting the Smarter HA cap and 3' primers targeting consensus regions in CH1. Briefly, each 50 μl PCR reaction consists of 20 μM of forward and reverse primer mixes, 25 μl of PrimeStar Max DNA polymerase premix (Clontech), 2 μl of unpurified cDNA, and 21 μl of double-distilled H2O. The cycling program starts at 94° C. for 3 min, followed by 35 cycles (94° C. for 30 Sec, 50° C. for 1 min, 68° C. for 1 min), and ends at 72° C. for 7 min. The second round PCR was performed with VL and VH 2nd round primers containing 15 bp complementary extensions that "overlap" respective regions in their respective pTT5 mother vector (VH and VL). Second round PCR was performed with the following program: 94° C. for 3 min; 35 cycles (94° C. for 30 Sec, 50° C. for 1 min, 68° C. for 1 min), and ends at 72° C. for 7 min.

In-Fusion® HD Cloning Kit (Clontech, U.S.A.) was used for directional cloning of VL gene into a pTT5 huIgK vector and VH gene into a pTT5 huIgG1KO vector. To facilitate In-Fusion® HD Cloning, PCR products were purified and treated with Cloning Enhancer before In-Fusion HD Cloning. Cloning and transformation were performed according to manufacturer's protocol (Clontech, U.S.A.). Mini-prep DNAs were subjected to Sanger sequencing to confirm that complete V-gene fragments were obtained.

Using this methodology, pairs of Ig VH and VL genes encoding binding domains with specificity for DLL3 were prepared. Recombinant antibodies were produced by transient transfection of CHO-E37 cells with the corresponding heavy and light chain-encoding plasmids.

Confirmatory Screening of Recombinant Antibodies

Supernatants containing expressed recombinant antibodies were assayed by flow cytometry for binding to cell lines expressing human or cyno DLL3. Briefly, cells were incubated with recombinant supernatants, washed, and bound mAbs from the supernatants were detected with anti-human-IgG-APC (Jackson ImmunoResearch 109-136-098). Signal-to-background ratios (S/B) were calculated by dividing the median fluorescence intensity (MFI) of the sample by that of isotype control (variable regions against an unrelated protein and different constant region backbones).

Surface Plasmon Resonance (SPR) on Biacore 400 was performed on recombinant supernatants. Briefly, the non-optimized IgGs in the HTP supernatants were captured via Protein A/G onto the sensor surface for 60 sec at 10 ul/min. Binding of 100 nM human DLL3 to the captured IgGs was monitored for 180 sec of association at 30 ul/min, followed by 120 sec of dissociation in the HBS-EP buffer. Regeneration of the Protein A/G surface was performed with Glycine pH 2.1 in between each binding cycle. The following materials were used in this assay: Protein reagent: recombinantly expressed human DLL3. System running buffer: HBS-EP (10 mM HEPES pH 7.4, 150 mM NaCl, 3 mM EDTA, and 0.005% v/v polysorbate P20). Capturing reagent: Protein A/G G (ThermoFisher Scientific, Waltham, MA, USA), with specificity towards all human IgG isotypes.

Clones of interest (with Kd<300 pM) were selected for multispecific formatting. Multispecific binding proteins were generated and further evaluated in mechanistic and functional screening (such as cell binding, cytotoxicity and T cell activation as described below).

Humanization of DLL3 and CD3 Binders

Sequences of DLL3 binders as described above as well as CD3 binders described in the literature (Pessano et al., EMBO J. 1985 February; 4(2): 337-44; Salmerón A et al., J Immunol. 1991 Nov. 1; 147(9):3047-52) were humanized and/or optimized. Sequence optimization/humanization of antibodies is a methodology to engineer antibodies raised in non-human species (against a specific antigen/epitope) for use as therapeutics that resemble antibodies produced in humans and thereby eliminating potential adverse effects such as immunogenicity while retaining the specificity. The sequence optimization/humanization approach utilized here was as described by Singh et al, 2015 (Singh S et al., mAbs 2015: 7(4):778-91). In brief, closely matching human germlines were identified in silico, and optimization/humanization variants were evaluated using a phage screening method. Final lead candidate sequences were selected based on binding, percent human score and Epivax (in silico predictive tool for potential immunogenicity) score.

Construction of Bispecific Proteins Binding DLL3 and CD3

The variable regions of the DLL3 and CD3 binders were cloned into the expression vector pTT5 (National Research Council, Canada), using common molecular biology techniques to form bispecific binding proteins with one DLL3 specific binding unit comprising a single chain Fab binding to DLL3 and an Fc region (such binding unit also referred to herein as "DLL3 arm" or "DLL3 chain") and a CD3 specific binding unit comprising a single chain Fab binding to CD3 and an Fc region (such binding unit also referred to herein as "CD3 arm" or "CD3 chain". The Fc regions of the DLL3 and CD3 arms include either "Knob" or "Hole" mutations (Atwell et al, JMB, 1997, 270, 26-35) and the respective chains are referred to as Knob or Hole chains. For multi-fragment DNA assembly, a Gibson-assembly and NEBuilder HiFi DNA assembly approaches were used, following manufacturer's protocols (New England Biolabs, Ipswich, MA, USA). DNA mini-preps were sequenced.

Each expression vector contains eukaryotic promoter elements for the chain-encoding gene (DLL3 or CD3 arm/chain), i.e., the gene encoding the signal sequence and the light and heavy chain, an expression cassette for a prokaryotic selection marker gene such as ampicillin, and an origin of replication. These DNA plasmids were propagated in ampicillin resistant *E. coli* colonies and cultures and were purified.

Example 2: Expression and Purification of Bispecific, Bivalent Binding Proteins Binding DLL3 and CD3

Bispecific molecules binding DLL3 and CD3 were produced by transient transfection of CHO-E cells with the pTT5 vectors carrying the DLL3/CD3-chain-encoding genes. Briefly, transfected CHO-E cells growing in suspension in serum-free media were cultivated in shake flasks under agitation at 140 rpm, 37° C. and 5% CO2 and kept at conditions of exponential growth. On the day of transfection, cells were chemically transfected with Knob-chain plasmid and Hole-chain plasmid in 1:3 mass ratio. They were then seeded at 1 to $2\times10^6$ cells/ml in 1 L of Gibco® FreeStyle™ CHO expression medium (LifeTechnologies, NY, US). Cells were then incubated under orbital shaking for 10 days with one-time feeding of 200 ml commercial feed solution to allow expression of the proteins. Antibody titers in the cell culture supernatants were determined using an Octet® instrument (Pall ForteBio, CA, US) and protA biosensor tips according to manufacturer's instructions.

Recombinant DLL3/CD3 binding proteins were purified from culture supernatant in a two-step process: first by Protein A affinity chromatography using MabSelect™ column (GE Healthcare); second, by Cation exchange chromatography using a Poros 50 HS column (Applied Biosystems, Carlsbad, CA, USA). The two-step purified material was stored in final buffer of 50 mM Sodium Acetate and 100 mM NaCl, pH 5.0 Purity and degree of heterogeneity of the samples were assessed by analytical size-exclusion chromatography, mass spectrometry and analytical ultracentrifugation. Samples that were advanced for functional testing comprised two-step purified material, with about 99% monomer content.

TABLE 1

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
|---|---|---|
| SEQ ID NO: 1 | DLL3#1 LCCDR1 | RASQSVSSNFLV |
| SEQ ID NO: 2 | DLL3#1 LCCDR2 | GASTRAS |
| SEQ ID NO: 3 | DLL3#1 LCCDR3 | QQYGDSPYT |
| SEQ ID NO: 4 | DLL3#1 HCCDR1 | GNTFTNYYMH |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
|---|---|---|
| SEQ ID NO: 5 | DLL3#1 HCCDR2 | IIDPSVGSKSYAQKFLG |
| SEQ ID NO: 6 | DLL3#1 HCCDR3 | AGKRFGESYFDY |
| SEQ ID NO: 7 | DLL3#2 LCCDR1 | RASQGISNYLA |
| SEQ ID NO: 8 | DLL3#2 LCCDR2 | AASSLQS |
| SEQ ID NO: 9 | DLL3#2 LCCDR3 | LQHNSSPYT |
| SEQ ID NO: 10 | DLL3#2 HCCDR1 | GYTFTSYYMH |
| SEQ ID NO: 11 | DLL3#2 HCCDR2 | IINPSGGSTSYAQKFQG |
| SEQ ID NO: 12 | DLL3#2 HCCDR3 | GEAVGGNYYYYGMDV |
| SEQ ID NO: 13 | DLL3#3 LCCDR1 | RASQGISNYLV |
| SEQ ID NO: 14 | DLL3#3 LCCDR2 | AVSSLYS |
| SEQ ID NO: 15 | DLL3#3 LCCDR3 | LQHDSYPYT |
| SEQ ID NO: 16 | DLL3#3 HCCDR1 | GYTFTSYYVH |
| SEQ ID NO: 17 | DLL3#3 HCCDR2 | IINPGGGTTSYAQKFLG |
| SEQ ID NO: 18 | DLL3#3 HCCDR3 | GEAVTGNYFYYGMDV |
| SEQ ID NO: 19 | DLL3#4 LCCDR1 | RASKSVSSFGYSFMH |
| SEQ ID NO: 20 | DLL3#4 LCCDR2 | LASNLES |
| SEQ ID NO: 21 | DLL3#4 LCCDR3 | QHSRELPWT |
| SEQ ID NO: 22 | DLL3#4 HCCDR1 | VYTFTSYFMY |
| SEQ ID NO: 23 | DLL3#4 HCCDR2 | EISPTNGNSNLNERFKN |
| SEQ ID NO: 24 | DLL3#4 HCCDR3 | GGDGYLDY |
| SEQ ID NO: 25 | DLL3#5 LCCDR1 | QASQDISNYLN |
| SEQ ID NO: 26 | DLL3#5 LCCDR2 | DASNLET |
| SEQ ID NO: 27 | DLL3#5 LCCDR3 | QQYDNLPTWT |
| SEQ ID NO: 28 | DLL3#5 HCCDR1 | GFTFTGYYIH |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
| --- | --- | --- |
| SEQ ID NO: 29 | DLL3#5 HCCDR2 | WINPNSGGTNYAQKFQG |
| SEQ ID NO: 30 | DLL3#5 HCCDR3 | GWDY |
| SEQ ID NO: 31 | DLL3#6 LCCDR1 | RASQDISNYFA |
| SEQ ID NO: 32 | DLL3#6 LCCDR2 | AASTLQS |
| SEQ ID NO: 33 | DLL3#6 LCCDR3 | QQLNSYPYT |
| SEQ ID NO: 34 | DLL3#6 HCCDR1 | GGSISSYFVVS |
| SEQ ID NO: 35 | DLL3#6 HCCDR2 | RIYTSGSTNYNPSLNS |
| SEQ ID NO: 36 | DLL3#6 HCCDR3 | RGDWGGFDI |
| SEQ ID NO: 37 | DLL3#1 VL | EIVLTQSPGTLSLSPGERATLSCRASQSVSSNFLVWYQQKPGQAPRPLIYGASTRASGIPDRFSGSGSGADFTLTISRLEPEDFALYYCQQYGDSPYTFGQGTTLEIK |
| SEQ ID NO: 38 | DLL3#1 VH | QVQLVQSGAEVKKPGASVKVSCKASGNTFTNYYMHWVRQAPGPGLEWMGIIDPSVGSKSYAQKFLGRVTIARDTSTSTVFLDLYSLRSEDTAVYFCARAGKRFGESYFDYWGQGTLVTVSS |
| SEQ ID NO: 39 | DLL3#2 VL | DIQMTQSPSAMSASVGDRVTITCRASQGISNYLAWFQQKPGKVPEPLIYAASSLQSGVPSRFSGSGSVTEFTLTISSLQPEDFATYYCLQHNSSPYTFGQGTKLEIK |
| SEQ ID NO: 40 | DLL3#2 VH | QVQLVQSGAEVKKPGASVKVSCKASGYTFTSYYMHWVRQAPGQGLEWMGIINPSGGSTSYAQKFQGRVTMTRDTSTSTVYMELSSLRSEDTAVYYCARGEAVGGNYYYYGMDVWGQGTTVTVSS |
| SEQ ID NO: 41 | DLL3#3 VL | DIQMTQSPSAMSASVGDRVTITCRASQGISNYLVWFQQKPGKAPKRLIYAVSSLYSGVPSRFSGSGSGTEFTLTISSLQPEDFATYYCLQHDSYPYTFGQGTKLEIK |
| SEQ ID NO: 42 | DLL3#3 VH | QVQLVQSGAEVKKPGASVKVSCKASGYTFTSYYVHWVRQAPGQGLEWMVIINPGGGTTSYAQKFLGRVTMTRDTSTNTVYMELKSLRSEDTAVYYCARGEAVTGNYFYYGMDVWGQGTTVTVSS |
| SEQ ID NO: 43 | DLL3#4 VL | DIVLTQSPASLAVSLGQRATISCRASKSVSSFGYSFMHWYQQKPGQPPKLLIYLASNLESGVPARFSGSGSGTDFTLNIHPVEEEDAATYYCQHSRELPWTFGGGTKLEIK |
| SEQ ID NO: 44 | DLL3#4 VH | QVQLQQSGTELVKPGASVKLSCKASVYTFTSYFMYWVKQRPGHGLEWIGEISPTNGNSNLNERFKNKATLTVDKSSSTAYMQLSSLTSEDSAVYYCTRGGDGYLDYWGQGTTLTVSS |
| SEQ ID NO: 45 | DLL3#5 VL | DIQMTQSPSSLSASVGDRVTVTCQASQDISNYLNWYQQKPGKAPKLLIYDASNLETGVPSRFSGSGSGTDFTFTISSLQPEDIATYYCQQYDNLPTWTFGQGTKVEIK |
| SEQ ID NO: 46 | DLL3#5 VH | QVQLVQSGAEVKKPGASVKVSCKASGFTFTGYYIHWVRQAPGQGLEWMGWINPNSGGTNYAQKFQGRVTMTRDSSINTAFMELSRLTSDDTAVYYCAAGWDYWGQGTLVTVSS |
| SEQ ID NO: 47 | DLL3#6 VL | DIQLTQSPSFLSTSVGDRVTITCRASQDISNYFAWYQQKPGKAPKLLIYAASTLQSGVPSRFSGGGSGTEFTLTISSLQPEDFATYYCQQLNSYPYTFGQGTKLEIK |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
|---|---|---|
| SEQ ID NO: 48 | DLL3#6 VH | QVQLQESGPGLVKPSETLSLTCTVSGGSISSYFWSWIRQPAG KGLEWIGRIYTSGSTNYNPSLNSRLTMSVDTSKNQFSLKLSS VTAADTAVYYCARRGDWGGFDIWGQGTVVTVSS |
| SEQ ID NO: 49 | DLL3#1 scFab | EIVLTQSPGTLSLSPGERATLSCRASQSVSSNFLVWYQQKPG QAPRPLIYGASTRASGIPDRFSGSGSGADFTLTISRLEPEDFAL YYCQQYGDSPYTFGQGTTLEIKRTVAAPSVFIFPPSDEQLKS GTASVVCLLNNFYPREAKVQWKVDNALQSGNSQESVTEQD SKDSTYSLSSTLTLSKADYEKHKVYACEVTHQGLSSPVTKSF NRGECGGGGSEGKSSGSGSESKSTEGKSSGSGSESKSTGGGG SQVQLVQSGAEVKKPGASVKVSCKASGNTFTNYYMHWVR QAPGPGLEWMGIIDPSVGSKSYAQKFLGRVTIARDTSTSTVF LDLYSLRSEDTAVYFCARAGKRFGESYFDYWGQGTLVTVSS ASTKGPSVFPLAPSSKSTSGGTAALGCLVKDYFPEPVTVSWN SGALTSGVHTFPAVLQSSGLYSLSSVVTVPSSSLGTQTYICNV NHKPSNTKVDKRVEPKSC |
| SEQ ID NO: 50 | DLL3#2 scFab | DIQMTQSPSAMSASVGDRVTITCRASQGISNYLAWFQQKPG KVPEPLIYAASSLQSGVPSRFSGSGSVTEFTLTISSLQPEDFAT YYCLQHNSSPYTFGQGTKLEIKRTVAAPSVFIFPPSDEQLKSG TASVVCLLNNFYPREAKVQWKVDNALQSGNSQESVTEQDS KDSTYSLSSTLTLSKADYEKHKVYACEVTHQGLSSPVTKSF NRGECGGGGSEGKSSGSGSESKSTEGKSSGSGSESKSTGGGG SQVQLVQSGAEVKKPGASVKVSCKASGYTFTSYYMHWVR QAPGQGLEWMGIINPSGGSTSYAQKFQGRVTMTRDTSTSTV YMELSSLRSEDTAVYYCARGEAVGNYYYYGMDVWGQGT TVTVSSASTKGPSVFPLAPSSKSTSGGTAALGCLVKDYFPEP VTVSWNSGALTSGVHTFPAVLQSSGLYSLSSVVTVPSSSLGT QTYICNVNHKPSNTKVDKRVEPKSC |
| SEQ ID NO: 51 | DLL3#3 scFab | DIQMTQSPSAMSASVGDRVTITCRASQGISNYLVWFQQKPG KAPKRLIYAVSSLYSGVPSRFSGSGSGTEFTLTISSLQPEDFAT YYCLQHDSYPYTFGQGTKLEIKRTVAAPSVFIFPPSDEQLKS GTASVVCLLNNFYPREAKVQWKVDNALQSGNSQESVTEQD SKDSTYSLSSTLTLSKADYEKHKVYACEVTHQGLSSPVTKSF NRGECGGGGSEGKSSGSGSESKSTEGKSSGSGSESKSTGGGG SQVQLVQSGAEVKKPGASVKVSCKASGYTFTSYYHWVRQ APGQGLEWMVIINPGGGTTSYAQKFLGRVTMTRDTSTNTVY MELKSLRSEDTAVYYCARGEAVTGNYFYYGMDVWGQGTT VTVSSASTKGPSVFPLAPSSKSTSGGTAALGCLVKDYFPEPV TVSWNSGALTSGVHTFPAVLQSSGLYSLSSVVTVPSSSLGTQ TYICNVNHKPSNTKVDKRVEPKSC |
| SEQ ID NO: 52 | DLL3#4 scFab | DIVLTQSPASLAVSLGQRATISCRASKSVSSFGYSFMHWYQQ KPGQPPKLLIYLASNLESGVPARFSGSGSGTDFTLNIHPVEEE DAATYYCQHSRELPWTFGGGTKLEIKRTVAAPSVFIFPPSDE QLKSGTASVVCLLNNFYPREAKVQWKVDNALQSGNSQESV TEQDSKDSTYSLSSTLTLSKADYEKHKVYACEVTHQGLSSP VTKSFNRGECGGGGSEGKSSGSGSESKSTEGKSSGSGSESKS TGGGGSQVQLQQSGTELVKPGASVKLSCKASVYTFTSYFMY WVKQRPGHGLEWIGEISPTNGNSNLNERFKNKATLTVDKSS STAYMQLSSLTSEDSAVYYCTRGGDGYLDYWGQGTTLTVS SASTKGPSVFPLAPSSKSTSGGTAALGCLVKDYFPEPVTVSW NSGALTSGVHTFPAVLQSSGLYSLSSVVTVPSSSLGTQTYICN VNHKPSNTKVDKRVEPKSC |
| SEQ ID NO: 53 | DLL3#5 scFab | DIQMTQSPSSLSASVGDRVTVTCQASQDISNYLNWYQQKPG KAPKLLIYDASNLETGVPSRFSGSGSGTDFTFTISSLQPEDIAT YYCQQYDNLPTWTFGQGTKVEIKRTVAAPSVFIFPPSDEQLK SGTASVVCLLNNFYPREAKVQWKVDNALQSGNSQESVTEQ DSKDSTYSLSSTLTLSKADYEKHKVYACEVTHQGLSSPVTK SFNRGECGGGGSEGKSSGSGSESKSTEGKSSGSGSESKSTGG GGSQVQLVQSGAEVKKPGASVKVSCKASGFTFTGYYIHWV RQAPGQGLEWMGWINPNSGGTNYAQKFQGRVTMTRDSSIN TAFMELSRLTSDDTAVYYCAAGWDYWGQGTLVTVSSASTK GPSVFPLAPSSKSTSGGTAALGCLVKDYFPEPVTVSWNSGAL TSGVHTFPAVLQSSGLYSLSSVVTVPSSSLGTQTYICNVNHK PSNTKVDKRVEPKSC |
| SEQ ID NO: 54 | DLL3#6 scFab | DIQLTQSPSFLSTSVGDRVTITCRASQDISNYFAWYQQKPGK APKLLIYAASTLQSGVPSRFSGGGSGTEFTLTISSLQPEDFAT YYCQQLNSYPYTFGQGTKLEIKRTVAAPSVFIFPPSDEQLKS |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
|---|---|---|
| | | GTASVVCLLNNFYPREAKVQWKVDNALQSGNSQESVTEQD SKDSTYSLSSTLTLSKADYEKHKVYACEVTHQGLSSPVTKSF NRGECGGGGSEGKSSGSGSESKSTEGKSSGSGSESKSTGGGG SQVQLQESGPGLVKPSETLSLTCTVSGGSISSYFWSWIRQPA GKGLEWIGRIYTSGSTNYNPSLNSRLTMSVDTSKNQFSLKLS SVTAADTAVYYCARRGDWGGFDIVVGQGTVVTVSSASTKGP SVFPLAPSSKSTSGGTAALGCLVKDYFPEPVTVSWNSGALTS GVHTFPAVLQSSGLYSLSSVVTVPSSSLGTQTYICNVNHKPS NTKVDKRVEPKSC |
| SEQ ID NO: 55 | CD3#1 LCCDR1 | RSSTGAVTTSNYAN |
| SEQ ID NO: 56 | CD3#1 LCCDR2 | GTNKRAP |
| SEQ ID NO: 57 | CD3#1 LCCDR3 | ALWYSNLWV |
| SEQ ID NO: 58 | CD3#1 HCCDR1 | GFTFNTYAMN |
| SEQ ID NO: 59 | CD3#1 HCCDR2 | RIRSKYNNYATYYADSVKD |
| SEQ ID NO: 60 | CD3#1 HCCDR3 | HGNFGNSYVSWFAY |
| SEQ ID NO: 61 | CD3#2 LCCDR1 | RSSTGAVTTSNYAN |
| SEQ ID NO: 62 | CD3#2 LCCDR2 | GTNKRAP |
| SEQ ID NO: 63 | CD3#2 LCCDR3 | ALWYSNLWV |
| SEQ ID NO: 64 | CD3#2 HCCDR1 | GFTFNTYAMN |
| SEQ ID NO: 65 | CD3#2 HCCDR2 | RIRSKYINYATYYADSVKD |
| SEQ ID NO: 66 | CD3#2 HCCDR3 | HGNFGNSYVSWFAY |
| SEQ ID NO: 67 | CD3#1 VL | EAVVTQEPSLTVSPGGTVTLTCRSSTGAVTTSNYANWVQEK PGQLPRGLIGGTNKRAPWVPARFSGSLLGGKAALTLSGAQP EDEAEYFCALWYSNLWVFGGGTKLTVL |
| SEQ ID NO: 68 | CD3#1 VH | EVQLVESGGGLVQPGGSLKLSCAASGFTFNTYAMNWVRQA PGKGLEWVARIRSKYNNYATYYADSVKDRFTISRDDSKNTA YLQMNNLKTEDTAVYYCVRHGNFGNSYVSWFAYWGQGTL VTVSA |
| SEQ ID NO: 69 | CD3#2 VL | EAVVTQEPSLTVSPGGTVTLTCRSSTGAVTTSNYANWVQEK PGQLPRGLIGGTNKRAPWVPARFSGSLLGGKAALTLSGAQP EDEAEYFCALWYSNLWVFGGGTKLTVL |
| SEQ ID NO: 70 | CD3#2 VH | EVQLVESGGGLVQPGGSLKLSCAASGFTFNTYAMNWVRQA PGKGLEWVARIRSKYINYATYYADSVKDRFTISRDDSKNTA YLQMNNLKTEDTAVYYCVRHGNFGNSYVSWFAYWGQGTL VTVSA |
| SEQ ID NO: 71 | CD3#1 scFab | EAVVTQEPSLTVSPGGTVTLTCRSSTGAVTTSNYANWVQEK PGQLPRGLIGGTNKRAPWVPARFSGSLLGGKAALTLSGAQP EDEAEYFCALWYSNLWVFGGGTKLTVLGQPKAAPSVTLFPP SSEELQANKATLVCLISDFYPGAVKVAWKADGSPVNTGVET TTPSKQSNNKYAASSYLSLTPEQWKSHRSYSCQVTHEGSTV EKTVAPAECSGGGGSEGKSSGSGSESKSTEGKSSGSGSESKS TGGGGSEVQLVESGGGLVQPGGSLKLSCAASGFTFNTYAM NWVRQAPGKGLEWVARIRSKYNNYATYYADSVKDRFTISR DDSKNTAYLQMNNLKTEDTAVYYCVRHGNFGNSYVSWFA |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
|---|---|---|
| | | YWGQGTLVTVSAASTKGPSVFPLAPSSKSTSGGTAALGCLV KDYFPEPVTVSWNSGALTSGVHTFPAVLQSSGLYSLSSVVT VPSSSLGTQTYICNVNHKPSNTKVDKRVEPKSC |
| SEQ ID NO: 72 | CD3#2 scFab | EAVVTQEPSLTVSPGGTVTLTCRSSTGAVTTSNYANWVQEK PGQLPRGLIGGTNKRAPWVPARFSGSLLGGKAALTLSGAQP EDEAEYFCALWYSNLWVFGGGTKLTVLGQPKAAPSVTLFPP SSEELQANKATLVCLISDFYPGAVKVAWKADGSPVNTGVET TTPSKQSNNKYAASSYLSLTPEQWKSHRSYSCQVTHEGSTV EKTVAPAECSGGGGSEGKSSGSGSESKSTEGKSSGSGSESKS TGGGGSEVQLVESGGGLVQPGGSLKLSCAASGFTFNTYAM NWVRQAPGKGLEWVARIRSKYINYATYYADSVKDRFTISRD DSKNTAYLQMNNLKTEDTAVYYCVRHGNFGNSYVSWFAY WGQGTLVTVSAASTKGPSVFPLAPSSKSTSGGTAALGCLVK DYFPEPVTVSWNSGALTSGVHTFPAVLQSSGLYSLSSVVTVP SSSLGTQTYICNVNHKPSNTKVDKRVEPKSC |
| SEQ ID NO: 73 | DLL3#1 chain | EIVLTQSPGTLSLSPGERATLSCRASQSVSSNFLVWYQQKPG QAPRPLIYGASTRASGIPDRFSGSGSGADFTLTISRLEPEDFAL YYCQQYGDSPYTFGQGTTLEIKRTVAAPSVFIFPPSDEQLKS GTASVVCLLNNFYPREAKVQWKVDNALQSGNSQESVTEQD SKDSTYSLSSTLTLSKADYEKHKVYACEVTHQGLSSPVTKSF NRGECGGGGSEGKSSGSGSESKSTEGKSSGSGSESKSTGGGG SQVQLVQSGAEVKKPGASVKVSCKASGNTFTNYYMHWVR QAPGPGLEWMGIIDPSVGSKSYAQKFLGRVTIARDTSTSTVF LDLYSLRSEDTAVYFCARAGKRFGESYFDYWGQGTLVTVSS ASTKGPSVFPLAPSSKSTSGGTAALGCLVKDYFPEPVTVSWN SGALTSGVHTFPAVLQSSGLYSLSSVVTVPSSSLGTQTYICNV NHKPSNTKVDKRVEPKSCDKTHTCPPCPAPEAAGGPSVFLFP PKPKDTLMISRTPEVTCVVVDVSHEDPEVKFNWYVDGVEV HNAKTKPREEQYNSTYRVVSVLTVLHQDWLNGKEYKCKVS NKALPAPIEKTISKAKGQPREPQVYTLPPSREEMTKNQVSLW CLVKGFYPSDIAVEWESNGQPENNYKTTPPVLDSDGSFFLYS KLTVDKSRWQQGNVFSCSVMHEALHNHYTQKSLSLSPG |
| SEQ ID NO: 74 | DLL3#2 chain | DIQMTQSPSAMSASVGDRVTITCRASQGISNYLAWFQQKPG KVPEPLIYAASSLQSGVPSRFSGSGSVTEFTLTISSLQPEDFAT YYCLQHNSSPYTFGQGTKLEIKRTVAAPSVFIFPPSDEQLKSG TASVVCLLNNFYPREAKVQWKVDNALQSGNSQESVTEQDS KDSTYSLSSTLTLSKADYEKHKVYACEVTHQGLSSPVTKSF NRGECGGGGSEGKSSGSGSESKSTEGKSSGSGSESKSTGGGG SQVQLVQSGAEVKKPGASVKVSCKASGYTFTSYYMHWVR QAPGQGLEWMGIINPSGGSTSYAQKFQGRVTMTRDTSTSTV YMELSSLRSEDTAVYYCARGEAVGGNYYYYGMDVWGQGT TVTVSSASTKGPSVFPLAPSSKSTSGGTAALGCLVKDYFPEP VTVSWNSGALTSGVHTFPAVLQSSGLYSLSSVVTVPSSSLGT QTYICNVNHKPSNTKVDKRVEPKSCDKTHTCPPCPAPEAAG GPSVFLFPPKPKDTLMISRTPEVTCVVVDVSHEDPEVKFNWY VDGVEVHNAKTKPREEQYNSTYRVVSVLTVLHQDWLNGK EYKCKVSNKALPAPIEKTISKAKGQPREPQVYTLPPSREEMT KNQVSLWCLVKGFYPSDIAVEWESNGQPENNYKTTPPVLDS DGSFFLYSKLTVDKSRWQQGNVFSCSVMHEALHNHYTQKS LSLSPG |
| SEQ ID NO: 75 | DLL3#3 chain | DIQMTQSPSAMSASVGDRVTITCRASQGISNYLVWFQQKPG KAPKRLIYAVSSLYSGVPSRFSGSGSGTEFTLTISSLQPEDFAT YYCLQHDSYPYTFGQGTKLEIKRTVAAPSVFIFPPSDEQLKS GTASVVCLLNNFYPREAKVQWKVDNALQSGNSQESVTEQD SKDSTYSLSSTLTLSKADYEKHKVYACEVTHQGLSSPVTKSF NRGECGGGGSEGKSSGSGSESKSTEGKSSGSGSESKSTGGGG SQVQLVQSGAEVKKPGASVKVSCKASGYTFTSYYVHWVRQ APGQGLEWMVIINPGGGTTSYAQKFLGRVTMTRDTSTNTVY MELKSLRSEDTAVYYCARGEAVTGNYFYYGMDVWGQGTT VTVSSASTKGPSVFPLAPSSKSTSGGTAALGCLVKDYFPEPV TVSWNSGALTSGVHTFPAVLQSSGLYSLSSVVTVPSSSLGTQ TYICNVNHKPSNTKVDKRVEPKSCDKTHTCPPCPAPEAAGG PSVFLFPPKPKDTLMISRTPEVTCVVVDVSHEDPEVKFNWY DGVEVHNAKTKPREEQYNSTYRVVSVLTVLHQDWLNGKE YKCKVSNKALPAPIEKTISKAKGQPREPQVYTLPPSREEMTK NQVSLWCLVKGFYPSDIAVEWESNGQPENNYKTTPPVLDSD GSFFLYSKLTVDKSRWQQGNVFSCSVMHEALHNHYTQKSL SLSPG |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
|---|---|---|
| SEQ ID NO: 76 | DLL3#4 chain | DIVLTQSPASLAVSLGQRATISCRASKSVSSFGYSFMHWYQQ KPGQPPKLLIYLASNLESGVPARFSGSGSGTDFTLNIHPVEEE DAATYYCQHSRELPWTFGGGTKLEIKRTVAAPSVFIFPPSDE QLKSGTASVVCLLNNFYPREAKVQWKVDNALQSGNSQESV TEQDSKDSTYSLSSTLTLSKADYEKHKVYACEVTHQGLSSP VTKSFNRGECGGGGSEGKSSGSGSESKSTEGKSSGSGSESKS TGGGGSQVQLQQSGTELVKPGASVKLSCKASVYTFTSYFMY WVKQRPGHGLEWIGEISPTNGNSNLNERFKNKATLTVDKSS STAYMQLSSLTSEDSAVYYCTRGGDGYLDYWGQGTTLTVS SASTKGPSVFPLAPSSKSTSGGTAALGCLVKDYFPEPVTVSW NSGALTSGVHTFPAVLQSSGLYSLSSVVTVPSSSLGTQTYICN VNHKPSNTKVDKRVEPKSCDKTHTCPPCPAPEAAGGPSVFL FPPKPKDTLMISRTPEVTCVVVDVSHEDPEVKFNWYVDGVE VHNAKTKPREEQYNSTYRVVSVLTVLHQDWLNGKEYKCK VSNKALPAPIEKTISKAKGQPREPQVYTLPPSREEMTKNQVS LWCLVKGFYPSDIAVEWESNGQPENNYKTTPPVLDSDGSFF LYSKLTVDKSRWQQGNVFSCSVMHEALHNHYTQKSLSLSP G |
| SEQ ID NO: 77 | DLL3#5 chain | DIQMTQSPSSLSASVGDRVTVTCQASQDISNYLNWYQQKPG KAPKLLIYDASNLETGVPSRFSGSGSGTDFTFTISSLQPEDIAT YYCQQYDNLPTWTFGQGTKVEIKRTVAAPSVFIFPPSDEQLK SGTASVVCLLNNFYPREAKVQWKVDNALQSGNSQESVTEQ DSKDSTYSLSSTLTLSKADYEKHKVYACEVTHQGLSSPVTK SFNRGECGGGGSEGKSSGSGSESKSTEGKSSGSGSESKSTGG GGSQVQLVQSGAEVKKPGASVKVSCKASGFTFTGYYIHWV RQAPGQGLEWMGWINPNSGGTNYAQKFQGRVTMTRDSSIN TAFMELSRLTSDDTAVYYCAAGWDYWGQGTLVTVSSASTK GPSVFPLAPSSKSTSGGTAALGCLVKDYFPEPVTVSWNSGAL TSGVHTFPAVLQSSGLYSLSSVVTVPSSSLGTQTYICNVNHK PSNTKVDKRVEPKSCDKTHTCPPCPAPEAAGGPSVFLFPPKP KDTLMISRTPEVTCVVVDVSHEDPEVKFNWYVDGVEVHNA KTKPREEQYNSTYRVVSVLTVLHQDWLNGKEYKCKVSNKA LPAPIEKTISKAKGQPREPQVYTLPPSREEMTKNQVSLWCLV KGFYPSDIAVEWESNGQPENNYKTTPPVLDSDGSFFLYSKLT VDKSRWQQGNVFSCSVMHEALHNHYTQKSLSLSPG |
| SEQ ID NO: 78 | DLL3#6 chain | DIQLTQSPSFLSTSVGDRVTITCRASQDISNYFAWYQQKPGK APKLLIYAASTLQSGVPSRFSGGGSGTEFTLTISSLQPEDFAT YYCQQLNSYPYTFGQGTKLEIKRTVAAPSVFIFPPSDEQLKS GTASVVCLLNNFYPREAKVQWKVDNALQSGNSQESVTEQD SKDSTYSLSSTLTLSKADYEKHKVYACEVTHQGLSSPVTKSF NRGECGGGGSEGKSSGSGSESKSTEGKSSGSGSESKSTGGGG SQVQLQESGPGLVKPSETLSLTCTVSGGSISSYFWSWIRQPA GKGLEWIGRIYTSGSTNYNPSLNSRLTMSVDTSKNQFSLKLS SVTAADTAVYYCARRGDWGGFDIWGQGTVVTVSSASTKGP SVFPLAPSSKSTSGGTAALGCLVKDYFPEPVTVSWNSGALTS GVHTFPAVLQSSGLYSLSSVVTVPSSSLGTQTYICNVNHKPS NTKVDKRVEPKSCDKTHTCPPCPAPEAAGGPSVFLFPPKPKD TLMISRTPEVTCVVVDVSHEDPEVKFNWYVDGVEVHNAKT KPREEQYNSTYRVVSVLTVLHQDWLNGKEYKCKVSNKALP APIEKTISKAKGQPREPQVYTLPPSREEMTKNQVSLWCLVKG FYPSDIAVEWESNGQPENNYKTTPPVLDSDGSFFLYSKLTVD KSRWQQGNVFSCSVMHEALHNHYTQKSLSLSPG |
| SEQ ID NO: 79 | CD3#1 chain | EAVVTQEPSLTVSPGGTVTLTCRSSTGAVTTSNYANWVQEK PGQLPRGLIGGTNKRAPWVPARFSGSLLGGKAALTLSGAQP EDEAEYFCALWYSNLWVFGGGTKLTVLGQPKAAPSVTLFPP SSEELQANKATLVCLISDFYPGAVKVAWKADGSPVNTGVET TTPSKQSNNKYAASSYLSLTPEQWKSHRSYSCQVTHEGSTV EKTVAPAECSGGGGSEGKSSGSGSESKSTEGKSSGSGSESKS TGGGGSEVQLVESGGGLVQPGGSLKLSCAASGFTFNTYAM NWVRQAPGKGLEWVARIRSKYNNYATYYADSVKDRFTISR DDSKNTAYLQMNNLKTEDTAVYYCVRHGNFGNSYVSWFA YWGQGTLVTVSAASTKGPSVFPLAPSSKSTSGGTAALGCLV KDYFPEPVTVSWNSGALTSGVHTFPAVLQSSGLYSLSSVVT VPSSSLGTQTYICNVNHKPSNTKVDKRVEPKSCDKTHTCPPC PAPEAAGGPSVFLFPPKPKDTLMISRTPEVTCVVVDVSHEDP EVKFNWYVDGVEVHNAKTKPREEQYNSTYRVVSVLTVLHQ DWLNGKEYKCKVSNKALPAPIEKTISKAKGQPREPQVYTLP PSREEMTKNQVSLSCAVKGFYPSDIAVEWESNGQPENNYKT TPPVLDSDGSFFLVSKLTVDKSRWQQGNVFSCSVMHEALHN RFTQKSLSLSPG |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
|---|---|---|
| SEQ ID NO: 80 | CD3#2 chain | EAVVTQEPSLTVSPGGTVTLTCRSSTGAVTTSNYANWVQEK PGQLPRGLIGGTNKRAPWVPARFSGSLLGGKAALTLSGAQP EDEAEYFCALWYSNLWVFGGGTKLTVLGQPKAAPSVTLFPP SSEELQANKATLVCLISDFYPGAVKVAWKADGSPVNTGVET TTPSKQSNNKYAASSYLSLTPEQWKSHRSYSCQVTHEGSTV EKTVAPAECSGGGGSEGKSSGSGSESKSTEGKSSGSGSESKS TGGGGSEVQLVESGGGLVQPGGSLKLSCAASGFTFNTYAM NWVRQAPGKGLEWVARIRSKYINYATYYADSVKDRFTISRD DSKNTAYLQMNNLKTEDTAVYYCVRHGNFGNSYVSWFAY WGQGTLVTVSAASTKGPSVFPLAPSSKSTSGGTAALGCLVK DYFPEPVTVSWNSGALTSGVHTFPAVLQSSGLYSLSSVVTVP SSSLGTQTYICNVNHKPSNTKVDKRVEPKSCDKTHTCPPCPA PEAAGGPSVFLFPPKPKDTLMISRTPEVTCVVVDVSHEDPEV KFNWYVDGVEVHNAKTKPREEQYNSTYRVVSVLTVLHQD WLNGKEYKCKVSNKALPAPIEKTISKAKGQPREPQVYTLPPS REEMTKNQVSLSCAVKGFYPSDIAVEWESNGQPENNYKTTP PVLDSDGSFFLVSKLTVDKSRWQQGNVFSCSVMHEALHNRF TQKSLSLSPG |
| SEQ ID NO: 81 | Fc domain* (IgG1) | DKTHTCPPCPAPELLGGPSVFLFPPKPKDTLMISRTPEVTCVV VDVSHEDPEVKFNWYVDGVEVHNAKTKPREEQYNSTYRVV VSVLTVLHQDWLNGKEYKCKVSNKALPAPIEKTISKAKGQP REPQVYTLPPSREEMTKNQVSLTCLVKGFYPSDIAVEWESN GQPENNYKTTPPVLDSDGSFFLYSKLTVDKSRWQQGNVFSC SVMHEALHNHYTQKSLSLSPG |
| SEQ ID NO: 82 | Fc W domain (IgG1, LALA) | DKTHTCPPCPAPEAAGGPSVFLFPPKPKDTLMISRTPEVTCV VVDVSHEDPEVKFNWYVDGVEVHNAKTKPREEQYNSTYR VVSVLTVLHQDWLNGKEYKCKVSNKALPAPIEKTISKAKGQ PREPQVYTLPPSREEMTKNQVSLWCLVKGFYPSDIAVEWES NGQPENNYKTTPPVLDSDGSFFLYSKLTVDKSRWQQGNVFS CSVMHEALHNHYTQKSLSLSPG |
| SEQ ID NO: 83 | Fc SAV domain (IgG1, RF/LALA) | DKTHTCPPCPAPEAAGGPSVFLFPPKPKDTLMISRTPEVTCV VVDVSHEDPEVKFNWYVDGVEVHNAKTKPREEQYNSTYR VVSVLTVLHQDWLNGKEYKCKVSNKALPAPIEKTISKAKGQ PREPQVYTLPPSREEMTKNQVSLSCAVKGFYPSDIAVEWESN GQPENNYKTTPPVLDSDGSFFLVSKLTVDKSRWQQGNVFSC SVMHEALHNRFTQKSLSLSPG |
| SEQ ID NO: 84 | Fc domain (IgG4Pro) | ESKYGPPCPPCPAPEFLGGPSVFLFPPKPKDTLMISRTPEVTC VVVDVSQEDPEVQFNWYVDGVEVHNAKTKPREEQFNSTYR VVSVLTVLHQDWLNGKEYKCKVSNKGLPSSIEKTISKAKGQ PREPQVYTLPPSQEEMTKNQVSLTCLVKGFYPSDIAVEWESN GQPENNYKTTPPVLDSDGSFFLYSRLTVDKSRWQEGNVFSC SVMHEALHNHYTQKSLSLSLG |
| SEQ ID NO: 85 | Fc W domain (IgG4Pro) | ESKYGPPCPPCPAPEFLGGPSVFLFPPKPKDTLMISRTPEVTC VVVDVSQEDPEVQFNWYVDGVEVHNAKTKPREEQFNSTYR VVSVLTVLHQDWLNGKEYKCKVSNKGLPSSIEKTISKAKGQ PREPQVYTLPPSQEEMTKNQVSLWCLVKGFYPSDIAVEWES NGQPENNYKTTPPVLDSDGSFFLYSRLTVDKSRWQEGNVFS CSVMHEALHNHYTQKSLSLSLG |
| SEQ ID NO: 86 | Fc SAV domain (IgG4Pro, RF) | ESKYGPPCPPCPAPEFLGGPSVFLFPPKPKDTLMISRTPEVTC VVVDVSQEDPEVQFNWYVDGVEVHNAKTKPREEQFNSTYR VVSVLTVLHQDWLNGKEYKCKVSNKGLPSSIEKTISKAKGQ PREPQVYTLPPSQEEMTKNQVSLSCAVKGFYPSDIAVEWES NGQPENNYKTTPPVLDSDGSFFLVSRLTVDKSRWQEGNVFS CSVMHEALHNRFTQKSLSLSLG |
| SEQ ID NO: 87 | constant region of a kappa light chain | RTVAAPSVFIFPPSDEQLKSGTASVVCLLNNFYPREAKVQW KVDNALQSGNSQESVTEQDSKDSTYSLSSTLTLSKADYEKH KVYACEVTHQGLSSPVTKSFNRGEC |
| SEQ ID NO: 88 | constant region of a lambda light chain | GQPKAAPSVTLFPPSSEELQANKATLVCLISDFYPGAVKVA WKADGSPVNTGVETTTPSKQSNNKYAASSYLSLTPEQWKS HRSYSCQVTHEGSTVEKTVAPAECS |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
|---|---|---|
| SEQ ID NO: 89 | Linker | GGGGSEGKSSGSGSESKSTEGKSSGSGSESKSTGGGGS |
| SEQ ID NO: 90 | Linker | GGGGSGGGGSGGSGGSGGGGGS |
| SEQ ID NO: 91 | Linker | GGGGSGGGGSGGGGSGGGGSGGGGS |
| SEQ ID NO: 92 | Linker | GGGGSGGGGGSGGGGGGSGGGGSGGGGS |
| SEQ ID NO: 93 | Linker | GGGGSGGGGSGGGSGGGSGGGGSGGGGSGGGGS |
| SEQ ID NO: 94 | Linker | GGGGSGGGGSGGGSGGGSGGGSGGGGSGGGGSGGGGS |
| SEQ ID NO: 95 | Linker | GGGGSGGGGSGGGSGGGSGGGSGGGGSGGGGSGGGSGGGGS |
| SEQ ID NO: 96 | CD3#3 LCCDR1 | RSSTGAVTTSNYAN |
| SEQ ID NO: 97 | CD3#3 LCCDR2 | GTNKRAP |
| SEQ ID NO: 98 | CD3#3 LCCDR3 | ALWYSNLWV |
| SEQ ID NO: 99 | CD3#3 HCCDR1 | GFTFNTYAMN |
| SEQ ID NO: 100 | CD3#3 HCCDR2 | RIRSKYANYATYYADSVKD |
| SEQ ID NO: 101 | CD3#3 HCCDR3 | HGNFGNSYVSWFAY |
| SEQ ID NO: 102 | CD3#3 VL | EAVVTQEPSLTVSPGGTVTLTCRSSTGAVTTSNYANWVQEKPGQLPRGLIGGTNKRAPWVPARFSGSLLGGKAALTLSGAQPEDEAEYFCALWYSNLWVFGGGTKLTVL |
| SEQ ID NO: 103 | CD3#3 HL | EVQLVESGGGLVQPGGSLKLSCAASGFTFNTYAMNWVRQAPGKGLEWVARIRSKYANYATYYADSVKDRFTISRDDSKNTAYLQMNNLKTEDTAVYYCVRHGNFGNSYVSWFAYWGQGTLVTVSA |
| SEQ ID NO: 104 | CD3#3 scFab | EAVVTQEPSLTVSPGGTVTLTCRSSTGAVTTSNYANWVQEKPGQLPRGLIGGTNKRAPWVPARFSGSLLGGKAALTLSGAQPEDEAEYFCALWYSNLWVFGGGTKLTVLGQPKAAPSVTLFPPSSEELQANKATLVCLISDFYPGAVKVAWKADGSPVNTGVETTTPSKQSNNKYAASSYLSLTPEQWKSHRSYSCQVTHEGSTVEKTVAPAECSGGGGSEGKSSGSGSESKSTEGKSSGSGSESKSTGGGGSEVQLVESGGGLVQPGGSLKLSCAASGFTFNTYAMNWVRQAPGKGLEWVARIRSKYANYATYYADSVKDRFTISRDDSKNTAYLQMNNLKTEDTAVYYCVRHGNFGNSYVSWFAYWGQGTLVTVSAASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKRVEPKSC |
| SEQ ID NO: 105 | CD3#3 chain | EAVVTQEPSLTVSPGGTVTLTCRSSTGAVTTSNYANWVQEKPGQLPRGLIGGTNKRAPWVPARFSGSLLGGKAALTLSGAQPEDEAEYFCALWYSNLWVFGGGTKLTVLGQPKAAPSVTLFPPSSEELQANKATLVCLISDFYPGAVKVAWKADGSPVNTGVETTTPSKQSNNKYAASSYLSLTPEQWKSHRSYSCQVTHEGSTVEKTVAPAECSGGGGSEGKSSGSGSESKSTEGKSSGSGSESKSTGGGGSEVQLVESGGGLVQPGGSLKLSCAASGFTFNTYAMNWVRQAPGKGLEWVARIRSKYANYATYYADSVKDRFTISRDDSKNTAYLQMNNLKTEDTAVYYCVRHGNFGNSYVSWFAYWGQGTLVTVSAASTKGPSVFPLAPSSKSTSGGTAALGCLVKDYFPEPVTVSWNSGALTSGVHTFPAVLQSSGLYSLSSVVT |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
|---|---|---|
| | | VPSSSLGTQTYICNVNHKPSNTKVDKRVEPKSCDKTHTCPPC PAPEAAGGPSVFLFPPKPKDTLMISRTPEVTCVVVDVSHEDP EVKFNWYVDGVEVHNAKTKPREEQYNSTYRVVSVLTVLHQ DWLNGKEYKCKVSNKALPAPIEKTISKAKGQPREPQVYTLP PSREEMTKNQVSLSCAVKGFYPSDIAVEWESNGQPENNYKT TPPVLDSDGSFFLVSKLTVDKSRWQQGNVFSCSVMHEALHN RFTQKSLSLSPG |
| SEQ ID NO: 133 | DLL3#7 LCCDR1 | RASQSVNSNFLA |
| SEQ ID NO: 134 | DLL3#7 LCCDR2 | GTSSRAT |
| SEQ ID NO: 135 | DLL3#7 LCCDR3 | QQYGSSPWT |
| SEQ ID NO: 136 | DLL3#7 HCCDR1 | GFTFSSYGMF |
| SEQ ID NO: 137 | DLL3#7 HCCDR2 | VIWLDGDDEDYVDSVKG |
| SEQ ID NO: 138 | DLL3#7 HCCDR3 | VLDY |
| SEQ ID NO: 139 | DLL3#8 LCCDR1 | KSSQSVLDTSNNKNYLV |
| SEQ ID NO: 140 | DLL3#8 LCCDR2 | WASTRES |
| SEQ ID NO: 141 | DLL3#8 LCCDR3 | QHYYNSPYT |
| SEQ ID NO: 142 | DLL3#8 HCCDR1 | GYTFTDYYMH |
| SEQ ID NO: 143 | DLL3#8 HCCDR2 | WINPNSGGTNYEQKFQG |
| SEQ ID NO: 144 | DLL3#8 HCCDR3 | DAVVIPMDY |
| SEQ ID NO: 145 | DLL3#9 LCCDR1 | RASQSISRSYLA |
| SEQ ID NO: 146 | DLL3#9 LCCDR2 | GASSRAT |
| SEQ ID NO: 147 | DLL3#9 LCCDR3 | QQYGTSPIT |
| SEQ ID NO: 148 | DLL3#9 HCCDR1 | GGSISSYYWS |
| SEQ ID NO: 149 | DLL3#9 HCCDR2 | YRYYSGNTNYNPSLKS |
| SEQ ID NO: 150 | DLL3#9 HCCDR3 | IGVAGFYFDY |
| SEQ ID NO: 151 | DLL3#10 LCCDR1 | RASQSLNSIFLA |
| SEQ ID NO: 152 | DLL3#10 LCCDR2 | GASSRAT |
| SEQ ID NO: 153 | DLL3#10 LCCDR3 | QQYGGSMNT |
| SEQ ID NO: 154 | DLL3#10 HCCDR1 | GYTFTGYYMH |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
|---|---|---|
| SEQ ID NO: 155 | DLL3#10 HCCDR2 | WINPNSGGTIFAQRFQG |
| SEQ ID NO: 156 | DLL3#10 HCCDR3 | DFGDTVGNAFDI |
| SEQ ID NO: 157 | DLL3#11 LCCDR1 | SASSSVTYIH |
| SEQ ID NO: 158 | DLL3#11 LCCDR2 | RTSYLAS |
| SEQ ID NO: 159 | DLL3#11 LCCDR3 | QQRSSYPRT |
| SEQ ID NO: 160 | DLL3#11 HCCDR1 | GYAFSDYWIT |
| SEQ ID NO: 161 | DLL3#11 HCCDR2 | DIYPGSGSTKSSEKFKN |
| SEQ ID NO: 162 | DLL3#11 HCCDR3 | LYYYGSHYLDT |
| SEQ ID NO: 163 | DLL3#12 LCCDR1 | SASSSVTYIH |
| SEQ ID NO: 164 | DLL3#12 LCCDR2 | RTSYLAS |
| SEQ ID NO: 165 | DLL3#12 LCCDR3 | QQRSSYPRT |
| SEQ ID NO: 166 | DLL3#12 HCCDR1 | GYAFSDYWIT |
| SEQ ID NO: 167 | DLL3#12 HCCDR2 | DIYPGSGSTKSSEKFKN |
| SEQ ID NO: 168 | DLL3#12 HCCDR3 | LYYYGSYYLDT |
| SEQ ID NO: 169 | DLL3#13 LCCDR1 | RSSQSIVHSNGNTYLE |
| SEQ ID NO: 170 | DLL3#13 LCCDR2 | KVSNRFS |
| SEQ ID NO: 171 | DLL3#13 LCCDR3 | FQGSHVPYT |
| SEQ ID NO: 172 | DLL3#13 HCCDR1 | GYTFTNYGVT |
| SEQ ID NO: 173 | DLL3#13 HCCDR2 | WINTYSGAPTYADDFNG |
| SEQ ID NO: 174 | DLL3#13 HCCDR3 | LDDYDLYYFDY |
| SEQ ID NO: 175 | DLL3#14 LCCDR1 | KASQSVDYDGDSYMN |
| SEQ ID NO: 176 | DLL3#14 LCCDR2 | AASTLES |
| SEQ ID NO: 177 | DLL3#14 LCCDR3 | QQSDEDPWT |
| SEQ ID NO: 178 | DLL3#14 HCCDR1 | GYTFTDYYIH |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
|---|---|---|
| SEQ ID NO: 179 | DLL3#14 HCCDR2 | YIYPGNSYTAYNQKFKD |
| SEQ ID NO: 180 | DLL3#14 HCCDR3 | SGGSAMDY |
| SEQ ID NO: 181 | DLL3#15 LCCDR1 | KASQSVDYDGDSYLN |
| SEQ ID NO: 182 | DLL3#15 LCCDR2 | AASNLES |
| SEQ ID NO: 183 | DLL3#15 LCCDR3 | QQSSEDPRT |
| SEQ ID NO: 184 | DLL3#15 HCCDR1 | GYTFTNYGMN |
| SEQ ID NO: 185 | DLL3#15 HCCDR2 | WINTYTGEPTYADDFKG |
| SEQ ID NO: 186 | DLL3#15 HCCDR3 | FHFSSNGDAMDN |
| SEQ ID NO: 187 | DLL3#16 LCCDR1 | RASQSVSDWLA |
| SEQ ID NO: 188 | DLL3#16 LCCDR2 | RASSLES |
| SEQ ID NO: 189 | DLL3#16 LCCDR3 | QLYNSYSPT |
| SEQ ID NO: 190 | DLL3#16 HCCDR1 | GFTFSSYWMT |
| SEQ ID NO: 191 | DLL3#16 HCCDR2 | NIKEDGSEKYYVDSVKG |
| SEQ ID NO: 192 | DLL3#16 HCCDR3 | DWGYFDY |
| SEQ ID NO: 193 | DLL3#17 LCCDR1 | RASENIYYSLA |
| SEQ ID NO: 194 | DLL3#17 LCCDR2 | NTNSLED |
| SEQ ID NO: 195 | DLL3#17 LCCDR3 | KQAYDFPLT |
| SEQ ID NO: 196 | DLL3#17 HCCDR1 | GYTFISYYIH |
| SEQ ID NO: 197 | DLL3#17 HCCDR2 | WIYPGDGSTNNNEKFKG |
| SEQ ID NO: 198 | DLL3#17 HCCDR3 | GEGNAMDD |
| SEQ ID NO: 199 | DLL3#18 LCCDR1 | RASENIYYSLA |
| SEQ ID NO: 200 | DLL3#18 LCCDR2 | NANSLED |
| SEQ ID NO: 201 | DLL3#18 LCCDR3 | KQAYDVPLT |
| SEQ ID NO: 202 | DLL3#18 HCCDR1 | GYTFTAYFIH |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
|---|---|---|
| SEQ ID NO: 203 | DLL3#18 HCCDR2 | YIDPFNDDTNYNVKFKG |
| SEQ ID NO: 204 | DLL3#18 HCCDR3 | GTSATLDY |
| SEQ ID NO: 205 | DLL3#7 VL | EIVLTQSPDTLSLSPGERATLSCRASQSVNSNFLAWYQQKPG QTPRLLIFGTSSRATGIPDRFSGSGSGTDFTLTISRLEPEDFAV YYCQQYGSSPWTFGQGTKVEIR |
| SEQ ID NO: 206 | DLL3#7 VH | QVQLVESGGGVVQPGRSLRLSCAASGFTFSSYGMFWVRQA PGKGLEWVAVIWLDGDDEDYVDSVKGRFTISRDDSKNTLY LQMNSLRVDDTAIYYCARVLDYWGQGTLVTVSS |
| SEQ ID NO: 207 | DLL3#8 VL | DIVMAQSPDSLAVSLGERATINCKSSQSVLDTSNNKNYLVW YQQKPGQPPKLLIYWASTRESGVPDRFSGSGSGTDFTLTISSL QAEDVAVYYCQHYYNSPYTFGQGTKLEIK |
| SEQ ID NO: 208 | DLL3#8 VH | QVQLVQSGAEVKKPGASVKVSCKASGYTFTDYYMHWVRQ APGQGLEWMGWINPNSGGTNYEQKFQGRVTMTRDTSISTA YMELNRLRSDDTAVYYCTRDAVVIPMDYWGQGTLVTVSS |
| SEQ ID NO: 209 | DLL3#9 VL | EIVLTQSPGTLSLSPGERATLSCRASQSISRSYLAWYQQKPGQ APRLLIYGASSRATGIPDRFSGSGSGTDFTLTISRLEPEDFAVY YCQQYGTSPITFGQGTRLEIK |
| SEQ ID NO: 210 | DLL3#9 VH | QVHLQESGPGLVKPSETLSLTCTVSGGSISSYYWSWIRQTPG KGLDWIGYRYYSGNTNYNPSLKSRVTISLDMSNNQFSLKLS SVTAADTAIYYCASIGVAGFYFDYWGQGTLVTVSS |
| SEQ ID NO: 211 | DLL3#10 VL | EIVLTQSPGTLSLSPGERATLSCRASQSLNSIFLAWYQQKPGQ APWLLIYGASSRATGIPDRFSGSGSGTDFTLTISRLEPEDFAV YFCQQYGGSMNTFGQGTKLEIK |
| SEQ ID NO: 212 | DLL3#10 VH | QVQLVQSGAEVKKPGASVKVSCKASGYTFTGYYMHWVRL APGQGLEWMGWINPNSGGTIFAQRFQGRVTMTRDTSISTVY MDLNRLRSDDTAVYYCARDFGDTVGNAFDIWGQGTMVTV SS |
| SEQ ID NO: 213 | DLL3#11 VL | QIVLTQSPAIMSASPGEKVTITCSASSSVTYIHWFQQNPGTSP KLWIYRTSYLASGVPARFSGSGSGTSYSLTISRMEAEDAATY YCQQRSSYPRTFGGGTKLEIK |
| SEQ ID NO: 214 | DLL3#11 VH | QVQLQQPGAELVQPGSSVKMSCKASGYAFSDYWITWVKQR PGQGLEWIGDIYPGSGSTKSSEKFKNKATLTADTSSSKAYIQ FSSLTPEDSAVYYCVSLYYYGSHYLDTWGQGTTLTVSS |
| SEQ ID NO: 215 | DLL3#12 VL | QVVLTQSPAIMSASPGEKVTITCSASSSVTYIHWFQQNPGTSP KLWIYRTSYLASGVPARFSGSGSGTSYSLTISRMEAEDAATY YCQQRSSYPRTFGGGTKLEIK |
| SEQ ID NO: 216 | DLL3#12 VH | QVQLQQPGAEFVQPGSSVKMSCKASGYAFSDYWITWVKQR PGQGLEWIGDIYPGSGSTKSSEKFKNRATLTADTSSSTAYIQF SSLTPEDSAVYYCVSLYYYGSYYLDTWGQGTTLTVSS |
| SEQ ID NO: 217 | DLL3#13 VL | DVLMTQTPLSLPVSLGDQAAISCRSSQSIVHSNGNTYLEWYL QKPGQSPKVLIYKVSNRFSGVPDRFSGSGSGTDFTLKISRVE AEDLGVYYCFQGSHVPYTFGGGTKLEIK |
| SEQ ID NO: 218 | DLL3#13 VH | QIQLVQSGPELKKPGETVKISCKASGYTFTNYGVTWVKQAP GKGLKWMGWINTYSGAPTYADDFNGRFALSLETSASTAYL QINNLKNEDTATYFCARLDDYDLYYFDYWGQGTALTVSS |
| SEQ ID NO: 219 | DLL3#14 VL | DIVLTQSPASLSVSLGQRATISCKASQSVDYDGDSYMNWYQ QKPGQPPKLLIYAASTLESGIPARFSGSGSGTDFTLNIHPVEEE DAATYYCQQSDEDPWTFGGGTKLEIK |
| SEQ ID NO: 220 | DLL3#14 VH | QIQLQQSGPELVKPGVKISCKASGYTFTDYYIHWMKQRPGQ GLEWIGYIYPGNSYTAYNQKFKDKATLTADNPSSTAYMQLS SLTSEDSAVYFCARSGGSAMDYWGQGTSVTVSS |
| SEQ ID | DLL3#15 | DIVLTQSPASLAVSLGQRATISCKASQSVDYDGDSYLNWYQ |

TABLE 1-continued

Amino acid sequences and SEQ ID NOs of CDRs, VH, VL, scFabs, DLL3-arm and
CD3-arm sequences of the proteins/antibody constructs described herein:

| SEQ ID Number | Brief description of sequence | Sequence |
|---|---|---|
| SEQ ID NO: 221 | VL | QKPGQPPKLLIYAASNLESGIPARFSGSGSGTDFTLNIHPVEE<br>EDAATYYCQQSSEDPRTFGGGTKLEIK |
| SEQ ID NO: 222 | DLL3#15 VH | QIQLVQSGPELKKPGETVKISCKASGYTFTNYGMNWVKQAP<br>GKGLKWMGWINTYTGEPTYADDFKGRFAFSLETSASTAYL<br>QINNLKNEDMATYFCTKFHFSSNGDAMDNWGQGTSVTVSS |
| SEQ ID NO: 223 | DLL3#16 VL | DIQMTQSPSTLSASVGDRVTITCRASQSVSDWLAWYQQKPG<br>KAPKFLIYRASSLESGVPSRFSGSGSGTEFTLTISSLQPADFAT<br>YYCQLYNSYSPTFGQGTKVEIK |
| SEQ ID NO: 224 | DLL3#16 VH | EVHLVESGGGLVQPGGSLRLSCAASGFTFSSYWMTWVRQA<br>PGKGLEWVANIKEDGSEKYYVDSVKGRFTISRDNAKNSLYL<br>QMNSLRAEDTALYYCARDWGYFDYWGQGTLVTVSS |
| SEQ ID NO: 225 | DLL3#17 VL | DIQMTQSPASLAASVGETVTITCRASENIYYSLAWYQQKQG<br>KSPQLLIYNTNSLEDGVPSRFSGSGSGTQYSMKINSMQPEDT<br>ATYFCKQAYDFPLTFGAGTKLELK |
| SEQ ID NO: 226 | DLL3#17 VH | QIQLQQSGPEVVKPGASVKISCKASGYTFISYYIHWVKQRPG<br>QGLEWIGWIYPGDGSTNNNEKFKGKTTLTADKSSSTAYMLL<br>SSLTSEDSAVYFCARGEGNAMDDWGQGTSVTVSS |
| SEQ ID NO: 227 | DLL3#18 VL | DIQMTQSPASLAASVGETVTITCRASENIYYSLAWYQQKQG<br>KSPQLLIYNANSLEDGVPSRFSGSGSGTQYSMKINNMQPEDT<br>ATYFCKQAYDVPLTFGAGTKLELK |
| SEQ ID NO: 228 | DLL3#18 VH | QVQLQQSGPDLVKPGASVKMSCEASGYTFTAYFIHWVKQK<br>PGQGLEWIGYIDPFNDDTNYNVKFKGKATLTSDTSSSIAYME<br>LSSLTSEDSSFYYCARGTSATLDYWGHGTTLTVSS |
| SEQ ID NO: 229 | DLL3#7 scFab | EIVLTQSPDTLSLSPGERATLSCRASQSVNSNFLAWYQQKPG<br>QTPRLLIFGTSSRATGIPDRFSGSGSGTDFTLTISRLEPEDFAV<br>YYCQQYGSSPWTFGQGTKVEIRRTVAAPSVFIFPPSDEQLKS<br>GTASVVCLLNNFYPREAKVQWKVDNALQSGNSQESVTEQD<br>SKDSTYSLSSTLTLSKADYEKHKVYACEVTHQGLSSPVTKSF<br>NRGECGGGGSEGKSSGSGSESKSTEGKSSGSGSESKSTGGGG<br>SQVQLVESGGGVVQPGRSLRLSCAASGFTFSSYGMFWVRQ<br>APGKGLEWVAVIWLDGDDEDYVDSVKGRFTISRDDSKNTL<br>YLQMNSLRVDDTAIYYCARVLDYWGQGTLVTVSSASTKGP<br>SVFPLAPSSKSTSGGTAALGCLVKDYFPEPVTVSWNSGALTS<br>GVHTFPAVLQSSGLYSLSSVVTVPSSSLGTQTYICNVNHKPS<br>NTKVDKRVEPKSC |
| SEQ ID NO: 230 | DLL3#8 scFab | DIVMAQSPDSLAVSLGERATINCKSSQSVLDTSNNKNYLVW<br>YQQKPGQPPKLLIYWASTRESGVPDRFSGSGSGTDFTLTISSL<br>QAEDVAVYYCQHYYNSPYTFGQGTKLEIKRTVAAPSVFIFPP<br>SDEQLKSGTASVVCLLNNFYPREAKVQWKVDNALQSGNSQ<br>ESVTEQDSKDSTYSLSSTLTLSKADYEKHKVYACEVTHQGL<br>SSPVTKSFNRGECGGGGSEGKSSGSGSESKSTEGKSSGSGSES<br>KSTGGGGSQVQLVQSGAEVKKPGASVKVSCKASGYTFTDY<br>YMHWVRQAPGQGLEWMGWINPNSGGTNYEQKFQGRVTM<br>TRDTSISTAYMELNRLRSDDTAVYYCTRDAWIPMDYWGQ<br>GTLVTVSSASTKGPSVFPLAPSSKSTSGGTAALGCLVKDYFP<br>EPVTVSWNSGALTSGVHTFPAVLQSSGLYSLSSVVTVPSSSL<br>GTQTYICNVNHKPSNTKVDKRVEPKSC |
| SEQ ID NO: 231 | DLL3#9 scFab | EIVLTQSPGTLSLSPGERATLSCRASQSISRSYLAWYQQKPGQ<br>APRLLIYGASSRATGIPDRFSGSGSGTDFTLTISRLEPEDFAVY<br>YCQQYGTSPITFGQGTRLEIKRTVAAPSVFIFPPSDEQLKSGT<br>ASVVCLLNNFYPREAKVQWKVDNALQSGNSQESVTEQDSK<br>DSTYSLSSTLTLSKADYEKHKVYACEVTHQGLSSPVTKSFNR<br>GECGGGGSEGKSSGSGSESKSTEGKSSGSGSESKSTGGGGSQ<br>VHLQESGPGLVKPSETLSLTCTVSGGSISSYYWSWIRQTPGK<br>GLDWIGYRYYSGNTNYNPSLKSRVTISLDMSNNQFSLKLSS<br>VTAADTAIYYCASIGVAGFYFDYWGQGTLVTVSSASTKGPS<br>VFPLAPSSKSTSGGTAALGCLVKDYFPEPVTVSWNSGALTSG<br>VHTFPAVLQSSGLYSLSSVVTVPSSSLGTQTYICNVNHKPSN<br>TKVDKRVEPKSC |
| SEQ ID NO: 232 | DLL3#10 scFab | EIVLTQSPGTLSLSPGERATLSCRASQSLNSIFLAWYQQKPGQ<br>APWLLIYGASSRATGIPDRFSGSGSGTDFTLTISRLEPEDFAV<br>YFCQQYGGSMNTFGQGTKLEIKRTVAAPSVFIFPPSDEQLKS |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
|---|---|---|
| | | GTASVVCLLNNFYPREAKVQWKVDNALQSGNSQESVTEQD SKDSTYSLSSTLTLSKADYEKHKVYACEVTHQGLSSPVTKSF NRGECGGGGSEGKSSGSGSESKSTEGKSSGSGSESKSTGGGG SQVQLVQSGAEVKKPGASVKVSCKASGYTFTGYYMHWVR LAPGQGLEWMGWINPNSGGTIFAQRFQGRVTMTRDTSISTV YMDLNRLRSDDTAVYYCARDFGDTVGNAFDIWGQGTMVT VSSASTKGPSVFPLAPSSKSTSGGTAALGCLVKDYFPEPVTV SWNSGALTSGVHTFPAVLQSSGLYSLSSVVTVPSSSLGTQTY ICNVNHKPSNTKVDKRVEPKSC |
| SEQ ID NO: 233 | DLL3#11 scFab | QIVLTQSPAIMSASPGEKVTITCSASSSVTYIHWFQQNPGTSP KLWIYRTSYLASGVPARFSGSGSGTSYSLTISRMEAEDAATY YCQQRSSYPRTFGGGTKLEIKRTVAAPSVFIFPPSDEQLKSGT ASVVCLLNNFYPREAKVQWKVDNALQSGNSQESVTEQDSK DSTYSLSSTLTLSKADYEKHKVYACEVTHQGLSSPVTKSFNR GECGGGGSEGKSSGSGSESKSTEGKSSGSGSESKSTGGGGSQ VQLQQPGAELVQPGSSVKMSCKASGYAFSDYWITWVKQRP GQGLEWIGDIYPGSGSTKSSEKFKNKATLTADTSSSKAYIQF SSLTPEDSAVYYCVSLYYYGSHYLDTWGQGTTLTVSSASTK GPSVFPLAPSSKSTSGGTAALGCLVKDYFPEPVTVSWNSGAL TSGVHTFPAVLQSSGLYSLSSVVTVPSSSLGTQTYICNVNHK PSNTKVDKRVEPKSC |
| SEQ ID NO: 234 | DLL3#12 scFab | QVVLTQSPAIMSASPGEKVTITCSASSSVTYIHWFQQNPGTSP KLWIYRTSYLASGVPARFSGSGSGTSYSLTISRMEAEDAATY YCQQRSSYPRTFGGGTKLEIKRTVAAPSVFIFPPSDEQLKSGT ASVVCLLNNFYPREAKVQWKVDNALQSGNSQESVTEQDSK DSTYSLSSTLTLSKADYEKHKVYACEVTHQGLSSPVTKSFNR GECGGGGSEGKSSGSGSESKSTEGKSSGSGSESKSTGGGGSQ VQLQQPGAEFVQPGSSVKMSCKASGYAFSDYWITWVKQRP GQGLEWIGDIYPGSGSTKSSEKFKNRATLTADTSSSTAYIQFS SLTPEDSAVYYCVSLYYYGSYYLDTWGQGTTLTVSSASTKG PSVFPLAPSSKSTSGGTAALGCLVKDYFPEPVTVSWNSGALT SGVHTFPAVLQSSGLYSLSSVVTVPSSSLGTQTYICNVNHKP SNTKVDKRVEPKSC |
| SEQ ID NO: 235 | DLL3#13 scFab | DVLMTQTPLSLPVSLGDQAAISCRSSQSIVHSNGNTYLEWYL QKPGQSPKVLIYKVSNRFSGVPDRFSGSGSGTDFTLKISRVE AEDLGVYYCFQGSHVPYTFGGGTKLEIKRTVAAPSVFIFPPS DEQLKSGTASVVCLLNNFYPREAKVQWKVDNALQSGNSQE SVTEQDSKDSTYSLSSTLTLSKADYEKHKVYACEVTHQGLS SPVTKSFNRGECGGGGSEGKSSGSGSESKSTEGKSSGSGSES KSTGGGGSQIQLVQSGPELKKPGETVKISCKASGYTFTNYGV TWVKQAPGKGLKWMGWINTYSGAPTYADDFNGRFALSLE TSASTAYLQINNLKNEDTATYFCARLDDYDLYYFDYWGQG TALTVSSASTKGPSVFPLAPSSKSTSGGTAALGCLVKDYFPE PVTVSWNSGALTSGVHTFPAVLQSSGLYSLSSVVTVPSSSLG TQTYICNVNHKPSNTKVDKRVEPKSC |
| SEQ ID NO: 236 | DLL3#14 scFab | DIVLTQSPASLSVSLGQRATISCKASQSVDYDGDSYMNWYQ QKPGQPPKLLIYAASTLESGIPARFSGSGSGTDFTLNIHPVEEE DAATYYCQQSDEDPWTFGGGTKLEIKRTVAAPSVFIFPPSDE QLKSGTASVVCLLNNFYPREAKVQWKVDNALQSGNSQESV TEQDSKDSTYSLSSTLTLSKADYEKHKVYACEVTHQGLSSP VTKSFNRGECGGGGSEGKSSGSGSESKSTEGKSSGSGSESKS TGGGGSQIQLQQSGPELVKPGVKISCKASGYTFTDYYIHWM KQRPGQGLEWIGYIYPGNSYTAYNQKFKDKATLTADNPSST AYMQLSSLTSEDSAVYFCARSGGSAMDYWGQGTSVTVSSA STKGPSVFPLAPSSKSTSGGTAALGCLVKDYFPEPVTVSWNS GALTSGVHTFPAVLQSSGLYSLSSVVTVPSSSLGTQTYICNV NHKPSNTKVDKRVEPKSC |
| SEQ ID NO: 237 | DLL3#15 scFab | DIVLTQSPASLAVSLGQRATISCKASQSVDYDGDSYLNWYQ QKPGQPPKLLIYAASNLESGIPARFSGSGSGTDFTLNIHPVEE EDAATYYCQQSSEDPRTFGGGTKLEIKRTVAAPSVFIFPPSDE QLKSGTASVVCLLNNFYPREAKVQWKVDNALQSGNSQESV TEQDSKDSTYSLSSTLTLSKADYEKHKVYACEVTHQGLSSP VTKSFNRGECGGGGSEGKSSGSGSESKSTEGKSSGSGSESKS TGGGGSQIQLVQSGPELKKPGETVKISCKASGYTFTNYGMN WVKQAPGKGLKWMGWINTYTGEPTYADDFKGRFAFSLETS ASTAYLQINNLKNEDMATYFCTKFHFSSNGDAMDNWGQGT |

TABLE 1-continued

Amino acid sequences and SEQ ID NOs of CDRs, VH, VL, scFabs, DLL3-arm and
CD3-arm sequences of the proteins/antibody constructs described herein:

| SEQ ID Number | Brief description of sequence | Sequence |
|---|---|---|
| | | SVTVSSASTKGPSVFPLAPSSKSTSGGTAALGCLVKDYFPEP VTVSWNSGALTSGVHTFPAVLQSSGLYSLSSVVTVPSSSLGT QTYICNVNHKPSNTKVDKRVEPKSC |
| SEQ ID NO: 238 | DLL3#16 scFab | DIQMTQSPSTLSASVGDRVTITCRASQSVSDWLAWYQQKPG KAPKFLIYRASSLESGVPSRFSGSGSGTEFTLTISSLQPADFAT YYCQLYNSYSPTFGQGTKVEIKRTVAAPSVFIFPPSDEQLKS GTASVVCLLNNFYPREAKVQWKVDNALQSGNSQESVTEQD SKDSTYSLSSTLTLSKADYEKHKVYACEVTHQGLSSPVTKSF NRGECGGGGSEGKSSGSGSESKSTEGKSSGSGSESKSTGGGG SEVHLVESGGGLVQPGGSLRLSCAASGFTFSSYWMTWVRQ APGKGLEWVANIKEDGSEKYYVDSVKGRFTISRDNAKNSLY LQMNSLRAEDTALYYCARDWGYFDYWGQGTLVTVSSAST KGPSVFPLAPSSKSTSGGTAALGCLVKDYFPEPVTVSWNSG ALTSGVHTFPAVLQSSGLYSLSSVVTVPSSSLGTQTYICNVN HKPSNTKVDKRVEPKSC |
| SEQ ID NO: 239 | DLL3#17 scFab | DIQMTQSPASLAASVGETVTITCRASENIYYSLAWYQQKQG KSPQLLIYNTNSLEDGVPSRFSGSGSGTQYSMKINSMQPEDT ATYFCKQAYDFPLTFGAGTKLELKRTVAAPSVFIFPPSDEQL KSGTASVVCLLNNFYPREAKVQWKVDNALQSGNSQESVTE QDSKDSTYSLSSTLTLSKADYEKHKVYACEVTHQGLSSPVT KSFNRGECGGGGSEGKSSGSGSESKSTEGKSSGSGSESKSTG GGGSQIQLQQSGPEVVKPGASVKISCKASGYTFISYYIHWVK QRPGQGLEWIGWIYPGDGSTNNNEKFKGKTTLTADKSSSTA YMLLSSLTSEDSAVYFCARGEGNAMDDWGQGTSVTVSSAS TKGPSVFPLAPSSKSTSGGTAALGCLVKDYFPEPVTVSWNSG ALTSGVHTFPAVLQSSGLYSLSSVVTVPSSSLGTQTYICNVN HKPSNTKVDKRVEPKSC |
| SEQ ID NO: 240 | DLL3#18 scFab | DIQMTQSPASLAASVGETVTITCRASENIYYSLAWYQQKQG KSPQLLIYNANSLEDGVPSRFSGSGSGTQYSMKINNMQPEDT ATYFCKQAYDVPLTFGAGTKLELKRTVAAPSVFIFPPSDEQL KSGTASVVCLLNNFYPREAKVQWKVDNALQSGNSQESVTE QDSKDSTYSLSSTLTLSKADYEKHKVYACEVTHQGLSSPVT KSFNRGECGGGGSEGKSSGSGSESKSTEGKSSGSGSESKSTG GGGSQVQLQQSGPDLVKPGASVKMSCEASGYTFTAYFIHW VKQKPGQGLEWIGYIDPFNDDTNYNVKFKGKATLTSDTSSSI AYMELSSLTSEDSSFYYCARGTSATLDYWGHGTTLTVSSAS TKGPSVFPLAPSSKSTSGGTAALGCLVKDYFPEPVTVSWNSG ALTSGVHTFPAVLQSSGLYSLSSVVTVPSSSLGTQTYICNVN HKPSNTKVDKRVEPKSC |
| SEQ ID NO: 241 | DLL3#7 chain | EIVLTQSPDTLSLSPGERATLSCRASQSVNSNFLAWYQQKPG QTPRLLIFGTSSRATGIPDRFSGSGSGTDFTLTISRLEPEDFAV YYCQQYGSSPWTFGQGTKVEIRRTVAAPSVFIFPPSDEQLKS GTASVVCLLNNFYPREAKVQWKVDNALQSGNSQESVTEQD SKDSTYSLSSTLTLSKADYEKHKVYACEVTHQGLSSPVTKSF NRGECGGGGSEGKSSGSGSESKSTEGKSSGSGSESKSTGGGG SQVQLVESGGGVVQPGRSLRLSCAASGFTFSSYGMFWVRQ APGKGLEWVAVIWLDGDDEDYVDSVKGRFTISRDDSKNTL YLQMNSLRVDDTAIYYCARVLDYWGQGTLVTVSSASTKGP SVFPLAPSSKSTSGGTAALGCLVKDYFPEPVTVSWNSGALTS GVHTFPAVLQSSGLYSLSSVVTVPSSSLGTQTYICNVNHKPS NTKVDKRVEPKSCDKTHTCPPCPAPEAAGGPSVFLFPPKPKD TLMISRTPEVTCVVVDVSHEDPEVKFNWYVDGVEVHNAKT KPREEQYNSTYRVVSVLTVLHQDWLNGKEYKCKVSNKALP APIEKTISKAKGQPREPQVYTLPPSREEMTKNQVSLWCLVKG FYPSDIAVEWESNGQPENNYKTTPPVLDSDGSFFLYSKLTVD KSRWQQGNVFSCSVMHEALHNHYTQKSLSLSPG |
| SEQ ID NO: 242 | DLL3#8 chain | DIVMAQSPDSLAVSLGERATINCKSSQSVLDTSNNKNYLVW YQQKPGQPPKLLIYWASTRESGVPDRFSGSGSGTDFTLTISSL QAEDVAVYYCQHYYNSPYTFGQGTKLEIKRTVAAPSVFIFPP SDEQLKSGTASVVCLLNNFYPREAKVQWKVDNALQSGNSQ ESVTEQDSKDSTYSLSSTLTLSKADYEKHKVYACEVTHQGL SSPVTKSFNRGECGGGGSEGKSSGSGSESKSTEGKSSGSGSES KSTGGGGSQVQLVQSGAEVKKPGASVKVSCKASGYTFTDY YMHWVRQAPGQGLEWMGWINPNSGGTNYEQKFQGRVTM TRDTSISTAYMELNRLRSDDTAVYYCTRDAVVIPMDYWGQ GTLVTVSSASTKGPSVFPLAPSSKSTSGGTAALGCLVKDYFP EPVTVSWNSGALTSGVHTFPAVLQSSGLYSLSSVVTVPSSSL GTQTYICNVNHKPSNTKVDKRVEPKSCDKTHTCPPCPAPEA |

TABLE 1-continued

Amino acid sequences and SEQ ID NOs of CDRs, VH, VL, scFabs, DLL3-arm and
CD3-arm sequences of the proteins/antibody constructs described herein:

| SEQ ID Number | Brief description of sequence | Sequence |
|---|---|---|
| | | AGGPSVFLFPPKPKDTLMISRTPEVTCVVVDVSHEDPEVKFN WYVDGVEVHNAKTKPREEQYNSTYRVVSVLTVLHQDWLN GKEYKCKVSNKALPAPIEKTISKAKGQPREPQVYTLPPSREE MTKNQVSLWCLVKGFYPSDIAVEWESNGQPENNYKTTPPV LDSDGSFFLYSKLTVDKSRWQQGNVFSCSVMHEALHNHYT QKSLSLSPG |
| SEQ ID NO: 243 | DLL3#9 chain | EIVLTQSPGTLSLSPGERATLSCRASQSISRSYLAWYQQKPGQ APRLLIYGASSRATGIPDRFSGSGSGTDFTLTISRLEPEDFAVY YCQQYGTSPITFGQGTRLEIKRTVAAPSVFIFPPSDEQLKSGT ASVVCLLNNFYPREAKVQWKVDNALQSGNSQESVTEQDSK DSTYSLSSTLTLSKADYEKHKVYACEVTHQGLSSPVTKSFNR GECGGGGSEGKSSGSGSESKSTEGKSSGSGSESKSTGGGGSQ VHLQESGPGLVKPSETLSLTCTVSGGSISSYYWSWIRQTPGK GLDWIGYRYYSGNTNYNPSLKSRVTISLDMSNNQFSLKLSS VTAADTAIYYCASIGVAGFYFDYWGQGTLVTVSSASTKGPS VFPLAPSSKSTSGGTAALGCLVKDYFPEPVTVSWNSGALTSG VHTFPAVLQSSGLYSLSSVVTVPSSSLGTQTYICNVNHKPSN TKVDKRVEPKSCDKTHTCPPCPAPEAAGGPSVFLFPPKPKDT LMISRTPEVTCVVVDVSHEDPEVKFNWYVDGVEVHNAKTK PREEQYNSTYRVVSVLTVLHQDWLNGKEYKCKVSNKALPA PIEKTISKAKGQPREPQVYTLPPSREEMTKNQVSLWCLVKGF YPSDIAVEWESNGQPENNYKTTPPVLDSDGSFFLYSKLTVDK SRWQQGNVFSCSVMHEALHNHYTQKSLSLSPG |
| SEQ ID NO: 244 | DLL3#10 chain | EIVLTQSPGTLSLSPGERATLSCRASQSLNSIFLAWYQQKPGQ APWLLIYGASSRATGIPDRFSGSGSGTDFTLTISRLEPEDFAV YFCQQYGGSMNTFGQGTKLEIKRTVAAPSVFIFPPSDEQLKS GTASVVCLLNNFYPREAKVQWKVDNALQSGNSQESVTEQD SKDSTYSLSSTLTLSKADYEKHKVYACEVTHQGLSSPVTKSF NRGECGGGGSEGKSSGSGSESKSTEGKSSGSGSESKSTGGGG SQVQLVQSGAEVKKPGASVKVSCKASGYTFTGYYMHWVR LAPGQGLEWMGWINPNSGGTIFAQRFQGRVTMTRDTSISTV YMDLNRLRSDDTAVYYCARDFGDTVGNAFDIVVGQGTMVT VSSASTKGPSVFPLAPSSKSTSGGTAALGCLVKDYFPEPVTV SWNSGALTSGVHTFPAVLQSSGLYSLSSVVTVPSSSLGTQTY ICNVNHKPSNTKVDKRVEPKSCDKTHTCPPCPAPEAAGGPS VFLFPPKPKDTLMISRTPEVTCVVVDVSHEDPEVKFNWYVD GVEVHNAKTKPREEQYNSTYRVVSVLTVLHQDWLNGKEY KCKVSNKALPAPIEKTISKAKGQPREPQVYTLPPSREEMTKN QVSLWCLVKGFYPSDIAVEWESNGQPENNYKTTPPVLDSDG SFFLYSKLTVDKSRWQQGNVFSCSVMHEALHNHYTQKSLSL SPG |
| SEQ ID NO: 245 | DLL3#11 chain | QIVLTQSPAIMSASPGEKVTITCSASSSVTYIHWFQQNPGTSP KLWIYRTSYLASGVPARFSGSGSGTSYSLTISRMEAEDAATY YCQQRSSYPRTFGGGTKLEIKRTVAAPSVFIFPPSDEQLKSGT ASVVCLLNNFYPREAKVQWKVDNALQSGNSQESVTEQDSK DSTYSLSSTLTLSKADYEKHKVYACEVTHQGLSSPVTKSFNR GECGGGGSEGKSSGSGSESKSTEGKSSGSGSESKSTGGGGSQ VQLQQPGAELVQPGSSVKMSCKASGYAFSDYWITWVKQRP GQGLEWIGDIYPGSGSTKSSEKFKNKATLTADTSSSKAYIQF SSLTPEDSAVYYCVSLYYYGSHYLDTWGQGTTLTVSSASTK GPSVFPLAPSSKSTSGGTAALGCLVKDYFPEPVTVSWNSGAL TSGVHTFPAVLQSSGLYSLSSVVTVPSSSLGTQTYICNVNHK PSNTKVDKRVEPKSCDKTHTCPPCPAPEAAGGPSVFLFPPKP KDTLMISRTPEVTCVVVDVSHEDPEVKFNWYVDGVEVHNA KTKPREEQYNSTYRVVSVLTVLHQDWLNGKEYKCKVSNKA LPAPIEKTISKAKGQPREPQVYTLPPSREEMTKNQVSLWCLV KGFYPSDIAVEWESNGQPENNYKTTPPVLDSDGSFFLYSKLT VDKSRWQQGNVFSCSVMHEALHNHYTQKSLSLSPG |
| SEQ ID NO: 246 | DLL3#12 chain | QVVLTQSPAIMSASPGEKVTITCSASSSVTYIHWFQQNPGTSP KLWIYRTSYLASGVPARFSGSGSGTSYSLTISRMEAEDAATY YCQQRSSYPRTFGGGTKLEIKRTVAAPSVFIFPPSDEQLKSGT ASVVCLLNNFYPREAKVQWKVDNALQSGNSQESVTEQDSK DSTYSLSSTLTLSKADYEKHKVYACEVTHQGLSSPVTKSFNR GECGGGGSEGKSSGSGSESKSTEGKSSGSGSESKSTGGGGSQ VQLQQPGAEFVQPGSSVKMSCKASGYAFSDYWITWVKQRP GQGLEWIGDIYPGSGSTKSSEKFKNRATLTADTSSSTAYIQFS SLTPEDSAVYYCVSLYYYGSYYLDTWGQGTTLTVSSASTKG PSVFPLAPSSKSTSGGTAALGCLVKDYFPEPVTVSWNSGALT SGVHTFPAVLQSSGLYSLSSVVTVPSSSLGTQTYICNVNHKP |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
|---|---|---|
| | | SNTKVDKRVEPKSCDKTHTCPPCPAPEAAGGPSVFLFPPKPK DTLMISRTPEVTCVVVDVSHEDPEVKFNWYVDGVEVHNAK TKPREEQYNSTYRVVSVLTVLHQDWLNGKEYKCKVSNKAL PAPIEKTISKAKGQPREPQVYTLPPSREEMTKNQVSLWCLVK GFYPSDIAVEWESNGQPENNYKTTPPVLDSDGSFFLYSKLTV DKSRWQQGNVFSCSVMHEALHNHYTQKSLSLSPG |
| SEQ ID NO: 247 | DLL3#13 chain | DVLMTQTPLSLPVSLGDQAAISCRSSQSIVHSNGNTYLEWYL QKPGQSPKVLIYKVSNRFSGVPDRFSGSGSGTDFTLKISRVE AEDLGVYYCFQGSHVPYTFGGGTKLEIKRTVAAPSVFIFPPS DEQLKSGTASVVCLLNNFYPREAKVQWKVDNALQSGNSQE SVTEQDSKDSTYSLSSTLTLSKADYEKHKVYACEVTHQGLS SPVTKSFNRGECGGGGSEGKSSGSGSESKSTEGKSSGSGSES KSTGGGGSQIQLVQSGPELKKPGETVKISCKASGYTFTNYGV TWVKQAPGKGLKWMGWINTYSGAPTYADDFNGRFALSLE TSASTAYLQINNLKNEDTATYFCARLDDYDLYYFDYWGQG TALTVSSASTKGPSVFPLAPSSKSTSGGTAALGCLVKDYFPE PVTVSWNSGALTSGVHTFPAVLQSSGLYSLSSVVTVPSSSLG TQTYICNVNHKPSNTKVDKRVEPKSCDKTHTCPPCPAPEAA GGPSVFLFPPKPKDTLMISRTPEVTCVVVDVSHEDPEVKFNW YVDGVEVHNAKTKPREEQYNSTYRVVSVLTVLHQDWLNG KEYKCKVSNKALPAPIEKTISKAKGQPREPQVYTLPPSREEM TKNQVSLWCLVKGFYPSDIAVEWESNGQPENNYKTTPPVLD SDGSFFLYSKLTVDKSRWQQGNVFSCSVMHEALHNHYTQK SLSLSPG |
| SEQ ID NO: 248 | DLL3#14 chain | DIVLTQSPASLSVSLGQRATISCKASQSVDYDGDSYMNWYQ QKPGQPPKLLIYAASTLESGIPARFSGSGSGTDFTLNIHPVEEE DAATYYCQQSDEDPWTFGGGTKLEIKRTVAAPSVFIFPPSDE QLKSGTASVVCLLNNFYPREAKVQWKVDNALQSGNSQESV TEQDSKDSTYSLSSTLTLSKADYEKHKVYACEVTHQGLSSP VTKSFNRGECGGGGSEGKSSGSGSESKSTEGKSSGSGSESKS TGGGGSQIQLQQSGPELVKPGVKISCKASGYTFTDYYIHWM KQRPGQGLEWIGYIYPGNSYTAYNQKFKDKATLTADNPSST AYMQLSSLTSEDSAVYFCARSGGSAMDYWGQGTSVTVSSA STKGPSVFPLAPSSKSTSGGTAALGCLVKDYFPEPVTVSWNS GALTSGVHTFPAVLQSSGLYSLSSVVTVPSSSLGTQTYICNV NHKPSNTKVDKRVEPKSCDKTHTCPPCPAPEAAGGPSVFLFP PKPKDTLMISRTPEVTCVVVDVSHEDPEVKFNWYVDGVEV HNAKTKPREEQYNSTYRVVSVLTVLHQDWLNGKEYKCKVS NKALPAPIEKTISKAKGQPREPQVYTLPPSREEMTKNQVSLW CLVKGFYPSDIAVEWESNGQPENNYKTTPPVLDSDGSFFLYS KLTVDKSRWQQGNVFSCSVMHEALHNHYTQKSLSLSPG |
| SEQ ID NO: 249 | DLL3#15 chain | DIVLTQSPASLAVSLGQRATISCKASQSVDYDGDSYLNWYQ QKPGQPPKLLIYAASNLESGIPARFSGSGSGTDFTLNIHPVEE EDAATYYCQQSSEDPRTFGGGTKLEIKRTVAAPSVFIFPPSDE QLKSGTASVVCLLNNFYPREAKVQWKVDNALQSGNSQESV TEQDSKDSTYSLSSTLTLSKADYEKHKVYACEVTHQGLSSP VTKSFNRGECGGGGSEGKSSGSGSESKSTEGKSSGSGSESKS TGGGGSQIQLVQSGPELKKPGETVKISCKASGYTFTNYGMN WVKQAPGKGLKWMGWINTYTGEPTYADDFKGRFAFSLETS ASTAYLQINNLKNEDMATYFCTKFHFSSNGDAMDNWGQGT SVTVSSASTKGPSVFPLAPSSKSTSGGTAALGCLVKDYFPEP VTVSWNSGALTSGVHTFPAVLQSSGLYSLSSVVTVPSSSLGT QTYICNVNHKPSNTKVDKRVEPKSCDKTHTCPPCPAPEAAG GPSVFLFPPKPKDTLMISRTPEVTCVVVDVSHEDPEVKFNWY VDGVEVHNAKTKPREEQYNSTYRVVSVLTVLHQDWLNGK EYKCKVSNKALPAPIEKTISKAKGQPREPQVYTLPPSREEMT KNQVSLWCLVKGFYPSDIAVEWESNGQPENNYKTTPPVLDS DGSFFLYSKLTVDKSRWQQGNVFSCSVMHEALHNHYTQKS LSLSPG |
| SEQ ID NO: 250 | DLL3#16 chain | DIQMTQSPSTLSASVGDRVTITCRASQSVSDWLAWYQQKPG KAPKFLIYRASSLESGVPSRFSGSGSGTEFTLTISSLQPADFAT YYCQLYNSYSPTFGQGTKVEIKRTVAAPSVFIFPPSDEQLKS GTASVVCLLNNFYPREAKVQWKVDNALQSGNSQESVTEQD SKDSTYSLSSTLTLSKADYEKHKVYACEVTHQGLSSPVTKSF NRGECGGGGSEGKSSGSGSESKSTEGKSSGSGSESKSTGGGG SEVHLVESGGGLVQPGGSLRLSCAASGFTFSSYWMTWVRQ APGKGLEWVANIKEDGSEKYYVDSVKGRFTISRDNAKNSLY LQMNSLRAEDTALYYCARDWGYFDYWGQGTLVTVSSAST KGPSVFPLAPSSKSTSGGTAALGCLVKDYFPEPVTVSWNSG |

TABLE 1-continued

Amino acid sequences and SEQ ID NOs of CDRs, VH, VL, scFabs, DLL3-arm and CD3-arm sequences of the proteins/antibody constructs described herein:

| SEQ ID Number | Brief description of sequence | Sequence |
| --- | --- | --- |
| | | ALTSGVHTFPAVLQSSGLYSLSSVVTVPSSSLGTQTYICNVN HKPSNTKVDKRVEPKSCDKTHTCPPCPAPEAAGGPSVFLFPP KPKDTLMISRTPEVTCVVVDVSHEDPEVKFNWYVDGVEVH NAKTKPREEQYNSTYRVVSVLTVLHQDWLNGKEYKCKVSN KALPAPIEKTISKAKGQPREPQVYTLPPSREEMTKNQVSLWC LVKGFYPSDIAVEWESNGQPENNYKTTPPVLDSDGSFFLYSK LTVDKSRWQQGNVFSCSVMHEALHNHYTQKSLSLSPG |
| SEQ ID NO: 251 | DLL3#17 chain | DIQMTQSPASLAASVGETVTITCRASENIYYSLAWYQQKQG KSPQLLIYNTNSLEDGVPSRFSGSGSGTQYSMKINSMQPEDT ATYFCKQAYDFPLTFGAGTKLELKRTVAAPSVFIFPPSDEQL KSGTASVVCLLNNFYPREAKVQWKVDNALQSGNSQESVTE QDSKDSTYSLSSTLTLSKADYEKHKVYACEVTHQGLSSPVT KSFNRGECGGGGSEGKSSGSGSESKSTEGKSSGSGSESKSTG GGGSQIQLQQSGPEVVKPGASVKISCKASGYTFISYYIHWVK QRPGQGLEWIGWIYPGDGSTNNNEKFKGKTTLTADKSSSTA YMLLSSLTSEDSAVYFCARGEGNAMDDWGQGTSVTVSSAS TKGPSVFPLAPSSKSTSGGTAALGCLVKDYFPEPVTVSWNSG ALTSGVHTFPAVLQSSGLYSLSSVVTVPSSSLGTQTYICNVN HKPSNTKVDKRVEPKSCDKTHTCPPCPAPEAAGGPSVFLFPP KPKDTLMISRTPEVTCVVVDVSHEDPEVKFNWYVDGVEVH NAKTKPREEQYNSTYRVVSVLTVLHQDWLNGKEYKCKVSN KALPAPIEKTISKAKGQPREPQVYTLPPSREEMTKNQVSLWC LVKGFYPSDIAVEWESNGQPENNYKTTPPVLDSDGSFFLYSK LTVDKSRWQQGNVFSCSVMHEALHNHYTQKSLSLSPG |
| SEQ ID NO: 252 | DLL3#18 chain | DIQMTQSPASLAASVGETVTITCRASENIYYSLAWYQQKQG KSPQLLIYNANSLEDGVPSRFSGSGSGTQYSMKINNMQPEDT ATYFCKQAYDVPLTFGAGTKLELKRTVAAPSVFIFPPSDEQL KSGTASVVCLLNNFYPREAKVQWKVDNALQSGNSQESVTE QDSKDSTYSLSSTLTLSKADYEKHKVYACEVTHQGLSSPVT KSFNRGECGGGGSEGKSSGSGSESKSTEGKSSGSGSESKSTG GGGSQVQLQQSGPDLVKPGASVKMSCEASGYTFTAYFIHW VKQKPGQGLEWIGYIDPFNDDTNYNVKFKGKATLTSDTSSSI AYMELSSLTSEDSSFYYCARGTSATLDYWGHGTTLTVSSAS TKGPSVFPLAPSSKSTSGGTAALGCLVKDYFPEPVTVSWNSG ALTSGVHTFPAVLQSSGLYSLSSVVTVPSSSLGTQTYICNVN HKPSNTKVDKRVEPKSCDKTHTCPPCPAPEAAGGPSVFLFPP KPKDTLMISRTPEVTCVVVDVSHEDPEVKFNWYVDGVEVH NAKTKPREEQYNSTYRVVSVLTVLHQDWLNGKEYKCKVSN KALPAPIEKTISKAKGQPREPQVYTLPPSREEMTKNQVSLWC LVKGFYPSDIAVEWESNGQPENNYKTTPPVLDSDGSFFLYSK LTVDKSRWQQGNVFSCSVMHEALHNHYTQKSLSLSPG |
| SEQ ID NO: 253 | Constant region of heavy chain CH1 | ASTKGPSVFPLAPSSKSTSGGTAALGCLVKDYFPEPVTVSWN SGALTSGVHTFPAVLQSSGLYSLSSVVTVPSSSLGTQTYICNV NHKPSNTKVDKRVEPKSC |
| SEQ ID NO: 254 | Mouse IgG2a HC | AKTTAPSVYPLAPVCGDTTGSSVTLGCLVKGYFPEPVTLTW NSGSLSSGVHTFPAVLQSDLYTLSSSVTVTSSTWPSQSITCNV AHPASSTKVDKKIEPRGPTIKPCPPCKCPAPNLLGGPSVFIFPP KIKDVLMISLSPIVTCVVVDVSEDDPDVQISWFVNNVEVHTA QTQTHREDYNSTLRVVSALPIQHQDWMSGKEFKCKVNNKD LPAPIERTISKPKGSVRAPQVYVLPPPEEEMTKKQVTLTCMV TDFMPEDIYVEWTNNGKTELNYKNTEPVLDSDGSYFMYSK LRVEKKNWVERNSYSCSVVHEGLHNHHTTKSFSRTPGK |
| SEQ ID NO: 255 | Mouse Kappa LC | RADAAPTVSIFPPSSEQLTSGGASVVCFLNNFYPKDINVKWK IDGSERQNGVLNSWTDQDSKDSTYSMSSTLTLTKDEYERHN SYTCEATHKTSTSPIVKSFNRNEC |

*Underlined sequence indicates hinge region

Example 3: Production of Recombinant Proteins

Human DLL3-His

A cell line to produce Human DLL3-His was generated using HEK-293 cells (Thermo Fisher), the Lenti-X Lentiviral System (Clontech), and plasmid encoding Human DLL3-His (human DLL3 Accession No. Q9NYJ7 huDLL3-His: SEQ ID NO:106). For expression, cells were cultured and expanded at 37 C, 5% CO2, and shaking at 140 rpm. On Day 0 of expression, cell were pelleted and re-suspended in Expi 293 media. On day 3 of expression the conditioned culture supernatant was harvested by pelleting the cells for 40 minutes at 4700 rpm. Protease inhibitors were added to the biomass before purification. Expression was confirmed by western blot. The conditioned culture supernatant was adjusted with 0.5 mM TCEP, 0.02% CHAPS, 10 mM imidazole. Purification was carried out on a HisTrap Ni excel column and Buffer A: 50 mM MES, 50 mM NaCl, 0.5 mM TCEP, 0.02% CHAPS, pH 6.5. The protein of interest was eluted in Buffer A supplemented with 0.5M Imidazole, pH 8.5, using an elution gradient from 20 mM imidazole to 500 mM imidazole. The pooled fractions were dialyzed in buffer: 50 mM MES, 50 mM NaCl, 1 mM TCEP, 0.02% CHAPS, 0.2M Arginine, 3% glycerol, pH 6.5. The purified material was qualified by mass spectrometry and analytical ultra-centrifugation.

Cyno DLL3-His

A cell line to produce Cyno DLL3-His was generated using HEK-293 cells (Thermo Fisher), the Lenti-X Lentiviral System (Clontech), and plasmid encoding Cyno DLL3-His (Cyno DLL3 Accession No: XM_005589196.1 (RefSeq); Cyno DLL3-His: SEQ ID NO:107). For expression, cells were cultured and expanded at 37° C., 5% CO2, and shaking at 140 rpm. On Day 0 of expression, cells were pelleted and re-suspended in Expi 293 media. On day 3 of expression the conditioned culture supernatant was harvested by pelleting the cells for 40 minutes at 4700 rpm. Protease inhibitors were added to the biomass before purification. Expression was confirmed by western blot. The conditioned culture supernatant was adjusted with 0.5 mM TCEP, 0.02% CHAPS, 10 mM imidazole. Purification was carried out on a HisTrap Ni excel column and Buffer A: 50 mM MES, 50 mM NaCl, 0.5 mM TCEP, 0.02% CHAPS, pH 6.5. The protein of interest was eluted in Buffer A supplemented with 0.5M Imidazole, pH 8.5, using an elution gradient from 20 mM imidazole to 500 mM imidazole. The pooled fractions were dialyzed in buffer: 50 mM MES, 50 mM NaCl, 1 mM TCEP, 0.02% CHAPS, 0.2M Arginine, 3% glycerol, pH 6.5. The purified material was qualified by mass spectrometry and analytical ultra-centrifugation.

Human CD3 E+G HuFc-6×His (E+G Indicates εγ Subunits)

A cell line to produce Human CD3 E+G HuFc-6×His was generated using HEK-293 cells (Thermo Fisher), the Lenti-X Lentiviral System (Clontech), and plasmid encoding Human CD3 E+G HuFc-6×His (human CD3E Accession No: P07766; human CD3E+G-HuFc-His: SEQ ID NO:108). For expression, cells were cultured and expanded in Freestyle 293 media, at 37 C, humidified 8% CO2 environment, and shaking at 135 rpm. The conditioned culture supernatant was harvested at Day 6 by centrifugation for 30 minutes at 9300×g. Expression was monitored by SDS-PAGE and Western Blotting. The conditioned culture supernatant was adjusted with 0.2M Sucrose, 5% glycerol, 0.01% CHAPS, and 10 mM Imidazole. The pH was then adjusted to 7.2. Purification was carried out in a two-step process: affinity purification using Ni/NTA resin (overnight incubation at 4 C, and elution with 250 mM Imidazole); followed by size-exclusion chromatography on a Superdex 200 column in destination buffer PBS with 0.2M Sucrose, 5% glycerol, 0.01% CHAPS, 1 mM TCEP, pH7.2. The pooled material was concentrated using a 10K MWCO PES membrane viva cell 100 centrifugation device prior to final analysis and storage. The purified material was qualified by mass spectrometry and analytical ultra-centrifugation.

Cyno CD3 E+G HuFc-6×His (E+G Indicates εγ Subunits)

A cell line to produce Cyno CD3 E+G HuFc-6×His was generated using HEK-293 cells (Thermo Fisher), the Lenti-X Lentiviral System (Clontech), and plasmid encoding Cyno CD3 E+G HuFc-6×His (Cynomolgus CD3E Accession No: Q95LI5<, cyno CD3 E+G huFc-His: SEQ ID NO:109). For expression, cells were cultured and expanded in Freestyle 293 media, at 37 C, humidified 8% CO2 environment, and shaking at 135 rpm. The conditioned culture supernatant was harvested at Day 6 by centrifugation for 30 minutes at 9300×g. Expression was monitored by SDS-PAGE and Western Blotting. The conditioned culture supernatant was adjusted with 0.2M Sucrose, 5% glycerol, 0.01% CHAPS, and 10 mM Imidazole. The pH was then adjusted to 7.2. Purification was carried out in a two-step process: affinity purification using Ni/NTA resin (overnight incubation at 4 C, and elution with 250 mM Imidazole); followed by size-exclusion chromatography on a Superdex 200 column in destination buffer PBS with 0.2M Sucrose, 5% glycerol, 0.01% CHAPS, 1 mM TCEP, pH7.2. The pooled material was concentrated using a 10K MWCO PES membrane viva cell 100 centrifugation device prior to final analysis and storage. The purified material was qualified by mass spectrometry and analytical ultra-centrifugation.

Example 4A: SPR Based Determination of Affinities to Recombinant DLL3 and CD3 εγ Subunits and Interspecies Cross-Reactivity The binding affinity of purified DLL3/CD3 bispecific constructs for recombinant human and cyno DLL3-ECD and Fc-fusion proteins of human and cyno CD3 εγ subunits was determined by Surface Plasmon Resonance (SPR), using a ProteOn XPR36 instrument (Bio-Rad). The running buffer and all dilutions (except where stated) were done in PBS-T-EDTA. The GLM sensor chip (Bio-Rad) was normalized and pre-conditioned as per the manufacturer's recommendations. The sensor chip was activated with equal mixture of EDC/s-NHS in the horizontal direction for 300 sec at a flow rate of 30 ul/min and immobilized with protein A/G (20 ug/ml in 10 mM acetate pH 4.5) in the horizontal direction for 300 sec at a flowrate of 30 ul/min resulting in ~5000 RU of protein A/G on the surface. The sensor chip was deactivated with 1M ethanolamine HCl in the horizontal direction for 300 sec at a flowrate of 30 μl/min. The sensor chip was stabilized with 18 sec of 0.85% phosphoric acid at a flowrate of 100 μl/min 3 times horizontally and 3 times vertically.

For binding kinetic determination to DLL3, bispecific molecules were captured individually on the protein A/G surface vertically for 250 sec at a flowrate of 25 μl/min.

The baseline was stabilized by injecting PBS-T-EDTA for 60 sec at a flowrate of 40 μl/min horizontally. The analyte (hu DLL3 or cy DLL3) was injected horizontally over the captured antibody for 600 sec at a flowrate of 40 μl/min and a dissociation for 2700 sec. The concentrations of the analyte were 20 nM, 10 nM, 5 nM, 2.5 nM, and 1.25 nM. The surface was regenerated by injecting 0.85% phosphoric acid solution for 18 sec at a flowrate of 100 μl/min one time horizontally and one time vertically.

For binding kinetic determination to CD3, hu CD3εγ-Fc and cy CD3εγ-Fc (dissolved in pH 4.5 acetate) was immobilized directly onto the sensor surface through amine coupling for 140 sec at a flowrate of 30 μl/min vertically. The baseline was stabilized by injecting PBS-T-EDTA for 60 sec at a flowrate of 40 μl/min horizontally. The analyte (the bispecific molecule) was injected horizontally over the captured CD3εγ-Fc construct for 600 sec at a flowrate of 40 μl/min and a dissociation for 600 sec. The concentrations of the analyte were 250 nM, 125 nM, 62.5 nM, 31.3 nM, and 15.6 nM or 2 μM, 1 μM, 0.5 μM, 0.25 μM, and 0.125 μM. The surface was regenerated by injecting 0.85% phosphoric acid solution for 18 sec at a flowrate of 100 μl/min one time horizontally and one time vertically.

The inter spot (interactions with sensor surface) and blank (PBS-T-EDTA) were subtracted from the raw data. Sensorgrams were then fit to 1:1 kinetic model to provide rate constants (ka, kd) as well as affinity (KD) value for hu DLL3 and cy DLL3, and fit globally to equilibrium to provide affinity (KD) value for hu CD3εγ and cy CD3εγ.

DLL3/CD3 binding proteins described herein showed affinities to DLL3 in the pM range. Affinities to the CD3 εγ subunit were in the low nM range. The interspecies gap between human and cyno is balanced. Affinities of three exemplary DLL3/CD3 binding proteins (DLL3/CD3 binding proteins comprising a DLL3 chain of SEQ ID NO:75 and a CD3 chain of SEQ ID NO:79, SEQ ID NO:80 or SEQ ID NO:105, respectively) are shown in. Table 2A.

TABLE 2A

Affinities (KD) of DLL3/CD3 binding proteins to human and cynomolgus monkey DLL3 and CD3 εγ subunit as determined by SPR analysis, and interspecies gaps

| DLL3/CD3 binding protein | Recomb. human DLL3 | Recomb. cyno DLL3 | Affinity gap KD hu/cyno DLL3 | Recomb. Human CD3 εγ | Recomb. Cyno CD3 εγ | Affinity gap KD hu/cyno CD3 εγ |
|---|---|---|---|---|---|---|
| DLL3#3/CD3#1 | <10 pM | <10 pM | 1 | 7 nM | 8 nM | 1.1 |
| DLL3#3/CD3#2 | <10 pM | <10 pM | 1 | 90 nM | 100 nM | 1.1 |
| DLL3#3/CD3#3 | <10 pM | <10 pM | 1 | 68 nM | 71 nM | 1.04 |

Example 4B: SPR Based Determination of Affinities to Recombinant DLL3 and CD3 εγ

The binding affinity of purified DLL3/CD3 bispecific constructs for recombinant human DLL3-ECD and Fc-fusion protein of human CD3 εγ subunits was determined by Surface Plasmon Resonance (SPR), using a ProteOn XPR36 instrument (Bio-Rad). The method was similar as in Example 4A, with a few differences as outlined below.

For binding kinetic determination to DLL3, anti-DLL3/CD3 molecules were captured individually on the protein A/G surface vertically for 200 sec at a flowrate of 30 μl/min. The baseline was stabilized by injecting PBS-T-EDTA for 60 sec at a flowrate of 30 μl/min horizontally. The analyte (hu DLL3) was injected horizontally over the captured antibody for 300 sec at a flowrate of 30 μl/min and a dissociation for 1800 sec. The concentrations of the analyte were 20 nM, 10 nM, 5 nM, 2.5 nM, and 1.25 nM. The surface was regenerated by injecting 0.85% phosphoric acid solution for 18 sec at a flowrate of 100 μl/min one time horizontally and one time vertically.

For binding kinetic determination to CD3, HuCD3E_HuCD3G-Fc (dissolved in pH 4.5 acetate) was immobilized directly onto the sensor surface through amine coupling for 360 sec at a flowrate of 30 μl/min vertically. The baseline was stabilized by injecting PBS-T-EDTA for 60 sec at a flowrate of 30 μl/min horizontally. The analytes (all anti-DLL3/CD3 molecules) were injected horizontally over the captured antibody for 600 sec at a flowrate of 30 μl/min and a dissociation for 1800 sec. The concentrations of the analyte were 250 nM, 83.3 nM, 27.8 nM, 9.3 nM, and 3.1 nM. The surface was regenerated by injecting 0.85% phosphoric acid solution for 18 sec at a flowrate of 100 μl/min one time horizontally and one time vertically.

Affinities of exemplary DLL3/CD3 binding proteins (DLL3/CD3 binding proteins comprising a DLL3 chain of SEQ ID NO:73, SEQ ID NO:74, SEQ ID NO:75, SEQ ID NO:76, SEQ ID NO:77, SEQ ID NO:78, SEQ ID NO:241, SEQ ID NO:242, SEQ ID NO:243, SEQ ID NO:244, SEQ ID NO:245, SEQ ID NO:246, SEQ ID NO:247, SEQ ID NO:248, SEQ ID NO:249, SEQ ID NO:250, SEQ ID NO:251, or SEQ ID NO:252 and a CD3 chain of SEQ ID NO:79, a DLL3 binding protein comprising a DLL3 chain of SEQ ID NO:75 and a CD3 chain of SEQ ID NO:80, and a DLL3 binding protein comprising a DLL3 chain of SEQ ID NO:75 and a CD3 chain of SEQ ID NO:105) are shown in 2B.

TABLE 2B

Affinities (KD) of DLL3/CD3 binding proteins to human DLL3 and CD3 εγ subunit as determined by SPR analysis

| DLL3/CD3 binding protein | Recomb. human huDLL3 | Recomb. Human huCD3 εγ |
|---|---|---|
| DLL3#1/CD3#1 | 52 pM | 2 nM |
| DLL3#2/CD3#1 | 91 pM | 3 nM |
| DLL3#3/CD3#1 | 75 pM | 2 nM |
| DLL3#3/CD3#2 | 120 pM | 7 nM |
| DLL3#3/CD3#3 | 116 pM | 4 nM |
| DLL3#4/CD3#1 | <20 pM | 2 nM |
| DLL3#5/CD3#1 | <20 pM | 3 nM |
| DLL3#6/CD3#1 | 152 pM | 2 nM |
| DLL3#7/CD3#1 | 637 pM | 1 nM |
| DLL3#8/CD3#1 | 40 pM | 2 nM |
| DLL3#9/CD3#1 | 46 pM | 2 nM |
| DLL3#10/CD3#1 | 141 pM | na |
| DLL3#11/CD3#1 | 37 pM | 2 nM |
| DLL3#12/CD3#1 | <20 pM | 2 nM |
| DLL3#13/CD3#1 | 23 pM | 3 nM |
| DLL3#14/CD3#1 | 60 pM | 3 nM |
| DLL3#15/CD3#1 | na | na |
| DLL3#16/CD3#1 | 228 pM | 2 nM |
| DLL3#17/CD3#1 | <20 pM | 2 nM |

TABLE 2B-continued

Affinities (KD) of DLL3/CD3 binding proteins to human DLL3 and CD3 εγ subunit as determined by SPR analysis

| DLL3/CD3 binding protein | Recomb. human huDLL3 | Recomb. Human huCD3 εγ |
|---|---|---|
| DLL3#18/ CD3#1 | <20 pM | 3 nM |

Example 5: Generation of HEK293 Cells Expressing the Extracellular Domain and its Subdomains on the Cell Surface For generation of stable HEK293 cells expressing full-length human DLL3 (Uniprot: Q9NYJ7), cynomolgus DLL3 (UPI0003AB95BD), human DLL1 (Q00548) and human DLL4 (Q9NR61), respectively, the respective coding sequence was cloned into pcDNA3.1 (Thermo Fisher Scientific) and a FLAG-tag was inserted between the signal sequence and the extracellular domain. The expression on the cell surface was verified by using an anti-FLAG antibody (clone M2, Sigma) followed by a monoclonal anti mouse IgG1 (Acris). The extracellular domain of DLL3 consists of different subdomains:

Hu DLL3 Signal peptide: aa 1-26
Hu DLL3 N-terminal ECD domain: aa 27-175
Hu DLL3 DSL: aa 176-215
Hu DLL3 EGF1: aa 216-249
Hu DLL3 EGF2: aa 274-310
Hu DLL3 EGF3: aa 312-351
Hu DLL3 EGF4: aa 353-389
Hu DLL3 EGF5: aa 391-427
Hu DLL3 EGF6: aa 429-465
Membrane proximal peptide: aa 466-492

The following subdomains of DLL3 were expressed on the cell surface of HEK293 cells:

Hu DLL3 EGF1+2: Uniprot: Q9NYJ7 aa 216-310
Hu DLL3 EGF 2+3: Uniprot: Q9NYJ7 aa 274-351
Hu DLL3 EGF3+4: Uniprot: Q9NYJ7 aa 312-389
Hu DLL3 EGF4+5: Uniprot: Q9NYJ7 aa 353-427
Hu DLL3 EGF5+6: Uniprot: Q9NYJ7 aa 391-465
Hu DLL3 EGF6+membrane proximal peptide: Uniprot: Q9NYJ7 aa 429-492

For the generation of HEK293 cells expressing 6-His-myc tagged subdomains of human DLL3, the respective coding sequences were cloned into pcDNA 3.1 (Thermo Fisher Scientific). Constructs contain an N-terminal mouse IgG Vk leading sequence, followed by a 6-Histidin-myc tag and the respective human DLL3 domain. To ensure cell surface localization of the human DLL3 domains, all constructs were followed by a Ser/Gly-Linker, the transmembrane domain (aa266-288) and the intracellular domain (aa 289-314) of human EpCAM (P16422). The expression of the subdomains was verified using mouse monoclonal IgG2a antibodies against various domains as described in WO 2013126746. Bound monoclonal antibody was detected with an goat anti-mouse IgG (F(ab')2)-RPE (Jackson Immuno Research). The samples were measured by flow cytometry. The expression of human DLL1 and DLL4 was confirmed by FACS analysis using anti-DLL1 (R&D Systems, MAB1818) and anti-DLL4 R&D Systems, MAB1506) antibodies followed by PE-labeled anti-mouse or anti-rat secondary antibodies (see FIG. 5, right panel).

TABLE 3

Sequences of various DLL3 subdomains expressed on HEK293 cells

| ID | Construct | Sequence |
|---|---|---|
| SEQ ID NO: 110 | FLAG-tagged human DLL3 full length | MVSPRMSGLLSQTVILALIFLPQTRPDYKDDDDKAGVFELQIHS FGPGPGPGAPRSPCSARLPCRLFFRVCLKPGLSEEAAESPCALGA ALSARGPVYTEQPGAPAPDLPLPDGLLQVPFRDAWPGTFSFIIET WREELGDQIGGPAWSLLARVAGRRRLAAGGPWARDIQRAGA WELRFSYRARCEPPAVGTACTRLCRPRSAPSRCGPGLRPCAPLE DECEAPLVCRAGCSPEHGFCEQPGECRCLEGWTGPLCTVPVSTS SCLSPRGPSSATTGCLVPGPGPCDGNPCANGGSCSETPRSFECTC PRGFYGLRCEVSGVTCADGPCFNGGLCVGGADPDSAYICHCPP GFQGSNCEKRVDRCSLQPCRNGGLCLDLGHALRCRCRAGFAGP RCEHDLDDCAGRACANGGTCVEGGGAHRCSCALGFGGRDCRE RADPCAARPCAHGGRCYAHFSGLVCACAPGYMGARCEFPVHP DGASALPAAPPGLRPGDPQRYLLPPALGLLVAAGVAGAALLLV HVRRRGHSQDAGSRLLAGTPEPSVHALPDALNNLRTQEGSGDG PSSSVDWNRPEDVDPQGIYVISAPSIYAREVATPLFPPLHTGRAG QRQHLLFPYPSSILSVK |
| SEQ ID NO: 111 | FLAG-tagged cyno DLL3 full length | MVSPRMSRLLSQTVILALIFIPQARPDYKDDDDKAGVFELQIHSF GPGPGPGAPRSPCSARGPCRLFFRVCLKPGLSEEAAESPCALGA ALSARGPVYTEQPEAPAPDLPLPNGLLQVPFRDAWPGTFSLIIET WREELGDQIGGPAWSLLARVTRRRRLAAGGPWARDIQRAGAW ELRFSYRARCELPAVGTACTRLCRPRSAPSRCGPGLRPCAPLED ECEAPPVCRAGCSLEHGFCEQPGECRCLEGWTGPLCMVPVSTS SCLGLRGPSSTTTGCLVPGPGPCDGNPCANGGSCSETPGSFECT CPRGFYGLRCEVSGVTCADGPCFNGGLCVGGADPDSAYICHCP PGFQGSNCEKRVDRCSLQPCRNGGLCLDLGHALRCRCRAGFAG PRCEHDLDDCAGRACANGGTCVEGGGAHRCSCALGFGGRNCR ERADPCAARPCAHGGRCYAHFSGLVCACAPGYMGARCEFPVH PDGVSALPAAPPGLRPGDPQRYLLPPALGLLVAAGVAGAALLL VHVRRRGHAQDAGSRLLAGTPEPSVHALPDALNNLRTQEGPG DVPSSSVDWNRPEDVDSRGIYVISAPSIYAREVAMPLFPPLHTG RAGQRQNLLFPFPSSILSVK |

TABLE 3-continued

Sequences of various DLL3 subdomains expressed on HEK293 cells

| ID | Construct | Sequence |
|---|---|---|
| SEQ ID NO: 112 | FLAG-tagged human DLL1 full length | MGSRCALALAVLSALLCDYKDDDDKQVWSSGVFELKLQEFVN KKGLLGNRNCCRGGAGPPPCACRTFFRVCLKHYQASVSPEPPC TYGSAVTPVLGVDSFSLPDGGGADSAFSNPIRFPFGFTWPGTFSL IIEALHTDSPDDLATENPERLISRLATQRHLTVGEEWSQDLHSSG RTDLKYSYRFVCDEHYYGEGCSVFCRPRDDAFGHFTCGERGEK VCNPGWKGPYCTEPICLPGCDEQHGFCDKPGECKCRVGWQGR YCDECIRYPGCLHGTCQQPWQCNCQEGWGGLFCNQDLNYCTH HKPCKNGATCTNTGQGSYTCSCRPGYTGATCELGIDECDPSPC KNGGSCTDLENSYSCTCPPGFYGKICELSAMTCADGPCFNGGR CSDSPDGGYSCRCPVGYSGFNCEKKIDYCSSSPCSNGAKCVDLG DAYLCRCQAGFSGRHCDDNVDDCASSPCANGGTCRDGVNDFS CTCPPGYTGRNCSAPVSRCEHAPCHNGATCHERGHRYVCECAR GYGGPNCQFLLPELPPGPAVVDLTEKLEGQGGPFPWVAVCAGV ILVLMLLLGCAAVVVCVRLRLQKHRPPADPCRGETETMNNLA NCQREKDISVSIIGATQIKNTNKKADFHGDHSADKNGFKARYPA VDYNLVQDLKGDDTAVRDAHSKRDTKCQPQGSSGEEKGTPTT LRGGEASERKRPDSGCSTSKDTKYQSVYVISEEKDECVIATEV |
| SEQ ID NO: 113 | FLAG-tagged human DLL4 full length | MAAASRSASGWALLLLLVALWQQRAAGDYKDDDDKSGVFQLQ LQEFINERGVLASGRPCEPGCRTFFRVCLKHFQAVVSPGPCTFG TVSTPVLGTNSFAVRDDSSGGGRNPLQLPFNFTWPGTFSLIIEA WHAPGDDLRPEALPPDALISKIAIQGSLAVGQNWLLDEQTSTLT RLRYSYRVICSDNYYGDNCSRLCKKRNDHFGHYVCQPDGNLS CLPGWTGEYCQQPICLSGCHEQNGYCSKPAECLCRPGWQGRLC NECIPHNGCRHGTCSTPWQCTCDEGWGGLFCDQDLNYCTHHS PCKNGATCSNSGQRSYTCTCRPGYTGVDCELELSECDSNPCRN GGSCKDQEDGYHCLCPPGYYGLHCEHSTLSCADSPCFNGGSCR ERNQGANYACECPPNFTGSNCEKKVDRCTSNPCANGGQCLNR GPSRMCRCRPGFTGTYCELHVSDCARNPCAHGGTCHDLENGL MCTCPAGFSGRRCEVRTSIDACASSPCFNRATCYTDLSTDTFVC NCPYGFVGSRCEFPVGLPPSFPWVAVSLGVGLAVLLVLLGMVA VAVRQLRLRRPDDGSREAMNNLSDFQKDNLIPAAQLKNTNQK KELEVDCGLDKSNCGKQQNHTLDYNLAPGPLGRGTMPGKFPH SDKSLGEKAPLRLHSEKPECRISAICSPRDSMYQSVCLISEERNE CVIATEV |
| SEQ ID NO: 114 | FLAG tag | DYKDDDDK |
| SEQ ID NO: 115 | Vk leader | METDTLLLWVLLLWVPGSTGD |
| SEQ ID NO: 116 | 6His-myc tag | HHHHHHEQKLISEEDL |
| SEQ ID NO: 117 | Ser/Gly linker | SGGGGS |
| SEQ ID NO: 118 | EpCAM transmembrane domain | AGVIAVIVVVVIAVVAGIVVLVI |
| SEQ ID NO: 119 | EpCAM intracellular domain | SRKKRMAKYEKAEIKEMGEMHRELNA |
| SEQ ID NO: 120 | EGF1 | APLVCRAGCSPEHGFCEQPGECRCLEGWTGPLCT |
| SEQ ID NO: 121 | Hu DLL3 EGF 1 + 2 | APLVCRAGCSPEHGFCEQPGECRCLEGWTGPLCTVPVSTSSCLS PRGPSSATTGCLVPGPGPCDGNPCANGGSCSETPRSFECTCPRG FYGLRCE |
| SEQ ID NO: 122 | EGF2 | GPGPCDGNPCANGGSCSETPRSFECTCPRGFYGLRCE |
| SEQ ID NO: 123 | Hu DLL3 EGF 2 + 3 | GPGPCDGNPCANGGSCSETPRSFECTCPRGFYGLRCEVSGVTCA DGPCFNGGLCVGGADPDSAYICHCPPGFQGSNCE |
| SEQ ID NO: 124 | EGF3 | SGVTCADGPCFNGGLCVGGADPDSAYICHCPPGFQGSNCE |

TABLE 3-continued

Sequences of various DLL3 subdomains expressed on HEK293 cells

| ID | Construct | Sequence |
|---|---|---|
| SEQ ID NO: 125 | Hu DLL3 EGF 3 + 4 | SGVTCADGPCFNGGLCVGGADPDSAYICHCPPGFQGSNCEKRV DRCSLQPCRNGGLCLDLGHALRCRCRAGFAGPRCE |
| SEQ ID NO: 126 | EGF4 | RVDRCSLQPCRNGGLCLDLGHALRCRCRAGFAGPRCE |
| SEQ ID NO: 127 | Hu DLL3 EGF 4 + 5 | RVDRCSLQPCRNGGLCLDLGHALRCRCRAGFAGPRCEHDLDD CAGRACANGGTCVEGGGAHRCSCALGFGGRDCR |
| SEQ ID NO: 128 | EGF5 | DLDDCAGRACANGGTCVEGGGAHRCSCALGFGGRDCR |
| SEQ ID NO: 129 | Hu DLL3 EGF 5 + 6 | DDCAGRACANGGTCVEGGGAHRCSCALGFGGRDCRERADPCA ARPCAHGGRCYAHFSGLVCACAPGYMGARCE |
| SEQ ID NO: 130 | EGF6 | RADPCAARPCAHGGRCYAHFSGLVCACAPGYMGARCE |
| SEQ ID NO: 131 | Hu DLL3 EGF6-membrane proximal peptide | RADPCAARPCAHGGRCYAHFSGLVCACAPGYMGARCEFPVHP DGASALPAAPPGLRPGDPQRYL |
| SEQ ID NO: 132 | Membrane proximal peptide | FPVHPDGASALPAAPPGLRPGDPQRYL |

Example 6: Epitope Domain Mapping of DLL3/CD3 Binding Proteins

Figure 2:
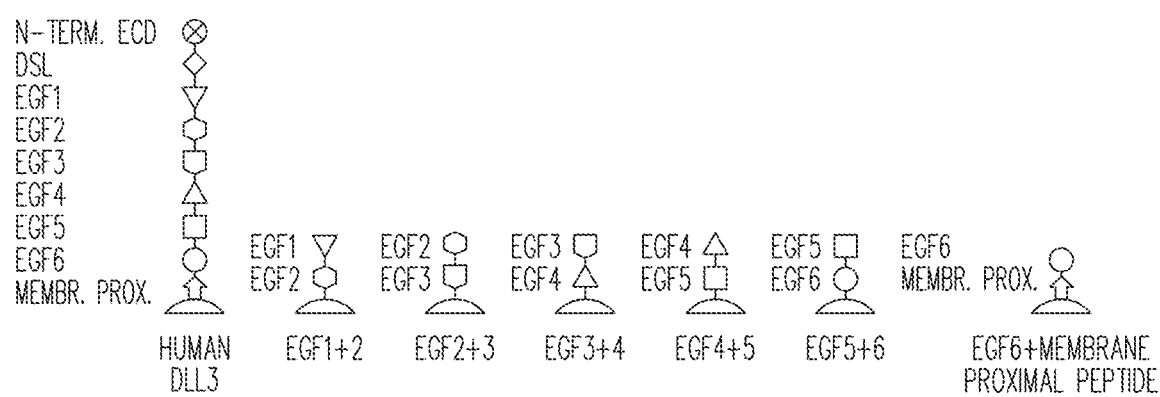
FIG. 2: Schematic representation of the DLL3 full length protein and DLL3 domain constructs expressed on HEK293 cells for epitope domain mapping. For the DLL3 domain constructs, the transmembrane and the intracellular domains are derived from EpCAM.

Epitope domains were determined by binding of DLL3/CD3 binding proteins to recombinant cell lines expressing subdomains of DLL3 (see FIG. 2). Generation of these cell lines is described under Example 5.

DLL3/CD3 binding proteins were produced by transient transfection of CHO-E cells with the pTT5 vectors carrying the chain-encoding genes, as described in Example 2.

Figure 3A:
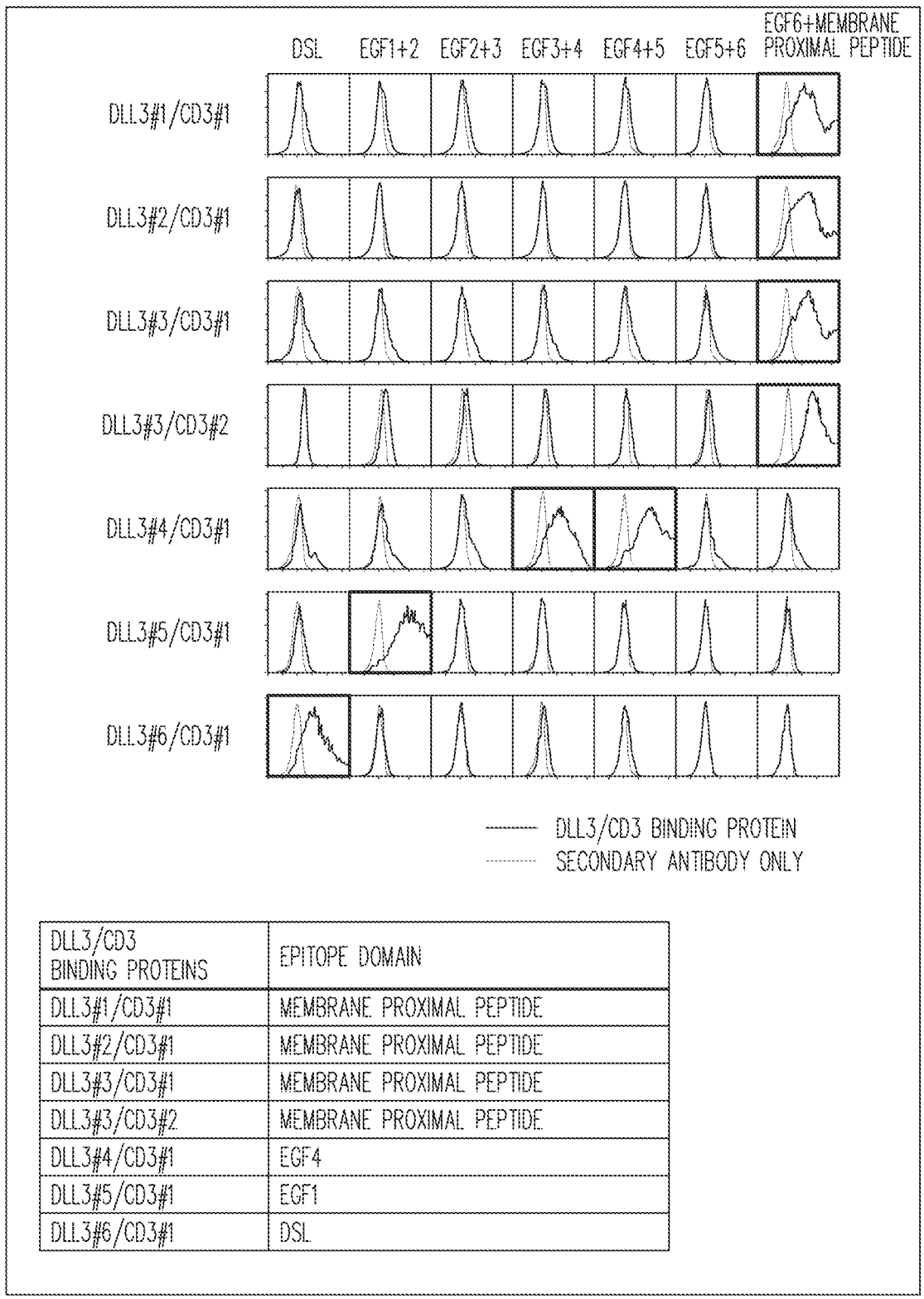
FIG. 3A: DLL3 epitope domain mapping of seven exemplary DLL3/CD3 binding proteins. Exemplary DLL3/CD3 binding proteins recognizing the membrane proximal peptide, EGF4, EGF1 and DSL domains of DLL3. The y-axis depicts counts, the x-axis depicts PE-A (phycoerythrin signal area).
Figure 3B:
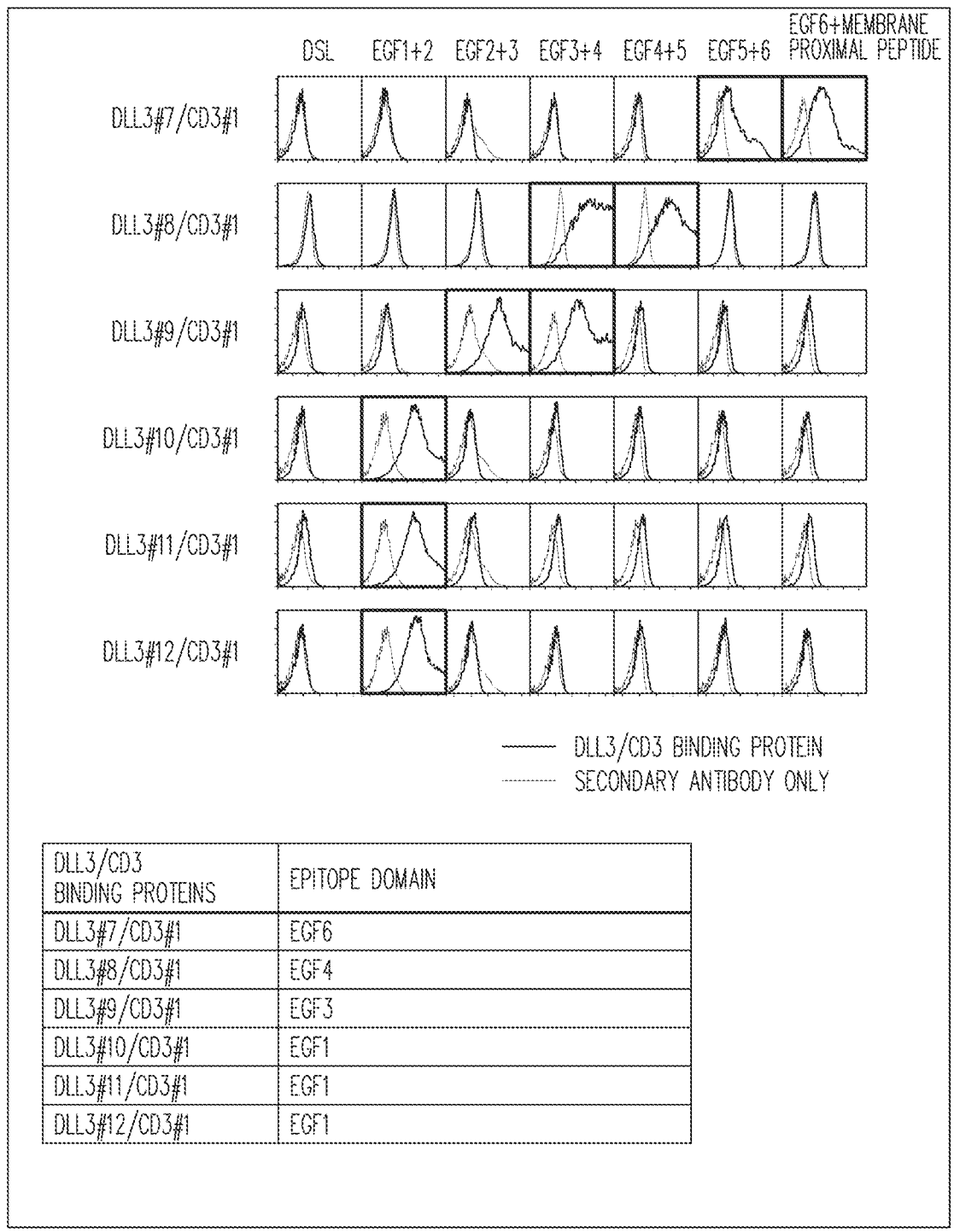
FIG. 3B: DLL3 epitope domain mapping of six exemplary DLL3/CD3 binding proteins. Exemplary DLL3/CD3 binding proteins recognizing the EGF1, EGF3, EGF4 or EGF6 of DLL3. The y-axis depicts counts, the x-axis depicts PE-A (phycoerythrin signal).
Figure 3C:
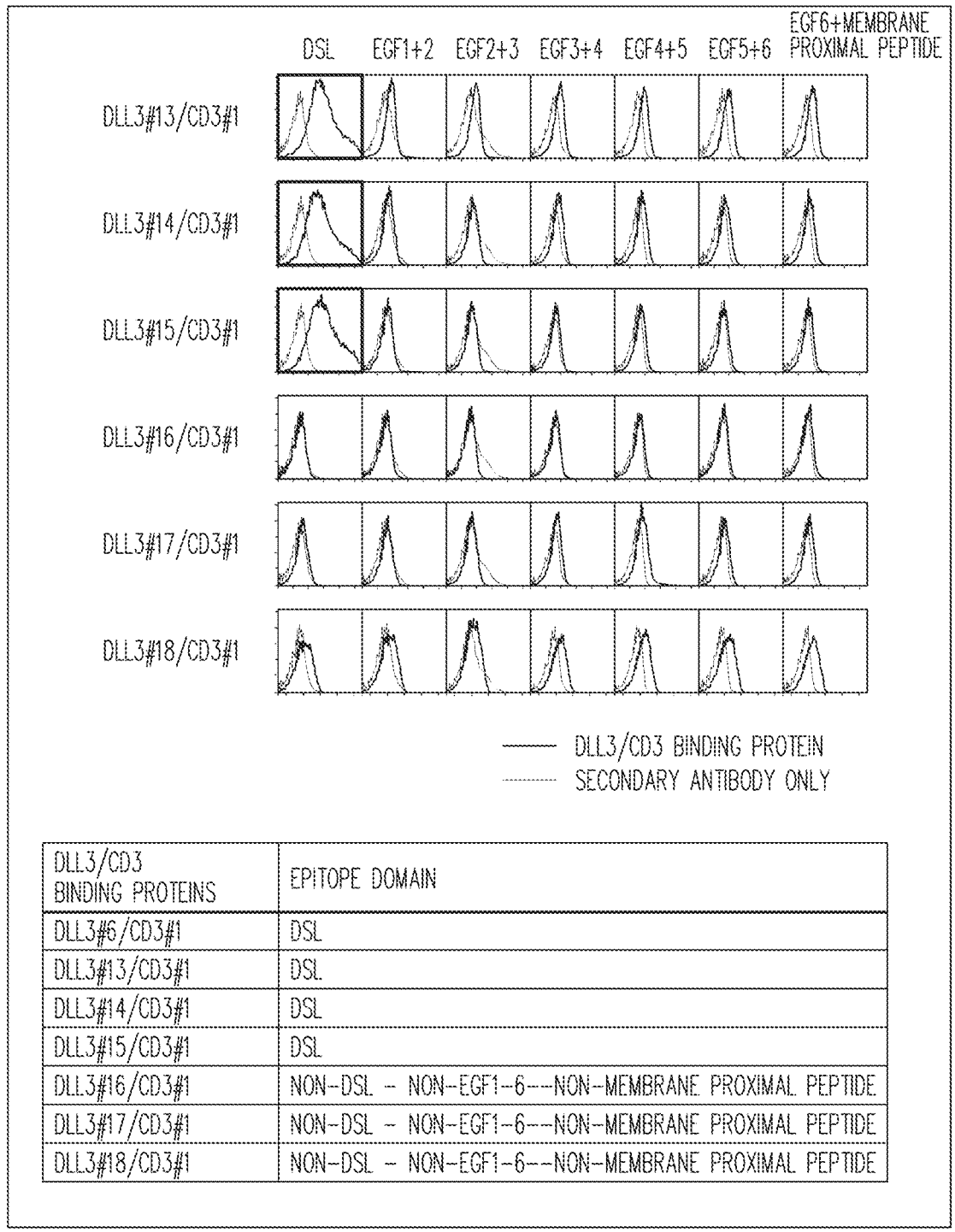
FIG. 3C: DLL3 epitope domain mapping of six exemplary DLL3/CD3 binding proteins. Exemplary DLL3/CD3 binding proteins recognizing the DSL domains or neither DSL, EGF, nor membrane proximal peptide of DLL3. The y-axis depicts counts, the x-axis depicts PE-A (phycoerythrin signal).

Cells expressing subdomains of DLL3 were stained with two-step purified DLL3/CD3 binding proteins at 1.6 nM in FACS buffer (PBS/0.5% BSA/0.05% sodium azide). Bound molecules were detected with PE-conjugated anti-human secondary antibody (Sigma-Aldrich, #P8047). As negative control, cells were incubated with secondary antibody only. The samples were measured by flow-cytometry. FIG. 3A-C show exemplary binders (DLL3/CD3 binding proteins comprising a DLL3 chain of SEQ ID NO:73, SEQ ID NO:74, SEQ ID NO:75, SEQ ID NO:76, SEQ ID NO:77, SEQ ID NO:78, SEQ ID NO:241, SEQ ID NO:242, SEQ ID NO:243, SEQ ID NO:244, SEQ ID NO:245, SEQ ID NO:246, SEQ ID NO:247, SEQ ID NO:248, SEQ ID NO:249, SEQ ID NO:250, SEQ ID NO:251 or SEQ ID NO:252 and a CD3 chain of SEQ ID NO:79, and a DLL3 binding protein comprising a DLL3 chain of SEQ ID NO:75 and a CD3 chain of SEQ ID NO:80) binding to different regions of DLL3. The sequences of the epitope domains are listed in Example 5, Table 3.

Example 7: Interspecies Cross-Reactivity

Interspecies cross-reactivity was determined by binding of DLL3/CD3 binding proteins to NCI-H82 (HTB-175™) and SHP77 (ATCC®, CRL2195™) cells, two SCLC cell lines, as well as to a recombinant cell line expressing cynomolgus DLL3 (generation of cell line described in Example 5).

Figure 4:
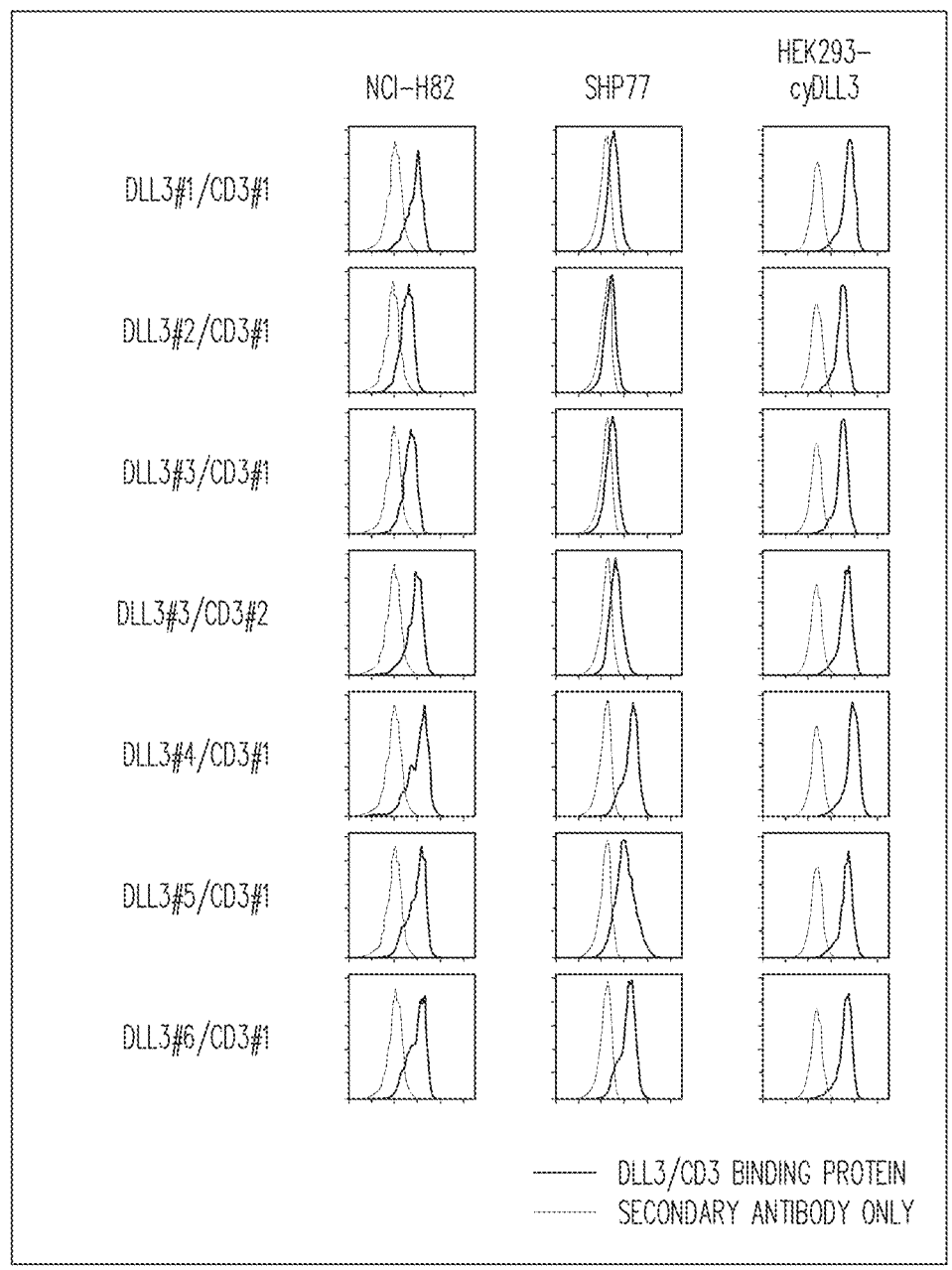
FIG. 4: Binding of seven exemplary DLL3/CD3 binding proteins to cell lines expressing human and cyno DLL3. The y-axis depicts counts, the x-axis depicts PE-A (phycoerythrin signal area).

DLL3/CD3 binding proteins were produced by transient transfection of CHO-E cells with the pTT5 vectors carrying the chain-encoding genes, as described in Example 2. Cells expressing human or cynomolgus DLL3 were stained with 1.6 nM of two-step purified DLL3/CD3 binding proteins with increasing concentrations in FACS buffer (PBS/0.5% BSA/0.05% sodium azide). Bound molecules were detected with PE-conjugated anti-human secondary antibody (Sigma-Aldrich, #P8047). As negative control, cells were incubated with secondary antibody only. The samples were measured by flow-cytometry. FIG. 4 shows binding to human and cyno DLL3-expressing cells of seven exemplary DLL3/CD3 binding proteins (DLL3/CD3 binding proteins comprising a DLL3 chain of SEQ ID NO:73 and a CD3 chain of SEQ ID NO:79, a DLL3 chain of SEQ ID NO:74 and a CD3 chain of SEQ ID NO:79, a DLL3 chain of SEQ ID NO:75 and a CD3 chain of SEQ ID NO:79, a DLL3 chain of SEQ ID NO:75 and a CD3 chain of SEQ ID NO:80, a DLL3 chain of SEQ ID NO:76 and a CD3 chain of SEQ ID NO:79, a DLL3 chain of SEQ ID NO:77 and a CD3 chain of SEQ ID NO:79 or a DLL3 chain of SEQ ID NO:78 and a CD3 chain of SEQ ID NO:79).

Example 8: Confirmation of the Absence of Binding to Human DLL1 and DLL4

Absence of cross-reactivity to human DLL1 and DLL4 was determined by binding of DLL3/CD3 binding proteins to recombinant cells expressing human DLL1 or DLL4 (generation of cell lines described in Example 5).

DLL3/CD3 binding proteins were produced by transient transfection of CHO-E cells with the pTT5 vectors carrying the chain-encoding genes, as described in Example 2.

Cells expressing DLL1 and DLL4 were stained with 1.6 nM of two-step purified DLL3/CD3 binding proteins with increasing concentrations in FACS buffer (PBS/0.5% BSA/ 0.05% sodium azide). Bound molecules were detected with PE-conjugated anti-human secondary antibody (Sigma-Aldrich, #P8047). As negative control, cells were incubated with secondary antibody only. The samples were measured by flow-cytometry. Expression of human DLL1 and DLL4 was confirmed by FACS analysis using anti-DLL1 (R&D Systems, MAB1818) and anti-DLL4 R&D Systems, MAB1506) antibodies followed by PE-labeled anti-mouse or anti-rat secondary antibodies. FIG. 5 shows binding of seven exemplary DLL3/CD3 binding proteins (DLL3/CD3 binding proteins comprising a DLL3 chain of SEQ ID NO:73 and a CD3 chain of SEQ ID NO:79, a DLL3 chain of SEQ ID NO:74 and a CD3 chain of SEQ ID NO:79, a DLL3 chain of SEQ ID NO:75 and a CD3 chain of SEQ ID NO:79, a DLL3 chain of SEQ ID NO:75 and a CD3 chain of SEQ ID NO:80, a DLL3 chain of SEQ ID NO:76 and a CD3 chain of SEQ ID NO:79, a DLL3 chain of SEQ ID NO:77 and a CD3 chain of SEQ ID NO:79 or a DLL3 chain of SEQ ID NO:78 and a CD3 chain of SEQ ID NO:79) to human DLL1 and DLL4-expressing cells.

Example 9: Binding of DLL3/CD3 Binding Proteins to SCLC Cell Lines and T Cells

Binding of DLL3/CD3 binding proteins to human SCLC cell lines was tested by flow cytometry of NCI-H82 (HTB-175™) and SHP77 (ATCC®, CRL-2195™). DLL3/CD3 binding proteins were produced, as described in Example 2.

Human peripheral blood mononuclear cells (PBMCs) were prepared by Ficoll density gradient centrifugation from enriched lymphocyte preparations (buffy coats), a side product of blood banks collecting blood for transfusions. All buffy coats were obtained after informed consent in accordance with the Declaration of Helsinki and with approval of the cantonal ethical committee in Austria and PBMCs were prepared the same day of collection. Therefore, mononuclear cells were isolated by Ficoll density gradient centrifugation (35 min without brake at 1400 rpm) and extensive washes with PBS. Remaining erythrocytes were removed by incubating for 3 minutes in ACK lysis buffer (Thermo Fisher Scientific, A1049201), followed by washing in PBS, before suspension in assay medium containing RPMI 1640 GlutaMAX (Gibco #61870-010), 5% human AB serum AB (Gemini, GemCell cat #100-512 LOT #H56500I)+1% MEM-NEAA (Gibco #11140-035), 10 mM HEPES (Affymetrix #7365-49-9), 10 µM beta-Mercaptoethanol (Gibco #21985-023) and sodium pyruvat (Gibco #11360-039).

T-cells were isolated by negative selection using the Pan T Cell Isolation Kit II (Miltenyi Biotec #130-091-156). In brief, cells were resuspend in 40 µl buffer PBS/0.5% BSA (Gibco ref #041-94553 M)/2 mM EDTA (Invitrogen ref #15575-038) per 10 Mio cells and incubated with 10 µl of Biotin-Antibody cocktail per 10 Mio cells for 5 min at 4° C. Subsequently, 30 µl buffer and 20 µl anti-biotin MicroBeds/10 million cells were added and incubated for 10 min at 4° C. Subsequently the mixture was placed in a pre-rinsed 25LS column (Miltenyi Biotec #130-042-401) in the magnetic field of suitable MACS separator (Miltenyi Biotec). Flow-through was collected and washed in assay medium.

Figure 6A:
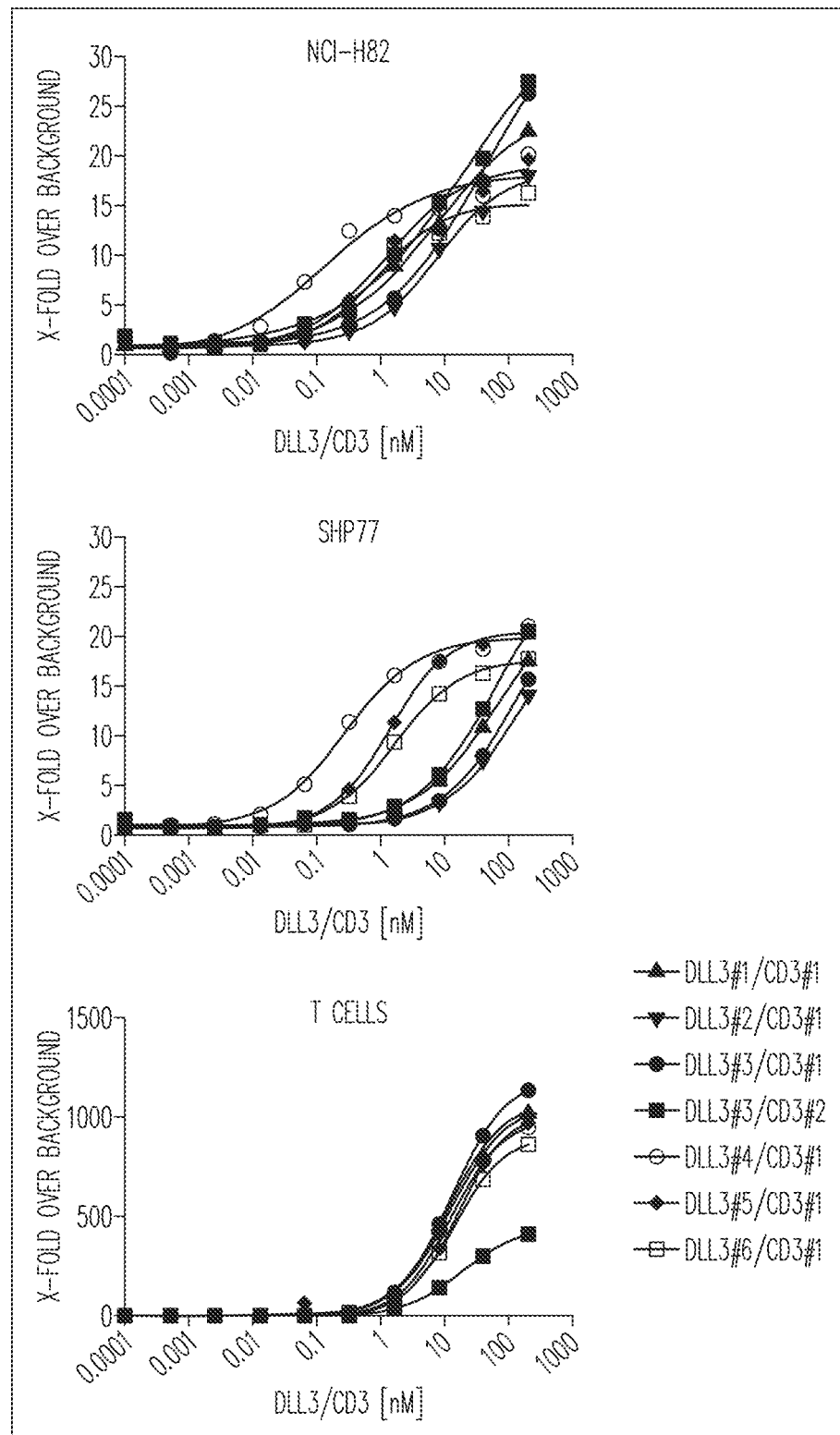
FIG. 6A: Binding of seven exemplary DLL3/CD3 binding proteins to SCLC cell lines; NCI-H82 (upper panel) and SHP77 (middle panel), and human T cells (lower panel) by flow cytometry analysis.
Figure 6B:
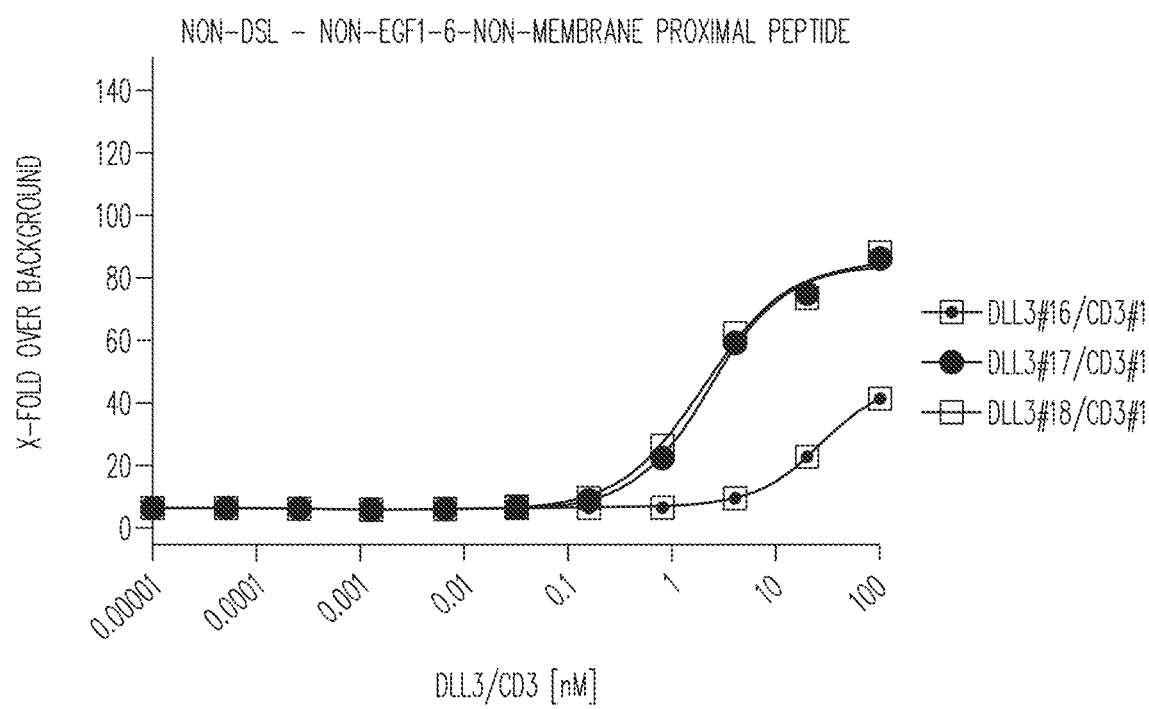
FIG. 6 B: Binding of exemplary DLL3/CD3 binding proteins (directed to a peptide that is neither the DSL nor the EGF1-6 nor the membrane proximal peptide) to SHP77 cells.
Figure 6C:
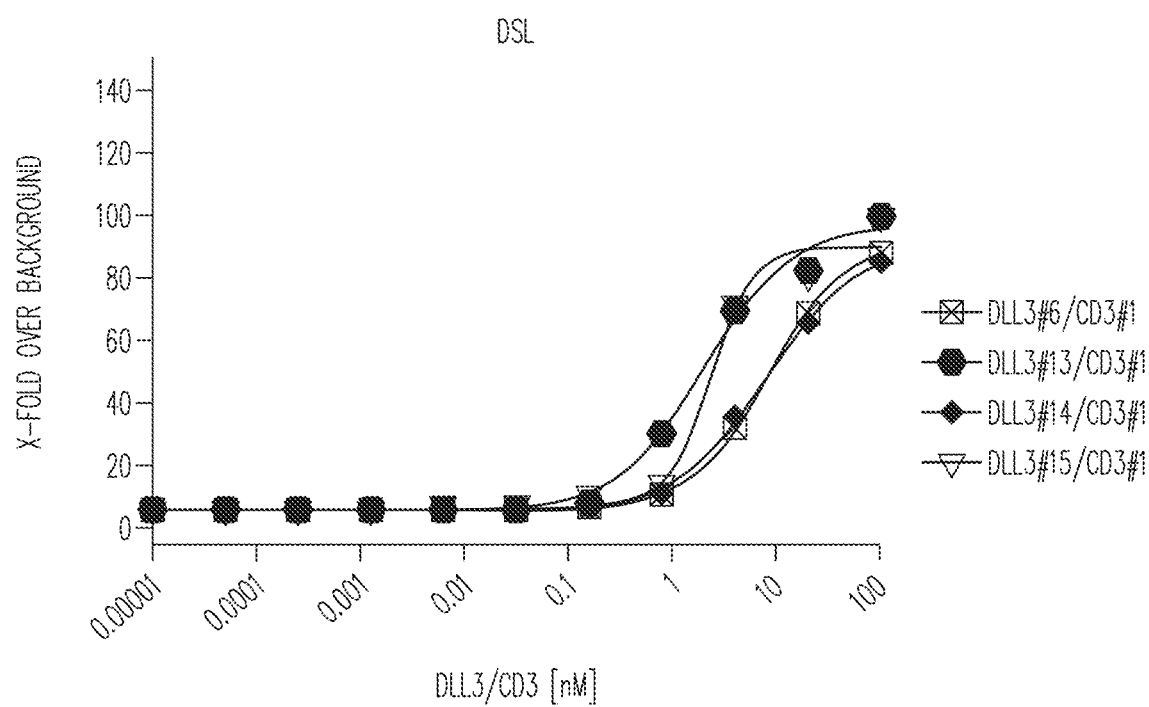
Figure 6D:
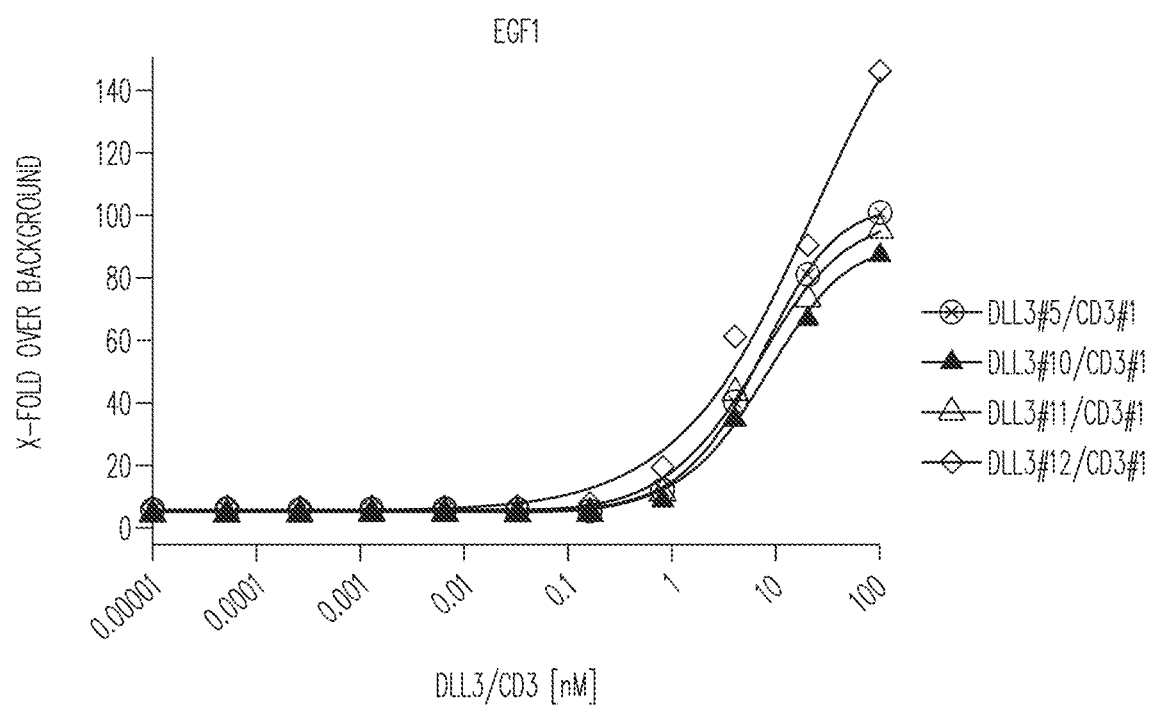
Figure 6E:
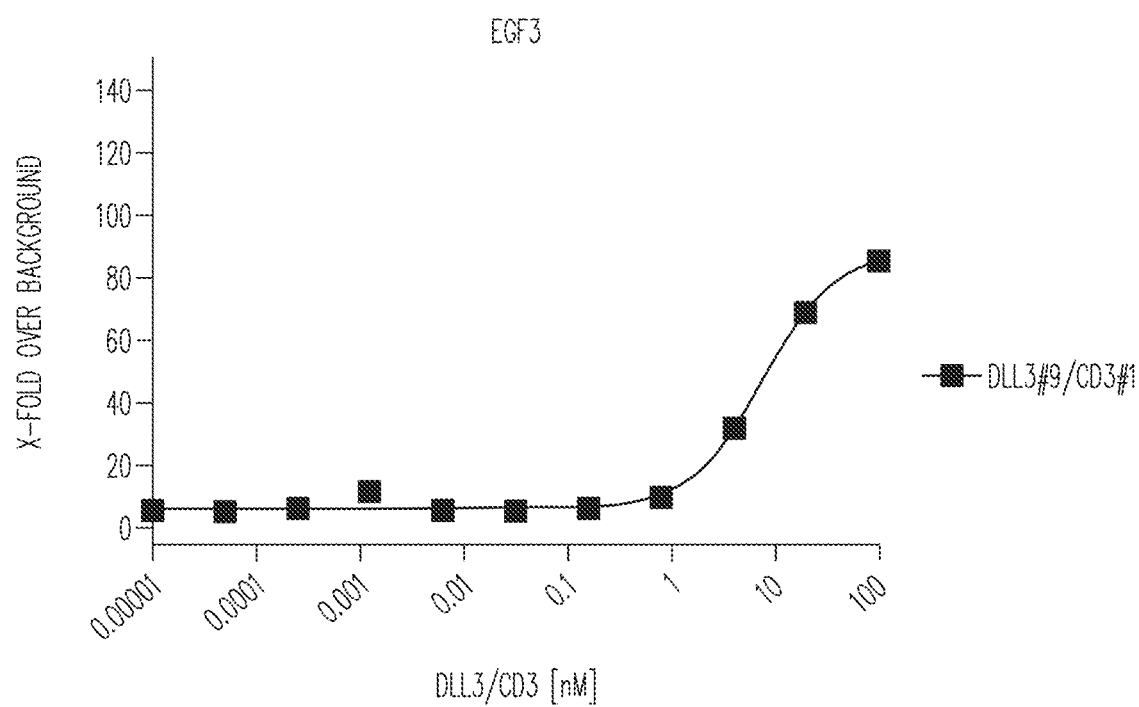
Figure 6F:
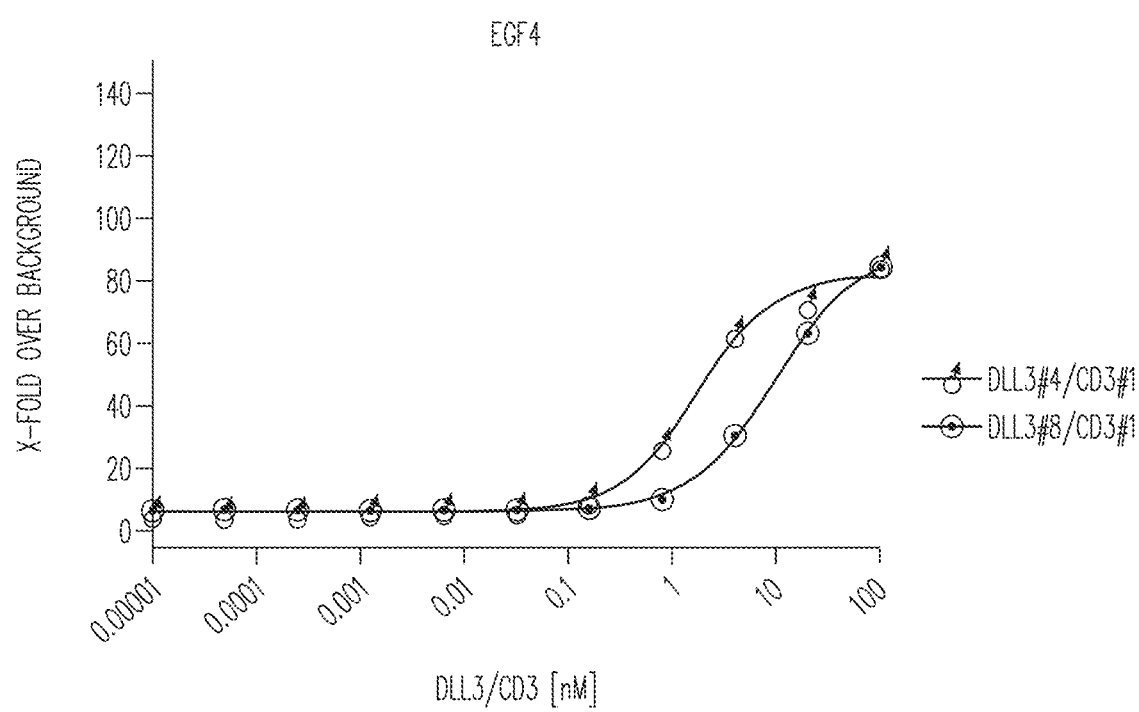
Figure 6G:
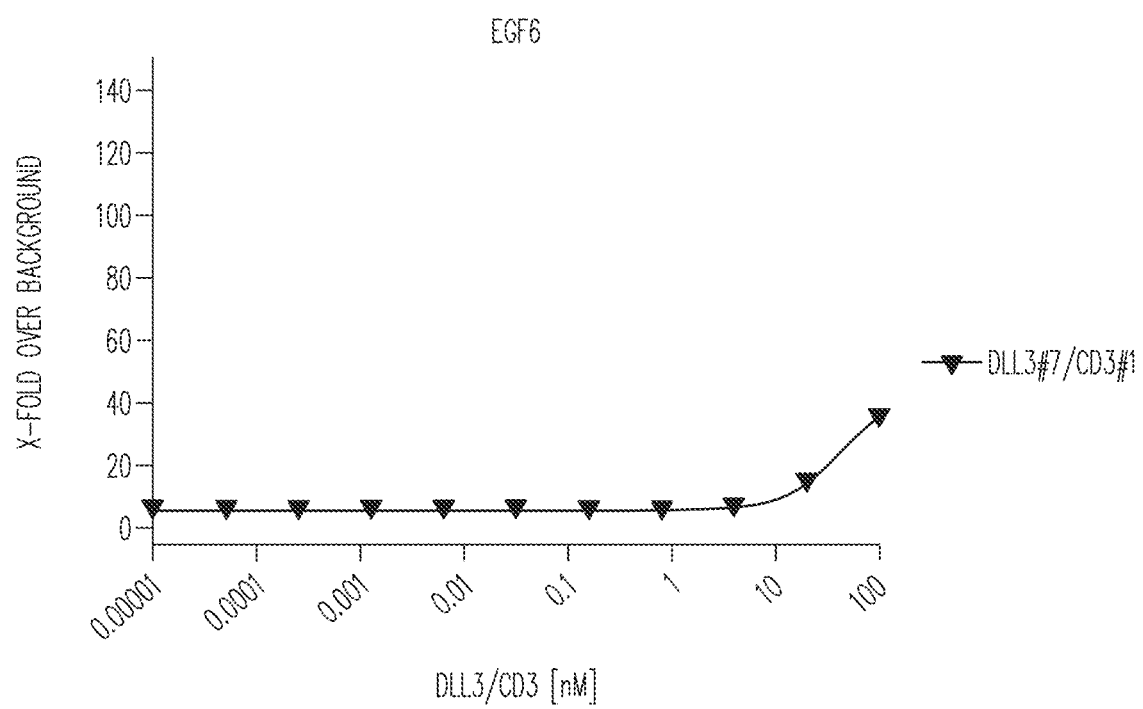
Figure 6H:
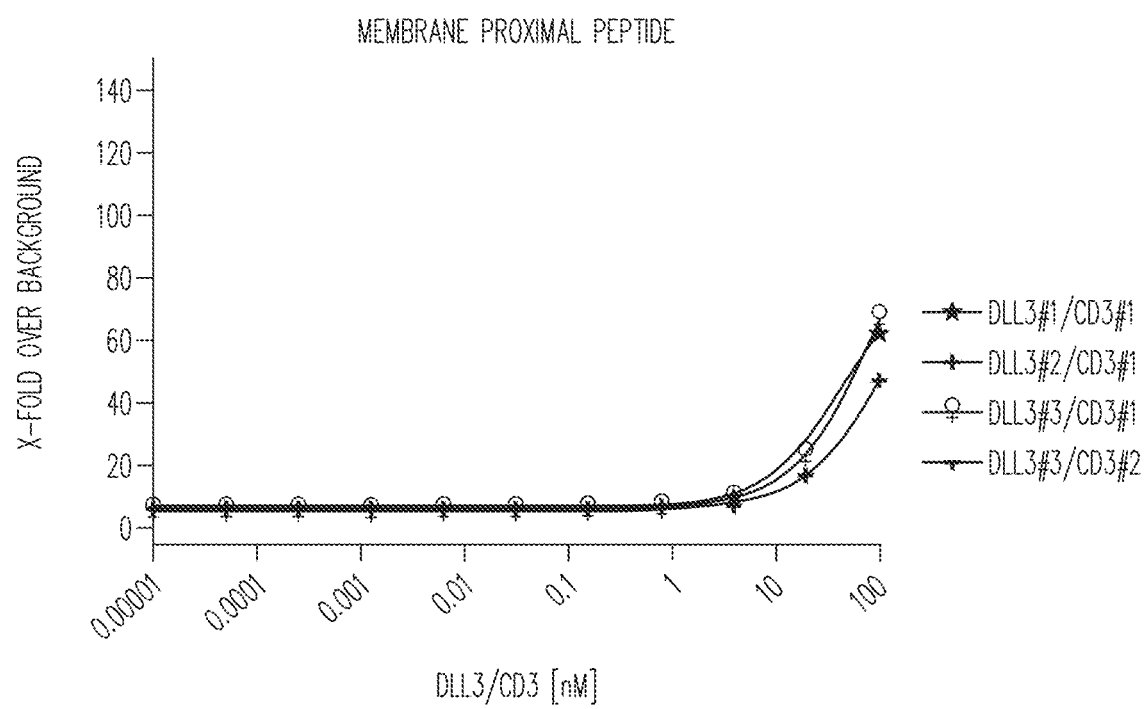
Figure 6I:
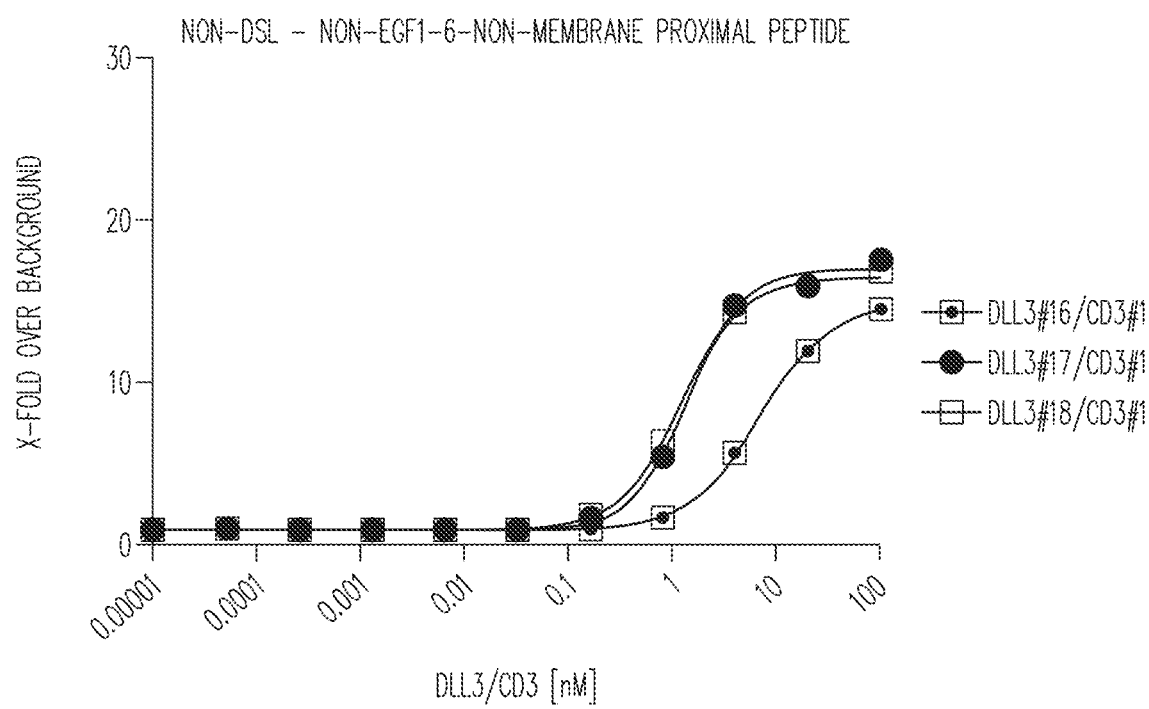
Figure 6J:
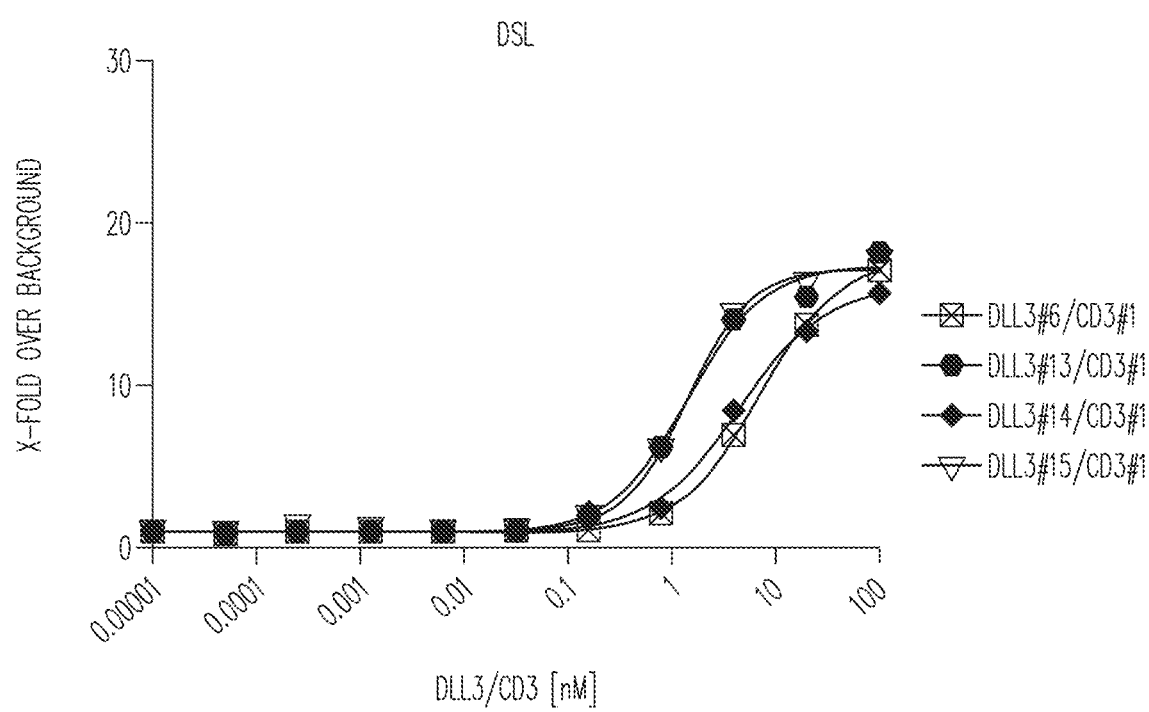
Figure 6K:
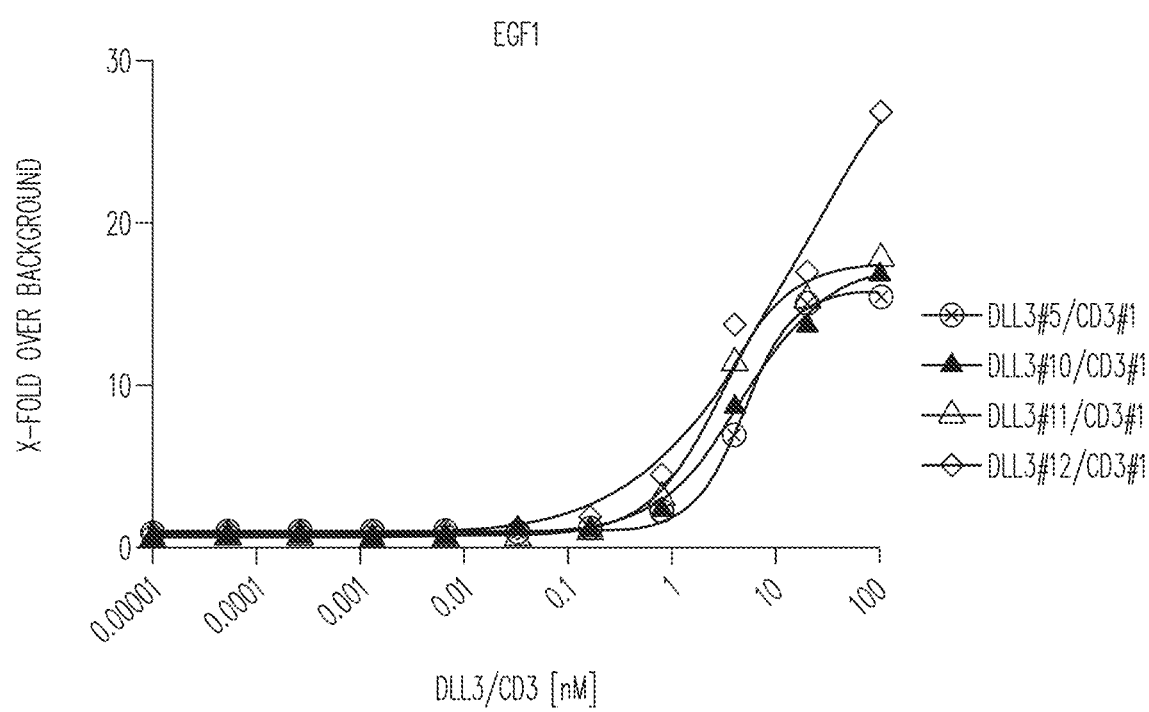
Figure 6L:
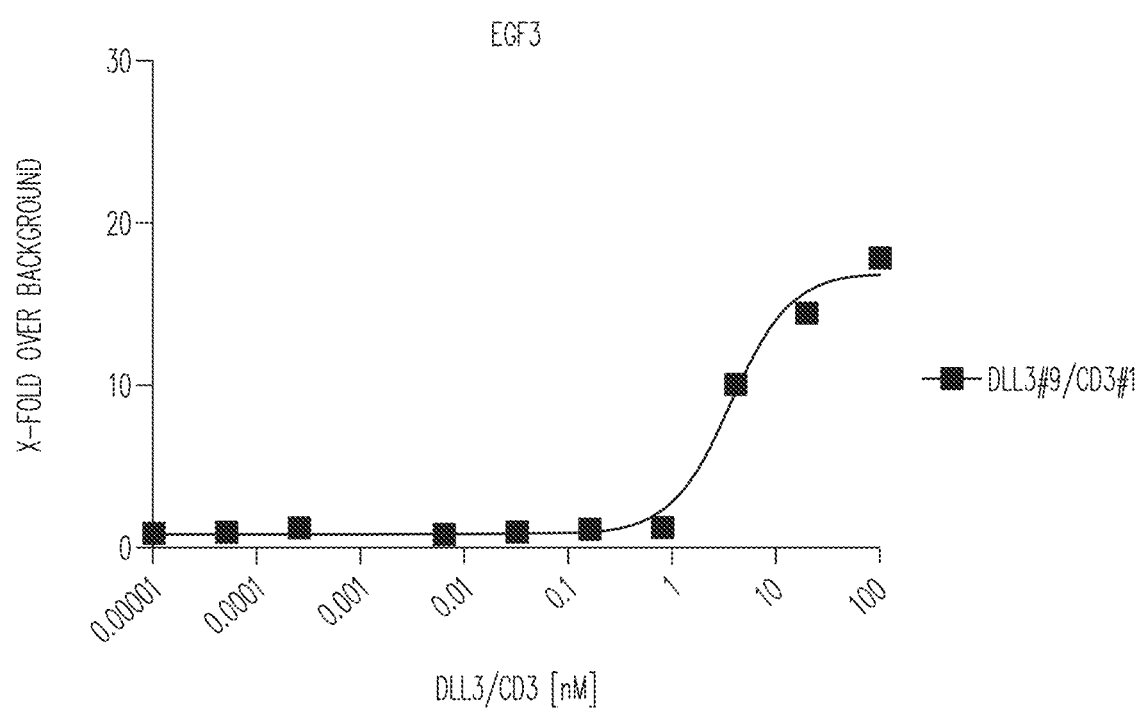
Figure 6M:
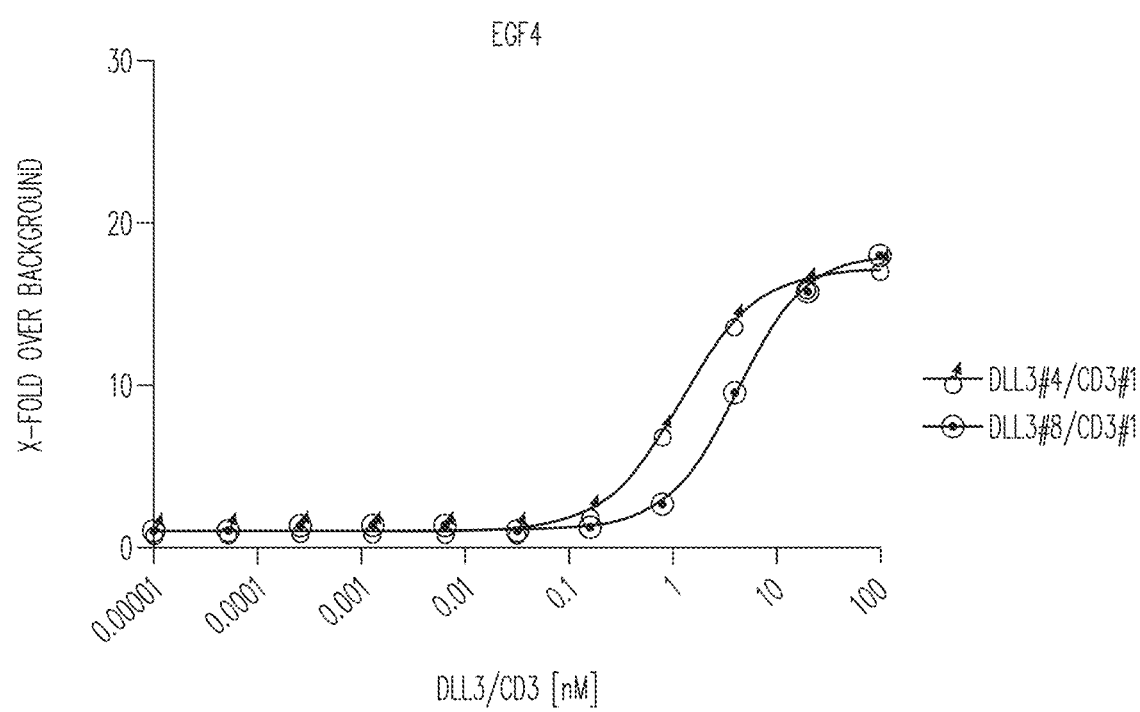
Figure 6N:
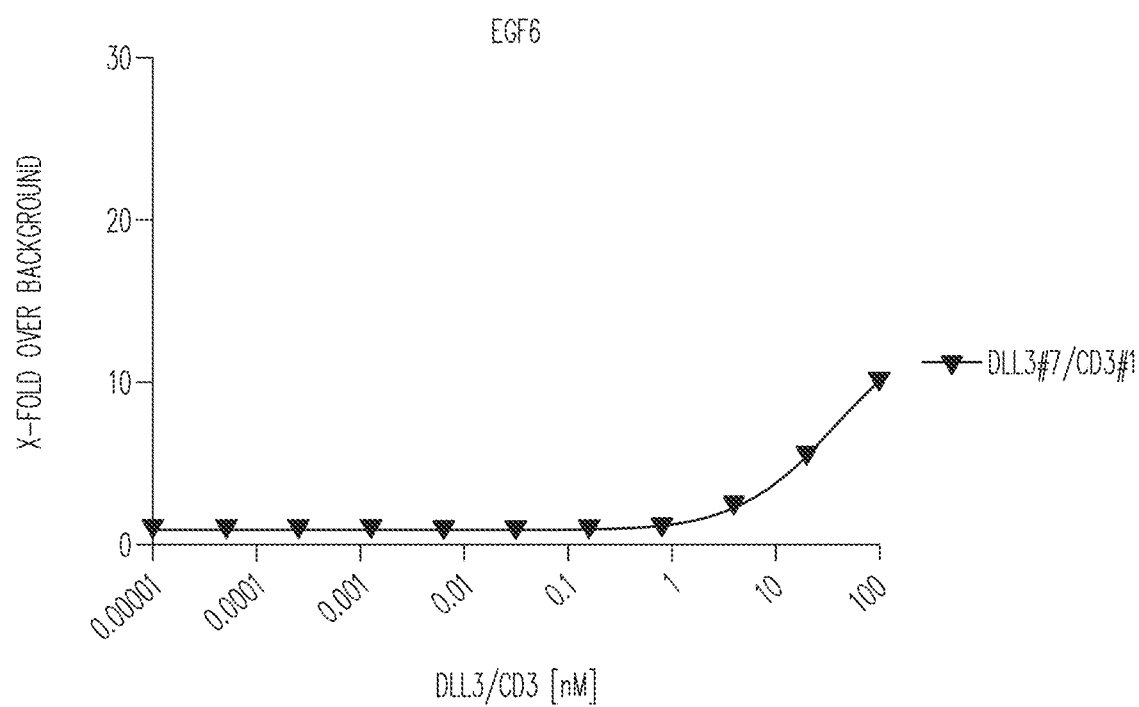
Figure 6O:
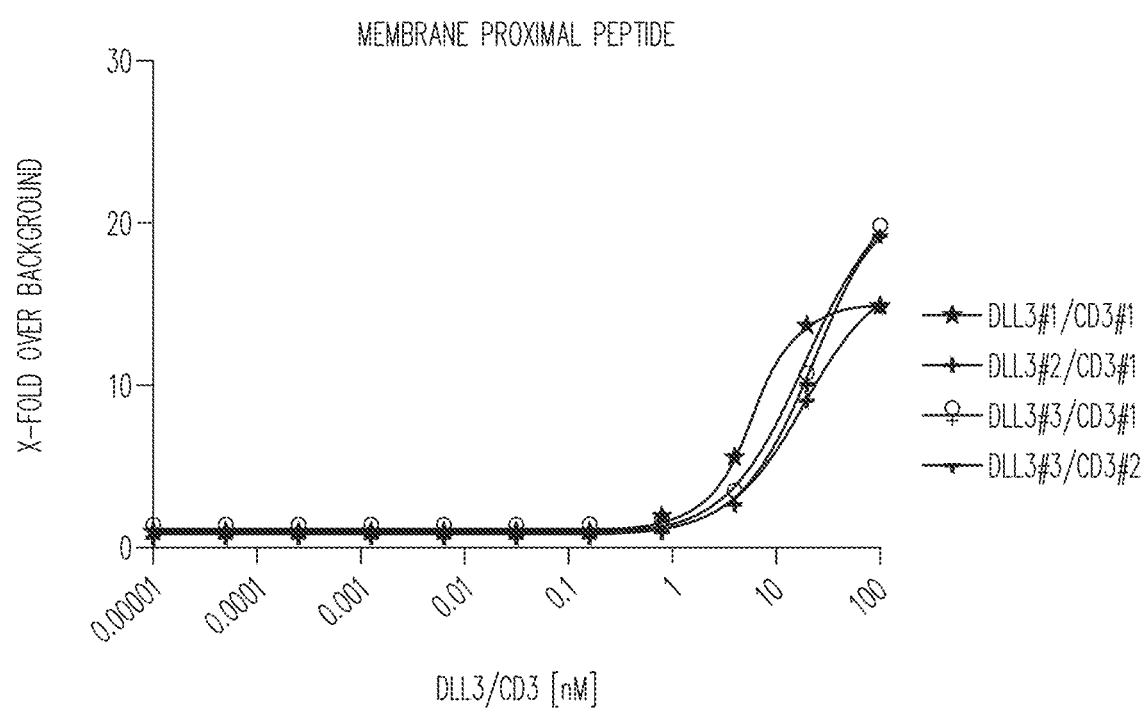
Figure 6P:
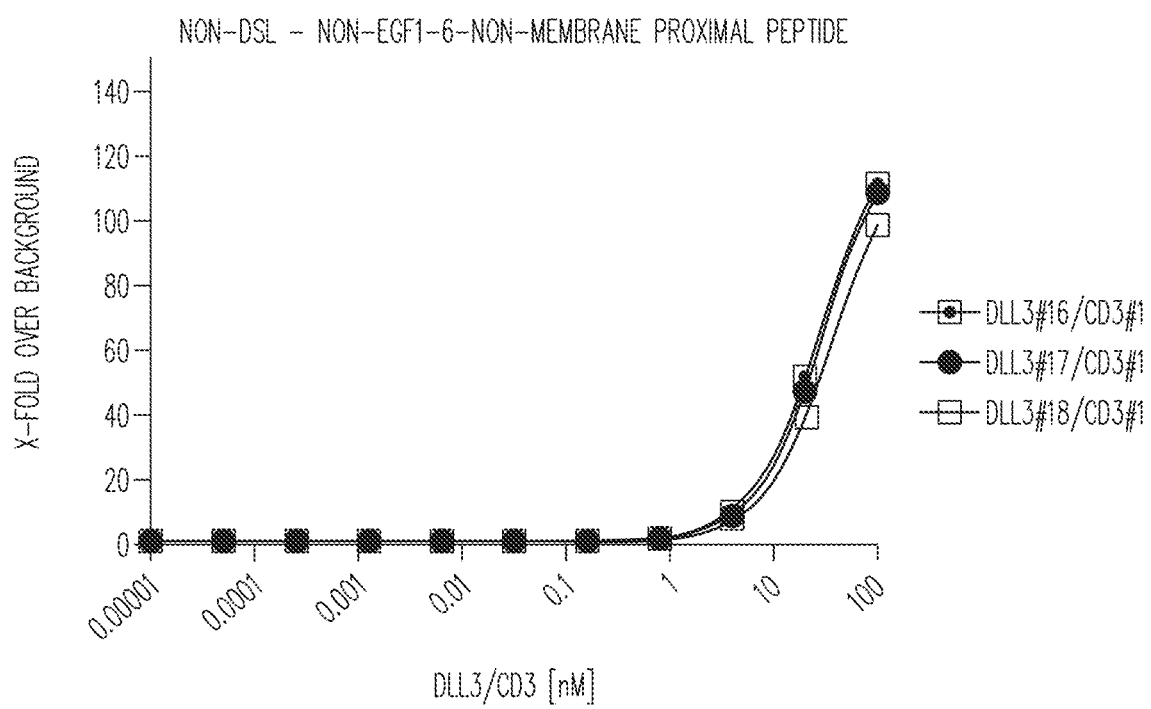
Figure 6Q:
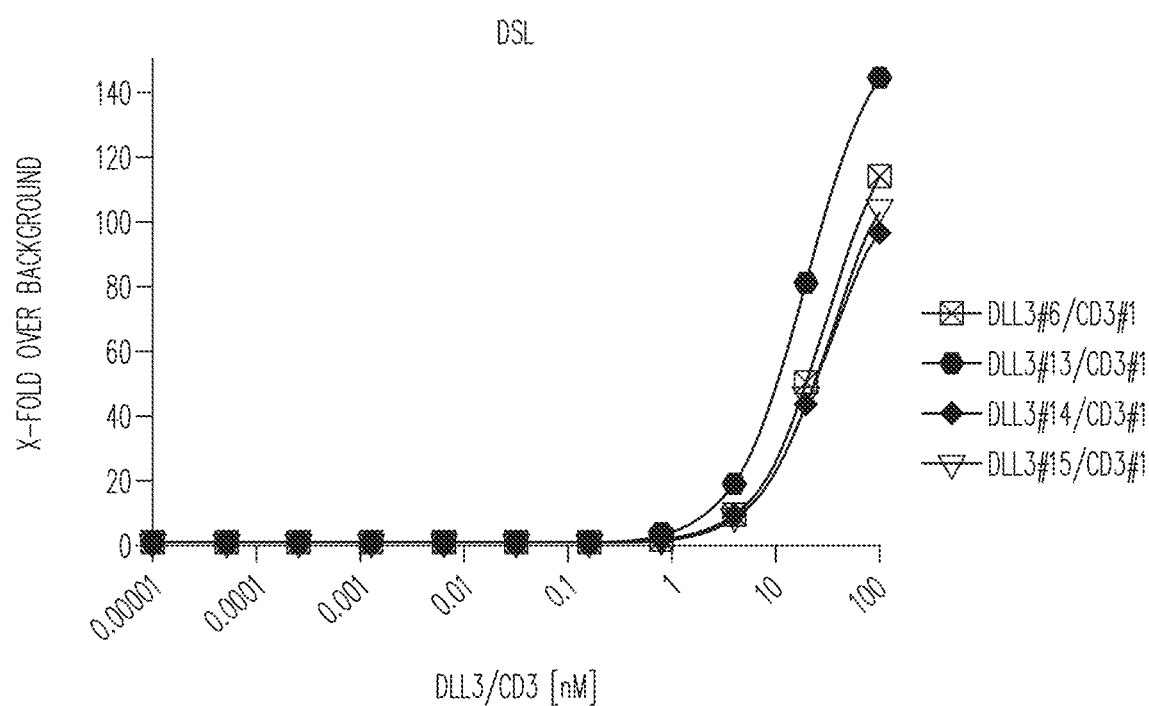
Figure 6R:
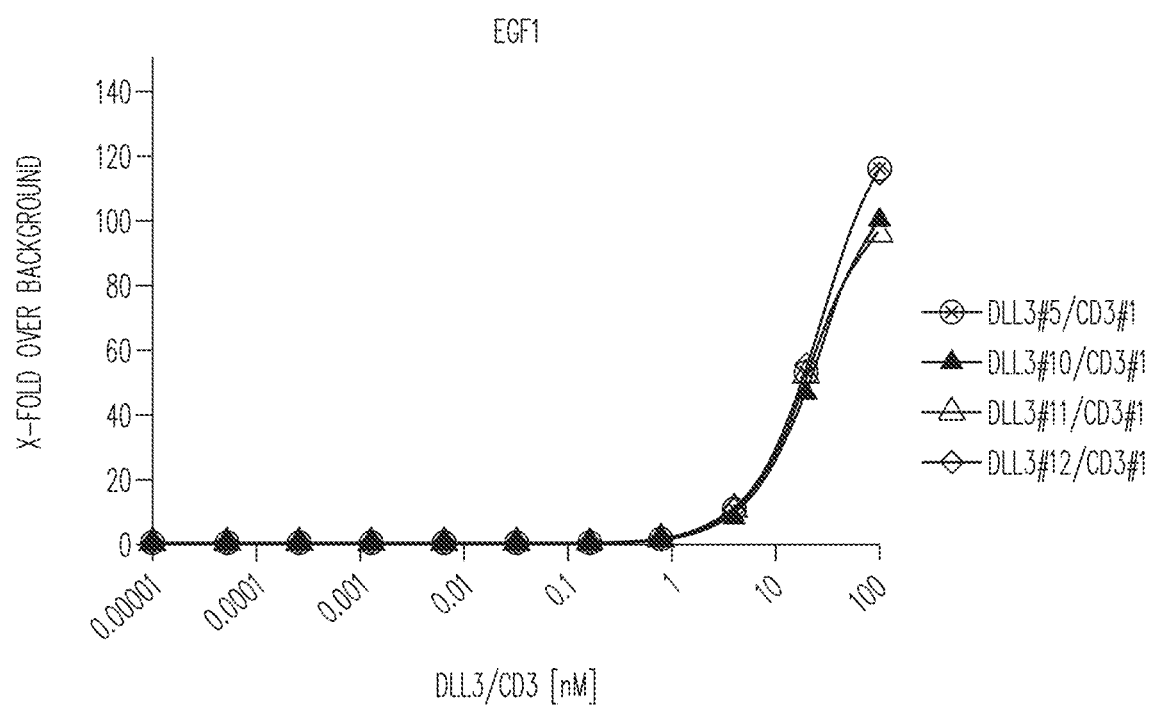
Figure 6S:
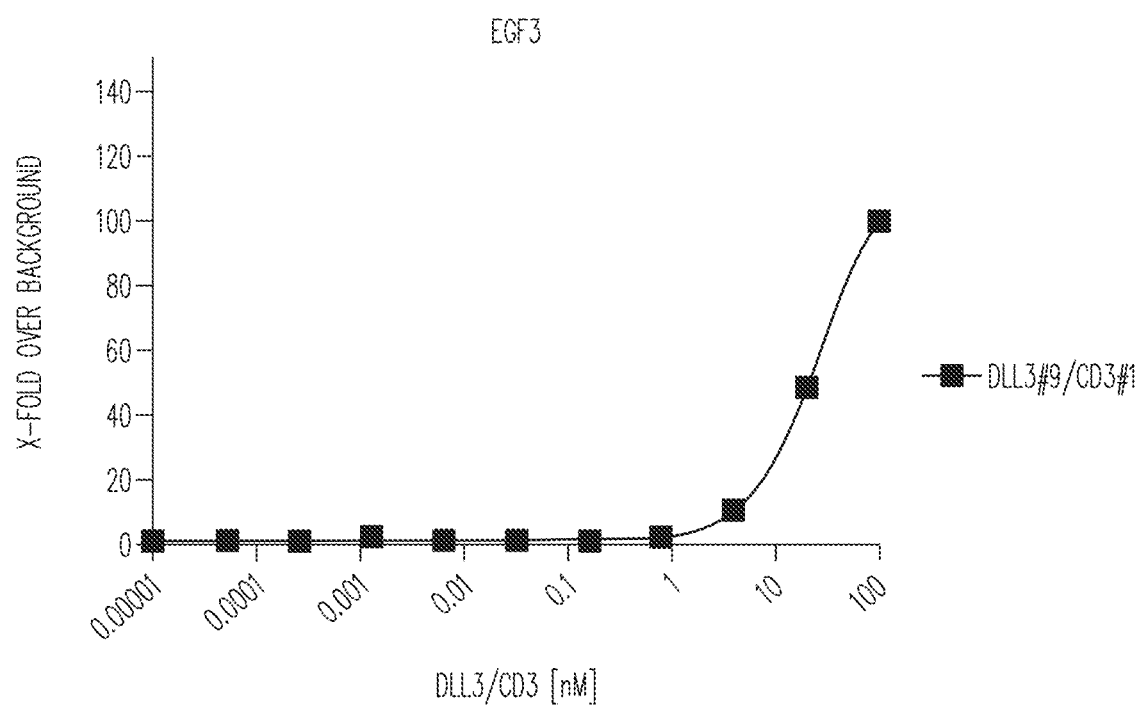
Figure 6T:
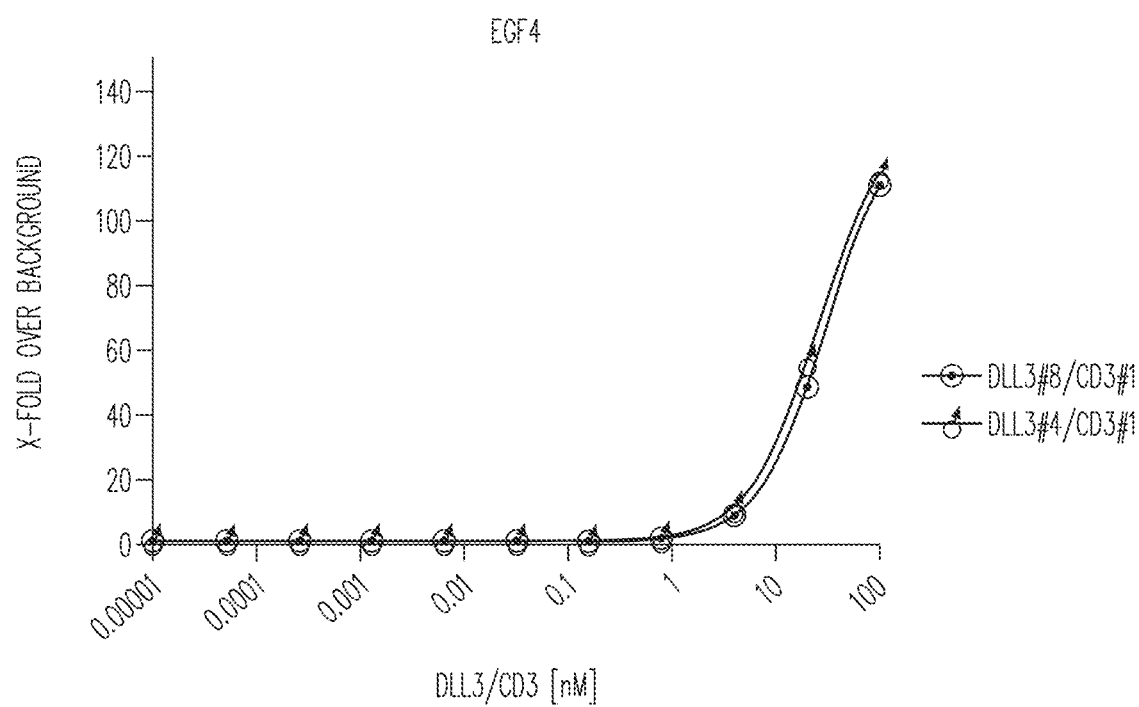
Figure 6U:
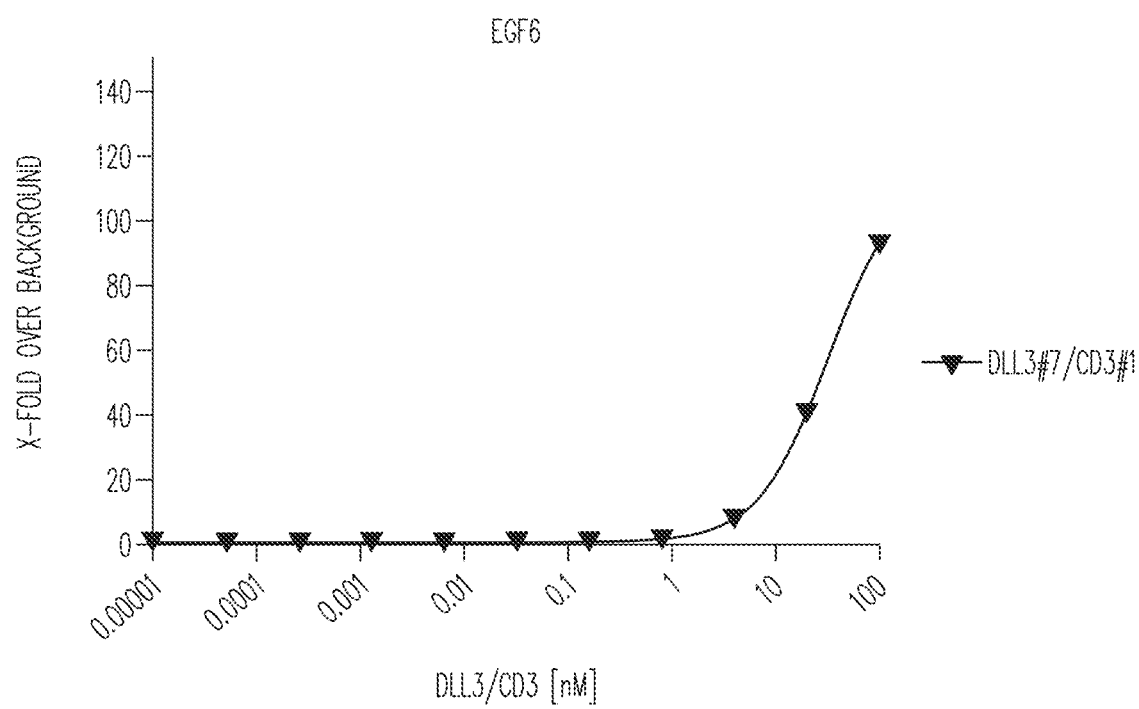
Figure 6V:
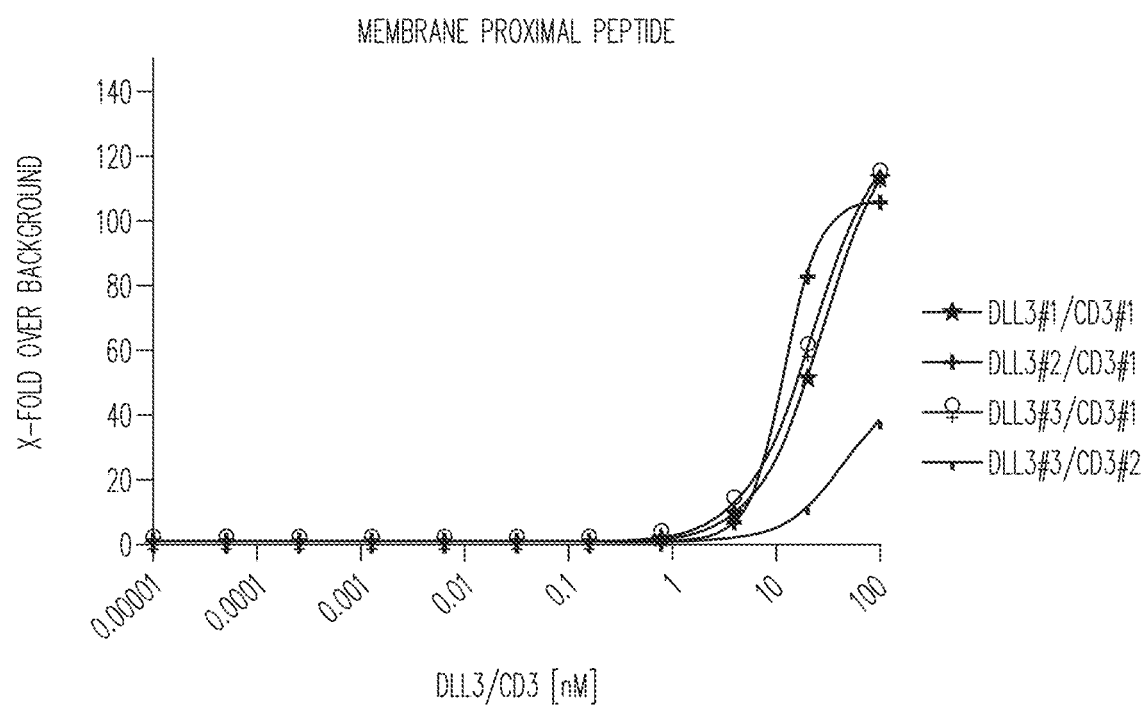

Cells (T cells or human SCLC cells) were stained with increasing concentrations of two-step purified DLL3/CD3 binding proteins with increasing concentrations in FACS buffer (PBS/0.5% BSA/0.05% sodium azide). Bound molecules were detected with PE-conjugated anti-human secondary antibody (Sigma-Aldrich, #P8047). DLL3/CD3 binding proteins targeting DSL (DLL3 #6), EGF1 (DLL3 #5) or EGF4 (DLL #4) domains show stronger binding to SCLC cell lines expressing DLL3, compared to DLL3/CD3 binding proteins which target the membrane proximal peptide (DLL3 #1, DLL3 #2, DLL3 #3). Binding to SHP77 (FIG. 6A middle panel), NCI-H82 cells (FIG. 6A upper panel) and T cells (FIG. 6A, lower panel) of exemplary DLL3/CD3 binding proteins (DLL3/CD3 binding proteins comprising a DLL3 chain of SEQ ID NO:73, SEQ ID NO:74, SEQ ID NO:75, SEQ ID NO:76, SEQ ID NO:77, SEQ ID NO:78, SEQ ID NO:241, SEQ ID NO:242, SEQ ID NO:243, SEQ ID NO:244, SEQ ID NO:245, SEQ ID NO:246, SEQ ID NO:247, SEQ ID NO:248, SEQ ID NO:249, SEQ ID NO:250, SEQ ID NO:251 or SEQ ID NO:252 and a CD3 chain of SEQ ID NO:79, and a DLL3 binding protein comprising a DLL3 chain of SEQ ID NO:75 and a CD3 chain of SEQ ID NO:80) against different epitope domains is shown in FIG. 6A-V.

Example 10A: Potency of Redirecting Non-Stimulated PBMCs Against Human SCLC Cell Lines Potency of non-stimulated PBMCs against SCLC cell lines was determined using lactate-dehydrogenase (LDH) release as readout for cell lysis. In this assay, DLL3-positive SCLC cell lines, SHP77 and NCI-H82, were co-cultured with human PBMCs as effector cells and increasing concentrations of DLL3/CD3 binding proteins for 72 hours at an effector to target cell ratio of 10:1. DLL3/CD3 binding proteins (DLL3/CD3 binding proteins comprising a DLL3 chain of SEQ ID NO:73, SEQ ID NO:74, SEQ ID NO:75, SEQ ID NO:76, SEQ ID NO:77, SEQ ID NO:78, and a CD3 chain of SEQ ID NO:79, and a DLL3 binding protein comprising a DLL3 chain of SEQ ID NO:75 and a CD3 chain of SEQ ID NO:80) were produced by transient transfection of CHO-E cells with the pTT5 vectors carrying the chain-encoding genes, as described in Example 2.

Human peripheral blood mononuclear cells (PBMCs) were prepared by Ficoll density gradient centrifugation from enriched lymphocyte preparations (buffy coats), a side product of blood banks collecting blood for transfusions. All buffy coats were obtained after informed consent in accordance with the Declaration of Helsinki and with approval of the cantonal ethical committee in Austria and PBMCs were prepared the same day of collection. Therefore, mononuclear cells were isolated by Ficoll density gradient centrifugation (35 min without brake at 1400 rpm) and extensive washes with PBS. Remaining erythrocytes were removed by incubating for 3 minutes in ACK lysis buffer (Thermo Fisher Scientific, A1049201), followed by washing in PBS, before suspension in assay medium containing RPMI 1640 GlutaMAX (Gibco #61870-010), 5% human AB serum AB (Gemini, GemCell cat #100-512 LOT #H56500I)+1% MEM-NEAA (Gibco #11140-035), 10 mM HEPES (Affymetrix #7365-49-9), 10 µM beta-Mercaptoethanol (Gibco #21985-023) and sodium pyruvat (Gibco #11360-039).

Subsequently, target cells, SHP77 and NCI-H82, and PBMCs at a ratio of 1:10 were incubated with DLL3/CD3 binding proteins at concentrations from 0.0001 nM to 100 nM for 72 hours.

Cytotoxic activity was determined using the Cytotoxicity Detection Kit$^{PLUS}$ (Roche), following the manufacturer's instructions. In brief, this method is based on the usage of the release of LDH from dead or plasma-membrane damaged cells. Cell culture supernatant is incubated with the reaction mixture from the kit for 30 minutes and the formation of Formazan, as a result of LDH activity is measured in a spectrophotometer at 500 nm as surrogate for cell lysis.

Percentage of cytotoxicity relative to the maximal lysis control was calculated according to the following formula:

$$\text{Cytotoxicity (relative to control)} = \frac{\text{measured value} - \text{background}}{\text{maximal lysis} - \text{minimal lysis}}$$

Background: Target cells+Effector cells

Maximal lysis: Target cells+5% Triton X-100

Minimal lysis: Target cells

Using GraphPad Prism 5 software, the percentage of cytotoxicity relative to the maximal lysis control was plotted against the corresponding DLL3/CD3 binding protein concentrations. Dose response curves were analysed with the four-parameter logistic equation model for evaluation of sigmoidal dose-response curve and $EC_{90}$ values were calculated ($EC_{90}$ values are shown in Table 4A).

Figure 7A:
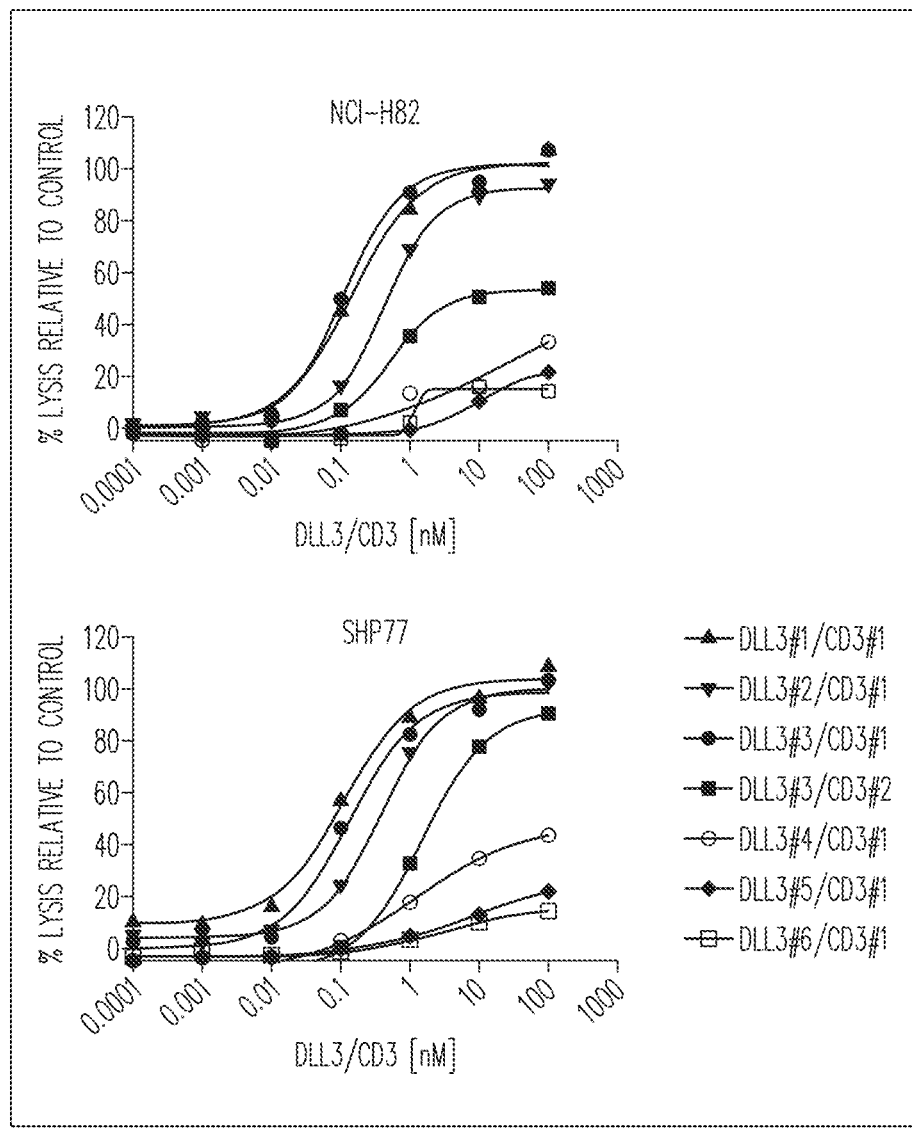
FIG. 7A: Potency in lysing cells of seven DLL3/CD3 binding proteins redirecting non-stimulated PBMCs towards human SCLC cell lines; NCI-H82 (upper panel) and SHP77 (lower panel).

FIG. 7A shows an example of potency in cell lysis of seven exemplary DLL3/CD3 binding proteins (DLL3/CD3 binding proteins comprising a DLL3 chain of SEQ ID NO:73, SEQ ID NO:74, SEQ ID NO:75, SEQ ID NO:76, SEQ ID NO:77, or SEQ ID NO:78, and a CD3 chain of SEQ ID NO:79, and a DLL3 binding protein comprising a DLL3 chain of SEQ ID NO:75 and a CD3 chain of SEQ ID NO:80) binding to different epitope domains.

TABLE 4A $EC_{90}$ values [nM] of DLL3/CD3 binding proteins as measured in a 72 hour cytotoxicity assay with non-stimulated PBMCs as effector cells and SCLC cell lines, NCI-H82 and SHP77 as target cells.

| DLL3/CD3 binding proteins | NCI-H82 | SHP77 |
| --- | --- | --- |
| DLL3#1/CD3#1 | 1.7 | 1.4 |
| DLL3#2/CD3#1 | 2.9 | 3.4 |
| DLL3#3/CD3#1 | 0.9 | 1.5 |
| DLL3#3/CD3#2 | 3.9 | 16.5 |
| DLL3#4/CD3#1 | no saturation at 100 nM | no saturation at 100 nM |
| DLL3#5/CD3#1 | no saturation at 100 nM | no saturation at 100 nM |
| DLL3#6/CD3#1 | no saturation at 100 nM | no saturation at 100 nM |

Example 10B: Potency of Redirecting Non-Stimulated T Cells Against Human SCLC Cell Lines T cells were isolated as described in Example 9. Subsequently purified T cells were used as effector cells in a cytotoxicity assay with SHP77 and NCI-H82 cells as target cells as described in Example 10A. Dose response curves are shown in FIGS. 7B-H (SHP77 cells) and FIG. 7I-O (NCI-H82 cells). Calculated EC90 values are shown in Table 4B.

Figure 7B:
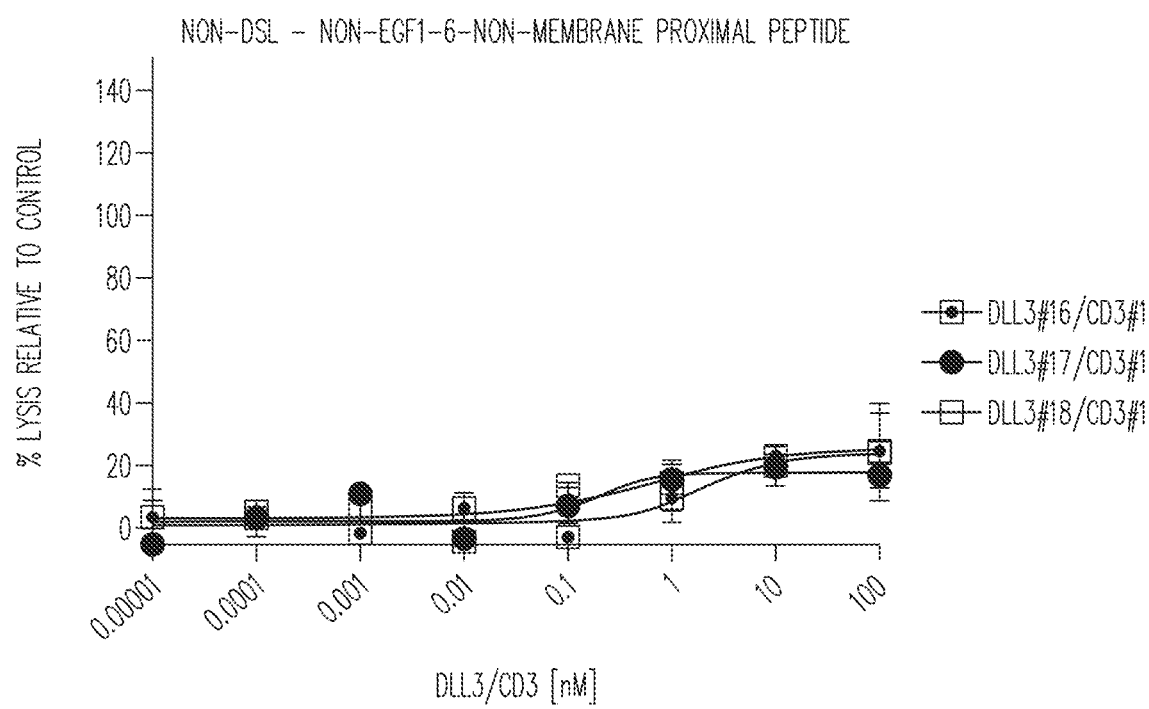
FIG. 7 B: Potency in lysing cells of exemplary DLL3/CD3 binding proteins (directed to a peptide that is neither the DSL nor the EGF1-6 nor the membrane proximal peptide) redirecting non-stimulated T cells towards human SHP77 cells.
Figure 7C:
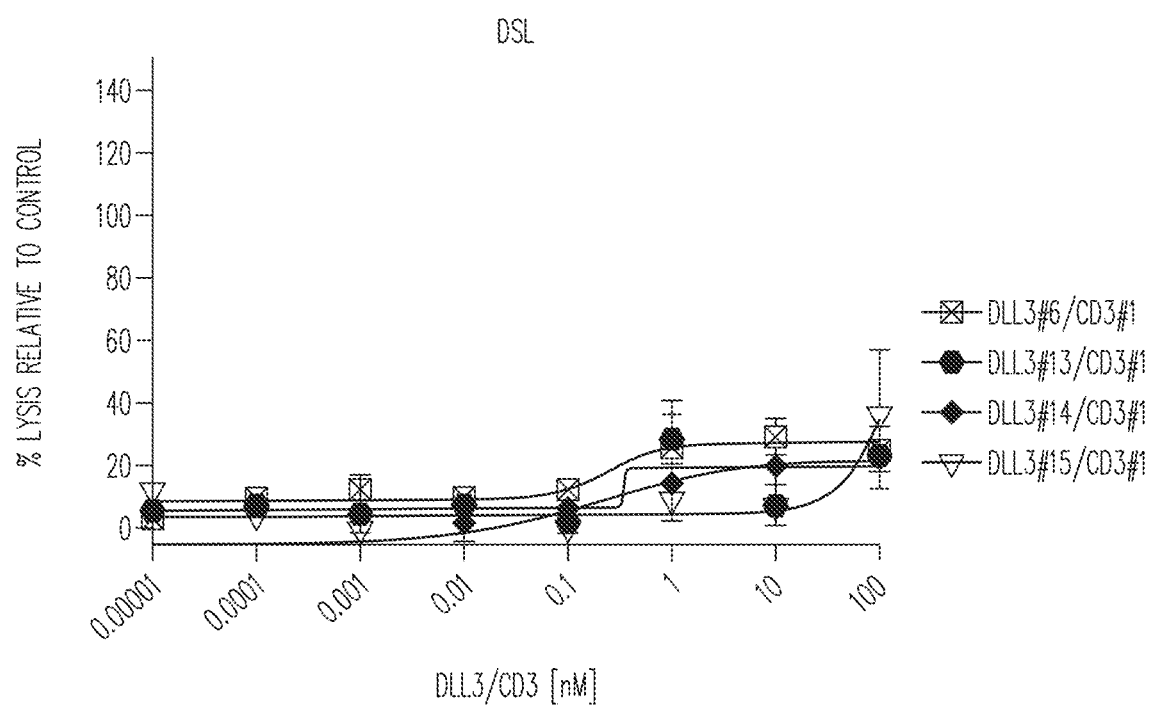
Figure 7D:
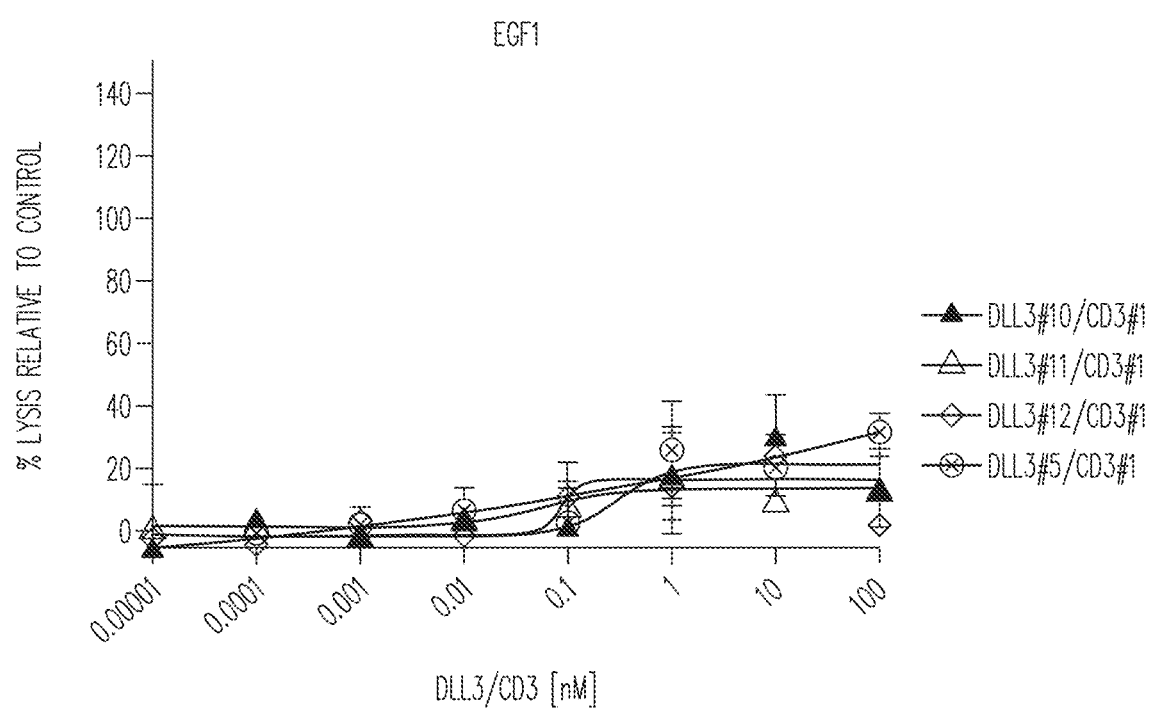
Figure 7E:
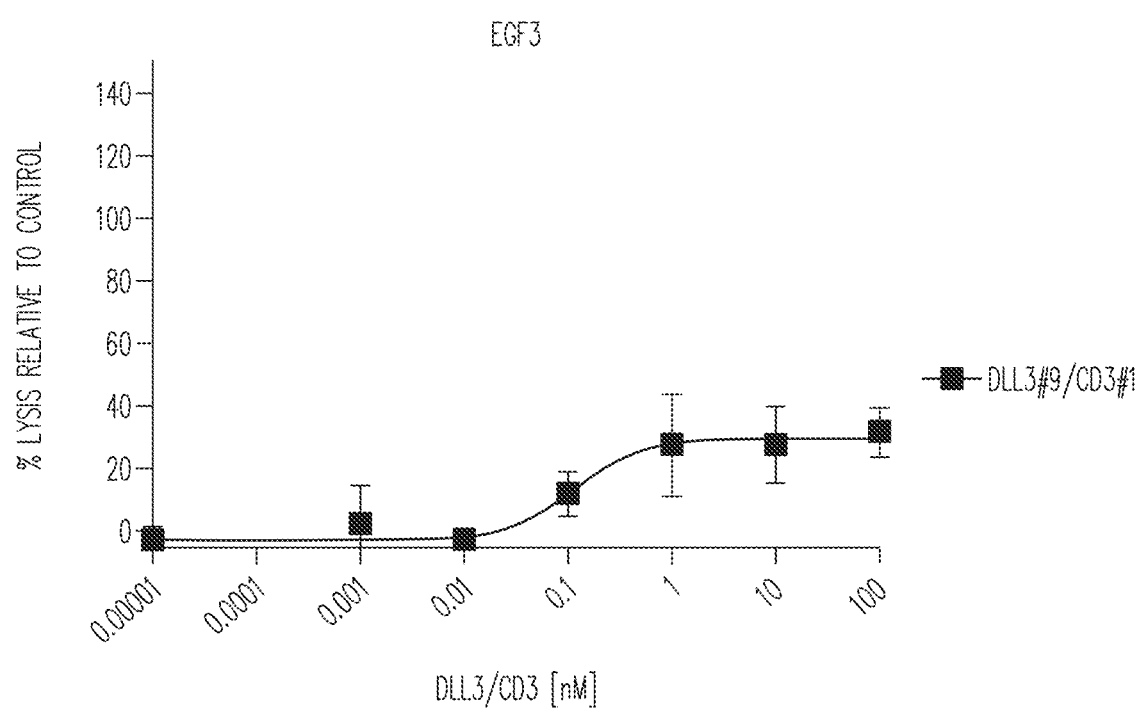
Figure 7F:
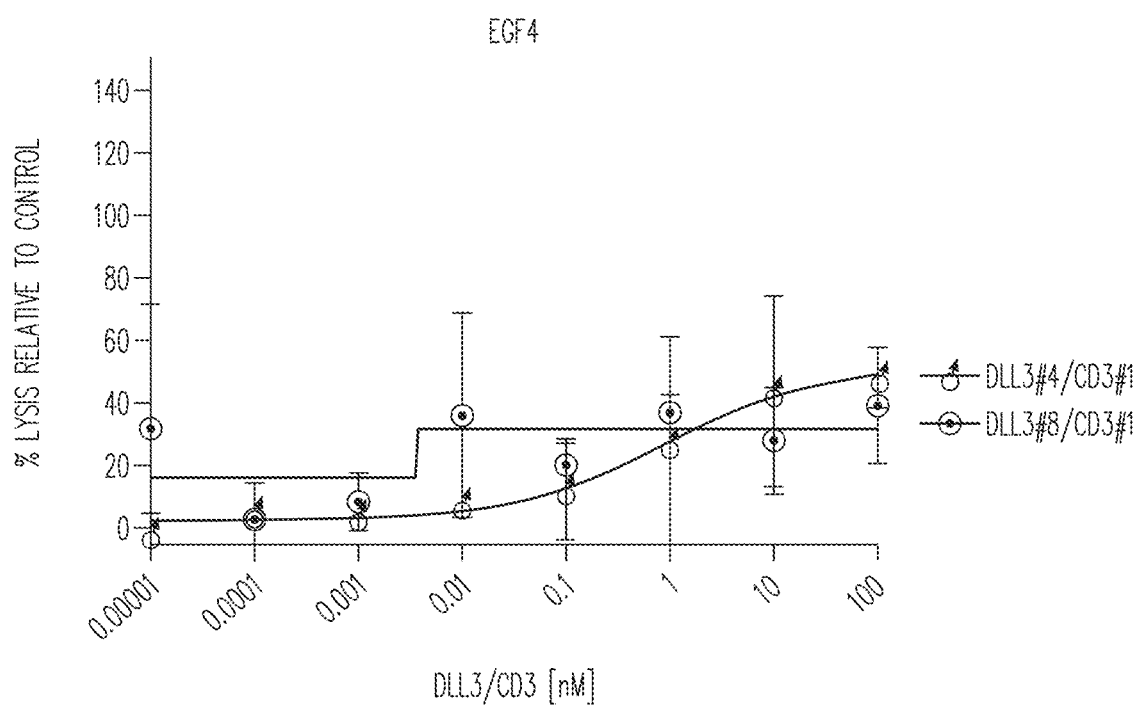
Figure 7G:
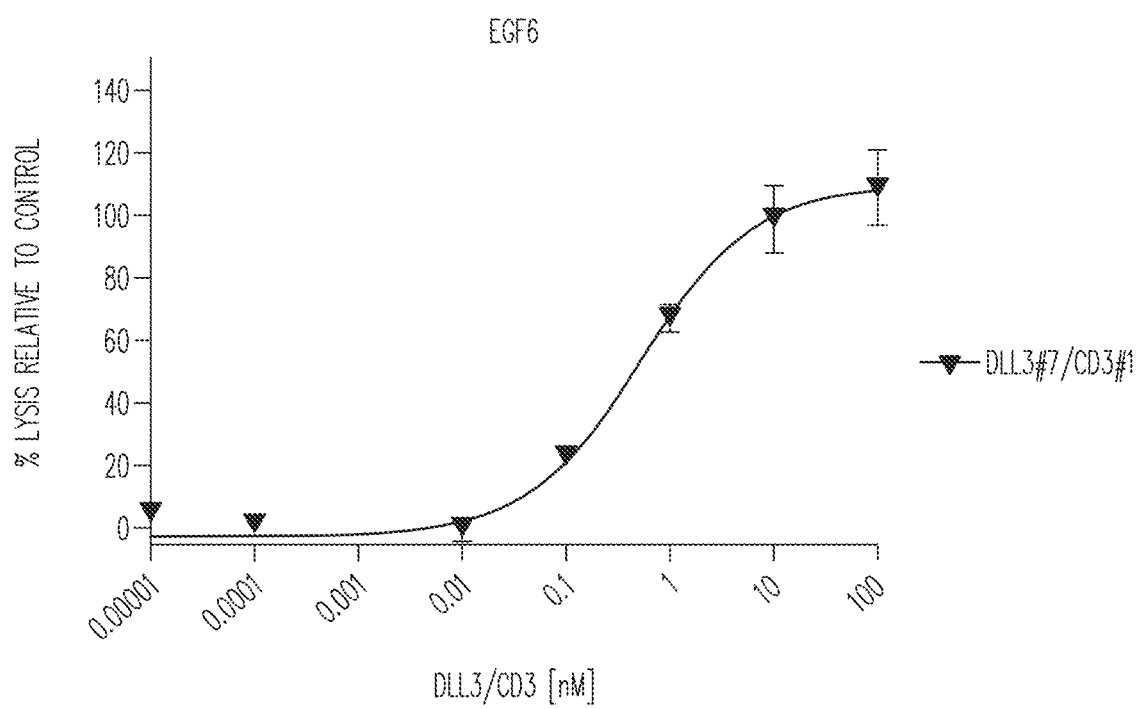
Figure 7H:
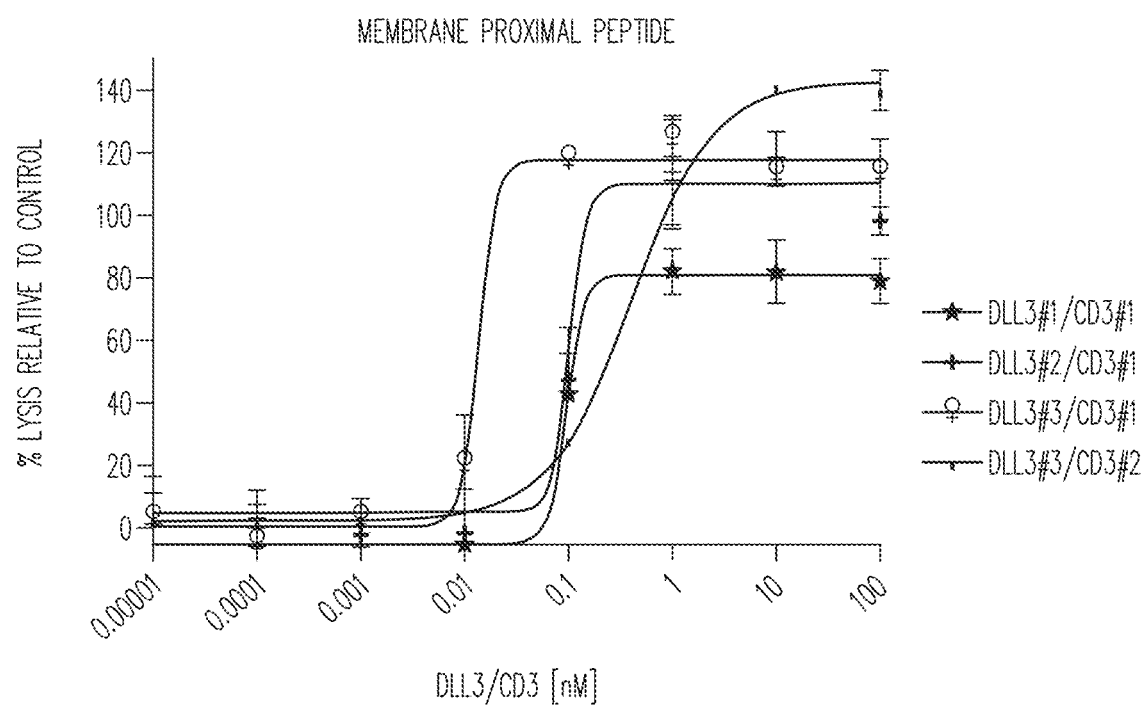
Figure 71:
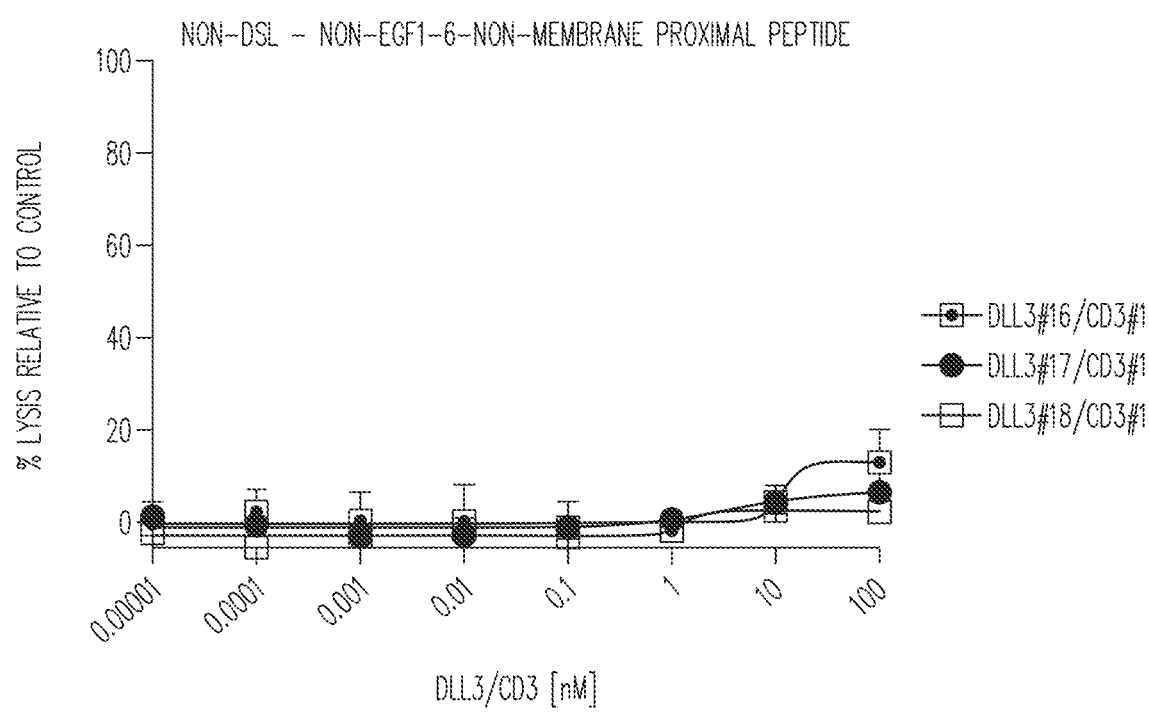
Figure 7J:
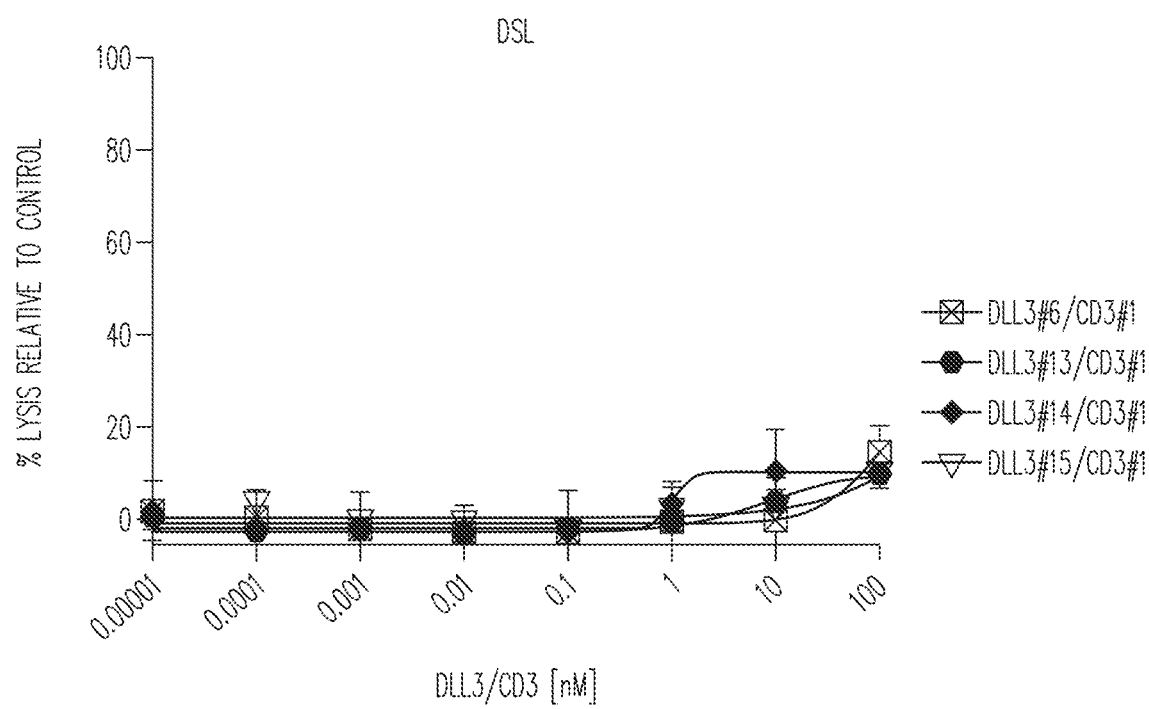
Figure 7K:
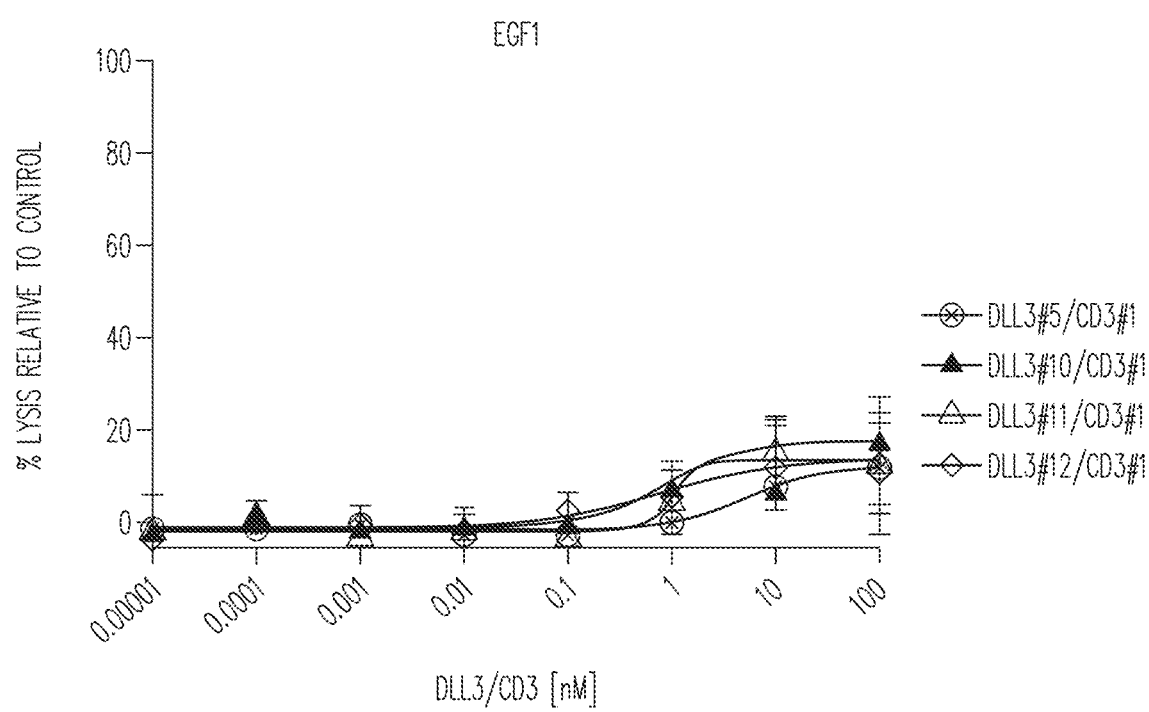
Figure 7L:
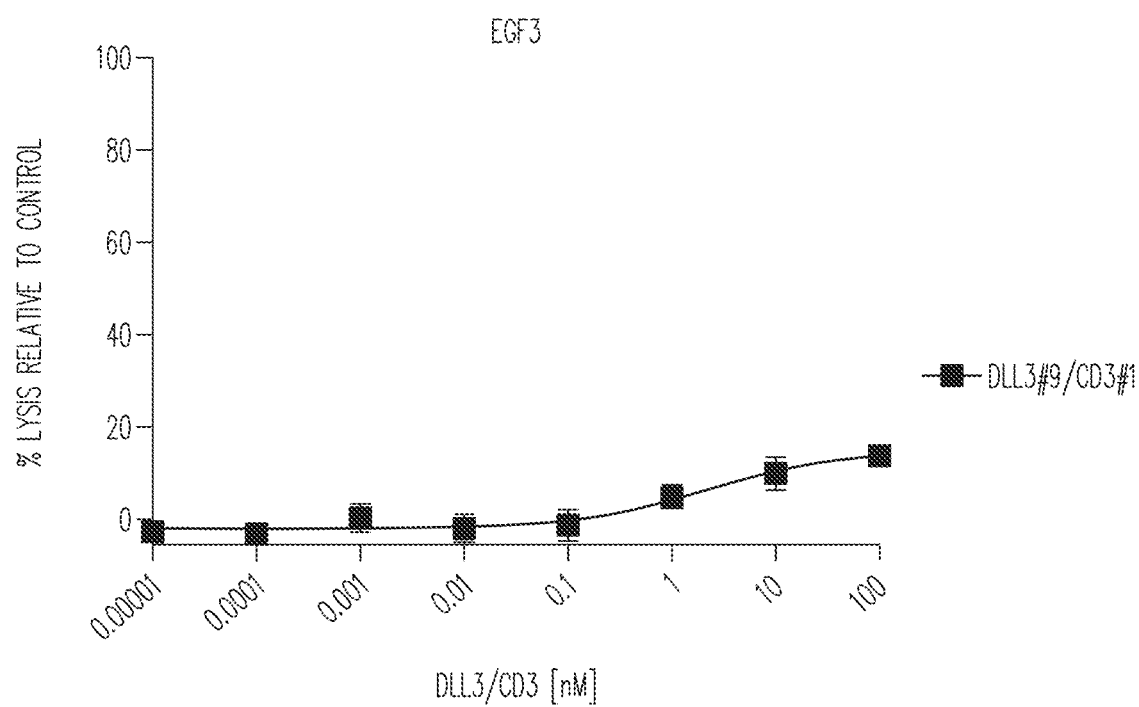
Figure 7M:
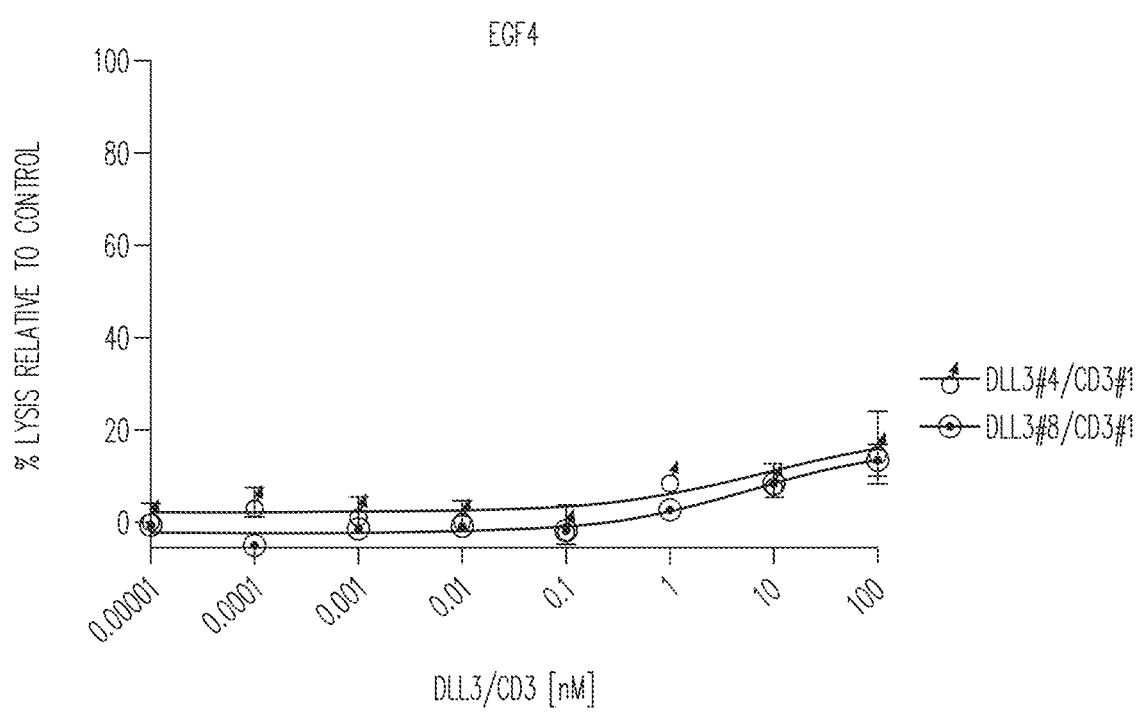
Figure 7N:
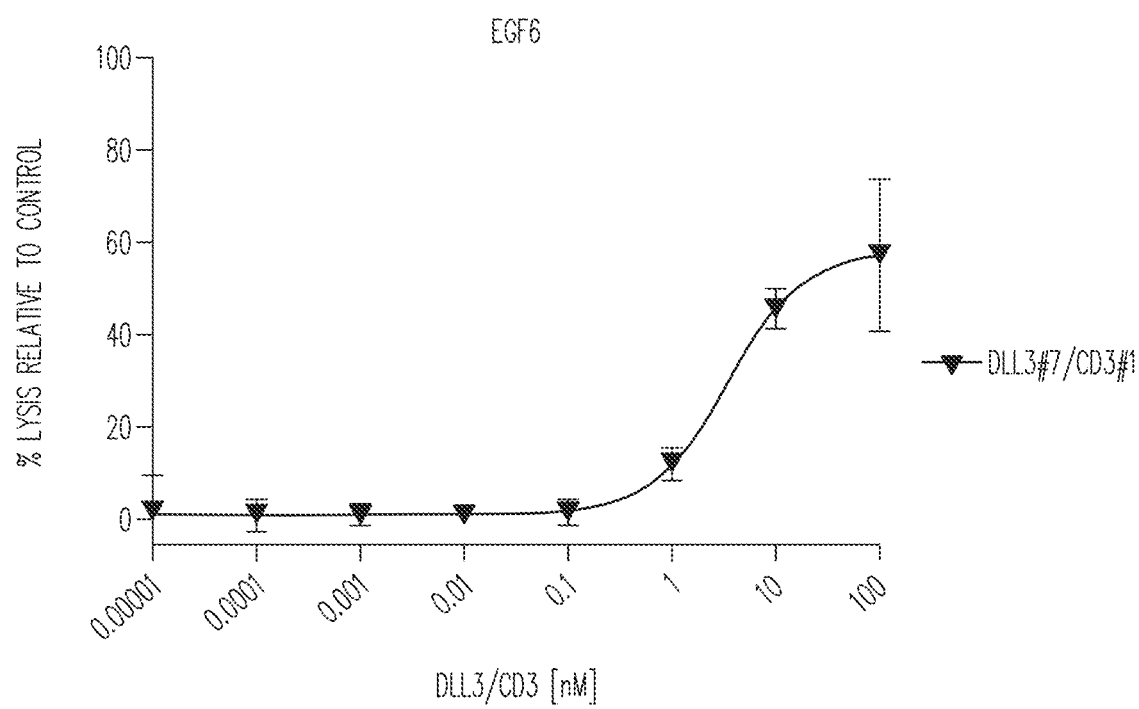
Figure 70:
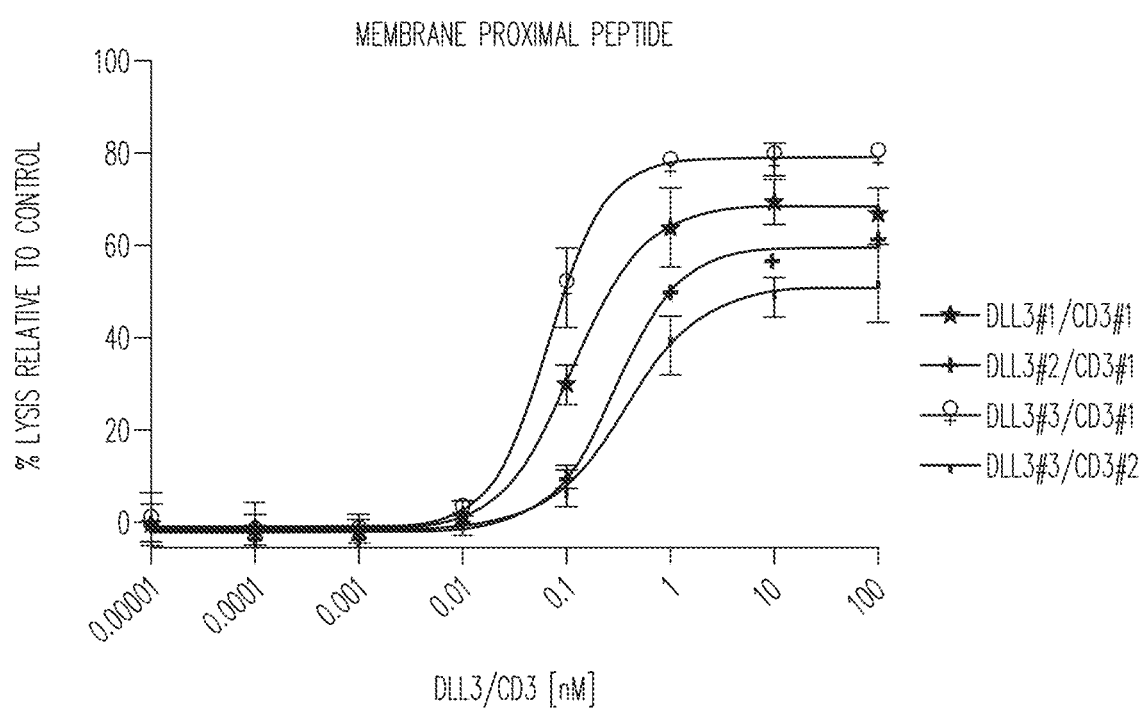

FIG. 7B-O show examples of potency in cell lysis of 19 exemplary DLL3/CD3 binding proteins (DLL3/CD3 binding proteins comprising a DLL3 chain of SEQ ID NO:73, SEQ ID NO:74, SEQ ID NO:75, SEQ ID NO:76, SEQ ID NO:77, SEQ ID NO:78, SEQ ID NO:241, SEQ ID NO:242, SEQ ID NO:243, SEQ ID NO:244, SEQ ID NO:245, SEQ ID NO:246, SEQ ID NO:247, SEQ ID NO:248, SEQ ID NO:249, SEQ ID NO:250, SEQ ID NO:251, SEQ ID NO:252

TABLE 4B $EC_{90}$ values [nM] of DLL3/CD3 binding proteins as measured in a 72 hour cytotoxicity assay with purified T cells as effector cells and SCLC and NCI-H82 cell lines as target cells.

| DLL3/CD3 binding proteins | NCI-H82 | SHP77 |
| --- | --- | --- |
| DLL3#1/CD3#1 | 0.66 | 0.15 |
| DLL3#2/CD3#1 | 1.51 | 0.16 |
| DLL3#3/CD3#1 | 0.27 | 0.02 |
| DLL3#3/CD3#2 | 2.50 | 3.00 |
| DLL3#4/CD3#1 | no activity | no activity |
| DLL3#5/CD3#1 | no activity | no activity |
| DLL3#6/CD3#1 | no activity | no activity |
| DLL3#7/CD3#1 | 21.84 | 8.37 |
| DLL3#8/CD3#1 | no activity | no activity |
| DLL3#9/CD3#1 | no activity | no activity |
| DLL3#10/CD3#1 | no activity | no activity |
| DLL3#11/CD3#1 | no activity | no activity |
| DLL3#12/CD3#1 | no activity | no activity |
| DLL3#13/CD3#1 | no activity | no activity |
| DLL3#14/CD3#1 | no activity | no activity |
| DLL3#15/CD3#1 | no activity | no activity |
| DLL3#16/CD3#1 | no activity | no activity |
| DLL3#17/CD3#1 | no activity | no activity |
| DLL3#18/CD3#1 | no activity | no activity |

Example 11: In Vitro Internalization Assay

Changes in the potency of the DLL3/CD3 binding proteins after pre-incubated with DLL3-positive SHP77 cells as target cells were measured. If the DLL3/CD3 binding protein is internalized, the effective concentration should decrease with this and thus the apparent potency should decrease.

DLL3/CD3 binding proteins were produced as described in Example 2. Human peripheral blood mononuclear cells (PBMCs) were prepared as described in Example 10.

SHP77 target cells were plated and incubated with DLL3/CD3 binding proteins at concentrations from 0.0001 to 100 nM for 2 and 4 hours before adding non-stimulated PBMCs for 48 hours. The effector to target cell ratio was 10:1. Cytotoxic activity was determined using the Cytotoxicity Detection Kit$^{PLUS}$ (Roche) as described in Example 10.

Figure 8A:
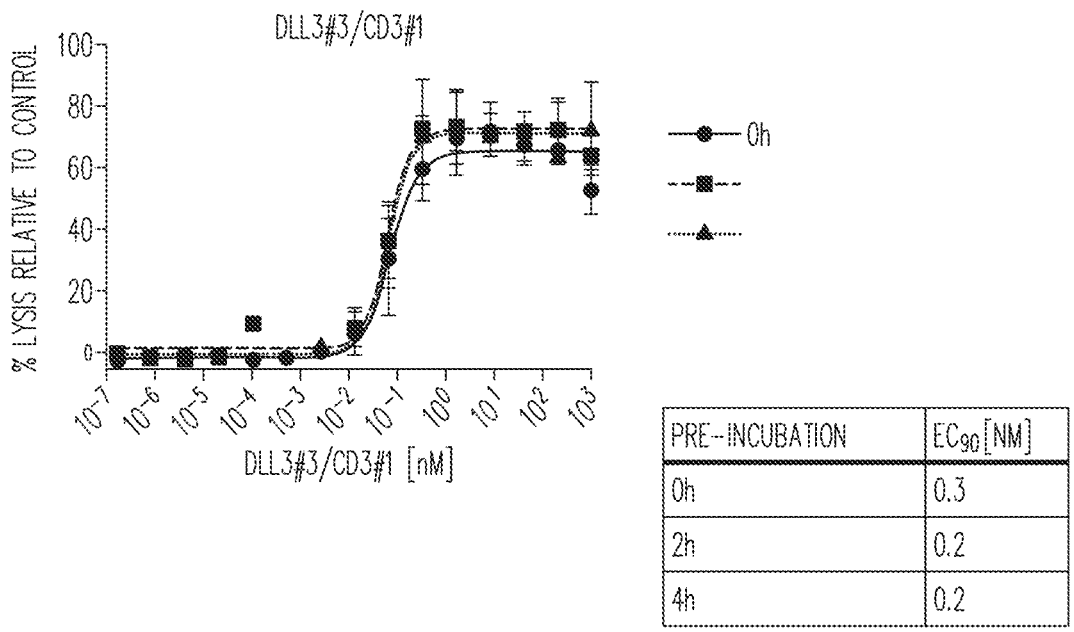
FIGS. 8A and B: In vitro internalization assay with two exemplary DLL3/CD3 binding proteins; DLL3 #3/CD3 #1 (8A) and DLL3 #3/CD3 #2 (8B). DLL3/CD3 binding proteins were pre-incubated with DLL3-positive SHP77 cells for 2 and 4 hours before co-incubation for 48 hours with human PBMCs.
Figure 8B:
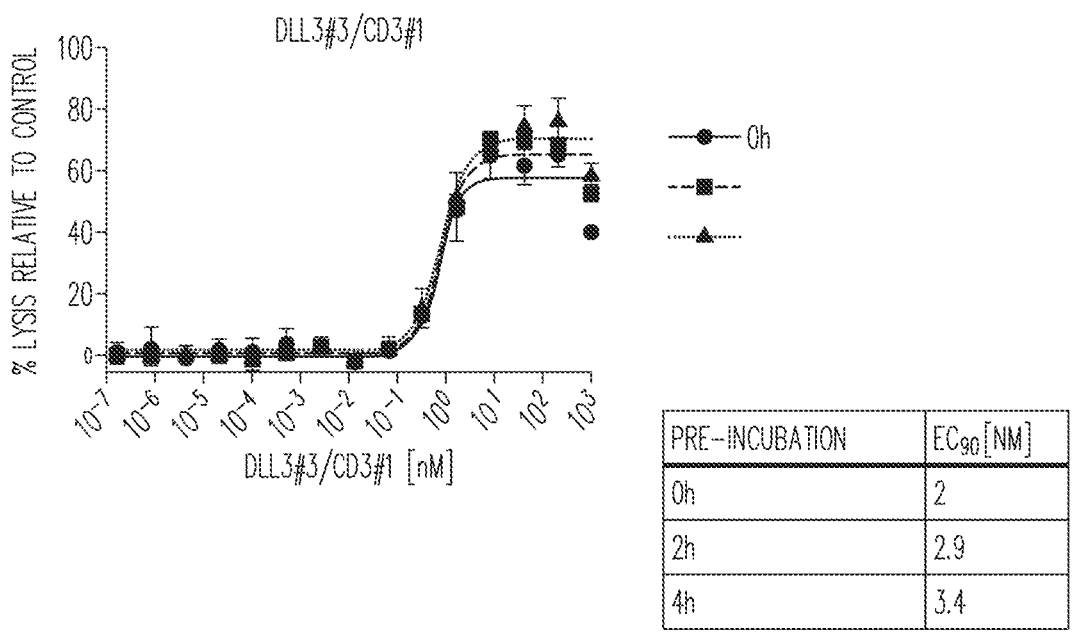

FIGS. 8A and B shows no difference in potency and efficacy of lysing cells of two exemplary DLL3/CD3 binding proteins; DLL3 #3/CD3 #1 (8A) and DLL #3/CD3 #2 (8B) (DLL3/CD3 binding protein comprising a DLL3 chain of SEQ ID NO:75 and a CD3 chain of SEQ ID NO:79, and DLL3/CD3 binding protein comprising a DLL3 chain of SEQ ID NO:75 and a CD3 chain of SEQ ID NO:80). Potency and efficacy have been observed compared to non-pre-incubated samples (0 h). Results suggest that no significant internalization occurs with DLL3/CD3 binding proteins.

Example 12: Mouse PK Study

The PK of DLL3/CD3 binding proteins was evaluated in C57BL/6 mice following a single 1 mg/kg i.v. dose. Serum concentrations of DLL3/CD3 binding proteins were determined using a DLL3 capture/CD3 detection assay.

In brief, male C57BL/6 mice received a single 1 mg/kg intravenous (IV) dose (n=3 per molecule). Blood samples were collected pre-dose and 0.15, 2, 8, 24, 72, 96, 168, 240 and 336 hours post-dose. Serum drug levels were measured with an MSD-based ligand binding assay, using biotinylated DLL3 as the capture reagent and sulfo-tagged CD3 as the detection reagent. Pharmacokinetic (PK) parameters were calculated from serum concentration time-profiles using non-compartmental analysis. The following PK parameters were assessed: AUCtlast (area under the serum concentration-time curve from time zero to the last quantifiable time-point), AUCinf (area under the serum concentration-time curve extrapolated to infinity), CL (systemic clearance), Vss (steady-state volume of distribution) and t1/2 (terminal half-life).

Figure 9:
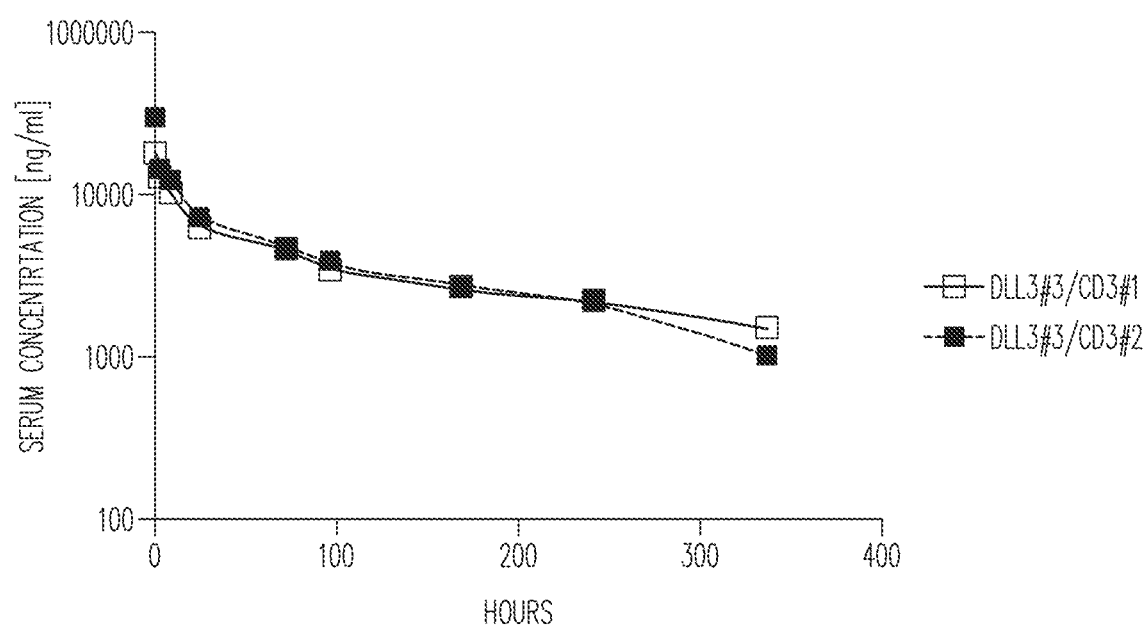
FIG. 9: Pharmacokinetics of two exemplary DLL3/CD3 binding proteins. Mean pharmacokinetic profiles of DLL3 #3/CD3 #1 (open squares) and DLL3 #3/CD3 #2 (closed squares) in male C57BL/6 mice following a single 1 mg/kg intravenous dose.

Mean (SD) serum concentration time-profiles for exemplary DLL3/CD3 binding proteins (DLL3/CD3 binding protein comprising a DLL3 chain of SEQ ID NO:75 and a CD3 chain of SEQ ID NO:79, and DLL3/CD3 binding protein comprising a DLL3 chain of SEQ ID NO:75 and a CD3 chain of SEQ ID NO:80) are summarized in FIG. 9. Mean (SD) PK parameters for these exemplary DLL3/CD3 binding proteins are summarized in Table 5.

TABLE 5

Mean (SD) PK parameters of exemplary DLL3/CD3 binding proteins in male C57BL/6 mice following a single 1 mg/kg intravenous dose

| DLL3/CD3 binding proteins | $AUC_{0\text{-}last}$ (µg*d/mL) | $AUC_{0\text{-}inf}$ (µg*d/mL) | CL (mL/day/kg) | $V_{ss}$ (mL/kg) | $t_{1/2}$ (days) |
|---|---|---|---|---|---|
| DLL3#3/CD3#1 | 1180 (127) | 1760 (179) | 13.7 (1.48) | 178 (57.7) | 10.6 (4.67) |
| DLL3#3/CD3#2 | 1260 (170) | 1440 (154) | 16.8 (1.74) | 109 (19.5) | 4.97 (0.78) |

Example 13: In Vivo Xenograft Efficacy Study

Efficacy studies were performed using a human xenograft mouse model reconstituted with human T cells. In detail, human SHP77 small cell lung cancer cells (2×10⁷) were injected subcutaneously (s.c.) into the right dorsal flank of sub-lethally irradiated (2 Gy, day −1) female NOD.Cg-Prkdc$^{scid}$ Il2rg$^{tm1Sug}$/JicTac mice (Day 1). In parallel, human CD3 positive T cells (isolated from healthy human blood donor) were expanded in vitro.

Human peripheral blood mononuclear cells (PBMCs) were prepared as described in Example 10.

T-cells were isolated by negative selection using the Pan T Cell Isolation Kit II (Miltenyi Biotec #130-091-156). In brief, cells were resuspend in 40 µl buffer PBS/0.5% BSA (gibco ref #041-94553 M)/2 mM EDTA (Invitrogen ref #15575-038) per 10 Mio cells and incubated with 10 µl of Biotin-Antibody cocktail per 10 Mio cells for 5 min at 4° C. Subsequently, 30 µl buffer and 20 µl anti-biotin MicroBeds/10 million cells were added and incubated for 10 min at 4° C. Subsequently the mixture was placed in a pre-rinsed 25LS column (Miltenyi Biotec #130-042-401) in the magnetic field of suitable MACS separator (Miltenyi Biotec). Flow-through was collected and washed in assay medium.

Subsequently T cells were expanded using the T Cell Activation/Expansion Kit human (Miltenyi Biotec Cat #130-091-441, Lot #5170720843) for 20 days. In brief, anti-Biotin MACSiBead™ Particles are loaded with CD2-, CD3-, CD28 Biotin and are transferred to the purified T cells in a ratio of 2 cells per particle and incubated in presence of 20 Units recombinant IL-2 (R&D #202-IL-050/CF) at a density of 0.5-1 10⁶ cells/ml for 20 days. Cells were supplemented with 20 Units fresh IL-2 every three days. Three days before injection into the animals, T cells were restimulated with anti-Biotin MACSiBead™ Particles are loaded with CD2-, CD3-, CD28 Biotin at a ratio of 1 bead per 4 cells for additional three days. Finally, beads were removed with a MACSiMAG Separator (Miltenyi Biotec) and T cells were washed in PBMCs.

Figure 10:
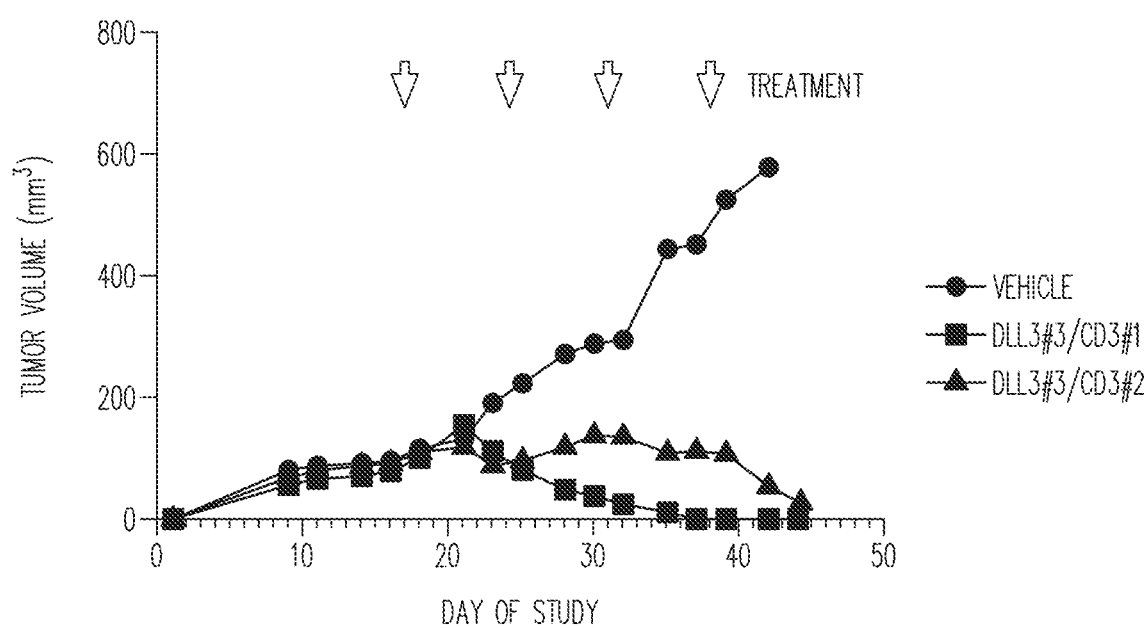
FIG. 10: Anti-tumor activity of two exemplary DLL3/CD3 binding proteins. The y-axis depicts median tumor volumes and the x-axis depicts time.
Figure 11:
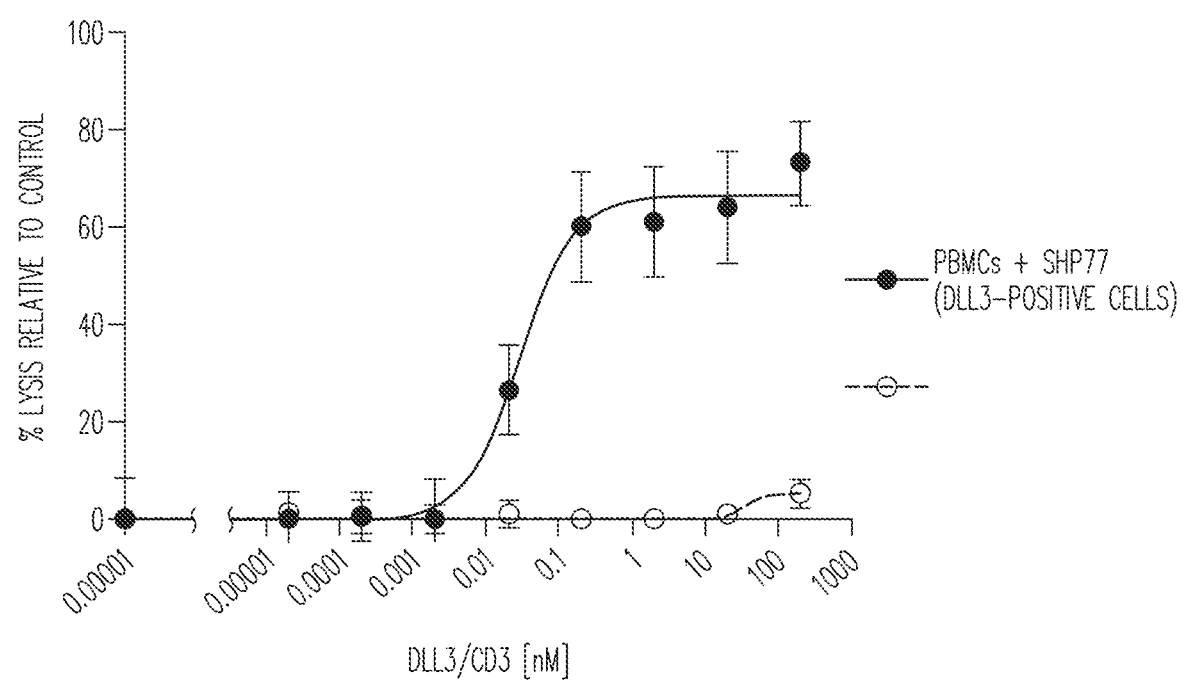
FIG. 11: Potency in lysing cells of an exemplary DLL3/CD3 binding protein redirecting non-stimulated PBMCs towards human SHP77 and RKO-E6 cells.
Figure 12:
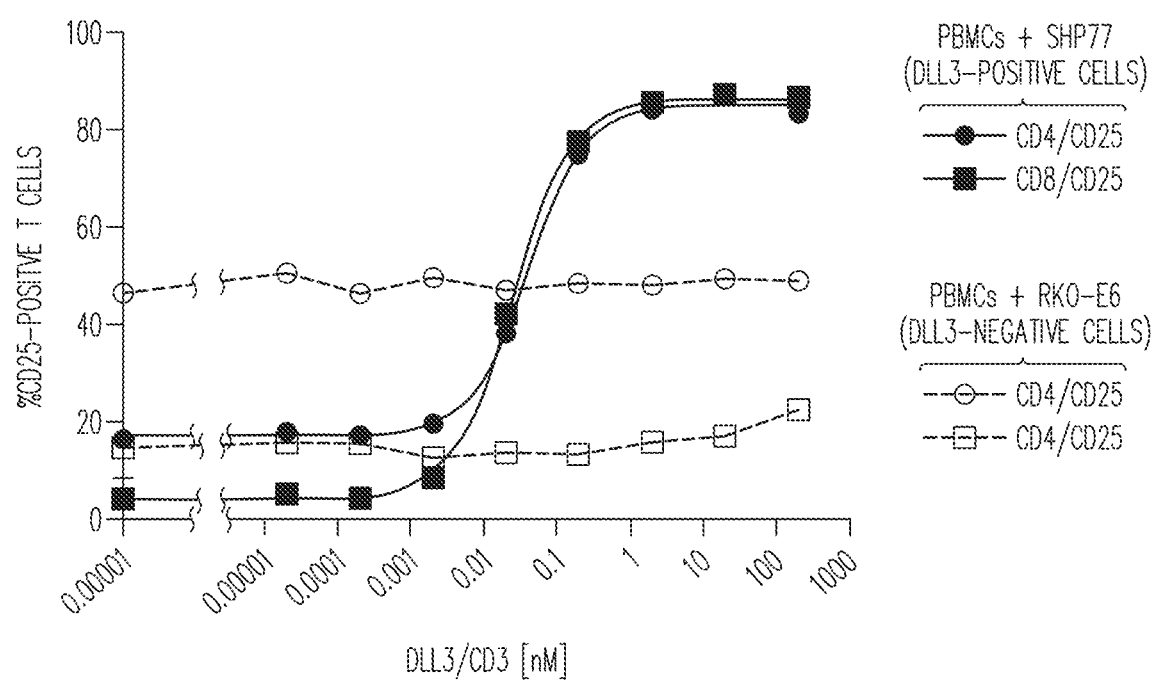
FIG. 12: Potency in activation of T cells in presence of SHP77 cells of an exemplary DLL3/CD3 binding protein
Figure 13:
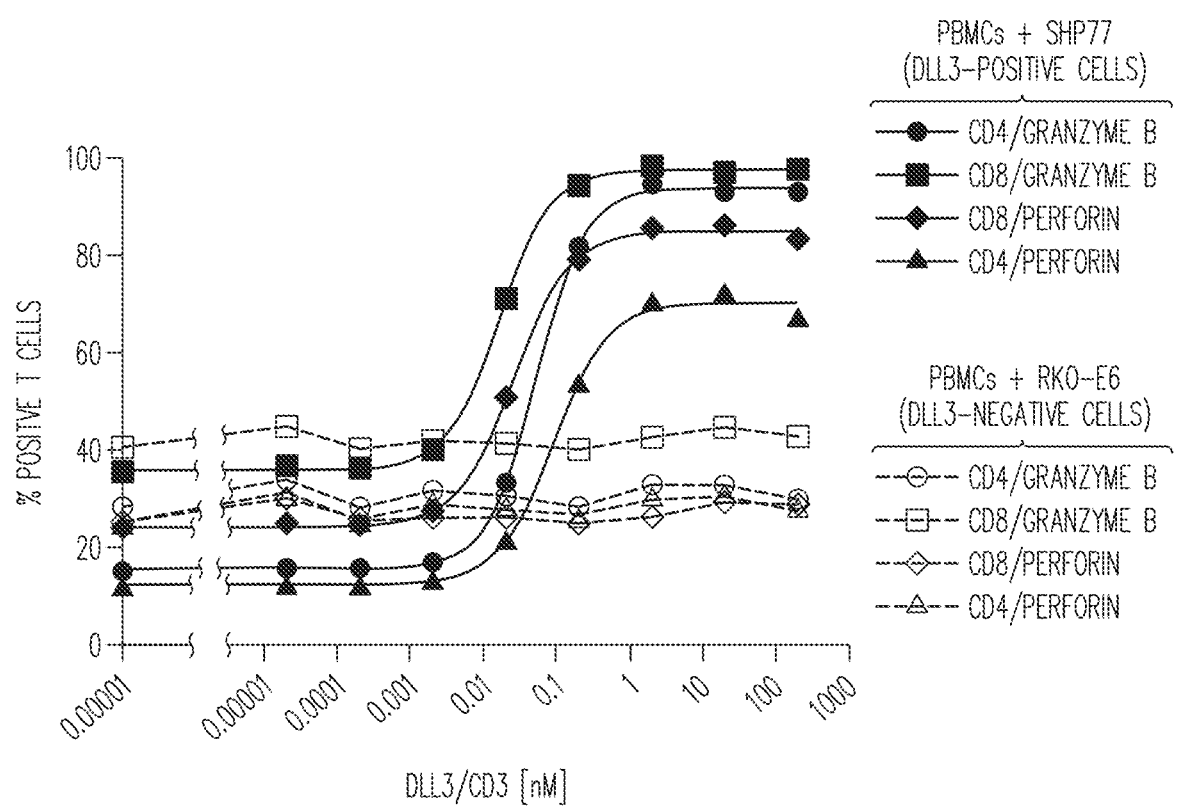
FIG. 13: Potency in degranulation of T cells in presence of SHP77 cells of an exemplary DLL3/CD3 binding protein

On day 14, animals were randomized into treatment groups based on tumor volume and 2×10⁷ human T cells were injected intra-peritoneally (i.p.). Treatment was started on day 17 and DLL3/CD3 binding protein (DLL3/CD3 binding protein comprising a DLL3 chain of SEQ ID NO:75 and a CD3 chain of SEQ ID NO:79, and DLL3/CD3 binding protein comprising a DLL3 chain of SEQ ID NO:75 and a CD3 chain of SEQ ID NO:80) or Vehicle buffer (50 mM NaOAc, 100 mM NaCl, pH 5.0) was administered in a q7d dosing regimen by intravenous (i. v.) bolus injections into the lateral tail vein. Tumor growth was monitored by external caliper measurements and tumor volumes were calculated using a standard hemi-ellipsoid formula. Human T cell engraftment was assessed in the spleen by immunohistochemistry (IHC) staining for human CD3 at the end of the study. Only those animals showing human T-cell engraftment at the end of the study were included in the statistical analysis. Animals reaching sacrifice criteria were euthanized early during the studies for ethical reasons. Treatment of tumor-bearing mice with DLL3/CD3 binding proteins once weekly i.v. at 0.25 mg/kg induced significant tumor regression (FIG. 10).

Example 14: Percent Monomer Content of DLL3/CD3 Binding Proteins

Percent monomer was determined for exemplary DLL3/CD3 binding proteins (DLL3/CD3 binding proteins comprising a DLL3 chain of SEQ ID NO:73, SEQ ID NO:74, SEQ ID NO:75, SEQ ID NO:76, SEQ ID NO:77, SEQ ID NO:78, SEQ ID NO:241, SEQ ID NO:242, SEQ ID NO:243, SEQ ID NO:244, SEQ ID NO:245, SEQ ID NO:246, SEQ ID NO:247, SEQ ID NO:248, SEQ ID NO:249, SEQ ID NO:250, SEQ ID NO:251, or SEQ ID NO:252 and a CD3 chain of SEQ ID NO:79, a DLL3 binding protein comprising a DLL3 chain of SEQ ID NO:75 and a CD3 chain of SEQ ID NO:80, and a DLL3 binding protein comprising a DLL3 chain of SEQ ID NO:75 and a CD3 chain of SEQ ID NO:105) by Analytical Size Exclusion Chromatography (aSEC) (shown in Table 6). aSEC was run on a Waters (Milfrod, MA, USA) Acquity UPLC system using a Protein BEH SEC column 200 Å, 1.7 µm, 4.6×150 mm (Cat #186005225). Running conditions were as follows: Mobile phase: 50 mM Sodium Phosphate, 200 mM Arginine and 0.05% Sodium Azide; Flow rate: 0.5 ml/min; Runtime: 5 minutes; Sample loading amount: 10 µg; Peak detection: A280 nm; Automated processing method of chromatograms.

TABLE 6

Percent monomer after first and second purification step

| DLL3/CD3 binding proteins | Percent monomer after 1$^{st}$ step of purification | Percent monomer after 2$^{nd}$ step of purification |
|---|---|---|
| DLL3#1/CD3#1 | 76.4 | 99.4 |
| DLL3#2/CD3#1 | 54.4 | 98.0 |
| DLL3#3/CD3#1 | 69.5 | 99.8 |
| DLL3#3/CD3#2 | 77.6 | 99.5 |
| DLL3#3/CD3#3 | 70.8 | 98.3 |
| DLL3#4/CD3#1 | 72.2 | 99.1 |
| DLL3#5/CD3#1 | 70.5 | 99.1 |
| DLL3#6/CD3#1 | 55.2 | 99.9 |
| DLL3#7/CD3#1 | 78.1 | 99.0 |
| DLL3#8/CD3#1 | 54.8 | 99.5 |
| DLL3#9/CD3#1 | 72.0 | 99.0 |
| DLL3#10/CD3#1 | 70.2 | 98.3 |

TABLE 6-continued

Percent monomer after first and second purification step

| DLL3/CD3 binding proteins | Percent monomer after 1st step of purification | Percent monomer after 2nd step of purification |
|---|---|---|
| DLL3#11/CD3#1 | 68.2 | 94.7 |
| DLL3#12/CD3#1 | 66.2 | 98.7 |
| DLL3#13/CD3#1 | 52.8 | 99.9 |
| DLL3#14/CD3#1 | 52.6 | 87.0 |
| DLL3#15/CD3#1 | 61.5 | na |
| DLL3#16/CD3#1 | 71.8 | 99.5 |
| DLL3#17/CD3#1 | 60.2 | 94.7 |
| DLL3#18/CD3#1 | 61.5 | 98.2 |

Example 15A: Thermostability

Thermostability was determined by Differential Scanning calorimetry (DSC) and results of the first melting transitions (Tm1) of DLL3/CD3 binding proteins are shown in Table 7. DSC thermal melts provide information regarding the thermal stability of a protein in solution relative to a buffer control. Thermal unfolding and aggregation of a 1 mg/ml solution of proteins in 20 mM Citrate, 115 mM NaCl, pH 6 was monitored from 20° C. to 110° C. at a scan rate of 60° C./hr via an automated capillary DSC.

TABLE 7A

| DLL3/CD3 binding proteins | Tm1 |
|---|---|
| DLL3#3/CD3#1 | 64 |
| DLL3#3/CD3#2 | 60 |
| DLL3#3/CD3#3 | 63 |
| DLL3#4/CD3#1 | 63 |

Example 15B: Thermostability

Thermostability was determined by Thermal Shift Analysis (TSA) and results of the first melting transitions (Tm1) of DLL3/CD3 binding proteins (DLL3/CD3 binding proteins comprising a DLL3 chain of SEQ ID NO:73, SEQ ID NO:74, SEQ ID NO:75, SEQ ID NO:76, SEQ ID NO:77, SEQ ID NO:78, SEQ ID NO:241, SEQ ID NO:242, SEQ ID NO:243, SEQ ID NO:244, SEQ ID NO:245, SEQ ID NO:246, SEQ ID NO:247, SEQ ID NO:248, SEQ ID NO:249, SEQ ID NO:250, SEQ ID NO:251 or SEQ ID NO:252 and a CD3 chain of SEQ ID NO:79, a DLL3 binding protein comprising a DLL3 chain of SEQ ID NO:75 and a CD3 chain of SEQ ID NO:80, and a DLL3 binding protein comprising a DLL3 chain of SEQ ID NO:75 and a CD3 chain of SEQ ID NO:105) are shown in Table 7B. The fluorescence intensity profile as a function of temperature was acquired using a QuantStudio 6 Flex real-time PCR system (Applied Biosystems, Waltham, MA) with SYPRO Orange (Invitrogen, Carlsbad, CA) as the extrinsic fluorophore. Sample was diluted to 0.4 mg/ml in 10 mM histidine, pH 6.0 with 40 mM sodium chloride and 0.02% sodium azide. The melt curve was generated with a thermal ramp from 25° C. to 95° C. at a rate of 2° C./min, with data collected approximately every 0.4° C. through the 'ROX' filter set (Ex: 580±10 nm, Em: 623±14 nm). Data were analyzed using Protein Thermal Shift Software Version 1.3 (ThermoFisher Scientific, Waltham, MA).

TABLE 7B

| DLL3/CD3 binding proteins | Tm1 (° C.) |
|---|---|
| DLL3#1/CD3#1 | 65.6 |
| DLL3#2/CD3#1 | 65.5 |
| DLL3#3/CD3#1 | 65.6 |
| DLL3#3/CD3#2 | 63.0 |
| DLL3#3/CD3#3 | 65.5 |
| DLL3#4/CD3#1 | 65.8 |
| DLL3#5/CD3#1 | 65.6 |
| DLL3#6/CD3#1 | 65.8 |
| DLL3#7/CD3#1 | 65.6 |
| DLL3#8/CD3#1 | 65.8 |
| DLL3#9/CD3#1 | 65.9 |
| DLL3#10/CD3#1 | 64.6 |
| DLL3#11/CD3#1 | 66.0 |
| DLL3#12/CD3#1 | 65.9 |
| DLL3#13/CD3#1 | 65.8 |
| DLL3#14/CD3#1 | 65.9 |
| DLL3#15/CD3#1 | na |
| DLL3#16/CD3#1 | 65.8 |
| DLL3#17/CD3#1 | 65.8 |
| DLL3#18/CD3#1 | 65.8 |

Example 16: Predicted Immunogenicity Scores in Silico by Epivax

Immunogenicity of sequences was evaluated in silico with a mathematical algorithm. Specifically, EpiMatrix Treg-adjusted Scores (EpiVax Inc., Providence RI)) as a measure of immunogenicity scores, were determined for DLL3/CD3 binding proteins (DLL3/CD3 binding proteins comprising a DLL3 chain of SEQ ID NO:73, SEQ ID NO:74, SEQ ID NO:75, SEQ ID NO:76, SEQ ID NO:77, SEQ ID NO:78, SEQ ID NO:241, SEQ ID NO:242, SEQ ID NO:243, SEQ ID NO:244, SEQ ID NO:245, SEQ ID NO:246, SEQ ID NO:247, SEQ ID NO:248, SEQ ID NO:249, SEQ ID NO:250, SEQ ID NO:251 or SEQ ID NO:252 and a CD3 chain of SEQ ID NO:79, a DLL3 binding protein comprising a DLL3 chain of SEQ ID NO:75 and a CD3 chain of SEQ ID NO:80, and a DLL3 binding protein comprising a DLL3 chain of SEQ ID NO:75 and a CD3 chain of SEQ ID NO:105) and compared to the scores of various Fc sequences. These scores are taking T-cell epitopes and Treg epitopes into consideration. The lower the immunogenicity score, the less likely a sequence to be immunogenic. In general, a negative score is considered low risk of immunogenicity, while a highly positive score is viewed as indication for potential immunogenicity. As shown in the tables below, DLL3/CD3 binding proteins described herein have very low immunogenicity scores, indicating that the risk of being immunogenic is low for these binding proteins.

TABLE 8

Adjusted Epivax scores of DLL3/CD3 binding proteins

| DLL3/CD3 binding proteins | VH | VL | Full polypeptide chain (VL-CL-linker-VH-CH1-hinge-CH2-CH3) |
|---|---|---|---|
| DLL3#1 DLL3 chain | −36.88 | −59.85 | −43.31 |
| DLL3#2 DLL3 chain | −46.99 | 31.40 | −33.53 |
| DLL3#3 DLL3 chain | −34.44 | 2.84 | −35.50 |
| DLL3#4 DLL3 chain | 25.97 | 28.92 | −21.93 |
| DLL3#5 DLL3 chain | −59.87 | −46.45 | −44.95 |
| DLL3#6 DLL3 chain | 29.70 | −14.55 | −27.26 |
| DLL3#1 CD3 chain | −9.68 | −50.52 | −35.25 |
| DLL3#2 CD3 chain | −15.54 | −50.52 | −36.23 |
| DLL3#3 CD3 chain | −13.49 | −50.52 | −35.88 |

TABLE 8-continued

Adjusted Epivax scores of DLL3/CD3 binding proteins

| DLL3/CD3 binding proteins | VH | VL | Full polypeptide chain (VL-CL-linker-VH-CH1-hinge-CH2-CH3) |
|---|---|---|---|
| DLL3#7 DLL3 chain | −48.55 | −34.92 | −41.60 |
| DLL3#8 DLL3 chain | −54.39 | −37.79 | −42.89 |
| DLL3#9 DLL3 chain | 35.95 | −60.37 | −31.83 |
| DLL3#10 DLL3 chain | −33.82 | −34.60 | −40.73 |
| DLL3#11 DLL3 chain | −24.00 | 26.66 | −30.50 |
| DLL3#12 DLL3 chain | −30.43 | 25.68 | −31.67 |
| DLL3#13 DLL3 chain | 8.64 | 18.63 | −25.96 |
| DLL3#14 DLL3 chain | 1.58 | −10.63 | −31.72 |
| DLL3#15 DLL3 chain | 8.93 | −8.31 | −29.91 |
| DLL3#16 DLL3 chain | −55.14 | 13.98 | −35.59 |
| DLL3#17 DLL3 chain | 11.89 | 12.55 | −26.52 |
| DLL3#18 DLL3 chain | 5.82 | 15.85 | −27.01 |

TABLE 9

Adjusted Epivax scores of Fc domains

| Fc Protein Chain | Adjusted Epivax score |
|---|---|
| Fc-IgG1-WT | −25.64 |
| Fc-IgG1-LALA | −29.83 |
| Fc-IgG1-LALA-KNOB | −31.76 |
| Fc-IgG1-LALA-HOLE | −18.01 |

Example 17A: Non-Specific Binding to Surfaces

The specificity of the DLL3/CD3 binding proteins of the invention was further tested in a SPR-based assay using highly charged proteins. A non-specific binding assay was developed using biosensor technology to determine if binding proteins have significant binding to unrelated charged proteins. In this assay, DLL3/CD3 binding proteins were passed over two SPR surfaces, one coated with a negatively charged protein (Trypsin Inhibitor) and one coated with a positively charged protein (Lysozyme). When a protein displays significant non-specific binding to these surfaces, it is likely that the cause of binding is the presence of positive or negative charged surface patches on the candidate. Non-specific binding of proteins may translate to poor pharmacokinetics (PK) and biodistribution and may also have downstream manufacturability impacts.

The experiment was performed on a Biacore T200. The dilution, surface preparation, and binding experiments were performed at 25° C. in 1×HBS-EP buffer prepared from 10×HBS-EP. The flow rate for both the immobilization protocol and binding experiment was at 5 μL/min.

To prepare the surface for the non-specific binding experiment, chicken egg white lysozyme and trypsin inhibitor from *Glycine max* soybean were coupled manually to a series S CMS chip with the surface density of 3000-5000 RU using the amine coupling kit according to the manufacture instructions.

Samples were prepared at 1 μM in 1×HBS-EP buffer. The samples were injected over activated surfaces with a 10 min association and 10 min dissociation. The data was collected using Biacore T200 Control Software version 2.0.1 and analyzed using Biacore T200 Evaluation Software version 3.0.

The DLL3/CD3 binding proteins did not bind to these highly charged surfaces. Table 10A shows absence of binding to the two highly charged proteins, Trypsin Inhibitor and Lysozyme, with two exemplary DLL3/CD3 binding proteins.

TABLE 10A

| | Non-specific binding | |
|---|---|---|
| DLL3/CD3 Binding Protein | Lysozyme (positive) | Tryp. Inhibitor (negative) |
| DLL3#3/CD3#1 | No | No |
| DLL3#3/CD3#2 | No | No |

Example 17B: Non-Specific Binding to Surfaces

The specificity of the DLL3/CD3 binding proteins (DLL3/CD3 binding proteins comprising a DLL3 chain of SEQ ID NO:73, SEQ ID NO:74, SEQ ID NO:75, SEQ ID NO:76, SEQ ID NO:77, SEQ ID NO:78, SEQ ID NO:241, SEQ ID NO:242, SEQ ID NO:243, SEQ ID NO:244, SEQ ID NO:245, SEQ ID NO:246, SEQ ID NO:247, SEQ ID NO:248, SEQ ID NO:249, SEQ ID NO:250, SEQ ID NO:251 or SEQ ID NO:252, and a CD3 chain of SEQ ID NO:79, a DLL3 binding protein comprising a DLL3 chain of SEQ ID NO:75 and a CD3 chain of SEQ ID NO:80, and a DLL3 binding protein comprising a DLL3 chain of SEQ ID NO:75 and a CD3 chain of SEQ ID NO:105) was further tested in an SPR-based assay using highly charged proteins, as described in Example 17a, with a 10 min association and 15 min dissociation. The results are shown in Table 10B.

TABLE 10B

Low RU numbers indicate no significant binding to unrelated charged proteins

| | Non-specific binding (RU) | |
|---|---|---|
| DLL3/CD3 Binding Protein | Lysozyme (positive) | Tryp. Inhibitor (negative) |
| DLL3#1/CD3#1 | 4 | 1 |
| DLL3#2/CD3#1 | 7 | 2 |
| DLL3#3/CD3#1 | 54 | 85 |
| DLL3#3/CD3#2 | 44 | 36 |
| DLL3#3/CD3#3 | 17 | 28 |
| DLL3#4/CD3#1 | 16 | 37 |
| DLL3#5/CD3#1 | 4 | 0 |
| DLL3#6/CD3#1 | 6 | 0 |
| DLL3#7/CD3#1 | 9 | 3 |
| DLL3#8/CD3#1 | 39 | 18 |
| DLL3#9/CD3#1 | 15 | 27 |
| DLL3#10/CD3#1 | 25 | 12 |
| DLL3#11/CD3#1 | 11 | 13 |
| DLL3#12/CD3#1 | 8 | 9 |
| DLL3#13/CD3#1 | 11 | 3 |
| DLL3#14/CD3#1 | 18 | 6 |
| DLL3#15/CD3#1 | na | na |
| DLL3#16/CD3#1 | 6 | 0 |
| DLL3#17/CD3#1 | 15 | 8 |
| DLL3#18/CD3#1 | 23 | 81 |

Example 18: Induction of Lysis, T Cell Activation, T Cell Degranulation, T Cell Proliferation and Cytokine Secretion in Presence of DLL3-Positive and DLL3-Negative Tumor Cells PBMCs were purified as described in Example 9. To determine T cell activation, T cell degranulation and cytokine secretion, a cytotoxicity assay with PBMCs and DLL3- positive SHP77 or DLL3-negative RKO-E6 cells as target cells was setup as described in Example 10B. Potency of cell lysis by redirecting T cells towards human SHP77 or RKO-E6 cells was determined as described in Example 10A. To determine T cell activation, and T cell degranulation cells were centrifuged and stained with antibodies against CD4 (BD #550630), CD8 (BD #557834), CD25 (BD #340907), subsequently the cells were permeabilized using the Fixation/Permeabilization Solution (BD #554714) and stained with antibodies against Perforin (BioLegend #308120) and Granzyme B (BD #560221) and measured by flow-cytometry. Cytokine levels in supernatants were determined by U-PLEX Biomarker Group 1 (hu) Assays (MSD, #K15067L-2, Kit).

To determine the proliferation of T cells, PBMCs were labeled with 5 µM Cell Trace™ CFSE (Invitrogen, C34554) and T cell stained with an anti-CD3 antibody (BioLegend cat #: 317336). Subsequently the labeled PBMCs were incubated with SHP77 or RKO-E6 cells at a ratio of 10:1 and increasing concentrations of an DLL3/CD3 binding protein for 6 days.

Figure 14A:
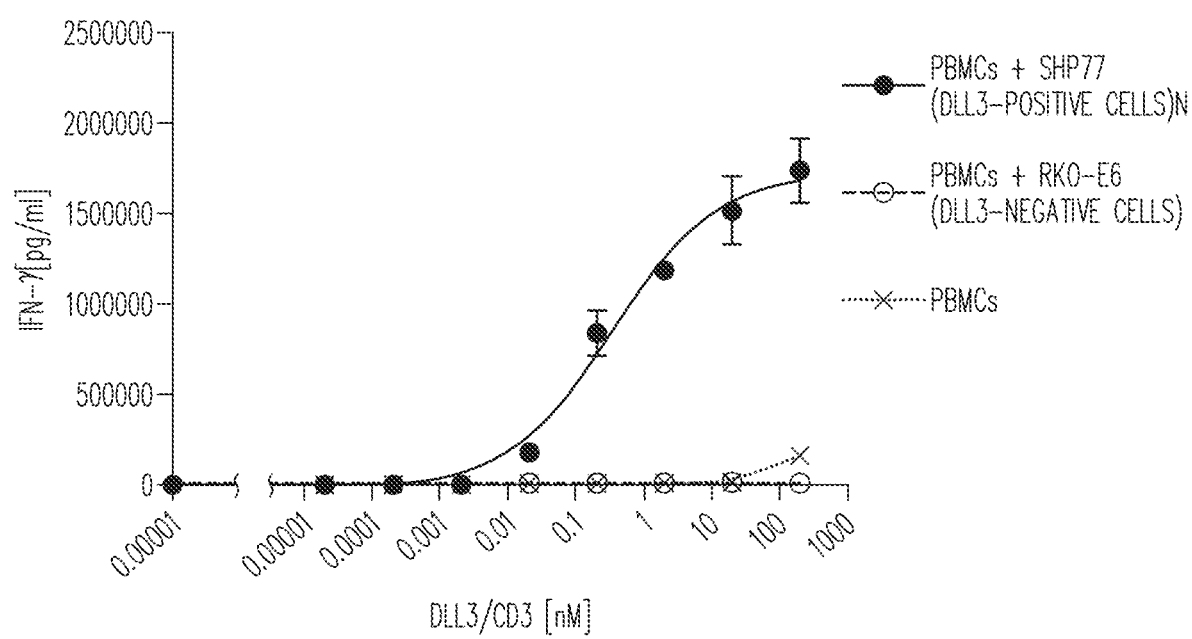
FIG. 14A: Potency secretion of Interferon gamma by PBMCsin presence of SHP77 cells of an exemplary DLL3/CD3 binding protein
Figure 14B:
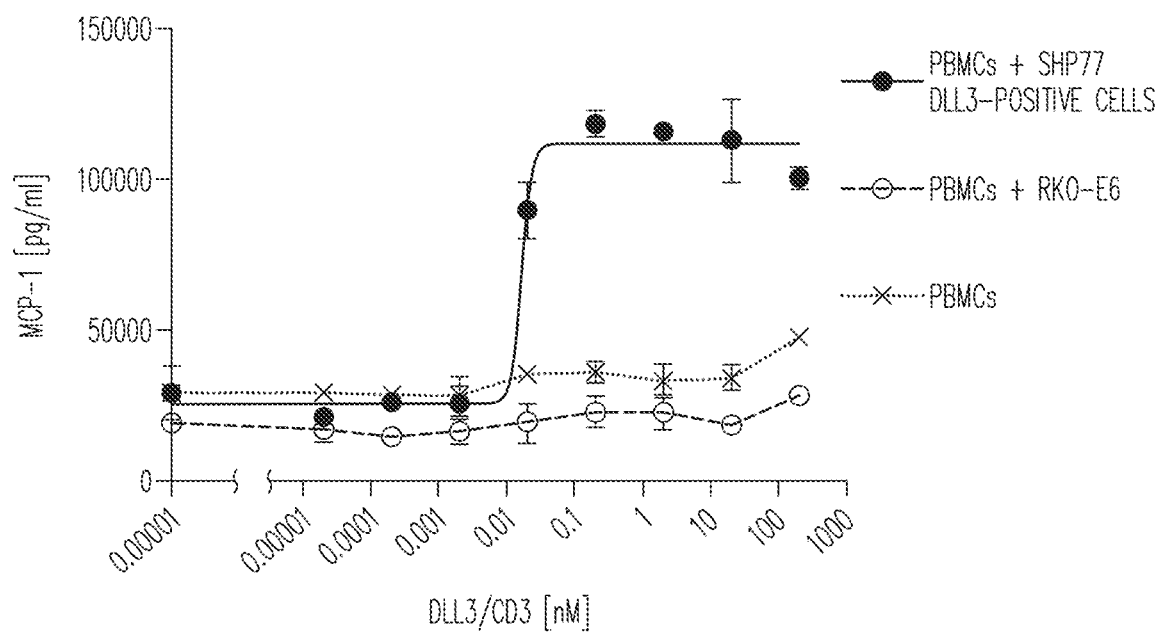
FIG. 14B: Potency secretion of MCP-1 by PBMCsin presence of SHP77 cells of an exemplary DLL3/CD3 binding protein
Figure 15A:
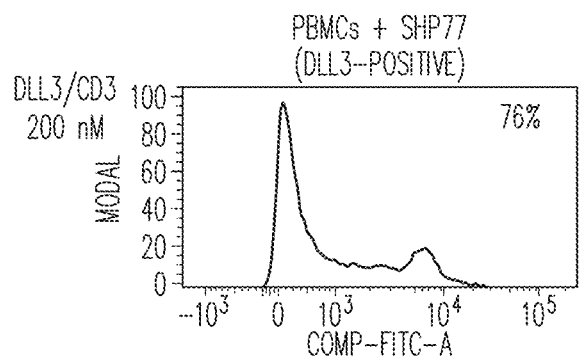
FIG. 15A-J: Potency of an exemplary DLL3/CD3 binding protein at a concentration of 0 nm (I and J), 0.002 nm (G and H), 0.02 nm (E and F), 2 nm (C and D), and 200 nm on proliferation of T cells in presence of DLL-3 positive SHP77 cells (A, C, E, G, and I) or DLL-3 negative RKO-E6 cells at each respective concentration.
Figure 15B:
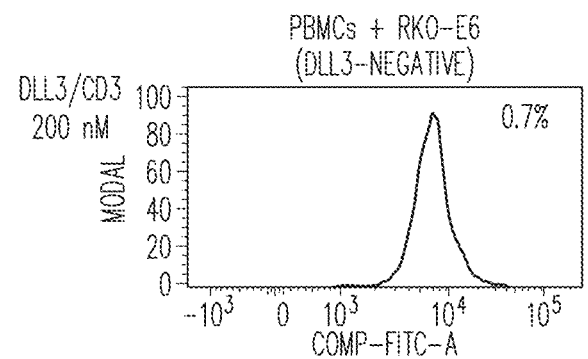
Figure 15C:
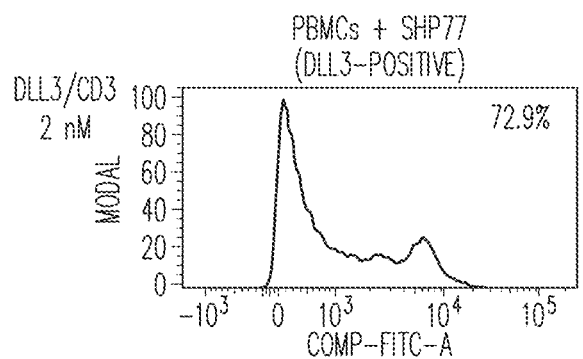
Figure 15D:
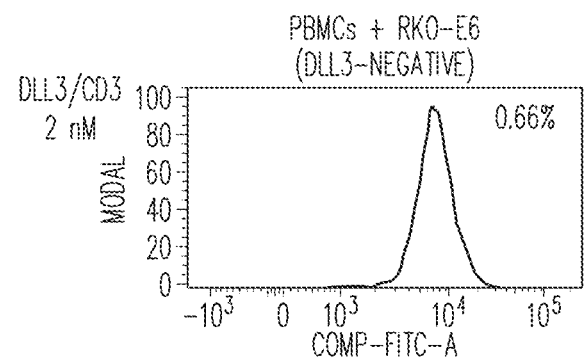
Figure 15E:
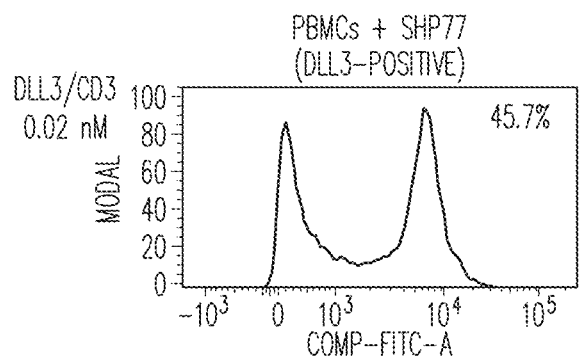
Figure 15F:
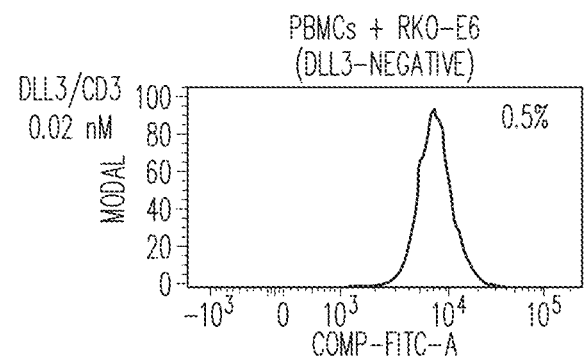
Figure 15G:
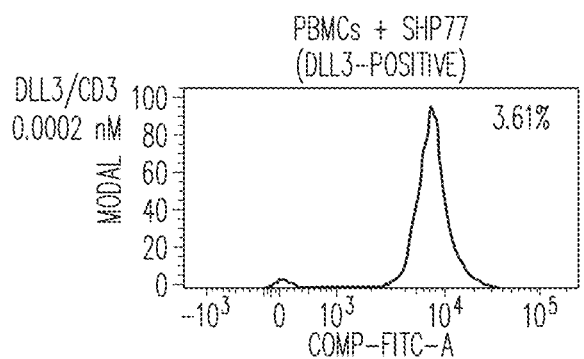
Figure 15H:
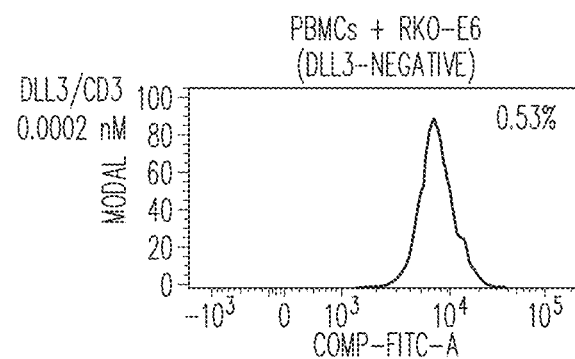
Figure 15I:
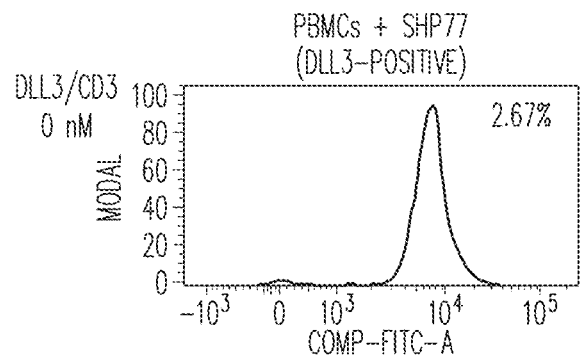
Figure 15J:
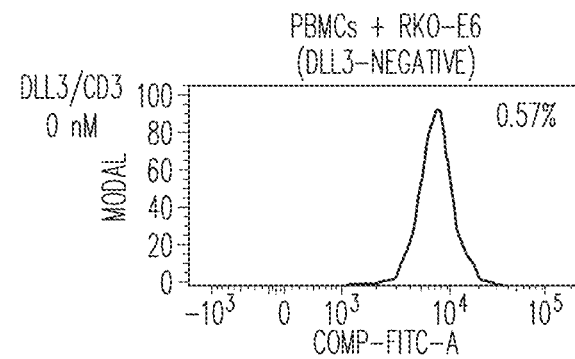
Figure 16:
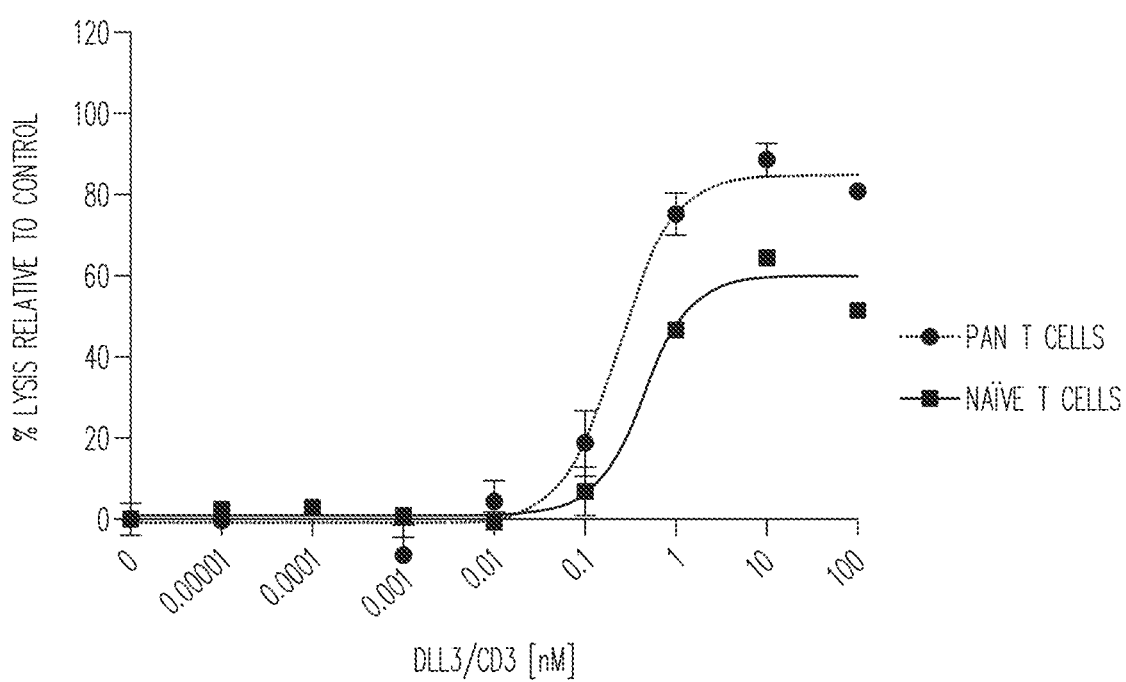
FIG. 16: Potency in lysing cells of an exemplary DLL3/CD3 binding protein redirecting non-stimulated pan T cells and naïve T cells towards human SHP77 cells
Figure 17:
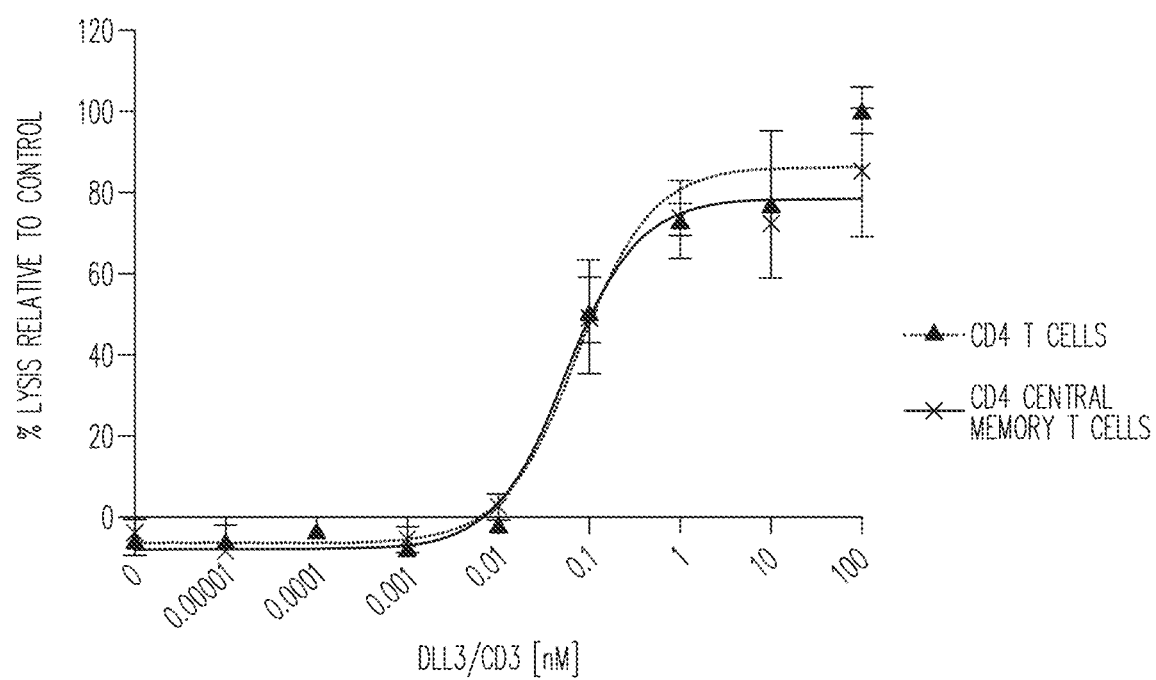
FIG. 17: Potency in lysing cells of an exemplary DLL3/CD3 binding protein redirecting non-stimulated $CD4^+$ and $CD4^+$ central memory T cells towards human SHP77 cells
Figure 18:
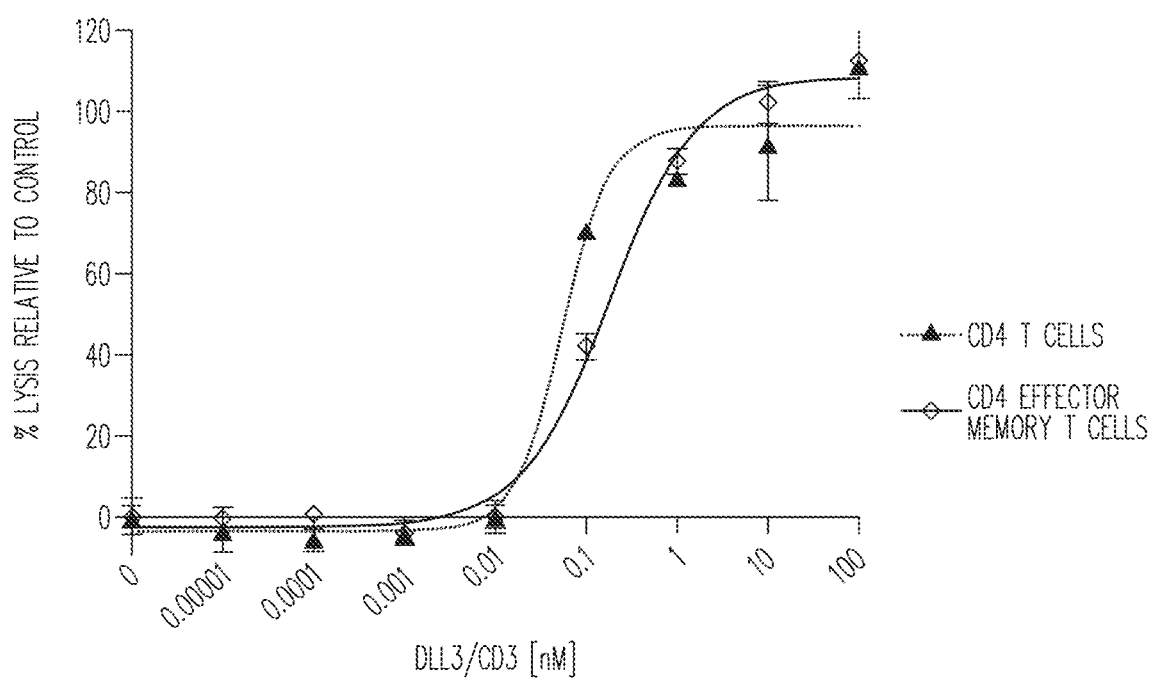
FIG. 18: Potency in lysing cells of an exemplary DLL3/CD3 binding protein redirecting non-stimulated $CD4^+$ and $CD4^+$ effector memory T cells towards human SHP77 cells
Figure 19:
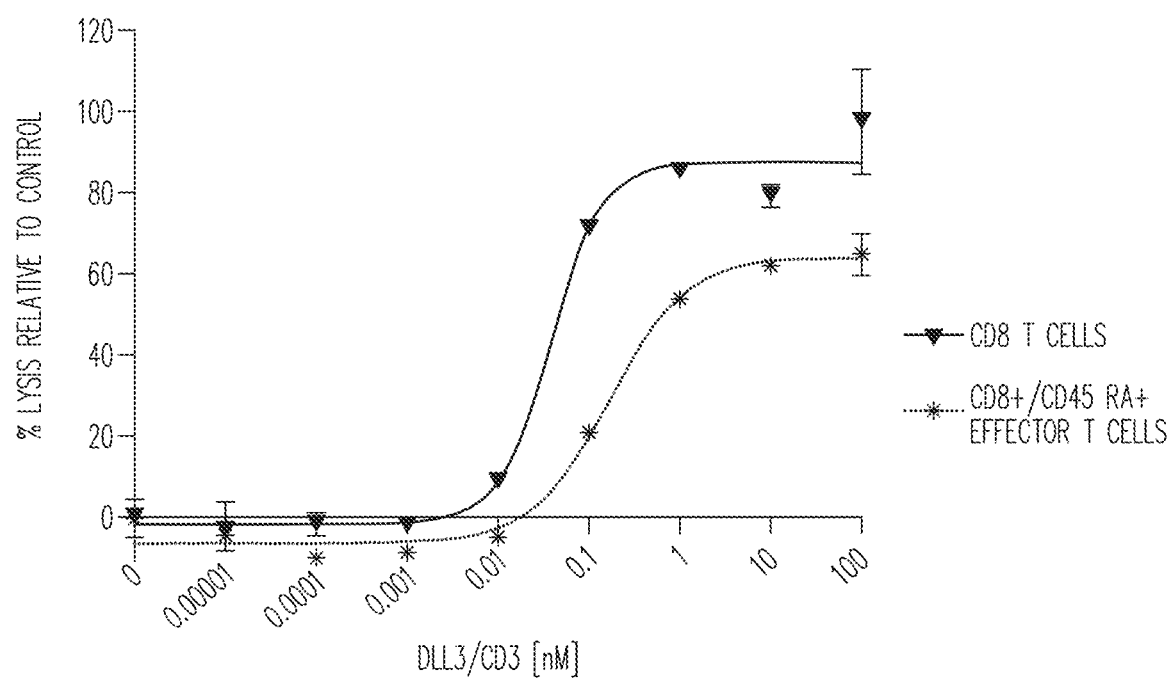
FIG. 19: Potency in lysing cells of an exemplary DLL3/CD3 binding protein redirecting non-stimulated $CD8^+$ and $CD8^+CD45RA^+$ effector memory T cells towards human SHP77 cells
Figure 20:
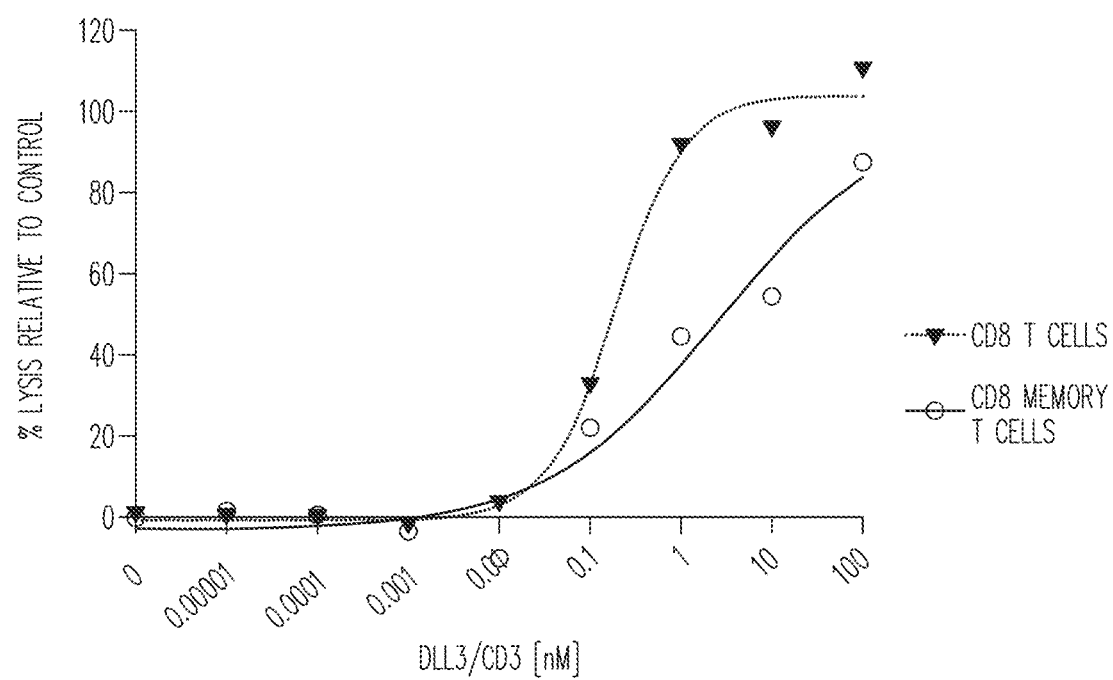
FIG. 20: Potency in lysing cells of an exemplary DLL3/CD3 binding protein redirecting non-stimulated $CD8^+$ and $CD8^+$ memory T cells towards human SHP77

FIGS. 11-15 show induction of T cell redirected lysis of SHP77 or RKO-E6 cells (FIG. 11) and induction of dose-dependent T cell activation (FIG. 12), T cell degranulation (FIG. 13), secretion of cytokines (FIG. 14A: Interferon gamma; 14B: MCP-1), and proliferation of T cells (FIG. 15A-J) in presence of SHP77 (FIGS. 15A, C, E, G and I) or RO-E6 cells (15 B, D, F, H, and J) and an DLL3/CD3 binding protein at 0 nM (FIGS. 15 I and J), 000.2 nM (FIGS. 15 G and H), 0.02 nM (FIGS. 15 C and D), and 200 nM (FIGS. 15 A and B).

Example 19: Redirection of T Cell Subsets to SHP77 Cells

PBMCs were isolated as described in Example 10a. Subsequently T cell subsets were isolated using the following reagents and protocols:

TABLE 11

Reagents and protocols for isolation of T cell subsets

| T cell subset | Used reagents and protocols |
| --- | --- |
| Naïve T cells | Miltenyi Biotech; #130-097-095 |
| CD4+ T cells | Miltenyi Biotech; #130-096-533 |
| CD4+ Effector Memory T cells | Miltenyi Biotech; #130-094-125 |
| CD4+ Central Memory T cells | Miltenyi Biotech; #130-094-302 |
| CD8+ T cells | Miltenyi Biotech; #130-096-495 |
| CD8+CD45RA+ Effector T cells | Miltenyi Biotech; #130-094-485 |
| CD8+ Memory T cells | Miltenyi Biotech; #130-094-412 |

FIGS. 16-20 shows potency of redirecting of Pan T cells (FIG. 16), naïve T cells (FIG. 16), CD4+ T cells (FIGS. 17, 18), CD4+ Effector Memory T cells (FIG. 18), CD4+ Central Memory T cells (FIG. 17), CD8+ T cells (FIGS. 19, 20), CD8+CD45RA+ Effector T cells (FIG. 19), CD8+ Memory T cells (FIG. 20) against human SHP77 cells of an DLL3/CD3 binding protein.

Figure 21:
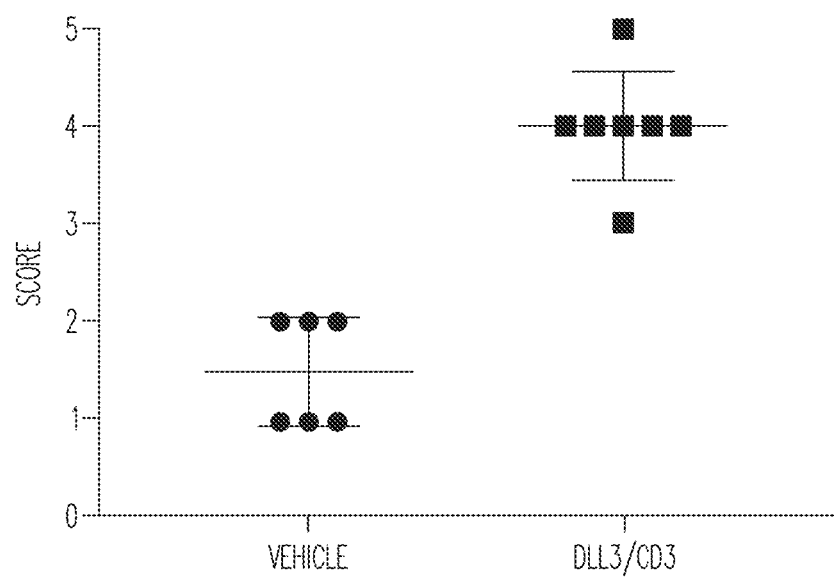
FIG. 21: T cell infiltration in SHP77 xenograft tumor tissue with an exemplary DLL3/CD3 binding protein.

Example 20: T Cell Infiltration in SHP77 Xenograft Tumor Tissue with an Exemplary DLL3/CD3 Binding Protein Remaining tumor tissues from mice in the study described in Example 13 were prepared, fixed in formalin and embedded in paraffin. Subsequently tissue sections were prepared and stained for CD3 expression on T cells (2GV6 Ventana). T cell infiltration in SHP77 xenograft tumor tissue with an exemplary DLL3/CD3 binding protein is shown in FIG. 21. The scoring in Table 12 was used to quantify CD3 expression in xenograft tumor tissues.

TABLE 12

Scoring for quantification of infiltrating CD3-positive T cells

| Score | Description |
| --- | --- |
| 0 | no CD3+ cells in plain of section |
| 1 | rare scattered cells or small clusters, mostly in the stroma |
| 2 | rare scattered cells or small clusters, in the stroma and margin |
| 3 | low cell numbers or clusters in stroma, epithelium and margin |
| 4 | moderate cell numbers or clusters in stroma and margin; low numbers of intra-epithelial cells |
| 5 | high cell numbers or clusters in stroma and margin; low numbers of intra-epithelial cells |

Example 21: Production of Anti-DLL3 Antibodies

To obtain anti-DLL3 binders, hybridomas or single B cells derived from DLL3 immunized wild-type and AlivaMab humanized mice (Ablexis, San Francisco, CA, USA: AlivaMab transgenic mouse platform with human immunoglobulin loci) were cultured in vitro. Supernatants were screened for reactivity against recombinant human DLL3, by AlphaLISA (PerkinElmer, Waltham, MA, USA), and against SHP-77 cells (ATCC®, CRL-2195™) expressing human DLL3, by Flow Cytometry.

Immunoglobulin (Ig) VH and VL genes were then amplified from identified positive clones. To isolate RNA from hybridomas, about $2 \times 10^6$ cells from single clones were pelleted and used as source material. For single B cells, 100 to 500 cells expanded from singularly isolated B cells were used as source material. RNA was isolated using RNeasy Plus (Qiagen, Hilden, Germany) cDNA was then synthesized using Smarter cDNA synthesis kit (Clontech, Mountain View, CA) according to manufacturer's instructions. To facilitate cDNA synthesis, oligodT was used to prime reverse transcription of all messenger RNAs followed by "5' capping" with a Smarter HA oligonucleotide. Subsequent amplification of the VH and VL fragments was performed using a 2-step PCR amplification using 5' primers targeting the Smarter HA cap and 3' primers targeting consensus regions in CH1. Briefly, each 50 µl PCR reaction consists of 20 µM of forward and reverse primer mixes, 25 µl of PrimeStar Max DNA polymerase premix (Clontech), 2 µl of unpurified cDNA, and 21 µl of double-distilled H2O. The cycling program starts at 94° C. for 3 min, followed by 35 cycles (94° C. for 30 Sec, 50° C. for 1 min, 68° C. for 1 min), and ends at 72° C. for 7 min. The second round PCR was performed with VL and VH 2nd round primers containing 15 bp complementary extensions that "overlap" respective regions in their respective pTT5 mother vector (VH and VL). Second round PCR was performed with the following program: 94° C. for 3 min; 35 cycles (94° C. for 30 Sec, 50° C. for 1 min, 68° C. for 1 min), and ends at 72° C. for 7 min.

In-Fusion® HD Cloning Kit (Clontech, U.S.A.) was used for directional cloning of VL gene into pTT5 huIgK vector and VH gene into pTT5 huIgG1KO vector. To facilitate In-Fusion® HD Cloning, PCR products were purified and treated with Cloning Enhancer before In-Fusion HD Cloning. Cloning and transformation were performed according to manufacturer's protocol (Clontech, U.S.A.). Mini-prep DNAs were subjected to Sanger sequencing to confirm that complete V-gene fragments were obtained.

Using this methodology, pairs of Ig VH and VL genes encoding binding domains with specificity for DLL3 were prepared. Recombinant antibodies were produced by transient transfection of CHO-E37 cells with the corresponding heavy and light chain-encoding plasmids.

Confirmatory Screening of Recombinant Antibodies

Supernatants containing expressed recombinant antibodies were assayed by flow cytometry for binding to cell lines expressing human DLL3. Briefly, cells were incubated with recombinant supernatants, washed, and bound mAbs from the supernatants were detected with anti-human-IgG-APC (Jackson ImmunoResearch 109-136-098). Signal-to-background ratios (S/B) were calculated by dividing the median fluorescence intensity (MFI) of the sample by that of isotype control.

Surface Plasmon Resonance (SPR) on Biacore 400 was performed on recombinant supernatants. Briefly, the non-optimized IgGs in the HTP supernatants were captured via Protein A/G onto the sensor surface for 60 sec at 10 ul/min. Binding of 100 nM human DLL3 to the captured IgGs was monitored for 180 sec of association at 30 ul/min, followed by 120 sec of dissociation in the HBS-EP buffer. Regeneration of the Protein A/G surface was performed with Glycine pH 2.1 in between each binding cycle. The following materials were used in this assay: Protein reagent: recombinantly expressed human DLL3. System running buffer: HBS-EP (10 mM HEPES pH 7.4, 150 mM NaCl, 3 mM EDTA, and 0.005% v/v polysorbate P20). Capturing reagent: Protein A/G, with specificity towards all human IgG isotypes.

Clones of interest (with Kd<300 pM) were selected and further evaluated in various detection assays as described below.

Example 22: Binding of Anti-DLL3 Antibodies to Recombinant Human DLL3 Protein

Figure 22:
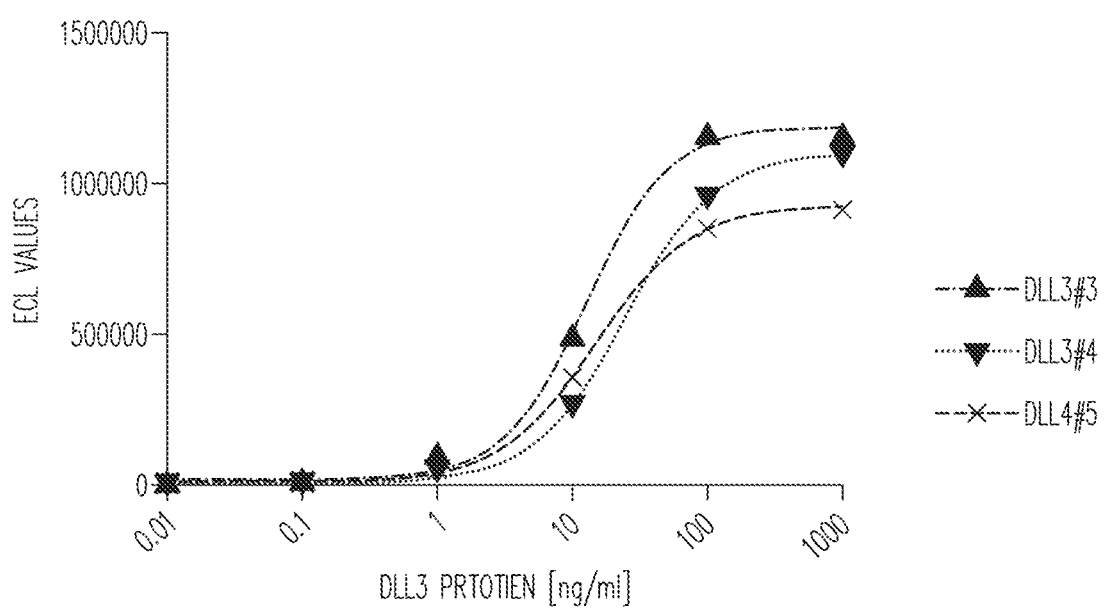
FIG. 22: Binding of three exemplary anti-DLL3 antibodies to recombinant DLL3 protein in ELISA assay. The y-axis depicts counts, the x-axis depicts concentration of DLL3 protein.

Binding of antibodies was performed in an ELISA. In brief, anti-DLL3 antibodies were coated at a concentration of 2 µg/ml at 4° C. over night. After washing the plates were blocked with blocking buffer (Gibco, Gibco #043-90309A) for one hour at room temperature, followed by washing and incubation with recombinant DLL3 protein at increasing concentrations. For detection the bound DLL3 protein was incubated with a polyclonal anti-DLL3 antibody (R&D Systems, AB4315) followed by a SULFO-TAG labelled anti-goat antibody (R32AG-1) for one hour. The bound antibody was quantified by using a Read Buffer (MSD) in a Sector imager 6000 (MSD). FIG. 22 shows binding to three exemplary anti-DLL3 antibodies to recombinant protein. Anti-DLL3 antibody targeting the membrane proximal peptide domain (DLL3 #3) shows stronger binding to recombinant DLL3 protein, compared to anti-DLL3 antibodies which target the EGF4 (DLL3 #4) or EGF1 domain (DLL3 #5).

Example 23: Binding of Anti-DLL3 Antibodies to SCLC Cell Lines

Figure 23:
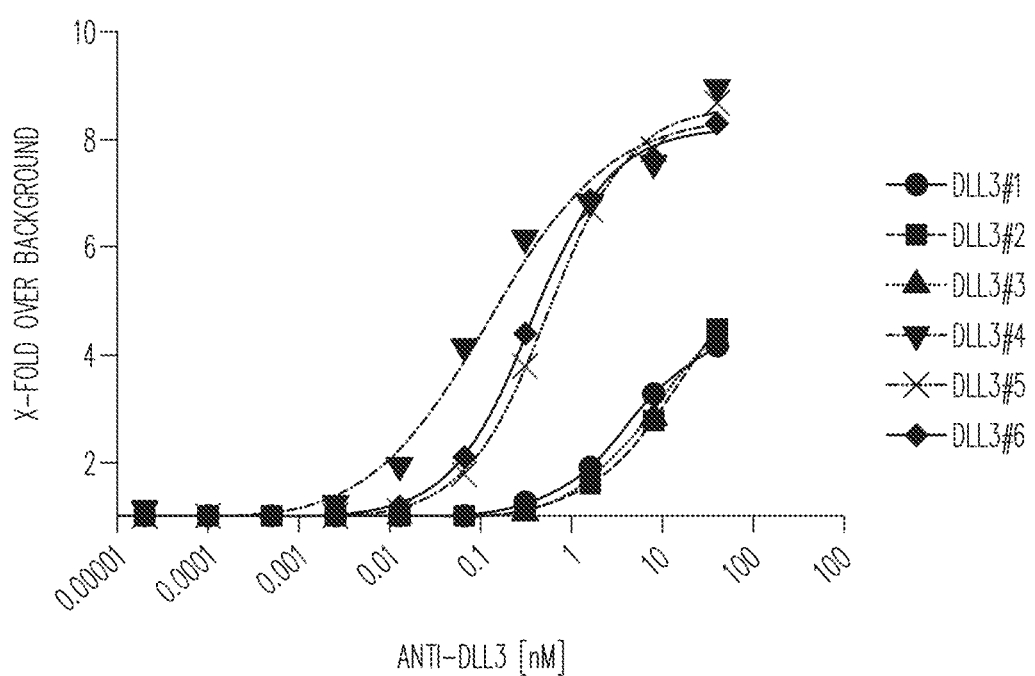
FIG. 23: Binding of six exemplary anti-DLL3 antibodies to DLL3-positive SCLC cell lines determined by flow cytometry. The y-axis depicts counts, the x-axis depicts concentration of anti-DLL3 antibody.
Figure 24A:
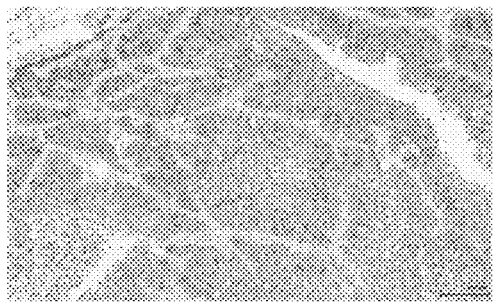
FIG. 24A-E: Representative staining of a SCLC tissue sample with 5 exemplary anti-DLL3 antibodies; (A) DLL3 #1, (B) DLL3 #2, (C) DLL3 #4, (D) DLL3 #5, and (E) DLL3 #6. Anti-DLL3 antibodies DLL3 #1 (A) and DLL3 #5 (D) showed that the tumor cells exhibit a punctate and/or diffuse cytoplasmic and/or membranous DLL3 staining Images have been electronically generated by LEICA SCN400 automated scanner with a magnification of 10×.
Figure 24B:
Figure 24C:
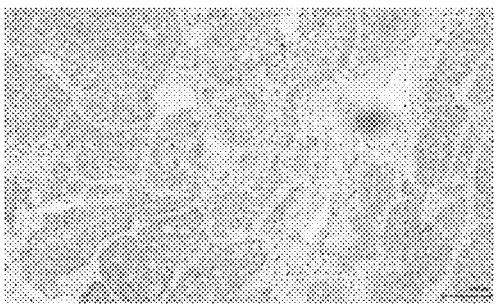
Figure 24D:
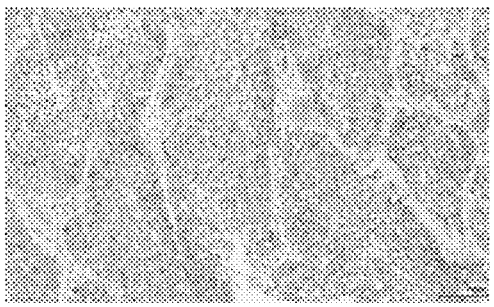
Figure 24E:
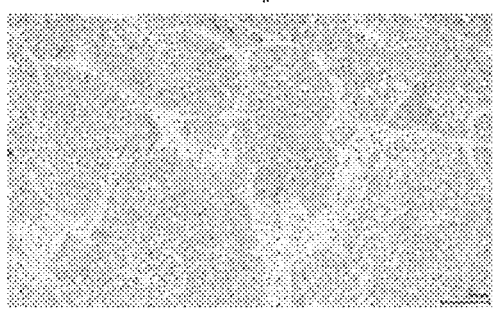

Cells (T cells or human SCLC cells) were stained with increasing concentrations of anti-DLL3 antibody with increasing concentrations in FACS buffer (PBS/0.5% BSA/0.05% sodium azide). Bound molecules were detected with PE-conjugated anti-mouse secondary antibody (Jackson Immuno Research, 115-116-072) by FACS analysis. Anti-DLL3 antibodies targeting DSL (DLL3 #6), EGF1 (DLL3 #5) or EGF4 (DLL3 #4) domains show stronger binding to SCLC cell lines expressing DLL3, compared to anti-DLL3 antibodies which target the C-terminal peptide (DLL3 #1, DLL3 #2, DLL3 #3) as shown in FIG. 23.

Example 24: (IHC)

Anti-DLL3 antibodies were tested on a DLL3 mRNA positive SCLC sample at 20 µg/ml concentration using Ventana Discovery ultra (Ventana Medical Systems, Inc, Arizona) following manufacturer's instructions. In brief, IHC was performed on formalin fixed paraffin embedded tissue and sections (4 pm) where stained with anti-DLL3 antibodies. IHC assay was performed on Ventana Discovery Ultra platform using RUO Discovery Universal protocol. Anti-DLL3 antibody staining was optimised using Proteinase K as Epitope Retrieval for 12 minutes. Anti-DLL3 antibody was incubated for 60 minutes, followed by anti-mouse HQ detection system and anti HQ HRP both for 12 minutes. Negative controls (IgG antibody) were performed for each tissue section, treated identically to the test slides.

The human SCLC cell line SHP77 were used as positive control. Digital images of whole-tissue sections were acquired using a Leica SCN400 histology scanner (Leica Microsystems, Milton Keynes, UK).

Immunohistochemistry analysis of a human SCLC sample with exemplary anti-DLL3 antibodies is shown in FIG. 24A-E (in color): DLL3 #1 (A), DLL3 #2 (B), DLL3 #4 (C), DLL3 #5 (D), and DLL3 #6 (E).

Example 25: Determination of Expression Levels on SCLC Cell Lines

Cell surface expression of anti-DLL3 antibodies was quantified using the QIFIKIT (K0078; Dako). In brief, SCLC cell lines (SHP77, NCI-H82 and NCI-H2286) were labeled with the anti-DLL3 antibody (DL309, WO 2011/093097) or irrelevant antibody (isotype control) at 5 µg/ml. In a separate vial. Subsequently cells and beads provided in the kit were labeled in parallel with fluorescein-conjugated anti-mouse secondary antibodies. Samples were measured in a BD CantoII Fluorocytometer and consequently, the fluorescence is correlated with the number of bound anti-DLL3 antibodies on the cells and on the beads. Table 12 shows DLL3 molecules expressed on the cell surface of three SCLC cell lines.

TABLE 13

DLL3 molecules expressed on the cell surface of SCLC cell lines

| SCLC CELL LINE | Cell surface DLL3 molecules/cell |
|---|---|
| SHP77 (ATCC ®, CRL-2195 ™) | 2061 |
| NCI-H82 (HTB-175TM) | 824 |
| NCI-H2286 | 129 |

Example 26: Determination of Sensitivity of IHC Protocol on SCLC Cell Line Blocks To evaluate the sensitivity of the IHC protocol, SCLC cell lines (SHP77, NCI-H82 and NCI-H2286) were processed like tissues in hospitals and fixed in Formalin and subsequently embedded in paraffin.

Figure 25A:
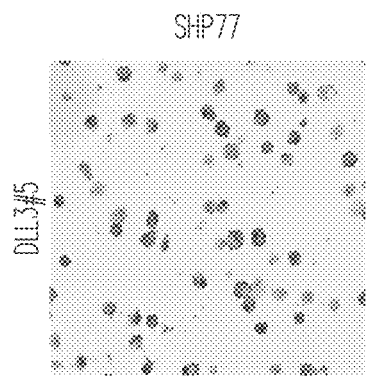
FIG. 25A-F: Representative staining of cell pellets from SCLC cell lines, SHP77 (A & B), NCI_H82(C & D), NCI-H226 (E & F) with different DLL3 expression levels.
Figure 25C:
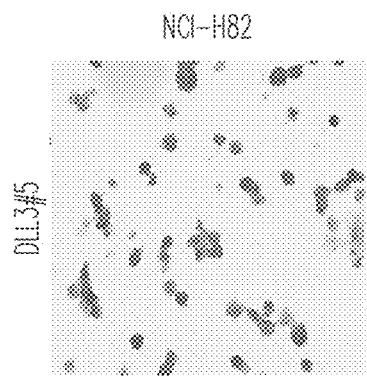
Figure 25E:
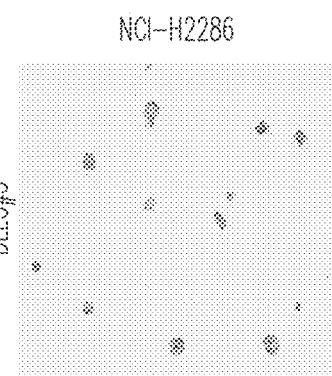
Figure 25B:
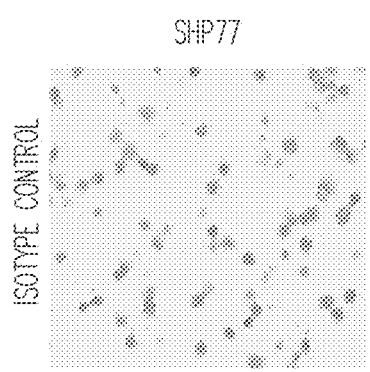
Figure 25D:
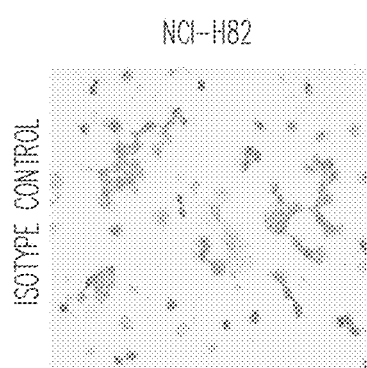
Figure 25F:
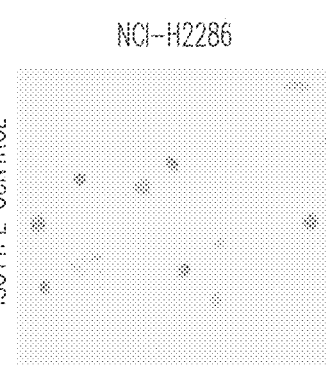

SCLC cell lines (FIG. 25A-F (in color): SHP77 (A and B), NCI-H82 (C and D), and NCI-H2286 (E and F) were cultured according to ATCC instructions with DLL3 #5 (FIGS. 25A, C, and E) or an isotype matched control (FIGS. 25B, D and F). Cells were scraped from the plate and fixed in Formalin and subsequently added to solubilized Histogel (Thermo Fisher scientific, HG-4000-012) and incubated over night at 4° C., followed by a standard paraffin embedding procedure performed in routine pathology laboratory. In brief, cell block is incubated in Ethanol and Isopropanol before embedding in Paraffin (roti-Plast, #6642.5). Sections of the cell pellet blocks were performed and sections were stained with the protocol as described in Example 24. The results shown in FIG. 25 A-F show that an IHC protocol with anti-DLL3 antibody DLL3 #5 (FIGS. 25 A, C and E) is able to detect cells with very low DLL3 expression.

The invention claimed is:

1. A protein comprising a first antigen binding unit specifically binding to the membrane proximal domain of DLL3 and a second antigen binding unit specifically binding to CD3, wherein said first antigen binding unit specifically binding to DLL3 is selected from the group consisting of i) to iii):
- i) an antigen binding unit comprising light chain CDRs comprising the amino acid sequences of SEQ ID NO:1 (CDR1), SEQ ID NO:2 (CDR2) and SEQ ID NO:3 (CDR3) and heavy chain CDRs comprising the amino acid sequences of SEQ ID NO: 4 (CDR1), SEQ ID NO:5 (CDR2) and SEQ ID NO:6 (CDR3);
- ii) an antigen binding unit comprising light chain CDRs comprising the amino acid sequences of SEQ ID NO:7 (CDR1), SEQ ID NO:8 (CDR2) and SEQ ID NO:9 (CDR3) and heavy chain CDRs comprising the amino acid sequences of SEQ ID NO: 10 (CDR1), SEQ ID NO:11 (CDR2) and SEQ ID NO:12 (CDR3); and
- iii) an antigen binding unit comprising light chain CDRs comprising the amino acid sequences of SEQ ID NO:13 (CDR1), SEQ ID NO:14 (CDR2) and SEQ ID NO:15 (CDR3) and heavy chain CDRs comprising the amino acid sequences of SEQ ID NO: 16 (CDR1), SEQ ID NO:17 (CDR2) and SEQ ID NO:18 (CDR3).

2. The protein of claim 1, wherein said first antigen binding unit specifically binding to the membrane proximal domain of DLL3 comprises a first light chain variable domain and a first heavy chain variable domain and is selected from the group consisting of i) to iii):
- i) an antigen binding unit comprising a light chain variable domain comprising the amino acid sequence of SEQ ID NO:37 and heavy chain variable domain comprising the amino acid sequence of SEQ ID NO:38;
- ii) an antigen binding unit comprising a light chain variable domain comprising the amino acid sequences of SEQ ID NO:39 and heavy chain variable domain comprising the amino acid sequences of SEQ ID NO:40; and
- iii) an antigen binding unit comprising a light chain variable domain comprising the amino acid sequence of SEQ ID NO:41 and heavy chain variable domain comprising the amino acid sequence of SEQ ID NO:42.

3. The protein of claim 1, wherein said second antigen binding unit specifically binding to CD3 is selected from the group consisting of i)-iii):
- i) an antigen binding unit comprising light chain CDRs comprising the amino acid sequences of SEQ ID NO:55 (CDR1), SEQ ID NO:56 (CDR2) and SEQ ID NO:57 (CDR3) and heavy chain CDRs comprising the amino acid sequences of SEQ ID NO: 58 (CDR1), SEQ ID NO:59 (CDR2) and SEQ ID NO:60 (CDR3);
- ii) an antigen binding unit comprising light chain CDRs comprising the amino acid sequences of SEQ ID NO:61 (CDR1), SEQ ID NO:62 (CDR2) and SEQ ID NO:63 (CDR3) and heavy chain CDRs comprising the amino acid sequences of SEQ ID NO: 64 (CDR1), SEQ ID NO:65 (CDR2) and SEQ ID NO:66 (CDR3); and
- iii) an antigen binding unit comprising light chain CDRs comprising the amino acid sequences of SEQ ID NO:96 (CDR1), SEQ ID NO:97 (CDR2) and SEQ ID NO:98 (CDR3) and heavy chain CDRs comprising the amino acid sequences of SEQ ID NO: 99 (CDR1), SEQ ID NO:100 (CDR2) and SEQ ID NO:101 (CDR3).

4. The protein of claim 1, wherein said second antigen binding unit specifically binding to CD3 comprises a second light chain variable domain and a second heavy chain variable domain selected from the group consisting of i) to iii):
- i) an antigen binding unit comprising a light chain variable domain comprising the amino acid sequence of SEQ ID NO:67 and a heavy chain variable domain comprising the amino acid sequence of SEQ ID NO:68;
- ii) an antigen binding unit comprising a light chain variable domain comprising the amino acid sequence of SEQ ID NO:69 and a heavy chain variable domain comprising the amino acid sequence of SEQ ID NO:70; and
- iii) an antigen binding unit comprising a light chain variable domain comprising the amino acid sequence of SEQ ID NO:102 and a heavy chain variable domain comprising the amino acid sequence of SEQ ID NO:103.

5. The protein of claim 1, wherein
- i) said first antigen binding unit specifically binding to the membrane proximal domain of DLL3 comprises from its N to C-terminus a first light chain variable domain, a first light chain constant domain, a first peptide linker, a first heavy chain variable domain and a first heavy chain constant CH1 domain; and
- ii) said second antigen binding unit specifically binding to CD3 comprises from its N to C-terminus a second light chain variable domain, a second light chain constant domain, a second peptide linker, a second heavy chain variable domain and a second heavy chain constant CH1 domain.

6. The protein of claim 5, wherein said first and/or second peptide linker comprises 26 to 42 amino acids, 30 to 40 amino acids, 34 to 40 amino acids, or 36 to 39 amino acids.

7. The protein of claim 5, wherein said first peptide linker and/or second peptide linker is a Glycine-Serine linker, comprising the amino acid sequence of SEQ ID NO:89, and wherein said first and second peptide linker comprise the same sequence.

8. The protein of claim 5, further comprising a first human IgG1 Fc domain and a second human IgG1 Fc domain, said first human IgG1 Fc domain covalently linked to said first antigen binding unit, and a said second human IgG1 Fc domain covalently linked to said second antigen binding unit.

9. The protein of claim 8, wherein
i) said first human IgG1 Fc domain comprises a tyrosine (Y) at position 366 [T366Y], and said second human IgG1 Fc domain comprises a threonine (T) at position 407 [Y407T], or
ii) said first human IgG1 Fc domain comprises a tryptophan (W) at position 366 [T366W], and said second human IgG1 Fc domain comprises a serine(S) at position 366 [T366S], an alanine (A) at position 368 [L368A] and a valine (V) at position 407 [Y407V], or
iii) said second human IgG1 Fc domain comprises a tyrosine (Y) at position 366 [T366Y], and said first human IgG1 Fc domain comprises a threonine (T) at position 407 [Y407T], or
iv) said second human IgG1 Fc domain comprises a tryptophan (W) at position 366 [T366W], and said first human IgG1 Fc domain comprises a serine(S) at position 366 [T366S], an alanine (A) at position 368 [L368A] and a valine (V) at position 407 [Y407V],
wherein said first or said second human IgG1 Fc domain optionally further comprises an arginine at position 435 [H435R] and a phenylalanine at position 436 [Y436F], wherein numbering of the amino acids of the human IgG1 Fc domain are according to the EU numbering system.

10. The protein of claim 5, wherein the first light chain constant domain and the second light chain constant domain comprise a human kappa or lambda domain.

11. A method of manufacturing a protein of claim 1, comprising
i) cultivating a host cell transfected with an expression vector comprising a nucleic acid molecule encoding a first polypeptide chain for the first antigen binding unit specifically binding to the membrane proximal domain of DLL3, and an expression vector comprising a nucleic acid molecule encoding a second polypeptide chain for the second antigen binding unit specifically binding to CD3 under conditions allowing expression of the protein of claim 1; and,
ii) recovering the protein; and optionally
iii) further purifying and/or modifying and/or formulating the protein.

12. A pharmaceutical composition comprising the protein of claim 1 and a pharmaceutically acceptable carrier.

13. The protein of claim 1, wherein
(i) said first antigen binding unit comprises light chain CDRs comprising the amino acid sequences of SEQ ID NO:1 (CDR1), SEQ ID NO:2 (CDR2) and SEQ ID NO:3 (CDR3) and heavy chain CDRs comprising the amino acid sequences of SEQ ID NO: 4 (CDR1), SEQ ID NO:5 (CDR2) and SEQ ID NO:6 (CDR3), and said second antigen binding unit comprises light chain CDRs comprising the amino acid sequences of SEQ ID NO:55 (CDR1), SEQ ID NO:56 (CDR2) and SEQ ID NO:57 (CDR3) and heavy chain CDRs comprising the amino acid sequences of SEQ ID NO: 58 (CDR1), SEQ ID NO:59 (CDR2) and SEQ ID NO:60 (CDR3); or
(ii) said first antigen binding unit comprises light chain CDRs comprising the amino acid sequences of SEQ ID NO:7 (CDR1), SEQ ID NO:8 (CDR2) and SEQ ID NO:9 (CDR3) and heavy chain CDRs comprising the amino acid sequences of SEQ ID NO: 10 (CDR1), SEQ ID NO:11 (CDR2) and SEQ ID NO: 12 (CDR3), and said second antigen binding unit comprises light chain CDRs comprising the amino acid sequences of SEQ ID NO:55 (CDR1), SEQ ID NO:56 (CDR2) and SEQ ID NO:57 (CDR3) and heavy chain CDRs comprising the amino acid sequences of SEQ ID NO: 58 (CDR1), SEQ ID NO:59 (CDR2) and SEQ ID NO:60 (CDR3); or
(iii) said first antigen binding unit comprises light chain CDRs comprising the amino acid sequences of SEQ ID NO:1 (CDR1), SEQ ID NO:2 (CDR2) and SEQ ID NO:3 (CDR3) and heavy chain CDRs comprising the amino acid sequences of SEQ ID NO: 4 (CDR1), SEQ ID NO:5 (CDR2) and SEQ ID NO:6 (CDR3), and said second antigen binding unit comprises light chain CDRs comprising the amino acid sequences of SEQ ID NO:61 (CDR1), SEQ ID NO:62 (CDR2) and SEQ ID NO:63 (CDR3) and heavy chain CDRs comprising the amino acid sequences of SEQ ID NO: 64 (CDR1), SEQ ID NO:65 (CDR2) and SEQ ID NO:66 (CDR3); or
(iv) said first antigen binding unit comprises light chain CDRs comprising the amino acid sequences of SEQ ID NO:7 (CDR1), SEQ ID NO:8 (CDR2) and SEQ ID NO:9 (CDR3) and heavy chain CDRs comprising the amino acid sequences of SEQ ID NO: 10 (CDR1), SEQ ID NO:11 (CDR2) and SEQ ID NO: 12 (CDR3), and said second antigen binding unit comprises light chain CDRs comprising the amino acid sequences of SEQ ID NO:61 (CDR1), SEQ ID NO:62 (CDR2) and SEQ ID NO:63 (CDR3) and heavy chain CDRs comprising the amino acid sequences of SEQ ID NO: 64 (CDR1), SEQ ID NO:65 (CDR2) and SEQ ID NO:66 (CDR3).

14. The protein of claim 1, wherein
(i) said first antigen binding unit comprises a light chain variable domain comprising the amino acid sequence of SEQ ID NO:37 and heavy chain variable domain comprising the amino acid sequence of SEQ ID NO:38, and said second antigen binding unit comprises a light chain variable domain comprising the amino acid sequence of SEQ ID NO:67 and a heavy chain variable domain comprising the amino acid sequence of SEQ ID NO:68; or
(ii) said first antigen binding unit comprises a light chain variable domain comprising the amino acid sequence of SEQ ID NO:39 and heavy chain variable domain comprising the amino acid sequence of SEQ ID NO:40, and said second antigen binding unit comprises a light chain variable domain comprising the amino acid sequence of SEQ ID NO:67 and a heavy chain variable domain comprising the amino acid sequence of SEQ ID NO:68; or
(iii) said first antigen binding unit comprises a light chain variable domain comprising the amino acid sequence of SEQ ID NO:37 and heavy chain variable domain comprising the amino acid sequence of SEQ ID NO:38, and said second antigen binding unit comprises a light chain variable domain comprising the amino acid sequence of SEQ ID NO:69 and a heavy chain variable domain comprising the amino acid sequence of SEQ ID NO:70; or
(iv) said first antigen binding unit comprises a light chain variable domain comprising the amino acid sequence of SEQ ID NO:39 and heavy chain variable domain comprising the amino acid sequence of SEQ ID NO:40, and said second antigen binding unit comprises a light chain variable domain comprising the amino acid sequence of SEQ ID NO:69 and a heavy chain variable domain comprising the amino acid sequence of SEQ ID NO:70.

15. The protein of claim 1, wherein
(i) said first antigen binding unit comprises the amino acid sequence of SEQ ID NO:49, and said second antigen binding unit comprises the amino acid sequence of SEQ ID NO: 71; or
(ii) said first antigen binding unit comprises the amino acid sequence of SEQ ID NO:50, and said second antigen binding unit comprises the amino acid sequence of SEQ ID NO: 71; or
(iii) said first antigen binding unit comprises the amino acid sequence of SEQ ID NO:51, and said second antigen binding unit comprises the amino acid sequence of SEQ ID NO: 71; or
(iv) said first antigen binding unit comprises the amino acid sequence of SEQ ID NO:49, and said second antigen binding unit comprises the amino acid sequence of SEQ ID NO: 72; or
(v) said first antigen binding unit comprises the amino acid sequence of SEQ ID NO: 50, and said second antigen binding unit comprises the amino acid sequence of SEQ ID NO:72; or
(vi) said first antigen binding unit comprises the amino acid sequence of SEQ ID NO:51, and said second antigen binding unit comprises the amino acid sequence of SEQ ID NO: 72.

16. A protein comprising
(i) a first polypeptide chain specifically binding to the membrane proximal domain of DLL3 comprising the amino acid sequence of SEQ ID NO: 73, and a second polypeptide chain specifically binding to CD3 comprising the amino acid sequence of SEQ ID NO:79; or
(ii) a first polypeptide chain specifically binding to the membrane proximal domain of DLL3 comprising the amino acid sequence of SEQ ID NO:74, and a second polypeptide chain specifically binding to CD3 comprising the amino acid sequence of SEQ ID NO: 79 or
(iii) a first polypeptide chain specifically binding to the membrane proximal domain of DLL3 comprising the amino acid sequence of SEQ ID NO:73, and a second polypeptide chain specifically binding to CD3 comprising the amino acid sequence of SEQ ID NO:80; or
(iv) a first polypeptide chain specifically binding to the membrane proximal domain of DLL3 comprising the amino acid sequence of SEQ ID NO:74, and a second polypeptide chain specifically binding to CD3 comprising the amino acid sequence of SEQ ID NO:80.

17. An isolated nucleic acid molecule encoding a first polypeptide chain comprising a first single chain Fab fragment (scFab) forming the first antigen binding unit and/or a second polypeptide chain comprising a second single chain Fab fragment (scFab) forming the second antigen binding unit of the protein of claim 16, said first or second polypeptide chain further encoding a first human Fc domain and/or a second human Fc domain.

18. An expression vector comprising the nucleic acid molecule of claim 17.

19. A host cell transfected with the expression vector of claim 18.

20. A membrane-proximal-domain-binding anti-DLL3 antibody molecule comprising
  i) light chain CDRs comprising the amino acid sequences of SEQ ID NO:1 (CDR1), SEQ ID NO: 2 (CDR2) and SEQ ID NO:3 (CDR3) and heavy chain CDRs comprising the amino acid sequences of SEQ ID NO:4 (CDR1), SEQ ID NO:5 (CDR2) and SEQ ID NO: 6 (CDR3); or
  ii) light chain CDRs comprising the amino acid sequences of SEQ ID NO:7 (CDR1), SEQ ID NO:8 (CDR2) and SEQ ID NO:9 (CDR3) and heavy chain CDRs comprising the amino acid sequences of SEQ ID NO:10 (CDR1), SEQ ID NO:11 (CDR2) and SEQ ID NO:12 (CDR3); or
  iii) light chain CDRs comprising the amino acid sequences of SEQ ID NO:13 (CDR1), SEQ ID NO:14 (CDR2) and SEQ ID NO:15 (CDR3) and heavy chain CDRs comprising the amino acid sequences of SEQ ID NO:16 (CDR1), SEQ ID NO:17 (CDR2) and SEQ ID NO:18 (CDR3).

21. The membrane-proximal-domain-binding anti-DLL3 antibody molecule of claim 20, wherein said antibody molecule is a monoclonal, a chimeric, a humanized or a human antibody molecule.

22. The membrane-proximal-domain-binding anti-DLL3 antibody molecule of claim 18, wherein said antibody molecule is a Fab, F(ab')2, Fab', Fv or scFv.

23. The membrane-proximal-domain-binding anti-DLL3 antibody molecule of claim 20, comprising a heavy chain constant region-selected from the group consisting of human IgG1, IgG2, IgG3, IgG4 constant regions.

* * * * *

```
                              SEQUENCE LISTING

Sequence total quantity: 274
SEQ ID NO: 1            moltype = AA  length = 12
FEATURE                 Location/Qualifiers
REGION                  1..12
                        note = DLL3# 1LCCDR1
source                  1..12
                        mol_type = protein
                        organism = synthetic construct
SEQUENCE: 1
RASQSVSSNF LV                                                             12

SEQ ID NO: 2            moltype = AA  length = 7
FEATURE                 Location/Qualifiers
REGION                  1..7
                        note = DLL3#1 LCCDR2
source                  1..7
                        mol_type = protein
                        organism = synthetic construct
SEQUENCE: 2
GASTRAS                                                                    7

SEQ ID NO: 3            moltype = AA  length = 9
FEATURE                 Location/Qualifiers
REGION                  1..9
                        note = DLL3#1 LCCDR3
source                  1..9
                        mol_type = protein
                        organism = synthetic construct
SEQUENCE: 3
QQYGDSPYT                                                                  9

SEQ ID NO: 4            moltype = AA  length = 10
FEATURE                 Location/Qualifiers
REGION                  1..10
                        note = DLL3#1 HCCDR1
source                  1..10
                        mol_type = protein
                        organism = synthetic construct
SEQUENCE: 4
GNTFTNYYMH                                                                10

SEQ ID NO: 5            moltype = AA  length = 17
FEATURE                 Location/Qualifiers
REGION                  1..17
                        note = DLL3#1 HCCDR2
source                  1..17
                        mol_type = protein
                        organism = synthetic construct
SEQUENCE: 5
IIDPSVGSKS YAQKFLG                                                        17

SEQ ID NO: 6            moltype = AA  length = 12
FEATURE                 Location/Qualifiers
REGION                  1..12
                        note = DLL3#1 HCCDR3
source                  1..12
                        mol_type = protein
                        organism = synthetic construct
SEQUENCE: 6
AGKRFGESYF DY                                                             12

SEQ ID NO: 7            moltype = AA  length = 11
FEATURE                 Location/Qualifiers
REGION                  1..11
                        note = DLL3#2 LCCDR1
source                  1..11
                        mol_type = protein
                        organism = synthetic construct
```

```
SEQUENCE: 7
RASQGISNYL A                                                            11

SEQ ID NO: 8           moltype = AA  length = 7
FEATURE                Location/Qualifiers
REGION                 1..7
                       note = DLL3#2 LCCDR1
source                 1..7
                       mol_type = protein
                       organism = synthetic construct
SEQUENCE: 8
AASSLQS                                                                 7

SEQ ID NO: 9           moltype = AA  length = 9
FEATURE                Location/Qualifiers
REGION                 1..9
                       note = DLL3#2 LCCDR1
source                 1..9
                       mol_type = protein
                       organism = synthetic construct
SEQUENCE: 9
LQHNSSPYT                                                               9

SEQ ID NO: 10          moltype = AA  length = 10
FEATURE                Location/Qualifiers
REGION                 1..10
                       note = DLL3#2 HCCDR1
source                 1..10
                       mol_type = protein
                       organism = synthetic construct
SEQUENCE: 10
GYTFTSYYMH                                                              10

SEQ ID NO: 11          moltype = AA  length = 17
FEATURE                Location/Qualifiers
REGION                 1..17
                       note = DLL3#2 HCCDR2
source                 1..17
                       mol_type = protein
                       organism = synthetic construct
SEQUENCE: 11
IINPSGGSTS YAQKFQG                                                      17

SEQ ID NO: 12          moltype = AA  length = 15
FEATURE                Location/Qualifiers
REGION                 1..15
                       note = DLL3#2 HCCDR3
source                 1..15
                       mol_type = protein
                       organism = synthetic construct
SEQUENCE: 12
GEAVGGNYYY YGMDV                                                        15

SEQ ID NO: 13          moltype = AA  length = 11
FEATURE                Location/Qualifiers
REGION                 1..11
                       note = DLL3#3 LCCDR1
source                 1..11
                       mol_type = protein
                       organism = synthetic construct
SEQUENCE: 13
RASQGISNYL V                                                            11

SEQ ID NO: 14          moltype = AA  length = 7
FEATURE                Location/Qualifiers
REGION                 1..7
                       note = DLL3#3 LCCDR2
source                 1..7
                       mol_type = protein
                       organism = synthetic construct
SEQUENCE: 14
AVSSLYS                                                                 7

SEQ ID NO: 15          moltype = AA  length = 9
FEATURE                Location/Qualifiers
REGION                 1..9
                       note = DLL3#3 LCCDR3
source                 1..9
                       mol_type = protein
```

-continued

```
                       organism = synthetic construct
SEQUENCE: 15
LQHDSYPYT                                                              9

SEQ ID NO: 16          moltype = AA  length = 10
FEATURE                Location/Qualifiers
REGION                 1..10
                       note = DLL3#3 HCCDR1
source                 1..10
                       mol_type = protein
                       organism = synthetic construct
SEQUENCE: 16
GYTFTSYYVH                                                             10

SEQ ID NO: 17          moltype = AA  length = 17
FEATURE                Location/Qualifiers
REGION                 1..17
                       note = DLL3#3 HCCDR2
source                 1..17
                       mol_type = protein
                       organism = synthetic construct
SEQUENCE: 17
IINPGGGTTS YAQKFLG                                                     17

SEQ ID NO: 18          moltype = AA  length = 15
FEATURE                Location/Qualifiers
REGION                 1..15
                       note = DLL3#3 HCCDR3
source                 1..15
                       mol_type = protein
                       organism = synthetic construct
SEQUENCE: 18
GEAVTGNYFY YGMDV                                                       15

SEQ ID NO: 19          moltype = AA  length = 15
FEATURE                Location/Qualifiers
REGION                 1..15
                       note = DLL3#4 LCCDR1
source                 1..15
                       mol_type = protein
                       organism = synthetic construct
SEQUENCE: 19
RASKSVSSFG YSFMH                                                       15

SEQ ID NO: 20          moltype = AA  length = 7
FEATURE                Location/Qualifiers
REGION                 1..7
                       note = DLL3#4 LCCDR2
source                 1..7
                       mol_type = protein
                       organism = synthetic construct
SEQUENCE: 20
LASNLES                                                                7

SEQ ID NO: 21          moltype = AA  length = 9
FEATURE                Location/Qualifiers
REGION                 1..9
                       note = DLL3#4 LCCDR3
source                 1..9
                       mol_type = protein
                       organism = synthetic construct
SEQUENCE: 21
QHSRELPWT                                                              9

SEQ ID NO: 22          moltype = AA  length = 10
FEATURE                Location/Qualifiers
REGION                 1..10
                       note = DLL3#4 HCCDR1
source                 1..10
                       mol_type = protein
                       organism = synthetic construct
SEQUENCE: 22
VYTFTSYFMY                                                             10

SEQ ID NO: 23          moltype = AA  length = 17
FEATURE                Location/Qualifiers
REGION                 1..17
                       note = DLL3#4 HCCDR2
source                 1..17
```

```
                                 mol_type = protein
                                 organism = synthetic construct
SEQUENCE: 23
EISPTNGNSN LNERFKN                                                          17

SEQ ID NO: 24         moltype = AA   length = 8
FEATURE               Location/Qualifiers
REGION                1..8
                      note = DLL3#4 HCCDR3
source                1..8
                      mol_type = protein
                      organism = synthetic construct
SEQUENCE: 24
GGDGYLDY                                                                    8

SEQ ID NO: 25         moltype = AA   length = 11
FEATURE               Location/Qualifiers
REGION                1..11
                      note = DLL3#5 LCCDR1
source                1..11
                      mol_type = protein
                      organism = synthetic construct
SEQUENCE: 25
QASQDISNYL N                                                                11

SEQ ID NO: 26         moltype = AA   length = 7
FEATURE               Location/Qualifiers
REGION                1..7
                      note = DLL3#5 LCCDR2
source                1..7
                      mol_type = protein
                      organism = synthetic construct
SEQUENCE: 26
DASNLET                                                                     7

SEQ ID NO: 27         moltype = AA   length = 10
FEATURE               Location/Qualifiers
REGION                1..10
                      note = DLL3#5 LCCDR3
source                1..10
                      mol_type = protein
                      organism = synthetic construct
SEQUENCE: 27
QQYDNLPTWT                                                                  10

SEQ ID NO: 28         moltype = AA   length = 10
FEATURE               Location/Qualifiers
REGION                1..10
                      note = DLL3#5 HCCDR1
source                1..10
                      mol_type = protein
                      organism = synthetic construct
SEQUENCE: 28
GFTFTGYYIH                                                                  10

SEQ ID NO: 29         moltype = AA   length = 17
FEATURE               Location/Qualifiers
REGION                1..17
                      note = DLL3#5 HCCDR2
source                1..17
                      mol_type = protein
                      organism = synthetic construct
SEQUENCE: 29
WINPNSGGTN YAQKFQG                                                          17

SEQ ID NO: 30         moltype = AA   length = 4
FEATURE               Location/Qualifiers
REGION                1..4
                      note = DLL3#5 HCCDR3
source                1..4
                      mol_type = protein
                      organism = synthetic construct
SEQUENCE: 30
GWDY                                                                        4

SEQ ID NO: 31         moltype = AA   length = 11
FEATURE               Location/Qualifiers
REGION                1..11
                      note = DLL3#6 LCCDR1
```

```
source                  1..11
                        mol_type = protein
                        organism = synthetic construct
SEQUENCE: 31
RASQDISNYF A                                                              11

SEQ ID NO: 32           moltype = AA   length = 7
FEATURE                 Location/Qualifiers
REGION                  1..7
                        note = DLL3#6 LCCDR2
source                  1..7
                        mol_type = protein
                        organism = synthetic construct
SEQUENCE: 32
AASTLQS                                                                    7

SEQ ID NO: 33           moltype = AA   length = 9
FEATURE                 Location/Qualifiers
REGION                  1..9
                        note = DLL3#6 LCCDR3
source                  1..9
                        mol_type = protein
                        organism = synthetic construct
SEQUENCE: 33
QQLNSYPYT                                                                  9

SEQ ID NO: 34           moltype = AA   length = 10
FEATURE                 Location/Qualifiers
REGION                  1..10
                        note = DLL3#6 HCCDR1
source                  1..10
                        mol_type = protein
                        organism = synthetic construct
SEQUENCE: 34
GGSISSYFWS                                                                10

SEQ ID NO: 35           moltype = AA   length = 16
FEATURE                 Location/Qualifiers
REGION                  1..16
                        note = DLL3#6 HCCDR2
source                  1..16
                        mol_type = protein
                        organism = synthetic construct
SEQUENCE: 35
RIYTSGSTNY NPSLNS                                                         16

SEQ ID NO: 36           moltype = AA   length = 9
FEATURE                 Location/Qualifiers
REGION                  1..9
                        note = DLL3#6 HCCDR3
source                  1..9
                        mol_type = protein
                        organism = synthetic construct
SEQUENCE: 36
RGDWGGFDI                                                                  9

SEQ ID NO: 37           moltype = AA   length = 108
FEATURE                 Location/Qualifiers
REGION                  1..108
                        note = DLL3#1 VL
source                  1..108
                        mol_type = protein
                        organism = synthetic construct
SEQUENCE: 37
EIVLTQSPGT LSLSPGERAT LSCRASQSVS SNFLVWYQQK PGQAPRPLIY GASTRASGIP          60
DRFSGSGSGA DFTLTISRLE PEDFALYYCQ QYGDSPYTFG QGTTLEIK                      108

SEQ ID NO: 38           moltype = AA   length = 121
FEATURE                 Location/Qualifiers
REGION                  1..121
                        note = DLL3#1 VH
source                  1..121
                        mol_type = protein
                        organism = synthetic construct
SEQUENCE: 38
QVQLVQSGAE VKKPGASVKV SCKASGNTFT NYYMHWVRQA PGPGLEWMGI IDPSVGSKSY          60
AQKFLGRVTI ARDTSTSTVF LDLYSLRSED TAVYFCARAG KRFGESYFDY WGQGTLVTVS         120
S                                                                        121
```

```
SEQ ID NO: 39                moltype = AA   length = 107
FEATURE                      Location/Qualifiers
REGION                       1..107
                             note = DLL3#2 VL
source                       1..107
                             mol_type = protein
                             organism = synthetic construct
SEQUENCE: 39
DIQMTQSPSA MSASVGDRVT ITCRASQGIS NYLAWFQQKP GKVPEPLIYA ASSLQSGVPS   60
RFSGSGSVTE FTLTISSLQP EDFATYYCLQ HNSSPYTFGQ GTKLEIK                107

SEQ ID NO: 40                moltype = AA   length = 124
FEATURE                      Location/Qualifiers
REGION                       1..124
                             note = DLL3#2 VH
source                       1..124
                             mol_type = protein
                             organism = synthetic construct
SEQUENCE: 40
QVQLVQSGAE VKKPGASVKV SCKASGYTFT SYYMHWVRQA PGQGLEWMGI INPSGGSTSY   60
AQKFQGRVTM TRDTSTSTVY MELSSLRSED TAVYYCARGE AVGGNYYYYG MDVWGQGTTV  120
TVSS                                                               124

SEQ ID NO: 41                moltype = AA   length = 107
FEATURE                      Location/Qualifiers
REGION                       1..107
                             note = DLL3#3 VL
source                       1..107
                             mol_type = protein
                             organism = synthetic construct
SEQUENCE: 41
DIQMTQSPSA MSASVGDRVT ITCRASQGIS NYLVWFQQKP GKAPKRLIYA VSSLYSGVPS   60
RFSGSGSGTE FTLTISSLQP EDFATYYCLQ HDSYPYTFGQ GTKLEIK                107

SEQ ID NO: 42                moltype = AA   length = 124
FEATURE                      Location/Qualifiers
REGION                       1..124
                             note = DLL3#3 VH
source                       1..124
                             mol_type = protein
                             organism = synthetic construct
SEQUENCE: 42
QVQLVQSGAE VKKPGASVKV SCKASGYTFT SYYVHWVRQA PGQGLEWMVI INPGGGTTSY   60
AQKFLGRVTM TRDTSTNTVY MELKSLRSED TAVYYCARGE AVTGNYFYYG MDVWGQGTTV  120
TVSS                                                               124

SEQ ID NO: 43                moltype = AA   length = 111
FEATURE                      Location/Qualifiers
REGION                       1..111
                             note = DLL3#4 VL
source                       1..111
                             mol_type = protein
                             organism = synthetic construct
SEQUENCE: 43
DIVLTQSPAS LAVSLGQRAT ISCRASKSVS SFGYSFMHWY QQKPGQPPKL LIYLASNLES   60
GVPARFSGSG SGTDFTLNIH PVEEEDAATY YCQHSRELPW TFGGGTKLEI K           111

SEQ ID NO: 44                moltype = AA   length = 117
FEATURE                      Location/Qualifiers
REGION                       1..117
                             note = DLL3#4 VH
source                       1..117
                             mol_type = protein
                             organism = synthetic construct
SEQUENCE: 44
QVQLQQSGTE LVKPGASVKL SCKASVYTFT SYFMYWVKQR PGHGLEWIGE ISPTNGNSNL   60
NERFKNKATL TVDKSSSTAY MQLSSLTSED SAVYYCTRGG DGYLDYWGQG TTLTVSS     117

SEQ ID NO: 45                moltype = AA   length = 108
FEATURE                      Location/Qualifiers
REGION                       1..108
                             note = DLL3#5 VL
source                       1..108
                             mol_type = protein
                             organism = synthetic construct
SEQUENCE: 45
DIQMTQSPSS LSASVGDRVT VTCQASQDIS NYLNWYQQKP GKAPKLLIYD ASNLETGVPS   60
RFSGSGSGTD FTFTISSLQP EDIATYYCQQ YDNLPTWTFG QGTKVEIK               108
```

```
SEQ ID NO: 46           moltype = AA   length = 113
FEATURE                 Location/Qualifiers
REGION                  1..113
                        note = DLL3#5 VH
source                  1..113
                        mol_type = protein
                        organism = synthetic construct
SEQUENCE: 46
QVQLVQSGAE VKKPGASVKV SCKASGFTFT GYYIHWVRQA PGQGLEWMGW INPNSGGTNY   60
AQKFQGRVTM TRDSSINTAF MELSRLTSDD TAVYYCAAGW DYWGQGTLVT VSS          113

SEQ ID NO: 47           moltype = AA   length = 107
FEATURE                 Location/Qualifiers
REGION                  1..107
                        note = DLL3#6 VL
source                  1..107
                        mol_type = protein
                        organism = synthetic construct
SEQUENCE: 47
DIQLTQSPSF LSTSVGDRVT ITCRASQDIS NYFAWYQQKP GKAPKLLIYA ASTLQSGVPS   60
RFSGGGSGTE FTLTISSLQP EDFATYYCQQ LNSYPYTFGQ GTKLEIK                107

SEQ ID NO: 48           moltype = AA   length = 117
FEATURE                 Location/Qualifiers
REGION                  1..117
                        note = DLL3#6 VH
source                  1..117
                        mol_type = protein
                        organism = synthetic construct
SEQUENCE: 48
QVQLQESGPG LVKPSETLSL TCTVSGGSIS SYFWSWIRQP AGKGLEWIGR IYTSGSTNYN   60
PSLNSRLTMS VDTSKNQFSL KLSSVTAADT AVYYCARRGD WGGFDIWGQG TVVTVSS     117

SEQ ID NO: 49           moltype = AA   length = 477
FEATURE                 Location/Qualifiers
REGION                  1..477
                        note = DLL3#1 scFab
source                  1..477
                        mol_type = protein
                        organism = synthetic construct
SEQUENCE: 49
EIVLTQSPGT LSLSPGERAT LSCRASQSVS SNFLVWYQQK PGQAPRPLIY GASTRASGIP   60
DRFSGSGSGA DFTLTISRLE PEDFALYYCQ QYGDSPYTFG QGTTLEIKRT VAAPSVFIFP  120
PSDEQLKSGT ASVVCLLNNF YPREAKVQWK VDNALQSGNS QESVTEQDSK DSTYSLSSTL  180
TLSKADYEKH KVYACEVTHQ GLSSPVTKSF NRGECGGGGS EGKSSGSGSE SKSTEGKSSG  240
SGSESKSTGG GGSQVQLVQS GAEVKKPGAS VKVSCKASGN TFTNYYMHWV RQAPGPGLEW  300
MGIIDPSVGS KSYAQKFLGR VTIARDTSTS TVFLDLYSLR SEDTAVYFCA RAGKRFGESY  360
FDYWGQGTLV TVSSASTKGP SVFPLAPSSK STSGGTAALG CLVKDYFPEP VTVSWNSGAL  420
TSGVHTFPAV LQSSGLYSLS SVVTVPSSSL GTQTYICNVN HKPSNTKVDK RVEPKSC     477

SEQ ID NO: 50           moltype = AA   length = 479
FEATURE                 Location/Qualifiers
REGION                  1..479
                        note = DLL3#2 scFab
source                  1..479
                        mol_type = protein
                        organism = synthetic construct
SEQUENCE: 50
DIQMTQSPSA MSASVGDRVT ITCRASQGIS NYLAWFQQKP GKVPEPLIYA ASSLQSGVPS   60
RFSGSGSVTE FTLTISSLQP EDFATYYCLQ HNSSPYTFGQ GTKLEIKRTV AAPSVFIFPP  120
SDEQLKSGTA SVVCLLNNFY PREAKVQWKV DNALQSGNSQ ESVTEQDSKD STYSLSSTLT  180
LSKADYEKHK VYACEVTHQG LSSPVTKSFN RGECGGGGSE GKSSGSGSES KSTEGKSSGS  240
GSESKSTGGG GSQVQLVQSG AEVKKPGASV KVSCKASGYT FTSYYMHWVR QAPGQGLEWM  300
GIINPSGGST SYAQKFQGRV TMTRDTSTST VYMELSSLRS EDTAVYYCAR GEAVGGNYYY  360
YGMDVWGQGT TVTVSSASTK GPSVFPLAPS SKSTSGGTAA LGCLVKDYFP EPVTVSWNSG  420
ALTSGVHTFP AVLQSSGLYS LSSVVTVPSS SLGTQTYICN VNHKPSNTKV DKRVEPKSC   479

SEQ ID NO: 51           moltype = AA   length = 479
FEATURE                 Location/Qualifiers
REGION                  1..479
                        note = DLL3#3 scFab
source                  1..479
                        mol_type = protein
                        organism = synthetic construct
SEQUENCE: 51
DIQMTQSPSA MSASVGDRVT ITCRASQGIS NYLVWFQQKP GKAPKRLIYA VSSLYSGVPS   60
RFSGSGSGTE FTLTISSLQP EDFATYYCLQ HDSYPYTFGQ GTKLEIKRTV AAPSVFIFPP  120
SDEQLKSGTA SVVCLLNNFY PREAKVQWKV DNALQSGNSQ ESVTEQDSKD STYSLSSTLT  180
LSKADYEKHK VYACEVTHQG LSSPVTKSFN RGECGGGGSE GKSSGSGSES KSTEGKSSGS  240
```

```
GSESKSTGGG GSQVQLVQSG AEVKKPGASV KVSCKASGYT FTSYYVHWVR QAPGQGLEWM    300
VIINPGGGTT SYAQKFLGRV TMTRDTSTNT VYMELKSLRS EDTAVYYCAR GEAVTGNYFY    360
YGMDVWGQGT TVTVSSASTK GPSVFPLAPS SKSTSGGTAA LGCLVKDYFP EPVTVSWNSG    420
ALTSGVHTFP AVLQSSGLYS LSSVVTVPSS SLGTQTYICN VNHKPSNTKV DKRVEPKSC     479

SEQ ID NO: 52           moltype = AA   length = 476
FEATURE                 Location/Qualifiers
REGION                  1..476
                        note = DLL3#4 scFab
source                  1..476
                        mol_type = protein
                        organism = synthetic construct
SEQUENCE: 52
DIVLTQSPAS LAVSLGQRAT ISCRASKSVS SFGYSFMHWY QQKPGQPPKL LIYLASNLES     60
GVPARFSGSG SGTDFTLNIH PVEEEDAATY YCQHSRELPW TFGGGTKLEI KRTVAAPSVF    120
IFPPSDEQLK SGTASVVCLL NNFYPREAKV QWKVDNALQS GNSQESVTEQ DSKDSTYSLS    180
STLTLSKADY EKHKVYACEV THQGLSSPVT KSFNRGECGG GGSEGKSSGS GSESKSTEGK    240
SSGSGSESKS TGGGGSQVQL QQSGTELVKP GASVKLSCKA SVYTFTSYFM YWVKQRPGHG    300
LEWIGEISPT NGNSNLNERF KNKATLTVDK SSSTAYMQLS SLTSEDSAVY YCTRGGDGYL    360
DYWGQGTTLT VSSASTKGPS VFPLAPSSKS TGGTAALGC LVKDYFPEPV TVSWNSGALT     420
SGVHTFPAVL QSSGLYSLSS VVTVPSSSLG TQTYICNVNH KPSNTKVDKR VEPKSC        476

SEQ ID NO: 53           moltype = AA   length = 469
FEATURE                 Location/Qualifiers
REGION                  1..469
                        note = DLL3#5 scFab
source                  1..469
                        mol_type = protein
                        organism = synthetic construct
SEQUENCE: 53
DIQMTQSPSS LSASVGDRVT VTCQASQDIS NYLNWYQQKP GKAPKLLIYD ASNLETGVPS     60
RFSGSGSGTD FTFTISSLQP EDIATYYCQQ YDNLPTWTFG QGTKVEIKRT VAAPSVFIFP    120
PSDEQLKSGT ASVVCLLNNF YPREAKVQWK VDNALQSGNS QESVTEQDSK DSTYSLSSTL    180
TLSKADYEKH KVYACEVTHQ GLSSPVTKSF NRGECGGGGS EGKSSGSGSE SKSTEGKSSG    240
SGSESKSTGG GGSQVQLVQS GAEVKKPGAS VKVSCKASGF TFTGYYIHWV RQAPGQGLEW    300
MGWINPNSGG TNYAQKFQGR VTMTRDSSIN TAFMELSRLT SDDTAVYYCA AGWDYWGQGT    360
LVTVSSASTK GPSVFPLAPS SKSTSGGTAA LGCLVKDYFP EPVTVSWNSG ALTSGVHTFP    420
AVLQSSGLYS LSSVVTVPSS SLGTQTYICN VNHKPSNTKV DKRVEPKSC                469

SEQ ID NO: 54           moltype = AA   length = 472
FEATURE                 Location/Qualifiers
REGION                  1..472
                        note = DLL3#6 scFab
source                  1..472
                        mol_type = protein
                        organism = synthetic construct
SEQUENCE: 54
DIQLTQSPSF LSTSVGDRVT ITCRASQDIS NYFAWYQQKP GKAPKLLIYA ASTLQSGVPS     60
RFSGGGSGTE FTLTISSLQP EDFATYYCQQ LNSYPYTFGQ GTKLEIKRTV AAPSVFIFPP    120
SDEQLKSGTA SVVCLLNNFY PREAKVQWKV DNALQSGNSQ ESVTEQDSKD STYSLSSTLT    180
LSKADYEKHK VYACEVTHQG LSSPVTKSFN RGECGGGGSE GKSSGSGSES KSTEGKSSGS    240
GSESKSTGGG GSQVQLQESG PGLVKPSETL SLTCTVSGGS ISSYFWSWIR QPAGKGLEWI    300
GRIYTSGSTN YNPSLNSRLT MSVDTSKNQF SLKLSSVTAA DTAVYYCARR GDWGGFDIWG    360
QGTVVTVSSA STKGPSVFPL APSSKSTSGG TAALGCLVKD YFPEPVTVSW NSGALTSGVH    420
TFPAVLQSSG LYSLSSVVTV PSSSLGTQTY ICNVNHKPSN TKVDKRVEPK SC            472

SEQ ID NO: 55           moltype = AA   length = 14
FEATURE                 Location/Qualifiers
REGION                  1..14
                        note = CD3#1 LCCDR1
source                  1..14
                        mol_type = protein
                        organism = synthetic construct
SEQUENCE: 55
RSSTGAVTTS NYAN                                                       14

SEQ ID NO: 56           moltype = AA   length = 7
FEATURE                 Location/Qualifiers
REGION                  1..7
                        note = CD3#1 LCCDR2
source                  1..7
                        mol_type = protein
                        organism = synthetic construct
SEQUENCE: 56
GTNKRAP                                                                7

SEQ ID NO: 57           moltype = AA   length = 9
FEATURE                 Location/Qualifiers
REGION                  1..9
```

```
                        note = CD3#1 LCCDR3
source                  1..9
                        mol_type = protein
                        organism = synthetic construct
SEQUENCE: 57
ALWYSNLWV                                                                  9

SEQ ID NO: 58           moltype = AA  length = 10
FEATURE                 Location/Qualifiers
REGION                  1..10
                        note = CD3#1 HCCDR1
source                  1..10
                        mol_type = protein
                        organism = synthetic construct
SEQUENCE: 58
GFTFNTYAMN                                                                10

SEQ ID NO: 59           moltype = AA  length = 19
FEATURE                 Location/Qualifiers
REGION                  1..19
                        note = CD3#1 HCCDR2
source                  1..19
                        mol_type = protein
                        organism = synthetic construct
SEQUENCE: 59
RIRSKYNNYA TYYADSVKD                                                      19

SEQ ID NO: 60           moltype = AA  length = 14
FEATURE                 Location/Qualifiers
REGION                  1..14
                        note = CD3#1 HCCDR3
source                  1..14
                        mol_type = protein
                        organism = synthetic construct
SEQUENCE: 60
HGNFGNSYVS WFAY                                                           14

SEQ ID NO: 61           moltype = AA  length = 14
FEATURE                 Location/Qualifiers
REGION                  1..14
                        note = CD3#2 LCCDR1
source                  1..14
                        mol_type = protein
                        organism = synthetic construct
SEQUENCE: 61
RSSTGAVTTS NYAN                                                           14

SEQ ID NO: 62           moltype = AA  length = 7
FEATURE                 Location/Qualifiers
REGION                  1..7
                        note = CD3#2 LCCDR2
source                  1..7
                        mol_type = protein
                        organism = synthetic construct
SEQUENCE: 62
GTNKRAP                                                                    7

SEQ ID NO: 63           moltype = AA  length = 9
FEATURE                 Location/Qualifiers
REGION                  1..9
                        note = CD3#2 LCCDR3
source                  1..9
                        mol_type = protein
                        organism = synthetic construct
SEQUENCE: 63
ALWYSNLWV                                                                  9

SEQ ID NO: 64           moltype = AA  length = 10
FEATURE                 Location/Qualifiers
REGION                  1..10
                        note = CD3#2 HCCDR1
source                  1..10
                        mol_type = protein
                        organism = synthetic construct
SEQUENCE: 64
GFTFNTYAMN                                                                10

SEQ ID NO: 65           moltype = AA  length = 19
FEATURE                 Location/Qualifiers
```

```
REGION                       1..19
                             note = CD3#2 HCCDR2
source                       1..19
                             mol_type = protein
                             organism = synthetic construct
SEQUENCE: 65
RIRSKYINYA TYYADSVKD                                                      19

SEQ ID NO: 66                moltype = AA   length = 14
FEATURE                      Location/Qualifiers
REGION                       1..14
                             note = CD3#2 HCCDR3
source                       1..14
                             mol_type = protein
                             organism = synthetic construct
SEQUENCE: 66
HGNFGNSYVS WFAY                                                           14

SEQ ID NO: 67                moltype = AA   length = 109
FEATURE                      Location/Qualifiers
REGION                       1..109
                             note = CD3#1 VL
source                       1..109
                             mol_type = protein
                             organism = synthetic construct
SEQUENCE: 67
EAVVTQEPSL TVSPGGTVTL TCRSSTGAVT TSNYANWVQE KPGQLPRGLI GGTNKRAPWV          60
PARFSGSLLG GKAALTLSGA QPEDEAEYFC ALWYSNLWVF GGGTKLTVL                     109

SEQ ID NO: 68                moltype = AA   length = 125
FEATURE                      Location/Qualifiers
REGION                       1..125
                             note = CD3#1 VH
source                       1..125
                             mol_type = protein
                             organism = synthetic construct
SEQUENCE: 68
EVQLVESGGG LVQPGGSLKL SCAASGFTFN TYAMNWVRQA PGKGLEWVAR IRSKYNNYAT          60
YYADSVKDRF TISRDDSKNT AYLQMNNLKT EDTAVYYCVR HGNFGNSYVS WFAYWGQGTL         120
VTVSA                                                                    125

SEQ ID NO: 69                moltype = AA   length = 109
FEATURE                      Location/Qualifiers
REGION                       1..109
                             note = CD3#2 VL
source                       1..109
                             mol_type = protein
                             organism = synthetic construct
SEQUENCE: 69
EAVVTQEPSL TVSPGGTVTL TCRSSTGAVT TSNYANWVQE KPGQLPRGLI GGTNKRAPWV          60
PARFSGSLLG GKAALTLSGA QPEDEAEYFC ALWYSNLWVF GGGTKLTVL                     109

SEQ ID NO: 70                moltype = AA   length = 125
FEATURE                      Location/Qualifiers
REGION                       1..125
                             note = CD3#2 VH
source                       1..125
                             mol_type = protein
                             organism = synthetic construct
SEQUENCE: 70
EVQLVESGGG LVQPGGSLKL SCAASGFTFN TYAMNWVRQA PGKGLEWVAR IRSKYINYAT          60
YYADSVKDRF TISRDDSKNT AYLQMNNLKT EDTAVYYCVR HGNFGNSYVS WFAYWGQGTL         120
VTVSA                                                                    125

SEQ ID NO: 71                moltype = AA   length = 481
FEATURE                      Location/Qualifiers
REGION                       1..481
                             note = CD3#1 scFab
source                       1..481
                             mol_type = protein
                             organism = synthetic construct
SEQUENCE: 71
EAVVTQEPSL TVSPGGTVTL TCRSSTGAVT TSNYANWVQE KPGQLPRGLI GGTNKRAPWV          60
PARFSGSLLG GKAALTLSGA QPEDEAEYFC ALWYSNLWVF GGGTKLTVLG QPKAAPSVTL         120
FPPSSEELQA NKATLVCLIS DFYPGAVKVA WKADGSPVNT GVETTTPSKQ SNNKYAASSY         180
LSLTPEQWKS HRSYSCQVTH EGSTVEKTVA PAECSGGGGS EGKSSGSGSE SKSTEGKSSG         240
SGSESKSTGG GGSEVQLVES GGGLVQPGGS LKLSCAASGF TFNTYAMNWV RQAPGKGLEW         300
VARIRSKYNN YATYYADSVK DRFTISRDDS KNTAYLQMNN LKTEDTAVYY CVRHGNFGNS         360
YVSWFAYWGQ GTLVTVSAAS TKGPSVFPLA PSSKSTSGGT AALGCLVKDY FPEPVTVSWN         420
```

```
SGALTSGVHT FPAVLQSSGL YSLSSVVTVP SSSLGTQTYI CNVNHKPSNT KVDKRVEPKS   480
C                                                                  481

SEQ ID NO: 72              moltype = AA  length = 481
FEATURE                    Location/Qualifiers
REGION                     1..481
                           note = CD3#2 scFab
source                     1..481
                           mol_type = protein
                           organism = synthetic construct
SEQUENCE: 72
EAVVTQEPSL TVSPGGTVTL TCRSSTGAVT TSNYANWVQE KPGQLPRGLI GGTNKRAPWV    60
PARFSGSLLG GKAALTLSGA QPEDEAEYFC ALWYSNLWVF GGGTKLTVLG QPKAAPSVTL   120
FPPSSEELQA NKATLVCLIS DFYPGAVKVA WKADGSPVNT GVETTTPSKQ SNNKYAASSY   180
LSLTPEQWKS HRSYSCQVTH EGSTVEKTVA PAECSGGGGS EGKSSGSGSE SKSTEGKSSG   240
SGSESKSTGG GGSEVQLVES GGGLVQPGGS LKLSCAASGF TFNTYAMNWV RQAPGKGLEW   300
VARIRSKYIN YATYYADSVK DRFTISRDDS KNTAYLQMNN LKTEDTAVYY CVRHGNFGNS   360
YVSWFAYWGQ GTLVTVSAAS TKGPSVFPLA PSSKSTSGGT AALGCLVKDY FPEPVTVSWN   420
SGALTSGVHT FPAVLQSSGL YSLSSVVTVP SSSLGTQTYI CNVNHKPSNT KVDKRVEPKS   480
C                                                                  481

SEQ ID NO: 73              moltype = AA  length = 703
FEATURE                    Location/Qualifiers
REGION                     1..703
                           note = DLL3#1 chain
source                     1..703
                           mol_type = protein
                           organism = synthetic construct
SEQUENCE: 73
EIVLTQSPGT LSLSPGERAT LSCRASQSVS SNFLVWYQQK PGQAPRPLIY GASTRASGIP    60
DRFSGSGSGA DFTLTISRLE PEDFALYYCQ QYGDSPYTFG QGTTLEIKRT VAAPSVFIFP   120
PSDEQLKSGT ASVVCLLNNF YPREAKVQWK VDNALQSGNS QESVTEQDSK DSTYSLSSTL   180
TLSKADYEKH KVYACEVTHQ GLSSPVTKSF NRGECGGGGS EGKSSGSGSE SKSTEGKSSG   240
SGSESKSTGG GGSQVQLVQS GAEVKKPGAS VKVSCKASGY TFTNYYMHWV RQAPGQGLEW   300
MGIIDPSVGS KSYAQKFGLR VTIARDTSTS TVFLDLYSLR SEDTAVYFCA RAGKRFGESY   360
FDYWGQGTLV TVSSASTKGP SVFPLAPSSK STSGGTAALG CLVKDYFPEP VTVSWNSGAL   420
TSGVHTFPAV LQSSGLYSLS SVVTVPSSSL GTQTYICNVN HKPSNTKVDK RVEPKSCDKT   480
HTCPPCPAPE AAGGPSVFLF PPKPKDTLMI SRTPEVTCVV VDVSHEDPEV KFNWYVDGVE   540
VHNAKTKPRE EQYNSTYRVV SVLTVLHQDW LNGKEYKCKV SNKALPAPIE KTISKAKGQP   600
REPQVYTLPP SREEMTKNQV SLWCLVKGFY PSDIAVEWES NGQPENNYKT TPPVLDSDGS   660
FFLYSKLTVD KSRWQQGNVF SCSVMHEALH NHYTQKSLSL SPG                    703

SEQ ID NO: 74              moltype = AA  length = 705
FEATURE                    Location/Qualifiers
REGION                     1..705
                           note = DLL3#2 chain
source                     1..705
                           mol_type = protein
                           organism = synthetic construct
SEQUENCE: 74
DIQMTQSPSA MSASVGDRVT ITCRASQGIS NYLAWFQQKP GKVPEPLIYA ASSLQSGVPS    60
RFSGSGSVTE FTLTISSLQP EDFATYYCLQ HNSSPYTFGQ GTKLEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGECGGGGSE GKSSGSGSES KSTEGKSSGS   240
GSESKSTGGG GSQVQLVQSG AEVKKPGASV KVSCKASGFT FSYYMHWVR QAPGQGLEWM   300
GIIINPSGGST SYAQKFQGRV TMTRDTSTST VYMELSSLRS EDTAVYYCAR GEAVGGNYYY   360
YGMDVWGQGT TVTVSSASTK GPSVFPLAPS SKSTSGGTAA LGCLVKDYFP EPVTVSWNSG   420
ALTSGVHTFP AVLQSSGLYS LSSVVTVPSS SLGTQTYICN VNHKPSNTKV DKRVEPKSCD   480
KTHTCPPCPA PEAAGGPSVF LFPPKPKDTL MISRTPEVTC VVVDVSHEDP EVKFNWYVGE   540
VEVHNAKTKP REEQYNSTYR VVSVLTVLHQ DWLNGKEYKC KVSNKALPAP IEKTISKAKG   600
QPREPQVYTL PPSREEMTKN QVSLWCLVKG FYPSDIAVEW ESNGQPENNY KTTPPVLDSD   660
GSFFLYSKLT VDKSRWQQGN VFSCSVMHEA LHNHYTQKSL SLSPG                  705

SEQ ID NO: 75              moltype = AA  length = 705
FEATURE                    Location/Qualifiers
REGION                     1..705
                           note = DLL3#3 chain
source                     1..705
                           mol_type = protein
                           organism = synthetic construct
SEQUENCE: 75
DIQMTQSPSA MSASVGDRVT ITCRASQGIS NYLVWFQQKP GKAPKRLIYA VSSLYSGVPS    60
RFSGSGSGTE FTLTISSLQP EDFATYYCLQ HDSYPYTFGQ GTKLEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGECGGGGSE GKSSGSGSES KSTEGKSSGS   240
GSESKSTGGG GSQVQLVQSG AEVKKPGASV KVSCKASGYT FTSYYHWVR QAPGQGLEWM   300
VIINPGGGTT SYAQKFLGRV TMTRDTSTNT VYMELKSLRS EDTAVYYCAR GEAVTGNYFY   360
YGMDVWGQGT TVTVSSASTK GPSVFPLAPS SKSTSGGTAA LGCLVKDYFP EPVTVSWNSG   420
ALTSGVHTFP AVLQSSGLYS LSSVVTVPSS SLGTQTYICN VNHKPSNTKV DKRVEPKSCD   480
```

```
KTHTCPPCPA PEAAGGPSVF LFPPKPKDTL MISRTPEVTC VVVDVSHEDP EVKFNWYVDG    540
VEVHNAKTKP REEQYNSTYR VVSVLTVLHQ DWLNGKEYKC KVSNKALPAP IEKTISKAKG    600
QPREPQVYTL PPSREEMTKN QVSLWCLVKG FYPSDIAVEW ESNGQPENNY KTTPPVLDSD    660
GSFFLYSKLT VDKSRWQQGN VFSCSVMHEA LHNHYTQKSL SLSPG                   705

SEQ ID NO: 76           moltype = AA  length = 702
FEATURE                 Location/Qualifiers
REGION                  1..702
                        note = DLL3#4 chain
source                  1..702
                        mol_type = protein
                        organism = synthetic construct
SEQUENCE: 76
DIVLTQSPAS LAVSLGQRAT ISCRASKSVS SFGYSFMHWY QQKPGQPPKL LIYLASNLES     60
GVPARFSGSG SGTDFTLNIH PVEEEDAATY YCQHSRELPW TFGGGTKLEI KRTVAAPSVF    120
IFPPSDEQLK SGTASVVCLL NNFYPREAKV QWKVDNALQS GNSQESVTEQ DSKDSTYSLS    180
STLTLSKADY EKHKVYACEV THQGLSSPVT KSFNRGECGG GGSEGKSSGS GSESKSTEGK    240
SSGSGSESKS TGGGGSQVQL QQSGTELVKP GASVKLSCKA SVYTFTSYFM YWVKQRPGHG    300
LEWIGEISPT NGNSNLNERF KNKATLTVDK SSSTAYMQLS SLTSEDSAVY YCTRGGDGYL    360
DYWGQGTTLT VSSASTKGPS VFPLAPSSKS TSGGTAALGC LVKDYFPEPV TVSWNSGALT    420
SGVHTFPAVL QSSGLYSLSS VVTVPSSSLG TQTYICNVNH KPSNTKVDKR VEPKSCDKTH    480
TCPPCPAPEA AGGPSVFLFP PKPKDTLMIS RTPEVTCVVV DVSHEDPEVK FNWYVDGVEV    540
HNAKTKPREE QYNSTYRVVS VLTVLHQDWL NGKEYKCKVS NKALPAPIEK TISKAKGQPR    600
EPQVYTLPPS REEMTKNQVS LWCLVKGFYP SDIAVEWESN GQPENNYKTT PPVLDSDGSF    660
FLYSKLTVDK SRWQQGNVFS CSVMHEALHN HYTQKSLSLS PG                      702

SEQ ID NO: 77           moltype = AA  length = 695
FEATURE                 Location/Qualifiers
REGION                  1..695
                        note = DLL3#5 chain
source                  1..695
                        mol_type = protein
                        organism = synthetic construct
SEQUENCE: 77
DIQMTQSPSS LSASVGDRVT VTCQASQDIS NYLNWYQQKP GKAPKLLIYD ASNLETGVPS     60
RFSGSGSGTD FTFTISSLQP EDIATYYCQQ YDNLPTWTFG QGTKVEIKRT VAAPSVFIFP    120
PSDEQLKSGT ASVVCLLNNF YPREAKVQWK VDNALQSGNS QESVTEQDSK DSTYSLSSTL    180
TLSKADYEKH KVYACEVTHQ GLSSPVTKSF NRGECGGGGS EGKSSGSGSE SKSTEGKSSG    240
SGSESKSTGG GGSQVQLVQS GAEVKKPGAS VKVSCKASGF TFTGYYIHWV RQAPGQGLEW    300
MGWINPNSGG TNYAQKFQGR VTMTRDSSIN TAFMELSRLT SDDTAVYYCA AGWDYWGQGT    360
LVTVSSASTK GPSVFPLAPS SKSTSGGTAA LGCLVKDYFP EPVTVSWNSG ALTSGVHTFP    420
AVLQSSGLYS LSSVVTVPSS SLGTQTYICN VNHKPSNTKV DKRVEPKSCD KTHTCPPCPA    480
PEAAGGPSVF LFPPKPKDTL MISRTPEVTC VVVDVSHEDP EVKFNWYVDG VEVHNAKTKP    540
REEQYNSTYR VVSVLTVLHQ DWLNGKEYKC KVSNKALPAP IEKTISKAKG QPREPQVYTL    600
PPSREEMTKN QVSLWCLVKG FYPSDIAVEW ESNGQPENNY KTTPPVLDSD GSFFLYSKLT    660
VDKSRWQQGN VFSCSVMHEA LHNHYTQKSL SLSPG                              695

SEQ ID NO: 78           moltype = AA  length = 698
FEATURE                 Location/Qualifiers
REGION                  1..698
                        note = DLL3#6 chain
source                  1..698
                        mol_type = protein
                        organism = synthetic construct
SEQUENCE: 78
DIQLTQSPSF LSTSVGDRVT ITCRASQDIS NYFAWYQQKP GKAPKLLIYA ASTLQSGVPS     60
RFSGGGSGTE FTLTISSLQP EDFATYYCQQ LNSYPYTFGQ GTKLEIKRTV AAPSVFIFPP    120
SDEQLKSGTA SVVCLLNNFY PREAKVQWKV DNALQSGNSQ ESVTEQDSKD STYSLSSTLT    180
LSKADYEKHK VYACEVTHQG LSSPVTKSFN RGECGGGGSE GKSSGSGSES KSTEGKSSGS    240
GSESKSTGGG GSQVQLQESG PGLVKPSETL SLTCTVSGGS ISSYFWSWIR QPAGKGLEWI    300
GRIYTSGSTN YNPSLNSRLT MSVDTSKNQF SLKLSSVTAA DTAVYYCARR GDWGGFDIWG    360
QGTVVTVSSA STKGPSVFPL APSSKSTSGG TAALGCLVKD YFPEPVTVSW NSGALTSGVH    420
TFPAVLQSSG LYSLSSVVTV PSSSLGTQTY ICNVNHKPSN TKVDKRVEPK SCDKTHTCPP    480
CPAPEAAGGP SVFLFPPKPK DTLMISRTPE VTCVVVDVSH EDPEVKFNWY VDGVEVHNAK    540
TKPREEQYNS TYRVVSVLTV LHQDWLNGKE YKCKVSNKAL PAPIEKTISK AKGQPREPQV    600
YTLPPSREEM TKNQVSLWCL VKGFYPSDIA VEWESNGQPE NNYKTTPPVL DSDGSFFLYS    660
KLTVDKSRWQ QGNVFSCSVM HEALHNHYTQ KSLSLSPG                           698

SEQ ID NO: 79           moltype = AA  length = 707
FEATURE                 Location/Qualifiers
REGION                  1..707
                        note = CD3#1 chain
source                  1..707
                        mol_type = protein
                        organism = synthetic construct
SEQUENCE: 79
EAVVTQEPSL TVSPGGTVTL TCRSSTGAVT TSNYANWVQE KPGQLPRGLI GGTNKRAPWV     60
PARFSGSLLG GKAALTLSGA QPEDEAEYYC ALWYSNLWVF GGGTKLTVLG QPKAAPSVTL    120
FPPSSEELQA NKATLVCLIS DFYPGAVKVA WKADGSPVNT GVETTTPSKQ SNNKYAASSY    180
```

```
LSLTPEQWKS HRSYSCQVTH EGSTVEKTVA PAECSGGGGS EGKSSGSGSE SKSTEGKSSG    240
SGSESKSTGG GGSEVQLVES GGGLVQPGGS LKLSCAASGF TFNTYAMNWV RQAPGKGLEW    300
VARIRSKYNN YATYYADSVK DRFTISRDDS KNTAYLQMNN LKTEDTAVYY CVRHGNFGNS    360
YVSWFAYWGQ GTLVTVSAAS TKGPSVFPLA PSSKSTSGGT AALGCLVKDY FPEPVTVSWN    420
SGALTSGVHT FPAVLQSSGL YSLSSVVTVP SSSLGTQTYI CNVNHKPSNT KVDKRVEPKS    480
CDKTHTCPPC PAPEAAGGPS VFLFPPKPKD TLMISRTPEV TCVVVDVSHE DPEVKFNWYV    540
DGVEVHNAKT KPREEQYNST YRVVSVLTVL HQDWLNGKEY KCKVSNKALP APIEKTISKA    600
KGQPREPQVY TLPPSREEMT KNQVSLSCAV KGFYPSDIAV EWESNGQPEN NYKTTPPVLD    660
SDGSFFLVSK LTVDKSRWQQ GNVFSCSVMH EALHNRFTQK SLSLSPG                 707

SEQ ID NO: 80           moltype = AA   length = 707
FEATURE                 Location/Qualifiers
REGION                  1..707
                        note = CD3#2 chain
source                  1..707
                        mol_type = protein
                        organism = synthetic construct
SEQUENCE: 80
EAVVTQEPSL TVSPGGTVTL TCRSSTGAVT TSNYANWVQE KPGQLPRGLI GGTNKRAPWV     60
PARFSGSLLG GKAALTLSGA QPEDEAEYFC ALWYSNLWVF GGGTKLTVLG QPKAAPSVTL    120
FPPSSEELQA NKATLVCLIS DFYPGAVKVA WKADGSPVNT GVETTTPSKQ SNNKYAASSY    180
LSLTPEQWKS HRSYSCQVTH EGSTVEKTVA PAECSGGGGS EGKSSGSGSE SKSTEGKSSG    240
SGSESKSTGG GGSEVQLVES GGGLVQPGGS LKLSCAASGF TFNTYAMNWV RQAPGKGLEW    300
VARIRSKYIN YATYYADSVK DRFTISRDDS KNTAYLQMNN LKTEDTAVYY CVRHGNFGNS    360
YVSWFAYWGQ GTLVTVSAAS TKGPSVFPLA PSSKSTSGGT AALGCLVKDY FPEPVTVSWN    420
SGALTSGVHT FPAVLQSSGL YSLSSVVTVP SSSLGTQTYI CNVNHKPSNT KVDKRVEPKS    480
CDKTHTCPPC PAPEAAGGPS VFLFPPKPKD TLMISRTPEV TCVVVDVSHE DPEVKFNWYV    540
DGVEVHNAKT KPREEQYNST YRVVSVLTVL HQDWLNGKEY KCKVSNKALP APIEKTISKA    600
KGQPREPQVY TLPPSREEMT KNQVSLSCAV KGFYPSDIAV EWESNGQPEN NYKTTPPVLD    660
SDGSFFLVSK LTVDKSRWQQ GNVFSCSVMH EALHNRFTQK SLSLSPG                 707

SEQ ID NO: 81           moltype = AA   length = 226
FEATURE                 Location/Qualifiers
REGION                  1..226
                        note = Fcdomain* (IgG1)
source                  1..226
                        mol_type = protein
                        organism = synthetic construct
SEQUENCE: 81
DKTHTCPPCP APELLGGPSV FLFPPKPKDT LMISRTPEVT CVVVDVSHED PEVKFNWYVD     60
GVEVHNAKTK PREEQYNSTY RVVSVLTVLH QDWLNGKEYK CKVSNKALPA PIEKTISKAK    120
GQPREPQVYT LPPSREEMTK NQVSLTCLVK GFYPSDIAVE WESNGQPENN YKTTPPVLDS    180
DGSFFLYSKL TVDKSRWQQG NVFSCSVMHE ALHNHYTQKS LSLSPG                  226

SEQ ID NO: 82           moltype = AA   length = 226
FEATURE                 Location/Qualifiers
REGION                  1..226
                        note = Fcknobdomain (IgG1, LALA)
source                  1..226
                        mol_type = protein
                        organism = synthetic construct
SEQUENCE: 82
DKTHTCPPCP APEAAGGPSV FLFPPKPKDT LMISRTPEVT CVVVDVSHED PEVKFNWYVD     60
GVEVHNAKTK PREEQYNSTY RVVSVLTVLH QDWLNGKEYK CKVSNKALPA PIEKTISKAK    120
GQPREPQVYT LPPSREEMTK NQVSLWCLVK GFYPSDIAVE WESNGQPENN YKTTPPVLDS    180
DGSFFLYSKL TVDKSRWQQG NVFSCSVMHE ALHNHYTQKS LSLSPG                  226

SEQ ID NO: 83           moltype = AA   length = 226
FEATURE                 Location/Qualifiers
REGION                  1..226
                        note = Fcholedomain (IgG1, RF/LALA)
source                  1..226
                        mol_type = protein
                        organism = synthetic construct
SEQUENCE: 83
DKTHTCPPCP APEAAGGPSV FLFPPKPKDT LMISRTPEVT CVVVDVSHED PEVKFNWYVD     60
GVEVHNAKTK PREEQYNSTY RVVSVLTVLH QDWLNGKEYK CKVSNKALPA PIEKTISKAK    120
GQPREPQVYT LPPSREEMTK NQVSLSCAVK GFYPSDIAVE WESNGQPENN YKTTPPVLDS    180
DGSFFLVSKL TVDKSRWQQG NVFSCSVMHE ALHNRFTQKS LSLSPG                  226

SEQ ID NO: 84           moltype = AA   length = 228
FEATURE                 Location/Qualifiers
REGION                  1..228
                        note = Fcdomain (IgG4Pro)
source                  1..228
                        mol_type = protein
                        organism = synthetic construct
SEQUENCE: 84
ESKYGPPCPP CPAPEFLGGP SVFLFPPKPK DTLMISRTPE VTCVVVDVSQ EDPEVQFNWY     60
```

```
VDGVEVHNAK TKPREEQFNS TYRVVSVLTV LHQDWLNGKE YKCKVSNKGL PSSIEKTISK    120
AKGQPREPQV YTLPPSQEEM TKNQVSLTCL VKGFYPSDIA VEWESNGQPE NNYKTTPPVL    180
DSDGSFFLYS RLTVDKSRWQ EGNVFSCSVM HEALHNHYTQ KSLSLSLG                 228

SEQ ID NO: 85          moltype = AA   length = 228
FEATURE                Location/Qualifiers
REGION                 1..228
                       note = Fcknobdomain(IgG4Pro)
source                 1..228
                       mol_type = protein
                       organism = synthetic construct
SEQUENCE: 85
ESKYGPPCPP CPAPEFLGGP SVFLFPPKPK DTLMISRTPE VTCVVVDVSQ EDPEVQFNWY     60
VDGVEVHNAK TKPREEQFNS TYRVVSVLTV LHQDWLNGKE YKCKVSNKGL PSSIEKTISK    120
AKGQPREPQV YTLPPSQEEM TKNQVSLWCL VKGFYPSDIA VEWESNGQPE NNYKTTPPVL    180
DSDGSFFLYS RLTVDKSRWQ EGNVFSCSVM HEALHNHYTQ KSLSLSLG                 228

SEQ ID NO: 86          moltype = AA   length = 228
FEATURE                Location/Qualifiers
REGION                 1..228
                       note = Fcholedomain(IgG4Pro,RF)
source                 1..228
                       mol_type = protein
                       organism = synthetic construct
SEQUENCE: 86
ESKYGPPCPP CPAPEFLGGP SVFLFPPKPK DTLMISRTPE VTCVVVDVSQ EDPEVQFNWY     60
VDGVEVHNAK TKPREEQFNS TYRVVSVLTV LHQDWLNGKE YKCKVSNKGL PSSIEKTISK    120
AKGQPREPQV YTLPPSQEEM TKNQVSLSCA VKGFYPSDIA VEWESNGQPE NNYKTTPPVL    180
DSDGSFFLVS RLTVDKSRWQ EGNVFSCSVM HEALHNRFTQ KSLSLSLG                 228

SEQ ID NO: 87          moltype = AA   length = 107
FEATURE                Location/Qualifiers
REGION                 1..107
                       note = constantregionofakappalightchain
source                 1..107
                       mol_type = protein
                       organism = synthetic construct
SEQUENCE: 87
RTVAAPSVFI FPPSDEQLKS GTASVVCLLN NFYPREAKVQ WKVDNALQSG NSQESVTEQD     60
SKDSTYSLSS TLTLSKADYE KHKVYACEVT HQGLSSPVTK SFNRGEC                  107

SEQ ID NO: 88          moltype = AA   length = 106
FEATURE                Location/Qualifiers
REGION                 1..106
                       note = constantregionofalambdalightchain
source                 1..106
                       mol_type = protein
                       organism = synthetic construct
SEQUENCE: 88
GQPKAAPSVT LFPPSSEELQ ANKATLVCLI SDFYPGAVKV AWKADGSPVN TGVETTTPSK     60
QSNNKYAASS YLSLTPEQWK SHRSYSCQVT HEGSTVEKTV APAECS                   106

SEQ ID NO: 89          moltype = AA   length = 38
FEATURE                Location/Qualifiers
REGION                 1..38
                       note = Linker
source                 1..38
                       mol_type = protein
                       organism = synthetic construct
SEQUENCE: 89
GGGGSEGKSS GSGSESKSTE GKSSGSGSES KSTGGGGS                             38

SEQ ID NO: 90          moltype = AA   length = 22
FEATURE                Location/Qualifiers
REGION                 1..22
                       note = Linker
source                 1..22
                       mol_type = protein
                       organism = synthetic construct
SEQUENCE: 90
GGGGSGGGGS GGSGGSGGGG GS                                              22

SEQ ID NO: 91          moltype = AA   length = 26
FEATURE                Location/Qualifiers
REGION                 1..26
                       note = Linker
source                 1..26
                       mol_type = protein
                       organism = synthetic construct
```

```
SEQUENCE: 91
GGGGSGGGGS GGGGSGGGGS GGGGGS                                                    26

SEQ ID NO: 92           moltype = AA   length = 30
FEATURE                 Location/Qualifiers
REGION                  1..30
                        note = Linker
source                  1..30
                        mol_type = protein
                        organism = synthetic construct
SEQUENCE: 92
GGGGSGGGGG GSGGGGGGSG GGGSGGGGGS                                                 30

SEQ ID NO: 93           moltype = AA   length = 34
FEATURE                 Location/Qualifiers
REGION                  1..34
                        note = Linker
source                  1..34
                        mol_type = protein
                        organism = synthetic construct
SEQUENCE: 93
GGGGSGGGGS GGGSGGGSGG GGSGGGGSGG GGGS                                            34

SEQ ID NO: 94           moltype = AA   length = 38
FEATURE                 Location/Qualifiers
REGION                  1..38
                        note = Linker
source                  1..38
                        mol_type = protein
                        organism = synthetic construct
SEQUENCE: 94
GGGGSGGGGS GGGSGGGSGG GSGGGGSGGG GSGGGGGS                                        38

SEQ ID NO: 95           moltype = AA   length = 42
FEATURE                 Location/Qualifiers
REGION                  1..42
                        note = Linker
source                  1..42
                        mol_type = protein
                        organism = synthetic construct
SEQUENCE: 95
GGGGSGGGGS GGGSGGGSGG GSGGGGSGGG GGSGGGSGGG GS                                   42

SEQ ID NO: 96           moltype = AA   length = 14
FEATURE                 Location/Qualifiers
REGION                  1..14
                        note = CD3#3 LCCDR1
source                  1..14
                        mol_type = protein
                        organism = synthetic construct
SEQUENCE: 96
RSSTGAVTTS NYAN                                                                  14

SEQ ID NO: 97           moltype = AA   length = 7
FEATURE                 Location/Qualifiers
REGION                  1..7
                        note = CD3#3 LCCDR2
source                  1..7
                        mol_type = protein
                        organism = synthetic construct
SEQUENCE: 97
GTNKRAP                                                                          7

SEQ ID NO: 98           moltype = AA   length = 9
FEATURE                 Location/Qualifiers
REGION                  1..9
                        note = CD3#3 LCCDR3
source                  1..9
                        mol_type = protein
                        organism = synthetic construct
SEQUENCE: 98
ALWYSNLWV                                                                        9

SEQ ID NO: 99           moltype = AA   length = 10
FEATURE                 Location/Qualifiers
REGION                  1..10
                        note = CD3#3 HCCDR1
source                  1..10
                        mol_type = protein
```

```
                                    organism = synthetic construct
SEQUENCE: 99
GFTFNTYAMN                                                                 10

SEQ ID NO: 100          moltype = AA   length = 19
FEATURE                 Location/Qualifiers
REGION                  1..19
                        note = CD3#3 HCCDR2
source                  1..19
                        mol_type = protein
                        organism = synthetic construct
SEQUENCE: 100
RIRSKYANYA TYYADSVKD                                                       19

SEQ ID NO: 101          moltype = AA   length = 14
FEATURE                 Location/Qualifiers
REGION                  1..14
                        note = CD3#3 HCCDR3
source                  1..14
                        mol_type = protein
                        organism = synthetic construct
SEQUENCE: 101
HGNFGNSYVS WFAY                                                            14

SEQ ID NO: 102          moltype = AA   length = 109
FEATURE                 Location/Qualifiers
REGION                  1..109
                        note = CD3#3 VL
source                  1..109
                        mol_type = protein
                        organism = synthetic construct
SEQUENCE: 102
EAVVTQEPSL TVSPGGTVTL TCRSSTGAVT TSNYANWVQE KPGQLPRGLI GGTNKRAPWV           60
PARFSGSLLG GKAALTLSGA QPEDEAEYFC ALWYSNLWVF GGGTKLTVL                      109

SEQ ID NO: 103          moltype = AA   length = 125
FEATURE                 Location/Qualifiers
REGION                  1..125
                        note = CD3#3 HL
source                  1..125
                        mol_type = protein
                        organism = synthetic construct
SEQUENCE: 103
EVQLVESGGG LVQPGGSLKL SCAASGFTFN TYAMNWVRQA PGKGLEWVAR IRSKYANYAT           60
YYADSVKDRF TISRDDSKNT AYLQMNNLKT EDTAVYYCVR HGNFGNSYVS WFAYWGQGTL          120
VTVSA                                                                     125

SEQ ID NO: 104          moltype = AA   length = 481
FEATURE                 Location/Qualifiers
REGION                  1..481
                        note = CD3#3 scFab
source                  1..481
                        mol_type = protein
                        organism = synthetic construct
SEQUENCE: 104
EAVVTQEPSL TVSPGGTVTL TCRSSTGAVT TSNYANWVQE KPGQLPRGLI GGTNKRAPWV           60
PARFSGSLLG GKAALTLSGA QPEDEAEYFC ALWYSNLWVF GGGTKLTVLG QPKAAPSVTL          120
FPPSSEELQA NKATLVCLIS DFYPGAVKVA WKADGSPVNT GVETTTPSKQ SNNKYAASSY          180
LSLTPEQWKS HRSYSCQVTH EGSTVEKTVA PAECSGGGGS EGKSSGSGSE SKSTEGKSSG          240
SGSESKSTGG GGSEVQLVES GGGLVQPGGS LKLSCAASGF TFNTYAMNWV RQAPGKGLEW          300
VARIRSKYAN YATYYADSVK DRFTISRDDS KNTAYLQMNN LKTEDTAVYY CVRHGNFGNS          360
YVSWFAYWGQ GTLVTVSAAS TKGPSVFPLA PSSKSTSGGT AALGCLVKDY FPEPVTVSWN          420
SGALTSGVHT FPAVLQSSGL YSLSSVVTVP SSSLGTQTYI CNVNHKPSNT KVDKRVEPKS          480
C                                                                         481

SEQ ID NO: 105          moltype = AA   length = 707
FEATURE                 Location/Qualifiers
REGION                  1..707
                        note = CD3#3 chain
source                  1..707
                        mol_type = protein
                        organism = synthetic construct
SEQUENCE: 105
EAVVTQEPSL TVSPGGTVTL TCRSSTGAVT TSNYANWVQE KPGQLPRGLI GGTNKRAPWV           60
PARFSGSLLG GKAALTLSGA QPEDEAEYFC ALWYSNLWVF GGGTKLTVLG QPKAAPSVTL          120
FPPSSEELQA NKATLVCLIS DFYPGAVKVA WKADGSPVNT GVETTTPSKQ SNNKYAASSY          180
LSLTPEQWKS HRSYSCQVTH EGSTVEKTVA PAECSGGGGS EGKSSGSGSE SKSTEGKSSG          240
SGSESKSTGG GGSEVQLVES GGGLVQPGGS LKLSCAASGF TFNTYAMNWV RQAPGKGLEW          300
VARIRSKYAN YATYYADSVK DRFTISRDDS KNTAYLQMNN LKTEDTAVYY CVRHGNFGNS          360
```

```
YVSWFAYWGQ GTLVTVSAAS TKGPSVFPLA PSSKSTSGGT AALGCLVKDY FPEPVTVSWN  420
SGALTSGVHT FPAVLQSSGL YSLSSVVTVP SSSLGTQTYI CNVNHKPSNT KVDKRVEPKS  480
CDKTHTCPPC PAPEAAGGPS VFLFPPKPKD TLMISRTPEV TCVVVDVSHE DPEVKFNWYV  540
DGVEVHNAKT KPREEQYNST YRVVSVLTVL HQDWLNGKEY KCKVSNKALP APIEKTISKA  600
KGQPREPQVY TLPPSREEMT KNQVSLSCAV KGFYPSDIAV EWESNGQPEN NYKTTPPVLD  660
SDGSFFLVSK LTVDKSRWQQ GNVFSCSVMH EALHNRFTQK SLSLSPG               707

SEQ ID NO: 106          moltype = AA   length = 476
FEATURE                 Location/Qualifiers
REGION                  1..476
                        note = HuDLL3(ECD)-His
source                  1..476
                        mol_type = protein
                        organism = synthetic construct
SEQUENCE: 106
AGVFELQIHS FGPGPGPGAP RSPCSARLPC RLFFRVCLKP GLSEEAAESP CALGAALSAR   60
GPVYTEQPGA PAPDLPLPDG LLQVPFRDAW PGTFSFIIET WREELGDQIG GPAWSLLARV  120
AGRRRLAAGG PWARDIQRAG AWELRFSYRA RCEPPAVGTA CTRLCRPRSA PSRCGPGLRP  180
CAPLEDECEA PLVCRAGCSP EHGFCEQPGE CRCLEGWTGP LCTVPVSTSS CLSPRGPSSA  240
TTGCLVPGPG PCDGNPCANG GSCSETPRSF ECTCPRGFYG LRCEVSGVTC ADGPCFNGGL  300
CVGGADPDSA YICHCPPGFQ GSNCEKRVDR CSLQPCRNGG LCLDLGHALR CRCRAGFAGP  360
RCEHDLDDCA GRACANGGTC VEGGGAHRCS CALGFGGRDC RERADPCAAR PCAHGGRCYA  420
HFSGLVCACA PGYMGARCEF PVHPDGASAL PAAPPGLRPD DPQRYLAGSA HHHHHH      476

SEQ ID NO: 107          moltype = AA   length = 476
FEATURE                 Location/Qualifiers
REGION                  1..476
                        note = CynoDLL3(ECD)-His
source                  1..476
                        mol_type = protein
                        organism = synthetic construct
SEQUENCE: 107
AGVFELQIHS FGPGPGPGAP RSPCSARGPC RLFFRVCLKP GLSEEAAESP CALGAALSAR   60
GPVYTEQPEA PAPDLPLPNG LLQVPFRDAW PGTFSLIIET WREELGDQIG GPAWSLLARV  120
TRRRRLAAGG PWARDIQRAG AWELRFSYRA RCELPAVGTA CTRLCRPRSA PSRCGPGLRP  180
CAPLEDECEA PPVCRAGCSL EHGFCEQPGE CRCLEGWTGP LCMVPVSTSS CLGLRGPSST  240
TTGCLVPGPG PCDGNPCANG GSCSETPGSF ECTCPRGFYG LRCEVSGVTC ADGPCFNGGL  300
CVGGADPDSA YICHCPPGFQ GSNCEKRVDR CSLQPCRNGG LCLDLGHALR CRCRAGFAGP  360
RCEHDLDDCA GRACANGGTC VEGGGAHRCS CALGFGGRNC RERADPCAAR PCAHGGRCYA  420
HFSGLVCACA PGYMGARCEF PVHPDGVSAL PAAPPGLRPG DPQRYLAGSA HHHHHH      476

SEQ ID NO: 108          moltype = AA   length = 487
FEATURE                 Location/Qualifiers
REGION                  1..487
                        note = HuCD3E+G-HuFc-His
source                  1..487
                        mol_type = protein
                        organism = synthetic construct
SEQUENCE: 108
QDGNEEMGGI TQTPYKVSIS GTTVILTCPQ YPGSEILWQH NDKNIGGDED DKNIGSDEDH   60
LSLKEFSELE QSGYYVCYPR GSKPEDANFY LYLRARVCEN CMEMDGGGSG GGSGGGSGGG  120
SGGGSGGGSG GQSIKGNHLV KVYDYQEDGS VLLTCDAEAK NITWFKDGKM IGFLTEDKKK  180
WNLGSNAKDP RGMYQCKGSQ NKSKPLQVYY RMCQNCIELN AATISGGSGG SGGSGGSGGS  240
GGSGGEPKSC DKTHTCPPCP APELLGGPSV FLFPPKPKDT LMISRTPEVT CVVVDVSHED  300
PEVKFNWYVD GVEVHNAKTK PREEQYNSTY RVVSVLTVLH QDWLNGKEYK CKVSNKALPA  360
PIEKTISKAK GQPREPQVYT LPPSRDELTK NQVSLTCLVK GFYPSDIAVE WESNGQPENN  420
YKTTPPVLDS DGSFFLYSKL TVDKSRWQQG NVFSCSVMHE ALHNHYTQKS LSLSPGKAGS  480
AHHHHHH                                                            487

SEQ ID NO: 109          moltype = AA   length = 477
FEATURE                 Location/Qualifiers
REGION                  1..477
                        note = CynoCD3E+G-Fc-His
source                  1..477
                        mol_type = protein
                        organism = synthetic construct
SEQUENCE: 109
QDGNEEMGSI TQTPYQVSIS GTTVILTCSQ HLGSEAQWQH NGKNKGDSGD QLFLPEFSEM   60
EQSGYYVCYP RGSNPEDASH HLYLKARVCE NCMEMDVMGG GSGGGSGGGS GGGSGGGSGG  120
GSGGQSFEEN RKLNVYNQED GSVLLTCHVK NTNITWFKEG KMIDILTAHK NKWNLGSNTK  180
DPRGVYQCKG SKDKSKTLQV YYRMCQNCIE LNAATGGSGG SGGSGGSGGS GGSGGEPKSC  240
DKTHTCPPCP APELLGGPSV FLFPPKPKDT LMISRTPEVT CVVVDVSHED PEVKFNWYVD  300
GVEVHNAKTK PREEQYNSTY RVVSVLTVLH QDWLNGKEYK CKVSNKALPA PIEKTISKAK  360
GQPREPQVYT LPPSRDELTK NQVSLTCLVK GFYPSDIAVE WESNGQPENN YKTTPPVLDS  420
DGSFFLYSKL TVDKSRWQQG NVFSCSVMHE ALHNHYTQKS LSLSPGKAGS AHHHHHH     477

SEQ ID NO: 110          moltype = AA   length = 626
FEATURE                 Location/Qualifiers
REGION                  1..626
```

```
                        note = FLAG-tagged human DLL3 full length
source                  1..626
                        mol_type = protein
                        organism = synthetic construct
SEQUENCE: 110
MVSPRMSGLL SQTVILALIF LPQTRPDYKD DDDKAGVFEL QIHSFGPGPG PGAPRSPCSA    60
RLPCRLFFRV CLKPGLSEEA AESPCALGAA LSARGPVYTE QPGAPAPDLP LPDGLLQVPF   120
RDAWPGTFSF IIETWREELG DQIGGPAWSL LARVAGRRRL AAGGPWARDI QRAGAWELRF   180
SYRARCEPPA VGTACTRLCR PRSAPSRCGP GLRPCAPLED ECEAPLVCRA GCSPEHGFCE   240
QPGECRCLEG WTGPLCTVPV STSSCLSPRG PSSATTGCLV PGPGPCDGNP CANGGSCSET   300
PRSFECTCPR GFYGLRCEVS GVTCADGPCF NGGLCVGGAD PDSAYICHCP PGFQGSNCEK   360
RVDRCSLQPC RNGGLCLDLG HALRCRCRAG FAGPRCEHDL DDCAGRACAN GGTCVEGGGA   420
HRCSCALGFG GRDCRERADP CAARPCAHGG RCYAHFSGLV CACAPGYMGA RCEFPVHPDG   480
ASALPAAPPG LRPGDPQRYL LPPALGLLVA AGVAGAALLL VHVRRRGHSQ DAGSRLLAGT   540
PEPSVHALPD ALNNLRTQEG SGDGPSSSVD WNRPEDVDPQ GIYVISAPSI YAREVATPLF   600
PPLHTGRAGQ RQHLLFPYPS SILSVK                                       626

SEQ ID NO: 111          moltype = AA   length = 626
FEATURE                 Location/Qualifiers
REGION                  1..626
                        note = FLAG-tagged cyno DLL3 full length
source                  1..626
                        mol_type = protein
                        organism = synthetic construct
SEQUENCE: 111
MVSPRMSRLL SQTVILALIF IPQARPDYKD DDDKAGVFEL QIHSFGPGPG PGAPRSPCSA    60
RGPCRLFFRV CLKPGLSEEA AESPCALGAA LSARGPVYTE QPEAPAPDLP LPNGLLQVPF   120
RDAWPGTFSL IIETWREELG DQIGGPAWSL LARVTRRRRL AAGGPWARDI QRAGAWELRF   180
SYRARCELPA VGTACTRLCR PRSAPSRCGP GLRPCAPLED ECEAPPVCRA GCSLEHGFCE   240
QPGECRCLEG WTGPLCMVPV STSSCLGLRG PSSTTTGCLV PGPGPCDGNP CANGGSCSET   300
PGSFECTCPR GFYGLRCEVS GVTCADGPCF NGGLCVGGAD PDSAYICHCP PGFQGSNCEK   360
RVDRCSLQPC RNGGLCLDLG HALRCRCRAG FAGPRCEHDL DDCAGRACAN GGTCVEGGGA   420
HRCSCALGFG GRNCRERADP CAARPCAHGG RCYAHFSGLV CACAPGYMGA RCEFPVHPDG   480
VSALPAAPPG LRPGDPQRYL LPPALGLLVA AGVAGAALLL VHVRRRGHAQ DAGSRLLAGT   540
PEPSVHALPD ALNNLRTQEG PGDVPSSSVD WNRPEDVDSR GIYVISAPSI YAREVAMPLF   600
PPLHTGRAGQ RQNLLFPFPS SILSVK                                       626

SEQ ID NO: 112          moltype = AA   length = 731
FEATURE                 Location/Qualifiers
REGION                  1..731
                        note = FLAG-tagged human DLL1 full length
source                  1..731
                        mol_type = protein
                        organism = synthetic construct
SEQUENCE: 112
MGSRCALALA VLSALLCDYK DDDDKQVWSS GVFELKLQEF VNKKGLLGNR NCCRGGAGPP    60
PCACRTFFRV CLKHYQASVS PEPPCTYGSA VTPVLGVDSF SLPDGGGADS AFSNPIRFPF   120
GFTWPGTFSL IIEALHTDSP DDLATENPER LISRLATQRH LTVGEEWSQD LHSSGRTDLK   180
YSYRFVCDEH YYGEGCSVFC RPRDDAFGHF TCGERGEKVC NPGWKGPYCT EPICLPGCDE   240
QHGFCDKPGE CKCRVGWQGR YCDECIRYPG CLHGTCQQPW QCNCQEGWGG LFCNQDLNYC   300
THHKPCKNGA TCTNTGQGSY TCSCRPGYTG ATCELGIDEC DPSPCKNGGS CTDLENSYSC   360
TCPPGFYGKI CELSAMTCAD GPCFNGGRCS DSPDGGYSCR CPVGYSGFNC EKKIDYCSSS   420
PCSNGAKCVD LGDAYLCRCQ AGFSGRHCDD NVDDCASSPC ANGGTCRDGV NDFSCTCPPG   480
YTGRNCSAPV SRCEHAPCHN GATCHERGHR YVCECARGYG GPNCQFLLPE LPPGPAVVDL   540
TEKLEGQGGP FPWVAVCAGV ILVLMLLLGC AAVVVCVRLR LQKHRPPADP CRGETETMNN   600
LANCQREKDI SVSIIGATQI KNTNKKADFH GDHSADKNGF KARYPAVDYN LVQDLKGDDT   660
AVRDAHSKRD TKCQPQGSSG EEKGTPTTLR GGEASERKRP DSGCSTSKDT KYQSVYVISE   720
EKDECVIATE V                                                       731

SEQ ID NO: 113          moltype = AA   length = 693
FEATURE                 Location/Qualifiers
REGION                  1..693
                        note = FLAG-tagged human DLL4 full length
source                  1..693
                        mol_type = protein
                        organism = synthetic construct
SEQUENCE: 113
MAAASRSASG WALLLLVALW QQRAAGDYKD DDDKSGVFQL QLQEFINERG VLASGRPCEP    60
GCRTFFRVCL KHFQAVVSPG PCTFGTVSTP VLGTNSFAVR DDSSGGGRNP LQLPFNFTWP   120
GTFSLIIEAW HAPGDDLRPE ALPPDALISK IAIQGSLAVG QNWLLDEQTS TLTRLRYSYR   180
VICSDNYYGD NCSRLCKKRN DHFGHYVCQP DGNLSCLPGW TGEYCQQPIC LSGCHEQNGY   240
CSKPAECLCR PGWQGRLCNE CIPHNGCRHG TCSTPWQCTC DEGWGGLFCD QDLNYCTHHS   300
PCKNGATCSN SGQRSYTCTC RPGYTGVDCE LELSECDSNP CRNGGSCKDQ EDGYHCLCPP   360
GYYGLHCEHS TLSCADSPCF NGGSCRERNQ GANYACECPP NFTGSNCEKK VDRCTSNPCA   420
NGGQCLNRGP SRMCRCRPGF TGTYCELHVS DCARNPCAHG GTCHDLENGL MCTCPAGFSG   480
RRCEVRTSID ACASSPCFNR ATCYTDLSTD TFVCNCPYGF VGSRCEFPVG LPPSFPWVAV   540
SLGVGLAVLL VLLGMVAVAV RQLRLRRPDD GSREAMNNLS DFQKDNLIPA AQLKNTNQKK   600
ELEVDCGLDK SNCGKQQNHT LDYNLAPGPL GRGTMPGKFP HSDKSLGEKA PLRLHSEKPE   660
CRISAICSPR DSMYQSVCLI SEERNECVIA TEV                               693
```

```
SEQ ID NO: 114         moltype = AA  length = 8
FEATURE                Location/Qualifiers
REGION                 1..8
                       note = FLAG tag
source                 1..8
                       mol_type = protein
                       organism = synthetic construct
SEQUENCE: 114
DYKDDDDK                                                                    8

SEQ ID NO: 115         moltype = AA  length = 21
FEATURE                Location/Qualifiers
REGION                 1..21
                       note = Vk leader
source                 1..21
                       mol_type = protein
                       organism = synthetic construct
SEQUENCE: 115
METDTLLLWV LLLWVPGSTG D                                                    21

SEQ ID NO: 116         moltype = AA  length = 16
FEATURE                Location/Qualifiers
REGION                 1..16
                       note = 6His-myc tag
source                 1..16
                       mol_type = protein
                       organism = synthetic construct
SEQUENCE: 116
HHHHHHEQKL ISEEDL                                                          16

SEQ ID NO: 117         moltype = AA  length = 6
FEATURE                Location/Qualifiers
REGION                 1..6
                       note = Ser/Gly linker
source                 1..6
                       mol_type = protein
                       organism = synthetic construct
SEQUENCE: 117
SGGGGS                                                                      6

SEQ ID NO: 118         moltype = AA  length = 23
FEATURE                Location/Qualifiers
REGION                 1..23
                       note = EpCAM transmembrane domain
source                 1..23
                       mol_type = protein
                       organism = synthetic construct
SEQUENCE: 118
AGVIAVIVVV VIAVVAGIVV LVI                                                  23

SEQ ID NO: 119         moltype = AA  length = 26
FEATURE                Location/Qualifiers
REGION                 1..26
                       note = EpCAM intracellular domain
source                 1..26
                       mol_type = protein
                       organism = synthetic construct
SEQUENCE: 119
SRKKRMAKYE KAEIKEMGEM HRELNA                                               26

SEQ ID NO: 120         moltype = AA  length = 34
FEATURE                Location/Qualifiers
REGION                 1..34
                       note = EGF1
source                 1..34
                       mol_type = protein
                       organism = synthetic construct
SEQUENCE: 120
APLVCRAGCS PEHGFCEQPG ECRCLEGWTG PLCT                                      34

SEQ ID NO: 121         moltype = AA  length = 95
FEATURE                Location/Qualifiers
REGION                 1..95
                       note = Hu DLL3 EGF 1+2
source                 1..95
                       mol_type = protein
                       organism = synthetic construct
SEQUENCE: 121
```

```
APLVCRAGCS PEHGFCEQPG ECRCLEGWTG PLCTVPVSTS SCLSPRGPSS ATTGCLVPGP    60
GPCDGNPCAN GGSCSETPRS FECTCPRGFY GLRCE                              95

SEQ ID NO: 122           moltype = AA  length = 37
FEATURE                  Location/Qualifiers
REGION                   1..37
                         note = EGF2
source                   1..37
                         mol_type = protein
                         organism = synthetic construct
SEQUENCE: 122
GPGPCDGNPC ANGGSCSETP RSFECTCPRG FYGLRCE                             37

SEQ ID NO: 123           moltype = AA  length = 78
FEATURE                  Location/Qualifiers
REGION                   1..78
                         note = Hu DLL3 EGF 2+3
source                   1..78
                         mol_type = protein
                         organism = synthetic construct
SEQUENCE: 123
GPGPCDGNPC ANGGSCSETP RSFECTCPRG FYGLRCEVSG VTCADGPCFN GGLCVGGADP    60
DSAYICHCPP GFQGSNCE                                                  78

SEQ ID NO: 124           moltype = AA  length = 40
FEATURE                  Location/Qualifiers
REGION                   1..40
                         note = EGF3
source                   1..40
                         mol_type = protein
                         organism = synthetic construct
SEQUENCE: 124
SGVTCADGPC FNGGLCVGGA DPDSAYICHC PPGFQGSNCE                          40

SEQ ID NO: 125           moltype = AA  length = 78
FEATURE                  Location/Qualifiers
REGION                   1..78
                         note = Hu DLL3 EGF 3+4
source                   1..78
                         mol_type = protein
                         organism = synthetic construct
SEQUENCE: 125
SGVTCADGPC FNGGLCVGGA DPDSAYICHC PPGFQGSNCE KRVDRCSLQP CRNGGLCLDL    60
GHALRCRCRA GFAGPRCE                                                  78

SEQ ID NO: 126           moltype = AA  length = 37
FEATURE                  Location/Qualifiers
REGION                   1..37
                         note = EGF4
source                   1..37
                         mol_type = protein
                         organism = synthetic construct
SEQUENCE: 126
RVDRCSLQPC RNGGLCLDLG HALRCRCRAG FAGPRCE                             37

SEQ ID NO: 127           moltype = AA  length = 75
FEATURE                  Location/Qualifiers
REGION                   1..75
                         note = Hu DLL3 EGF 4+5
source                   1..75
                         mol_type = protein
                         organism = synthetic construct
SEQUENCE: 127
RVDRCSLQPC RNGGLCLDLG HALRCRCRAG FAGPRCEHDL DDCAGRACAN GGTCVEGGGA    60
HRCSCALGFG GRDCR                                                     75

SEQ ID NO: 128           moltype = AA  length = 37
FEATURE                  Location/Qualifiers
REGION                   1..37
                         note = EGF5
source                   1..37
                         mol_type = protein
                         organism = synthetic construct
SEQUENCE: 128
DLDDCAGRAC ANGGTCVEGG GAHRCSCALG FGGRDCR                             37

SEQ ID NO: 129           moltype = AA  length = 73
FEATURE                  Location/Qualifiers
REGION                   1..73
```

```
                        note = Hu DLL3 EGF 5+6
source                  1..73
                        mol_type = protein
                        organism = synthetic construct
SEQUENCE: 129
DDCAGRACAN GGTCVEGGGA HRCSCALGFG GRDCRERADP CAARPCAHGG RCYAHFSGLV   60
CACAPGYMGA RCE                                                     73

SEQ ID NO: 130          moltype = AA   length = 37
FEATURE                 Location/Qualifiers
REGION                  1..37
                        note = EGF6
source                  1..37
                        mol_type = protein
                        organism = synthetic construct
SEQUENCE: 130
RADPCAARPC AHGGRCYAHF SGLVCACAPG YMGARCE                            37

SEQ ID NO: 131          moltype = AA   length = 64
FEATURE                 Location/Qualifiers
REGION                  1..64
                        note = Hu DLL3 EGF6-membrane proximal peptide
source                  1..64
                        mol_type = protein
                        organism = synthetic construct
SEQUENCE: 131
RADPCAARPC AHGGRCYAHF SGLVCACAPG YMGARCEFPV HPDGASALPA APPGLRPGDP   60
QRYL                                                               64

SEQ ID NO: 132          moltype = AA   length = 27
FEATURE                 Location/Qualifiers
REGION                  1..27
                        note = Membrane proximal peptide
source                  1..27
                        mol_type = protein
                        organism = synthetic construct
SEQUENCE: 132
FPVHPDGASA LPAAPPGLRP GDPQRYL                                      27

SEQ ID NO: 133          moltype = AA   length = 12
FEATURE                 Location/Qualifiers
REGION                  1..12
                        note = DLL3#7 LCCDR1
source                  1..12
                        mol_type = protein
                        organism = synthetic construct
SEQUENCE: 133
RASQSVNSNF LA                                                      12

SEQ ID NO: 134          moltype = AA   length = 7
FEATURE                 Location/Qualifiers
REGION                  1..7
                        note = DLL3#7 LCCDR2
source                  1..7
                        mol_type = protein
                        organism = synthetic construct
SEQUENCE: 134
GTSSRAT                                                            7

SEQ ID NO: 135          moltype = AA   length = 9
FEATURE                 Location/Qualifiers
REGION                  1..9
                        note = DLL3#7 LCCDR3
source                  1..9
                        mol_type = protein
                        organism = synthetic construct
SEQUENCE: 135
QQYGSSPWT                                                          9

SEQ ID NO: 136          moltype = AA   length = 10
FEATURE                 Location/Qualifiers
REGION                  1..10
                        note = DLL3#7 HCCDR1
source                  1..10
                        mol_type = protein
                        organism = synthetic construct
SEQUENCE: 136
GFTFSSYGMF                                                         10
```

```
SEQ ID NO: 137              moltype = AA  length = 17
FEATURE                     Location/Qualifiers
REGION                      1..17
                            note = DLL3#7 HCCDR2
source                      1..17
                            mol_type = protein
                            organism = synthetic construct
SEQUENCE: 137
VIWLDGDDED YVDSVKG                                                        17

SEQ ID NO: 138              moltype = AA  length = 4
FEATURE                     Location/Qualifiers
REGION                      1..4
                            note = DLL3#7 HCCDR3
source                      1..4
                            mol_type = protein
                            organism = synthetic construct
SEQUENCE: 138
VLDY                                                                       4

SEQ ID NO: 139              moltype = AA  length = 17
FEATURE                     Location/Qualifiers
REGION                      1..17
                            note = DLL3#8 LCCDR1
source                      1..17
                            mol_type = protein
                            organism = synthetic construct
SEQUENCE: 139
KSSQSVLDTS NNKNYLV                                                        17

SEQ ID NO: 140              moltype = AA  length = 7
FEATURE                     Location/Qualifiers
REGION                      1..7
                            note = DLL3#8 LCCDR2
source                      1..7
                            mol_type = protein
                            organism = synthetic construct
SEQUENCE: 140
WASTRES                                                                    7

SEQ ID NO: 141              moltype = AA  length = 9
FEATURE                     Location/Qualifiers
REGION                      1..9
                            note = DLL3#8 LCCDR3
source                      1..9
                            mol_type = protein
                            organism = synthetic construct
SEQUENCE: 141
QHYYNSPYT                                                                  9

SEQ ID NO: 142              moltype = AA  length = 10
FEATURE                     Location/Qualifiers
REGION                      1..10
                            note = DLL3#8 HCCDR1
source                      1..10
                            mol_type = protein
                            organism = synthetic construct
SEQUENCE: 142
GYTFTDYYMH                                                                10

SEQ ID NO: 143              moltype = AA  length = 17
FEATURE                     Location/Qualifiers
REGION                      1..17
                            note = DLL3#8 HCCDR2
source                      1..17
                            mol_type = protein
                            organism = synthetic construct
SEQUENCE: 143
WINPNSGGTN YEQKFQG                                                        17

SEQ ID NO: 144              moltype = AA  length = 9
FEATURE                     Location/Qualifiers
REGION                      1..9
                            note = DLL3#8 HCCDR3
source                      1..9
                            mol_type = protein
                            organism = synthetic construct
SEQUENCE: 144
DAVVIPMDY                                                                  9
```

```
SEQ ID NO: 145            moltype = AA  length = 12
FEATURE                   Location/Qualifiers
REGION                    1..12
                          note = DLL3#9 LCCDR1
source                    1..12
                          mol_type = protein
                          organism = synthetic construct
SEQUENCE: 145
RASQSISRSY LA                                                               12

SEQ ID NO: 146            moltype = AA  length = 7
FEATURE                   Location/Qualifiers
REGION                    1..7
                          note = DLL3#9 LCCDR2
source                    1..7
                          mol_type = protein
                          organism = synthetic construct
SEQUENCE: 146
GASSRAT                                                                      7

SEQ ID NO: 147            moltype = AA  length = 9
FEATURE                   Location/Qualifiers
REGION                    1..9
                          note = DLL3#9 LCCDR3
source                    1..9
                          mol_type = protein
                          organism = synthetic construct
SEQUENCE: 147
QQYGTSPIT                                                                    9

SEQ ID NO: 148            moltype = AA  length = 10
FEATURE                   Location/Qualifiers
REGION                    1..10
                          note = DLL3#9 HCCDR1
source                    1..10
                          mol_type = protein
                          organism = synthetic construct
SEQUENCE: 148
GGSISSYYWS                                                                  10

SEQ ID NO: 149            moltype = AA  length = 16
FEATURE                   Location/Qualifiers
REGION                    1..16
                          note = DLL3#9 HCCDR2
source                    1..16
                          mol_type = protein
                          organism = synthetic construct
SEQUENCE: 149
YRYYSGNTNY NPSLKS                                                           16

SEQ ID NO: 150            moltype = AA  length = 10
FEATURE                   Location/Qualifiers
REGION                    1..10
                          note = DLL3#9 HCCDR3
source                    1..10
                          mol_type = protein
                          organism = synthetic construct
SEQUENCE: 150
IGVAGFYFDY                                                                  10

SEQ ID NO: 151            moltype = AA  length = 12
FEATURE                   Location/Qualifiers
REGION                    1..12
                          note = DLL3#10 LCCDR1
source                    1..12
                          mol_type = protein
                          organism = synthetic construct
SEQUENCE: 151
RASQSLNSIF LA                                                               12

SEQ ID NO: 152            moltype = AA  length = 7
FEATURE                   Location/Qualifiers
REGION                    1..7
                          note = DLL3#10 LCCDR2
source                    1..7
                          mol_type = protein
                          organism = synthetic construct
SEQUENCE: 152
```

```
GASSRAT                                                                     7

SEQ ID NO: 153          moltype = AA  length = 9
FEATURE                 Location/Qualifiers
REGION                  1..9
                        note = DLL3#10 LCCDR3
source                  1..9
                        mol_type = protein
                        organism = synthetic construct
SEQUENCE: 153
QQYGGSMNT                                                                   9

SEQ ID NO: 154          moltype = AA  length = 10
FEATURE                 Location/Qualifiers
REGION                  1..10
                        note = DLL3#10 HCCDR1
source                  1..10
                        mol_type = protein
                        organism = synthetic construct
SEQUENCE: 154
GYTFTGYYMH                                                                  10

SEQ ID NO: 155          moltype = AA  length = 17
FEATURE                 Location/Qualifiers
REGION                  1..17
                        note = DLL3#10 HCCDR2
source                  1..17
                        mol_type = protein
                        organism = synthetic construct
SEQUENCE: 155
WINPNSGGTI FAQRFQG                                                          17

SEQ ID NO: 156          moltype = AA  length = 12
FEATURE                 Location/Qualifiers
REGION                  1..12
                        note = DLL3#10 HCCDR3
source                  1..12
                        mol_type = protein
                        organism = synthetic construct
SEQUENCE: 156
DFGDTVGNAF DI                                                               12

SEQ ID NO: 157          moltype = AA  length = 10
FEATURE                 Location/Qualifiers
REGION                  1..10
                        note = DLL3#11 LCCDR1
source                  1..10
                        mol_type = protein
                        organism = synthetic construct
SEQUENCE: 157
SASSSVTYIH                                                                  10

SEQ ID NO: 158          moltype = AA  length = 7
FEATURE                 Location/Qualifiers
REGION                  1..7
                        note = DLL3#11 LCCDR2
source                  1..7
                        mol_type = protein
                        organism = synthetic construct
SEQUENCE: 158
RTSYLAS                                                                     7

SEQ ID NO: 159          moltype = AA  length = 9
FEATURE                 Location/Qualifiers
REGION                  1..9
                        note = DLL3#11 LCCDR3
source                  1..9
                        mol_type = protein
                        organism = synthetic construct
SEQUENCE: 159
QQRSSYPRT                                                                   9

SEQ ID NO: 160          moltype = AA  length = 10
FEATURE                 Location/Qualifiers
REGION                  1..10
                        note = DLL3#11 HCCDR1
source                  1..10
                        mol_type = protein
                        organism = synthetic construct
```

```
SEQUENCE: 160
GYAFSDYWIT                                                                    10

SEQ ID NO: 161         moltype = AA  length = 17
FEATURE                Location/Qualifiers
REGION                 1..17
                       note = DLL3#11 HCCDR2
source                 1..17
                       mol_type = protein
                       organism = synthetic construct
SEQUENCE: 161
DIYPGSGSTK SSEKFKN                                                            17

SEQ ID NO: 162         moltype = AA  length = 11
FEATURE                Location/Qualifiers
REGION                 1..11
                       note = DLL3#11 HCCDR3
source                 1..11
                       mol_type = protein
                       organism = synthetic construct
SEQUENCE: 162
LYYYGSHYLD T                                                                  11

SEQ ID NO: 163         moltype = AA  length = 10
FEATURE                Location/Qualifiers
REGION                 1..10
                       note = DLL3#12 LCCDR1
source                 1..10
                       mol_type = protein
                       organism = synthetic construct
SEQUENCE: 163
SASSSVTYIH                                                                    10

SEQ ID NO: 164         moltype = AA  length = 7
FEATURE                Location/Qualifiers
REGION                 1..7
                       note = DLL3#12 LCCDR2
source                 1..7
                       mol_type = protein
                       organism = synthetic construct
SEQUENCE: 164
RTSYLAS                                                                        7

SEQ ID NO: 165         moltype = AA  length = 9
FEATURE                Location/Qualifiers
REGION                 1..9
                       note = DLL3#12 LCCDR3
source                 1..9
                       mol_type = protein
                       organism = synthetic construct
SEQUENCE: 165
QQRSSYPRT                                                                      9

SEQ ID NO: 166         moltype = AA  length = 10
FEATURE                Location/Qualifiers
REGION                 1..10
                       note = DLL3#12 HCCDR1
source                 1..10
                       mol_type = protein
                       organism = synthetic construct
SEQUENCE: 166
GYAFSDYWIT                                                                    10

SEQ ID NO: 167         moltype = AA  length = 17
FEATURE                Location/Qualifiers
REGION                 1..17
                       note = DLL3#12 HCCDR2
source                 1..17
                       mol_type = protein
                       organism = synthetic construct
SEQUENCE: 167
DIYPGSGSTK SSEKFKN                                                            17

SEQ ID NO: 168         moltype = AA  length = 11
FEATURE                Location/Qualifiers
REGION                 1..11
                       note = DLL3#12 HCCDR3
source                 1..11
                       mol_type = protein
```

```
                                      -continued
organism = synthetic construct
SEQUENCE: 168
LYYYGSYYLD T                                                              11

SEQ ID NO: 169          moltype = AA   length = 16
FEATURE                 Location/Qualifiers
REGION                  1..16
                        note = DLL3#13 LCCDR1
source                  1..16
                        mol_type = protein
                        organism = synthetic construct
SEQUENCE: 169
RSSQSIVHSN GNTYLE                                                         16

SEQ ID NO: 170          moltype = AA   length = 7
FEATURE                 Location/Qualifiers
REGION                  1..7
                        note = DLL3#13 LCCDR2
source                  1..7
                        mol_type = protein
                        organism = synthetic construct
SEQUENCE: 170
KVSNRFS                                                                    7

SEQ ID NO: 171          moltype = AA   length = 9
FEATURE                 Location/Qualifiers
REGION                  1..9
                        note = DLL3#13 LCCDR3
source                  1..9
                        mol_type = protein
                        organism = synthetic construct
SEQUENCE: 171
FQGSHVPYT                                                                  9

SEQ ID NO: 172          moltype = AA   length = 10
FEATURE                 Location/Qualifiers
REGION                  1..10
                        note = DLL3#13 HCCDR1
source                  1..10
                        mol_type = protein
                        organism = synthetic construct
SEQUENCE: 172
GYTFTNYGVT                                                                10

SEQ ID NO: 173          moltype = AA   length = 17
FEATURE                 Location/Qualifiers
REGION                  1..17
                        note = DLL3#13 HCCDR2
source                  1..17
                        mol_type = protein
                        organism = synthetic construct
SEQUENCE: 173
WINTYSGAPT YADDFNG                                                        17

SEQ ID NO: 174          moltype = AA   length = 11
FEATURE                 Location/Qualifiers
REGION                  1..11
                        note = DLL3#13 HCCDR3
source                  1..11
                        mol_type = protein
                        organism = synthetic construct
SEQUENCE: 174
LDDYDLYYFD Y                                                              11

SEQ ID NO: 175          moltype = AA   length = 15
FEATURE                 Location/Qualifiers
REGION                  1..15
                        note = DLL3#14 LCCDR1
source                  1..15
                        mol_type = protein
                        organism = synthetic construct
SEQUENCE: 175
KASQSVDYDG DSYMN                                                          15

SEQ ID NO: 176          moltype = AA   length = 7
FEATURE                 Location/Qualifiers
REGION                  1..7
                        note = DLL3#14 LCCDR2
source                  1..7
```

```
                              -continued
                       mol_type = protein
                       organism = synthetic construct
SEQUENCE: 176
AASTLES                                                         7

SEQ ID NO: 177         moltype = AA   length = 9
FEATURE                Location/Qualifiers
REGION                 1..9
                       note = DLL3#14 LCCDR3
source                 1..9
                       mol_type = protein
                       organism = synthetic construct
SEQUENCE: 177
QQSDEDPWT                                                       9

SEQ ID NO: 178         moltype = AA   length = 10
FEATURE                Location/Qualifiers
REGION                 1..10
                       note = DLL3#14 HCCDR1
source                 1..10
                       mol_type = protein
                       organism = synthetic construct
SEQUENCE: 178
GYTFTDYYIH                                                      10

SEQ ID NO: 179         moltype = AA   length = 17
FEATURE                Location/Qualifiers
REGION                 1..17
                       note = DLL3#14 HCCDR2
source                 1..17
                       mol_type = protein
                       organism = synthetic construct
SEQUENCE: 179
YIYPGNSYTA YNQKFKD                                              17

SEQ ID NO: 180         moltype = AA   length = 8
FEATURE                Location/Qualifiers
REGION                 1..8
                       note = DLL3#14 HCCDR3
source                 1..8
                       mol_type = protein
                       organism = synthetic construct
SEQUENCE: 180
SGGSAMDY                                                        8

SEQ ID NO: 181         moltype = AA   length = 15
FEATURE                Location/Qualifiers
REGION                 1..15
                       note = DLL3#15 LCCDR1
source                 1..15
                       mol_type = protein
                       organism = synthetic construct
SEQUENCE: 181
KASQSVDYDG DSYLN                                                15

SEQ ID NO: 182         moltype = AA   length = 7
FEATURE                Location/Qualifiers
REGION                 1..7
                       note = DLL3#15 LCCDR2
source                 1..7
                       mol_type = protein
                       organism = synthetic construct
SEQUENCE: 182
AASNLES                                                         7

SEQ ID NO: 183         moltype = AA   length = 9
FEATURE                Location/Qualifiers
REGION                 1..9
                       note = DLL3#15 LCCDR3
source                 1..9
                       mol_type = protein
                       organism = synthetic construct
SEQUENCE: 183
QQSSEDPRT                                                       9

SEQ ID NO: 184         moltype = AA   length = 10
FEATURE                Location/Qualifiers
REGION                 1..10
                       note = DLL3#15 HCCDR1
```

```
source                  1..10
                        mol_type = protein
                        organism = synthetic construct
SEQUENCE: 184
GYTFTNYGMN                                                              10

SEQ ID NO: 185          moltype = AA  length = 17
FEATURE                 Location/Qualifiers
REGION                  1..17
                        note = DLL3#15 HCCDR2
source                  1..17
                        mol_type = protein
                        organism = synthetic construct
SEQUENCE: 185
WINTYTGEPT YADDFKG                                                      17

SEQ ID NO: 186          moltype = AA  length = 12
FEATURE                 Location/Qualifiers
REGION                  1..12
                        note = DLL3#15 HCCDR3
source                  1..12
                        mol_type = protein
                        organism = synthetic construct
SEQUENCE: 186
FHFSSNGDAM DN                                                           12

SEQ ID NO: 187          moltype = AA  length = 11
FEATURE                 Location/Qualifiers
REGION                  1..11
                        note = DLL3#16 LCCDR1
source                  1..11
                        mol_type = protein
                        organism = synthetic construct
SEQUENCE: 187
RASQSVSDWL A                                                            11

SEQ ID NO: 188          moltype = AA  length = 7
FEATURE                 Location/Qualifiers
REGION                  1..7
                        note = DLL3#16 LCCDR2
source                  1..7
                        mol_type = protein
                        organism = synthetic construct
SEQUENCE: 188
RASSLES                                                                 7

SEQ ID NO: 189          moltype = AA  length = 9
FEATURE                 Location/Qualifiers
REGION                  1..9
                        note = DLL3#16 LCCDR3
source                  1..9
                        mol_type = protein
                        organism = synthetic construct
SEQUENCE: 189
QLYNSYSPT                                                               9

SEQ ID NO: 190          moltype = AA  length = 10
FEATURE                 Location/Qualifiers
REGION                  1..10
                        note = DLL3#16 HCCDR1
source                  1..10
                        mol_type = protein
                        organism = synthetic construct
SEQUENCE: 190
GFTFSSYWMT                                                              10

SEQ ID NO: 191          moltype = AA  length = 17
FEATURE                 Location/Qualifiers
REGION                  1..17
                        note = DLL3#16 HCCDR2
source                  1..17
                        mol_type = protein
                        organism = synthetic construct
SEQUENCE: 191
NIKEDGSEKY YVDSVKG                                                      17

SEQ ID NO: 192          moltype = AA  length = 7
FEATURE                 Location/Qualifiers
REGION                  1..7
```

```
                     note = DLL3#16 HCCDR3
source               1..7
                     mol_type = protein
                     organism = synthetic construct
SEQUENCE: 192
DWGYFDY                                                                  7

SEQ ID NO: 193       moltype = AA  length = 11
FEATURE              Location/Qualifiers
REGION               1..11
                     note = DLL3#17 LCCDR1
source               1..11
                     mol_type = protein
                     organism = synthetic construct
SEQUENCE: 193
RASENIYYSL A                                                            11

SEQ ID NO: 194       moltype = AA  length = 7
FEATURE              Location/Qualifiers
REGION               1..7
                     note = DLL3#17 LCCDR2
source               1..7
                     mol_type = protein
                     organism = synthetic construct
SEQUENCE: 194
NTNSLED                                                                  7

SEQ ID NO: 195       moltype = AA  length = 9
FEATURE              Location/Qualifiers
REGION               1..9
                     note = DLL3#17 LCCDR3
source               1..9
                     mol_type = protein
                     organism = synthetic construct
SEQUENCE: 195
KQAYDFPLT                                                                9

SEQ ID NO: 196       moltype = AA  length = 10
FEATURE              Location/Qualifiers
REGION               1..10
                     note = DLL3#17 HCCDR1
source               1..10
                     mol_type = protein
                     organism = synthetic construct
SEQUENCE: 196
GYTFISYYIH                                                              10

SEQ ID NO: 197       moltype = AA  length = 17
FEATURE              Location/Qualifiers
REGION               1..17
                     note = DLL3#17 HCCDR2
source               1..17
                     mol_type = protein
                     organism = synthetic construct
SEQUENCE: 197
WIYPGDGSTN NNEKFKG                                                      17

SEQ ID NO: 198       moltype = AA  length = 8
FEATURE              Location/Qualifiers
REGION               1..8
                     note = DLL3#17 HCCDR3
source               1..8
                     mol_type = protein
                     organism = synthetic construct
SEQUENCE: 198
GEGNAMDD                                                                 8

SEQ ID NO: 199       moltype = AA  length = 11
FEATURE              Location/Qualifiers
REGION               1..11
                     note = DLL3#18 LCCDR1
source               1..11
                     mol_type = protein
                     organism = synthetic construct
SEQUENCE: 199
RASENIYYSL A                                                            11

SEQ ID NO: 200       moltype = AA  length = 7
FEATURE              Location/Qualifiers
```

| | |
|---|---|
| REGION | 1..7<br>note = DLL3#18 LCCDR2 |
| source | 1..7<br>mol_type = protein<br>organism = synthetic construct |

SEQUENCE: 200
NANSLED                                                                7

| | |
|---|---|
| SEQ ID NO: 201 | moltype = AA  length = 9 |
| FEATURE | Location/Qualifiers |
| REGION | 1..9<br>note = DLL3#18 LCCDR3 |
| source | 1..9<br>mol_type = protein<br>organism = synthetic construct |

SEQUENCE: 201
KQAYDVPLT                                                              9

| | |
|---|---|
| SEQ ID NO: 202 | moltype = AA  length = 10 |
| FEATURE | Location/Qualifiers |
| REGION | 1..10<br>note = DLL3#18 HCCDR1 |
| source | 1..10<br>mol_type = protein<br>organism = synthetic construct |

SEQUENCE: 202
GYTFTAYFIH                                                             10

| | |
|---|---|
| SEQ ID NO: 203 | moltype = AA  length = 17 |
| FEATURE | Location/Qualifiers |
| REGION | 1..17<br>note = DLL3#18 HCCDR2 |
| source | 1..17<br>mol_type = protein<br>organism = synthetic construct |

SEQUENCE: 203
YIDPFNDDTN YNVKFKG                                                     17

| | |
|---|---|
| SEQ ID NO: 204 | moltype = AA  length = 8 |
| FEATURE | Location/Qualifiers |
| REGION | 1..8<br>note = DLL3#18 HCCDR3 |
| source | 1..8<br>mol_type = protein<br>organism = synthetic construct |

SEQUENCE: 204
GTSATLDY                                                               8

| | |
|---|---|
| SEQ ID NO: 205 | moltype = AA  length = 108 |
| FEATURE | Location/Qualifiers |
| REGION | 1..108<br>note = DLL3#7 VL |
| source | 1..108<br>mol_type = protein<br>organism = synthetic construct |

SEQUENCE: 205
EIVLTQSPDT LSLSPGERAT LSCRASQSVN SNFLAWYQQK PGQTPRLLIF GTSSRATGIP       60
DRFSGSGSGT DFTLTISRLE PEDFAVYYCQ QYGSSPWTFG QGTKVEIR                  108

| | |
|---|---|
| SEQ ID NO: 206 | moltype = AA  length = 113 |
| FEATURE | Location/Qualifiers |
| REGION | 1..113<br>note = DLL3#7 VH |
| source | 1..113<br>mol_type = protein<br>organism = synthetic construct |

SEQUENCE: 206
QVQLVESGGG VVQPGRSLRL SCAASGFTFS SYGMFWVRQA PGKGLEWVAV IWLDGDDEDY       60
VDSVKGRFTI SRDDSKNTLY LQMNSLRVDD TAIYYCARVL DYWGQGTLVT VSS             113

| | |
|---|---|
| SEQ ID NO: 207 | moltype = AA  length = 113 |
| FEATURE | Location/Qualifiers |
| REGION | 1..113<br>note = DLL3#8 VL |
| source | 1..113<br>mol_type = protein<br>organism = synthetic construct |

SEQUENCE: 207
DIVMAQSPDS LAVSLGERAT INCKSSQSVL DTSNNKNYLV WYQQKPGQPP KLLIYWASTR       60

```
ESGVPDRFSG SGSGTDFTLT ISSLQAEDVA VYYCQHYYNS PYTFGQGTKL EIK        113

SEQ ID NO: 208           moltype = AA   length = 118
FEATURE                  Location/Qualifiers
REGION                   1..118
                         note = DLL3#8 VH
source                   1..118
                         mol_type = protein
                         organism = synthetic construct
SEQUENCE: 208
QVQLVQSGAE VKKPGASVKV SCKASGYTFT DYYMHWVRQA PGQGLEWMGW INPNSGGTNY  60
EQKFQGRVTM TRDTSISTAY MELNRLRSDD TAVYYCTRDA VVIPMDYWGQ GTLVTVSS   118

SEQ ID NO: 209           moltype = AA   length = 108
FEATURE                  Location/Qualifiers
REGION                   1..108
                         note = DLL3#9 VL
source                   1..108
                         mol_type = protein
                         organism = synthetic construct
SEQUENCE: 209
EIVLTQSPGT LSLSPGERAT LSCRASQSIS RSYLAWYQQK PGQAPRLLIY GASSRATGIP  60
DRFSGSGSGT DFTLTISRLE PEDFAVYYCQ QYGTSPITFG QGTRLEIK              108

SEQ ID NO: 210           moltype = AA   length = 118
FEATURE                  Location/Qualifiers
REGION                   1..118
                         note = DLL3#9 VH
source                   1..118
                         mol_type = protein
                         organism = synthetic construct
SEQUENCE: 210
QVHLQESGPG LVKPSETLSL TCTVSGGSIS SYYWSWIRQT PGKGLDWIGY RYYSGNTNYN  60
PSLKSRVTIS LDMSNNQFSL KLSSVTAADT AIYYCASIGV AGFYFDYWGQ GTLVTVSS   118

SEQ ID NO: 211           moltype = AA   length = 108
FEATURE                  Location/Qualifiers
REGION                   1..108
                         note = DLL3#10 VL
source                   1..108
                         mol_type = protein
                         organism = synthetic construct
SEQUENCE: 211
EIVLTQSPGT LSLSPGERAT LSCRASQSLN SIFLAWYQQK PGQAPWLLIY GASSRATGIP  60
DRFSGSGSGT DFTLTISRLE PEDFAVYFCQ QYGGSMNTFG QGTKLEIK              108

SEQ ID NO: 212           moltype = AA   length = 121
FEATURE                  Location/Qualifiers
REGION                   1..121
                         note = DLL3#10 VH
source                   1..121
                         mol_type = protein
                         organism = synthetic construct
SEQUENCE: 212
QVQLVQSGAE VKKPGASVKV SCKASGYTFT GYYMHWVRLA PGQGLEWMGW INPNSGGTIF  60
AQRFQGRVTM TRDTSISTVY MDLNRLRSDD TAVYYCARDF GDTVGNAFDI WGQGTMVTVS 120
S                                                                121

SEQ ID NO: 213           moltype = AA   length = 106
FEATURE                  Location/Qualifiers
REGION                   1..106
                         note = DLL3#11 VL
source                   1..106
                         mol_type = protein
                         organism = synthetic construct
SEQUENCE: 213
QIVLTQSPAI MSASPGEKVT ITCSASSSVT YIHWFQQNPG TSPKLWIYRT SYLASGVPAR  60
FSGSGSGTSY SLTISRMEAE DAATYYCQQR SSYPRTFGGG TKLEIK                106

SEQ ID NO: 214           moltype = AA   length = 120
FEATURE                  Location/Qualifiers
REGION                   1..120
                         note = DLL3#11 VH
source                   1..120
                         mol_type = protein
                         organism = synthetic construct
SEQUENCE: 214
QVQLQQPGAE LVQPGSSVKM SCKASGYAFS DYWITWVKQR PGQGLEWIGD IYPGSGSTKS  60
SEKFKNKATL TADTSSSKAY IQFSSLTPED SAVYYCVSLY YYGSHYLDTW GQGTTLTVSS 120
```

```
SEQ ID NO: 215          moltype = AA   length = 106
FEATURE                 Location/Qualifiers
REGION                  1..106
                        note = DLL3#12 VL
source                  1..106
                        mol_type = protein
                        organism = synthetic construct
SEQUENCE: 215
QVVLTQSPAI MSASPGEKVT ITCSASSSVT YIHWFQQNPG TSPKLWIYRT SYLASGVPAR    60
FSGSGSGTSY SLTISRMEAE DAATYYCQQR SSYPRTFGGG TKLEIK                  106

SEQ ID NO: 216          moltype = AA   length = 120
FEATURE                 Location/Qualifiers
REGION                  1..120
                        note = DLL3#12 VH
source                  1..120
                        mol_type = protein
                        organism = synthetic construct
SEQUENCE: 216
QVQLQQPGAE FVQPGSSVKM SCKASGYAFS DYWITWVKQR PGQGLEWIGD IYPGSGSTKS    60
SEKFKNRATL TADTSSSTAY IQFSSLTPED SAVYYCVSLY YYGSYYLDTW GQGTTLTVSS   120

SEQ ID NO: 217          moltype = AA   length = 112
FEATURE                 Location/Qualifiers
REGION                  1..112
                        note = DLL3#13 VL
source                  1..112
                        mol_type = protein
                        organism = synthetic construct
SEQUENCE: 217
DVLMTQTPLS LPVSLGDQAA ISCRSSQSIV HSNGNTYLEW YLQKPGQSPK VLIYKVSNRF    60
SGVPDRFSGS GSGTDFTLKI SRVEAEDLGV YYCFQGSHVP YTFGGGTKLE IK           112

SEQ ID NO: 218          moltype = AA   length = 120
FEATURE                 Location/Qualifiers
REGION                  1..120
                        note = DLL3#13 VH
source                  1..120
                        mol_type = protein
                        organism = synthetic construct
SEQUENCE: 218
QIQLVQSGPE LKKPGETVKI SCKASGYTFT NYGVTWVKQA PGKGLKWMGW INTYSGAPTY    60
ADDFNGRFAL SLETSASTAY LQINNLKNED TATYFCARLD DYDLYYFDYW GQGTALTVSS   120

SEQ ID NO: 219          moltype = AA   length = 111
FEATURE                 Location/Qualifiers
REGION                  1..111
                        note = DLL3#14 VL
source                  1..111
                        mol_type = protein
                        organism = synthetic construct
SEQUENCE: 219
DIVLTQSPAS LSVSLGQRAT ISCKASQSVD YDGDSYMNWY QQKPGQPPKL LIYAASTLES    60
GIPARFSGSG SGTDFTLNIH PVEEEDAATY YCQQSDEDPW TFGGGTKLEI K            111

SEQ ID NO: 220          moltype = AA   length = 115
FEATURE                 Location/Qualifiers
REGION                  1..115
                        note = DLL3#14 VH
source                  1..115
                        mol_type = protein
                        organism = synthetic construct
SEQUENCE: 220
QIQLQQSGPE LVKPGVKISC KASGYTFTDY YIHWMKQRPG QGLEWIGYIY PGNSYTAYNQ    60
KFKDKATLTA DNPSSTAYMQ LSSLTSEDSA VYFCARSGGS AMDYWGQGTS VTVSS        115

SEQ ID NO: 221          moltype = AA   length = 111
FEATURE                 Location/Qualifiers
REGION                  1..111
                        note = DLL3#15 VL
source                  1..111
                        mol_type = protein
                        organism = synthetic construct
SEQUENCE: 221
DIVLTQSPAS LAVSLGQRAT ISCKASQSVD YDGDSYLNWY QQKPGQPPKL LIYAASNLES    60
GIPARFSGSG SGTDFTLNIH PVEEEDAATY YCQQSSEDPR TFGGGTKLEI K            111

SEQ ID NO: 222          moltype = AA   length = 121
```

```
FEATURE                 Location/Qualifiers
REGION                  1..121
                        note = DLL3#15 VH
source                  1..121
                        mol_type = protein
                        organism = synthetic construct
SEQUENCE: 222
QIQLVQSGPE LKKPGETVKI SCKASGYTFT NYGMNWVKQA PGKGLKWMGW INTYTGEPTY     60
ADDFKGRFAF SLETSASTAY LQINNLKNED MATYFCTKFH FSSNGDAMDN WGQGTSVTVS    120
S                                                                   121

SEQ ID NO: 223          moltype = AA  length = 107
FEATURE                 Location/Qualifiers
REGION                  1..107
                        note = DLL3#16 VL
source                  1..107
                        mol_type = protein
                        organism = synthetic construct
SEQUENCE: 223
DIQMTQSPST LSASVGDRVT ITCRASQSVS DWLAWYQQKP GKAPKFLIYR ASSLESGVPS     60
RFSGSGSGTE FTLTISSLQP ADFATYYCQL YNSYSPTFGQ GTKVEIK                 107

SEQ ID NO: 224          moltype = AA  length = 116
FEATURE                 Location/Qualifiers
REGION                  1..116
                        note = DLL3#16 VH
source                  1..116
                        mol_type = protein
                        organism = synthetic construct
SEQUENCE: 224
EVHLVESGGG LVQPGGSLRL SCAASGFTFS SYWMTWVRQA PGKGLEWVAN IKEDGSEKYY     60
VDSVKGRFTI SRDNAKNSLY LQMNSLRAED TALYYCARDW GYFDYWGQGT LVTVSS       116

SEQ ID NO: 225          moltype = AA  length = 107
FEATURE                 Location/Qualifiers
REGION                  1..107
                        note = DLL3#17 VL
source                  1..107
                        mol_type = protein
                        organism = synthetic construct
SEQUENCE: 225
DIQMTQSPAS LAASVGETVT ITCRASENIY YSLAWYQQKQ GKSPQLLIYN TNSLEDGVPS     60
RFSGSGSGTQ YSMKINSMQP EDTATYFCKQ AYDFPLTFGA GTKLELK                 107

SEQ ID NO: 226          moltype = AA  length = 117
FEATURE                 Location/Qualifiers
REGION                  1..117
                        note = DLL3#17 VH
source                  1..117
                        mol_type = protein
                        organism = synthetic construct
SEQUENCE: 226
QIQLQQSGPE VVKPGASVKI SCKASGYTFI SYYIHWVKQR PGQGLEWIGW IYPGDGSTNN     60
NEKFKGKTTL TADKSSSTAY MLLSSLTSED SAVYFCARGE GNAMDDWGQG TSVTVSS      117

SEQ ID NO: 227          moltype = AA  length = 107
FEATURE                 Location/Qualifiers
REGION                  1..107
                        note = DLL3#18 VL
source                  1..107
                        mol_type = protein
                        organism = synthetic construct
SEQUENCE: 227
DIQMTQSPAS LAASVGETVT ITCRASENIY YSLAWYQQKQ GKSPQLLIYN ANSLEDGVPS     60
RFSGSGSGTQ YSMKINNMQP EDTATYFCKQ AYDVPLTFGA GTKLELK                 107

SEQ ID NO: 228          moltype = AA  length = 117
FEATURE                 Location/Qualifiers
REGION                  1..117
                        note = DLL3#18 VH
source                  1..117
                        mol_type = protein
                        organism = synthetic construct
SEQUENCE: 228
QVQLQQSGPD LVKPGASVKM SCEASGYTFT AYFIHWVKQK PGQGLEWIGY IDPFNDDTNY     60
NVKFKGKATL TSDTSSSIAY MELSSLTSED SSFYYCARGT SATLDYWGHG TTLTVSS      117

SEQ ID NO: 229          moltype = AA  length = 469
FEATURE                 Location/Qualifiers
```

```
REGION                   1..469
                         note = DLL3#7 scFab
source                   1..469
                         mol_type = protein
                         organism = synthetic construct
SEQUENCE: 229
EIVLTQSPDT LSLSPGERAT LSCRASQSVN SNFLAWYQQK PGQTPRLLIF GTSSRATGIP    60
DRFSGSGSGT DFTLTISRLE PEDFAVYYCQ QYGSSPWTFG QGTKVEIRRT VAAPSVFIFP   120
PSDEQLKSGT ASVVCLLNNF YPREAKVQWK VDNALQSGNS QESVTEQDSK DSTYSLSSTL   180
TLSKADYEKH KVYACEVTHQ GLSSPVTKSF NRGECGGGGS EGKSSGSGSE SKSTEGKSSG   240
SGSESKSTGG GGSQVQLVES GGGVVQPGRS LRLSCAASGF TFSSYGMFWV RQAPGKGLEW   300
VAVIWLDGDD EDYVDSVKGR FTISRDDSKN TLYLQMNSLR VDDTAIYYCA RVLDYWGQGT   360
LVTVSSASTK GPSVFPLAPS SKSTSGGTAA LGCLVKDYFP EPVTVSWNSG ALTSGVHTFP   420
AVLQSSGLYS LSSVVTVPSS SLGTQTYICN VNHKPSNTKV DKRVEPKSC               469

SEQ ID NO: 230           moltype = AA  length = 479
FEATURE                  Location/Qualifiers
REGION                   1..479
                         note = DLL3#8 scFab
source                   1..479
                         mol_type = protein
                         organism = synthetic construct
SEQUENCE: 230
DIVMAQSPDS LAVSLGERAT INCKSSQSVL DTSNNKNYLV WYQQKPGQPP KLLIYWASTR    60
ESGVPDRFSG SGSGTDFTLT ISSLQAEDVA VYYCQHYYNS PYTFGQGTKL EIKRTVAAPS   120
VFIFPPSDEQ LKSGTASVVC LLNNFYPREA KVQWKVDNAL QSGNSQESVT EQDSKDSTYS   180
LSSTLTLSKA DYEKHKVYAC EVTHQGLSSP VTKSFNRGEC GGGGSEGKSS GSGSESKSTE   240
GKSSGSGSES KSTGGGGSQV QLVQSGAEVK KPGASVKVSC KASGYTFTDY YMHWVRQAPG   300
QGLEWMGWIN PNSGGTNYEQ KFQGRVTMTR DTSISTAYME LNRLRSDDTA VYYCTRDAVV   360
IPMDYWGQGT LVTVSSASTK GPSVFPLAPS SKSTSGGTAA LGCLVKDYFP EPVTVSWNSG   420
ALTSGVHTFP AVLQSSGLYS LSSVVTVPSS SLGTQTYICN VNHKPSNTKV DKRVEPKSC    479

SEQ ID NO: 231           moltype = AA  length = 474
FEATURE                  Location/Qualifiers
REGION                   1..474
                         note = DLL3#9 scFab
source                   1..474
                         mol_type = protein
                         organism = synthetic construct
SEQUENCE: 231
EIVLTQSPGT LSLSPGERAT LSCRASQSIS RSYLAWYQQK PGQAPRLLIY GASSRATGIP    60
DRFSGSGSGT DFTLTISRLE PEDFAVYYCQ QYGTSPITFG QGTRLEIKRT VAAPSVFIFP   120
PSDEQLKSGT ASVVCLLNNF YPREAKVQWK VDNALQSGNS QESVTEQDSK DSTYSLSSTL   180
TLSKADYEKH KVYACEVTHQ GLSSPVTKSF NRGECGGGGS EGKSSGSGSE SKSTEGKSSG   240
SGSESKSTGG GGSQVHLQES GPGLVKPSET LSLTCTVSGG SISSYYWSWI RQTPGKGLDW   300
IGYRYYSGNT NYNPSLKSRV TISLDMSNNQ FSLKLSSVTA ADTAIYYCAS IGVAGFYFDY   360
WGQGTLVTVS SASTKGPSVF PLAPSSKSTS GGTAALGCLV KDYFPEPVTV SWNSGALTSG   420
VHTFPAVLQS SGLYSLSSVV TVPSSSLGTQ TYICNVNHKP SNTKVDKRVE PKSC         474

SEQ ID NO: 232           moltype = AA  length = 477
FEATURE                  Location/Qualifiers
REGION                   1..477
                         note = DLL3#10 scFab
source                   1..477
                         mol_type = protein
                         organism = synthetic construct
SEQUENCE: 232
EIVLTQSPGT LSLSPGERAT LSCRASQSLN SIFLAWYQQK PGQAPWLLIY GASSRATGIP    60
DRFSGSGSGT DFTLTISRLE PEDFAVYFCQ QYGGSMNTFG QGTKLEIKRT VAAPSVFIFP   120
PSDEQLKSGT ASVVCLLNNF YPREAKVQWK VDNALQSGNS QESVTEQDSK DSTYSLSSTL   180
TLSKADYEKH KVYACEVTHQ GLSSPVTKSF NRGECGGGGS EGKSSGSGSE SKSTEGKSSG   240
SGSESKSTGG GGSQVQLVQS GAEVKKPGAS VKVSCKASGY TFTGYYMHWV RLAPGQGLEW   300
MGWINPNSGG TIFAQRFQGR VTMTRDTSIS TVYMDLNRLR SDDTAVYYCA RDFGDTVGNA   360
FDIWGQGTMV TVSSASTKGP SVFPLAPSSK STSGGTAALG CLVKDYFPEP VTVSWNSGAL   420
TSGVHTFPAV LQSSGLYSLS SVVTVPSSSL GTQTYICNVN HKPSNTKVDK RVEPKSC      477

SEQ ID NO: 233           moltype = AA  length = 474
FEATURE                  Location/Qualifiers
REGION                   1..474
                         note = DLL3#11 scFab
source                   1..474
                         mol_type = protein
                         organism = synthetic construct
SEQUENCE: 233
QIVLTQSPAI MSASPGEKVT ITCSASSSVT YIHWFQQNPG TSPKLWIYRT SYLASGVPAR    60
FSGSGSGTSY SLTISRMEAE DAATYYCQQR SSYPRTFGGG TKLEIKRTVA APSVFIFPPS   120
DEQLKSGTAS VVCLLNNFYP REAKVQWKVD NALQSGNSQE SVTEQDSKDS TYSLSSTLTL   180
SKADYEKHKV YACEVTHQGL SSPVTKSFNR GECGGGGSEG KSSGSGSESK STEGKSSGSG   240
SESKSTGGGG SQVQLQQPGA ELVQPGSSVK MSCKASGYAF SDYWITWVKQ RPGQGLEWIG   300
```

```
DIYPGSGSTK SSEKFKNKAT LTADTSSSKA YIQFSSLTPE DSAVYYCVSL YYYGSHYLDT    360
WGQGTTLTVS SASTKGPSVF PLAPSSKSTS GGTAALGCLV KDYFPEPVTV SWNSGALTSG    420
VHTFPAVLQS SGLYSLSSVV TVPSSSLGTQ TYICNVNHKP SNTKVDKRVE PKSC          474

SEQ ID NO: 234           moltype = AA   length = 474
FEATURE                  Location/Qualifiers
REGION                   1..474
                         note = DLL3#12 scFab
source                   1..474
                         mol_type = protein
                         organism = synthetic construct
SEQUENCE: 234
QVVLTQSPAI MSASPGEKVT ITCSASSSVT YIHWFQQNPG TSPKLWIYRT SYLASGVPAR    60
FSGSGSGTSY SLTISRMEAE DAATYYCQQR SSYPRTFGGG TKLEIKRTVA APSVFIFPPS    120
DEQLKSGTAS VVCLLNNFYP REAKVQWKVD NALQSGNSQE SVTEQDSKDS TYSLSSTLTL    180
SKADYEKHKV YACEVTHQGL SSPVTKSFNR GECGGGGSEG KSSGSGSESK STEGKSSGSG    240
SESKSTGGGG SQVQLQQPGA EFVQPGSSVK MSCKASGYAF SDYWITWVKQ RPGQGLEWIG    300
DIYPGSGSTK SSEKFKNRAT LTADTSSSTA YIQFSSLTPE DSAVYYCVSL YYYGSYYLDT    360
WGQGTTLTVS SASTKGPSVF PLAPSSKSTS GGTAALGCLV KDYFPEPVTV SWNSGALTSG    420
VHTFPAVLQS SGLYSLSSVV TVPSSSLGTQ TYICNVNHKP SNTKVDKRVE PKSC          474

SEQ ID NO: 235           moltype = AA   length = 480
FEATURE                  Location/Qualifiers
REGION                   1..480
                         note = DLL3#13 scFab
source                   1..480
                         mol_type = protein
                         organism = synthetic construct
SEQUENCE: 235
DVLMTQTPLS LPVSLGDQAA ISCRSSQSIV HSNGNTYLEW YLQKPGQSPK VLIYKVSNRF    60
SGVPDRFSGS GSGTDFTLKI SRVEAEDLGV YYCFQGSHVP YTFGGGTKLE IKRTVAAPSV    120
FIFPPSDEQL KSGTASVVCL LNNFYPREAK VQWKVDNALQ SGNSQESVTE QDSKDSTYSL    180
SSTLTLSKAD YEKHKVYACE VTHQGLSSPV TKSFNRGECG GGSEGKSSG SGSESKSTEG    240
KSSGSGSESK STGGGGSQIQ LVQSGPELKK PGETVKISCK ASGYTFTNYG VTWVKQAPGK    300
GLKWMGWINT YSGAPTYADD FNGRFALSLE TSASTAYLQI NNLKNEDTAT YFCARLDDYD    360
LYYFDYWGQG TALTVTSSAST KGPSVFPLAP SSKSTSGGTA ALGCLVKDYF PEPVTVSWNS    420
GALTSGVHTF PAVLQSSGLY SLSSVVTVPS SSLGTQTYIC NVNHKPSNTK VDKRVEPKSC    480

SEQ ID NO: 236           moltype = AA   length = 474
FEATURE                  Location/Qualifiers
REGION                   1..474
                         note = DLL3#14 scFab
source                   1..474
                         mol_type = protein
                         organism = synthetic construct
SEQUENCE: 236
DIVLTQSPAS LSVSLGQRAT ISCKASQSVD YDGDSYMNWY QQKPGQPPKL LIYAASTLES    60
GIPARFSGSG SGTDFTLNIH PVEEEDAATY YCQQSDEDPW TFGGGTKLEI KRTVAAPSVF    120
IFPPSDEQLK SGTASVVCLL NNFYPREAKV QWKVDNALQS GNSQESVTEQ DSKDSTYSLS    180
STLTLSKADY EKHKVYACEV THQGLSSPVT KSFNRGECGG GGSEGKSSGS GSESKSTEGK    240
SSGSGSESKS TGGGGSQIQL QQSGPELVKP GVKISCKASG YTFTDYYIHW MKQRPGQGLE    300
WIGYIYPGNS YTAYNQKFKD KATLTADNPS STAYMQLSSL TSEDSAVYFC ARSGGSAMDY    360
WGQGTSVTVS SASTKGPSVF PLAPSSKSTS GGTAALGCLV KDYFPEPVTV SWNSGALTSG    420
VHTFPAVLQS SGLYSLSSVV TVPSSSLGTQ TYICNVNHKP SNTKVDKRVE PKSC          474

SEQ ID NO: 237           moltype = AA   length = 480
FEATURE                  Location/Qualifiers
REGION                   1..480
                         note = DLL3#15 scFab
source                   1..480
                         mol_type = protein
                         organism = synthetic construct
SEQUENCE: 237
DIVLTQSPAS LAVSLGQRAT ISCKASQSVD YDGDSYLNWY QQKPGQPPKL LIYAASNLES    60
GIPARFSGSG SGTDFTLNIH PVEEEDAATY YCQQSSEDPR TFGGGTKLEI KRTVAAPSVF    120
IFPPSDEQLK SGTASVVCLL NNFYPREAKV QWKVDNALQS GNSQESVTEQ DSKDSTYSLS    180
STLTLSKADY EKHKVYACEV THQGLSSPVT KSFNRGECGG GGSEGKSSGS GSESKSTEGK    240
SSGSGSESKS TGGGGSQIQL VQSGPELKKP GETVKISCKA SGYTFTNYGM NWVKQAPGKG    300
LKWMGWINTY TGEPTYADDF KGRFAFSLET SASTAYLQIN NLKNEDMATY FCTKPHFSSN    360
GDAMDNWGQG TSVTVSSAST KGPSVFPLAP SSKSTSGGTA ALGCLVKDYF PEPVTVSWNS    420
GALTSGVHTF PAVLQSSGLY SLSSVVTVPS SSLGTQTYIC NVNHKPSNTK VDKRVEPKSC    480

SEQ ID NO: 238           moltype = AA   length = 471
FEATURE                  Location/Qualifiers
REGION                   1..471
                         note = DLL3#16 scFab
source                   1..471
                         mol_type = protein
                         organism = synthetic construct
```

-continued

```
SEQUENCE: 238
DIQMTQSPST LSASVGDRVT ITCRASQSVS DWLAWYQQKP GKAPKFLIYR ASSLESGVPS    60
RFSGSGSGTE FTLTISSLQP ADFATYYCQL YNSYSPTFGQ GTKVEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGECGGGGSE GKSSGSGSES KSTEGKSSGS   240
GSESKSTGGG GSEVHLVESG GGLVQPGGSL RLSCAASGFT FSSYWMTWVR QAPGKGLEWV   300
ANIKEDGSEK YYVDSVKGRF TISRDNAKNS LYLQMNSLRA EDTALYYCAR DWGYFDYWGQ   360
GTLVTVSSAS TKGPSVFPLA PSSKSTSGGT AALGCLVKDY FPEPVTVSWN SGALTSGVHT   420
FPAVLQSSGL YSLSSVVTVP SSSLGTQTYI CNVNHKPSNT KVDKRVEPKS C            471

SEQ ID NO: 239         moltype = AA   length = 472
FEATURE                Location/Qualifiers
REGION                 1..472
                       note = DLL3#17 scFab
source                 1..472
                       mol_type = protein
                       organism = synthetic construct
SEQUENCE: 239
DIQMTQSPAS LAASVGETVT ITCRASENIY YSLAWYQQKQ GKSPQLLIYN TNSLEDGVPS    60
RFSGSGSGTQ YSMKINSMQP EDTATYFCKQ AYDFPLTFGA GTKLELKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGECGGGGSE GKSSGSGSES KSTEGKSSGS   240
GSESKSTGGG GSQIQLQQSG PEVVKPGASV KISCKASGYT FISYYIHWVK QRPGQGLEWI   300
GWIYPGDGST NNNEKFKGKT TLTADKSSST AYMLLSSLTS EDSAVYFCAR GEGNAMDDWG   360
QGTSVTVSSA STKGPSVFPL APSSKSTSGG TAALGCLVKD YFPEPVTVSW NSGALTSGVH   420
TFPAVLQSSG LYSLSSVVTV PSSSLGTQTY ICNVNHKPSN TKVDKRVEPK SC           472

SEQ ID NO: 240         moltype = AA   length = 472
FEATURE                Location/Qualifiers
REGION                 1..472
                       note = DLL3#18 scFab
source                 1..472
                       mol_type = protein
                       organism = synthetic construct
SEQUENCE: 240
DIQMTQSPAS LAASVGETVT ITCRASENIY YSLAWYQQKQ GKSPQLLIYN ANSLEDGVPS    60
RFSGSGSGTQ YSMKINNMQP EDTATYFCKQ AYDVPLTFGA GTKLELKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGECGGGGSE GKSSGSGSES KSTEGKSSGS   240
GSESKSTGGG GSQVQLQQSG PDLVKPGASV KMSCEASGYT FTAYFIHWVK QKPGQGLEWI   300
GYIDPFNDDT NYNVKFKGKA TLTSDTSSSI AYMELSSLTS EDSSFYYCAR GTSATLDYWG   360
HGTTLTVSSA STKGPSVFPL APSSKSTSGG TAALGCLVKD YFPEPVTVSW NSGALTSGVH   420
TFPAVLQSSG LYSLSSVVTV PSSSLGTQTY ICNVNHKPSN TKVDKRVEPK SC           472

SEQ ID NO: 241         moltype = AA   length = 695
FEATURE                Location/Qualifiers
REGION                 1..695
                       note = DLL3#7 chain
source                 1..695
                       mol_type = protein
                       organism = synthetic construct
SEQUENCE: 241
EIVLTQSPDT LSLSPGERAT LSCRASQSVN SNFLAWYQQK PGQTPRLLIF GTSSRATGIP    60
DRFSGSGSGT DFTLTISRLE PEDFAVYYCQ QYGSSPWTFG QGTKVEIRRT VAAPSVFIFP   120
PSDEQLKSGT ASVVCLLNNF YPREAKVQWK VDNALQSGNS QESVTEQDSK DSTYSLSSTL   180
TLSKADYEKH KVYACEVTHQ GLSSPVTKSF NRGECGGGGS EGKSSGSGSE SKSTEGKSSG   240
SGSESKSTGG GGSQVQLVES GGGVVQPGRS LRLSCAASGF TFSSYGMFWV RQAPGKGLEW   300
VAVIWLDGDD EDYVDSVKGR FTISRDDSKN TLYLQMNSLR VDDTAIYYCA RVLDYWGQGT   360
LVTVSSASTK GPSVFPLAPS SKSTSGGTAA LGCLVKDYFP EPVTVSWNSG ALTSGVHTFP   420
AVLQSSGLYS LSSVVTVPSS SLGTQTYICN VNHKPSNTKV DKRVEPKSCD KTHTCPPCPA   480
PEAAGGPSVF LFPPKPKDTL MISRTPEVTC VVVDVSHEDP EVKFNWYVDG VEVHNAKTKP   540
REEQYNSTYR VVSVLTVLHQ DWLNGKEYKC KVSNKALPAP IEKTISKAKG QPREPQVYTL   600
PPSREEMTKN QVSLWCLVKG FYPSDIAVEW ESNGQPENNY KTTPPVLDSD GSFFLYSKLT   660
VDKSRWQQGN VFSCSVMHEA LHNHYTQKSL SLSPG                              695

SEQ ID NO: 242         moltype = AA   length = 705
FEATURE                Location/Qualifiers
REGION                 1..705
                       note = DLL3#8 chain
source                 1..705
                       mol_type = protein
                       organism = synthetic construct
SEQUENCE: 242
DIVMAQSPDS LAVSLGERAT INCKSSQSVL DTSNNKNYLV WYQQKPGQPP KLLIYWASTR    60
ESGVPDRFSG SGSGTDFTLT ISSLQAEDVA VYYCQHYYNS PYTFGQGTKL EIKRTVAAPS   120
VFIFPPSDEQ LKSGTASVVC LLNNFYPREA KVQWKVDNAL QSGNSQESVT EQDSKDSTYS   180
LSSTLTLSKA DYEKHKVYAC EVTHQGLSSP VTKSFNRGEC GGGGSEGKSS GSGSESKSTE   240
GKSSGSGSES KSTGGGGSQV QLVQSGAEVK KPGASVKVSC KASGYTFTDY YMHWVRQAPG   300
QGLEWMGWIN PNSGGTNYEQ KFQGRVTMTR DTSISTAYME LNRLRSDDTA VYYCTRDAVV   360
```

```
IPMDYWGQGT LVTVSSASTK GPSVFPLAPS SKSTSGGTAA LGCLVKDYFP EPVTVSWNSG    420
ALTSGVHTFP AVLQSSGLYS LSSVVTVPSS SLGTQTYICN VNHKPSNTKV DKRVEPKSCD    480
KTHTCPPCPA PEAAGGPSVF LFPPKPKDTL MISRTPEVTC VVVDVSHEDP EVKFNWYVDG    540
VEVHNAKTKP REEQYNSTYR VVSVLTVLHQ DWLNGKEYKC KVSNKALPAP IEKTISKAKG    600
QPREPQVYTL PPSREEMTKN QVSLWCLVKG FYPSDIAVEW ESNGQPENNY KTTPPVLDSD    660
GSFFLYSKLT VDKSRWQQGN VFSCSVMHEA LHNHYTQKSL SLSPG                    705

SEQ ID NO: 243              moltype = AA  length = 700
FEATURE                     Location/Qualifiers
REGION                      1..700
                            note = DLL3#9 chain
source                      1..700
                            mol_type = protein
                            organism = synthetic construct
SEQUENCE: 243
EIVLTQSPGT LSLSPGERAT LSCRASQSIS RSYLAWYQQK PGQAPRLLIY GASSRATGIP     60
DRFSGSGSGT DFTLTISRLE PEDFAVYYCQ QYGTSPITFG QGTRLEIKRT VAAPSVFIFP    120
PSDEQLKSGT ASVVCLLNNF YPREAKVQWK VDNALQSGNS QESVTEQDSK DSTYSLSSTL    180
TLSKADYEKH KVYACEVTHQ GLSSPVTKSF NRGECGGGGS EGKSSGSGSE SKSTEGKSSG    240
SGSESKSTGG GGSQVHLQES GPGLVKPSET LSLTCTVSGG SISSYYWSWI RQTPGKGLDW    300
IGYRYYSGNT NYNPSLKSRV TISLDMSNNQ FSLKLSSVTA ADTAIYYCAS IGVAGFYFDY    360
WGQGTLVTVS SASTKGPSVF PLAPSSKSTS GGTAALGCLV KDYFPEPVTV SWNSGALTSG    420
VHTFPAVLQS SGLYSLSSVV TVPSSSLGTQ TYICNVNHKP SNTKVDKRVE PKSCDKTHTC    480
PPCPAPEAAG GPSVFLFPPK PKDTLMISRT PEVTCVVVDV SHEDPEVKFN WYVDGVEVHN    540
AKTKPREEQY NSTYRVVSVL TVLHQDWLNG KEYKCKVSNK ALPAPIEKTI SKAKGQPREP    600
QVYTLPPSRE EMTKNQVSLW CLVKGFYPSD IAVEWESNGQ PENNYKTTPP VLDSDGSFFL    660
YSKLTVDKSR WQQGNVFSCS VMHEALHNHY TQKSLSLSPG                          700

SEQ ID NO: 244              moltype = AA  length = 703
FEATURE                     Location/Qualifiers
REGION                      1..703
                            note = DLL3#10 chain
source                      1..703
                            mol_type = protein
                            organism = synthetic construct
SEQUENCE: 244
EIVLTQSPGT LSLSPGERAT LSCRASQSLN SIFLAWYQQK PGQAPWLLIY GASSRATGIP     60
DRFSGSGSGT DFTLTISRLE PEDFAVYFCQ QYGGSMNTFG QGTKLEIKRT VAAPSVFIFP    120
PSDEQLKSGT ASVVCLLNNF YPREAKVQWK VDNALQSGNS QESVTEQDSK DSTYSLSSTL    180
TLSKADYEKH KVYACEVTHQ GLSSPVTKSF NRGECGGGGS EGKSSGSGSE SKSTEGKSSG    240
SGSESKSTGG GGSQVQLVQS GAEVKKPGAS VKVSCKASGY TFTGYYMHWV RLAPGQGLEW    300
MGWINPNSGG TIFAQRFQGR VTMTRDTSIS TVYMDLNRLR SDDTAVYYCA RDFGDTVGNA    360
FDIWGQGTMV TVSSASTKGP SVFPLAPSSK STSGGTAALG CLVKDYFPEP VTVSWNSGAL    420
TSGVHTFPAV LQSSGLYSLS SVVTVPSSSL GTQTYICNVN HKPSNTKVDK RVEPKSCDKT    480
HTCPPCPAPE AAGGPSVFLF PPKPKDTLMI SRTPEVTCVV VDVSHEDPEV KFNWYVDGVE    540
VHNAKTKPRE EQYNSTYRVV SVLTVLHQDW LNGKEYKCKV SNKALPAPIE KTISKAKGQP    600
REPQVYTLPP SREEMTKNQV SLWCLVKGFY PSDIAVEWES NGQPENNYKT TPPVLDSDGS    660
FFLYSKLTVD KSRWQQGNVF SCSVMHEALH NHYTQKSLSL SPG                      703

SEQ ID NO: 245              moltype = AA  length = 700
FEATURE                     Location/Qualifiers
REGION                      1..700
                            note = DLL3#11 chain
source                      1..700
                            mol_type = protein
                            organism = synthetic construct
SEQUENCE: 245
QIVLTQSPAI MSASPGEKVT ITCSASSSVT YIHWFQQNPG TSPKLWIYRT SYLASGVPAR     60
FSGSGSGTSY SLTISRMEAE DAATYYCQQR SSYPRTFGGG TKLEIKRTVA APSVFIFPPS    120
DEQLKSGTAS VVCLLNNFYP REAKVQWKVD NALQSGNSQE SVTEQDKDS TYSLSSTLTL     180
SKADYEKHKV YACEVTHQGL SSPVTKSFNR GECGGGGSEG KSSGSGSESK STEGKSSGSG    240
SESKSTGGGG SQVQLQQPGA ELVQPGSSVK MSCKASGYAF SDYWITWVKQ RPGQGLEWIG    300
DIYPGSGSTK SSEKFKNKAT LTADTSSSKA YIQFSSLTPE DSAVYYCVSL YYYGSHYLDT    360
WGQGTTLTVS SASTKGPSVF PLAPSSKSTS GGTAALGCLV KDYFPEPVTV SWNSGALTSG    420
VHTFPAVLQS SGLYSLSSVV TVPSSSLGTQ TYICNVNHKP SNTKVDKRVE PKSCDKTHTC    480
PPCPAPEAAG GPSVFLFPPK PKDTLMISRT PEVTCVVVDV SHEDPEVKFN WYVDGVEVHN    540
AKTKPREEQY NSTYRVVSVL TVLHQDWLNG KEYKCKVSNK ALPAPIEKTI SKAKGQPREP    600
QVYTLPPSRE EMTKNQVSLW CLVKGFYPSD IAVEWESNGQ PENNYKTTPP VLDSDGSFFL    660
YSKLTVDKSR WQQGNVFSCS VMHEALHNHY TQKSLSLSPG                          700

SEQ ID NO: 246              moltype = AA  length = 700
FEATURE                     Location/Qualifiers
REGION                      1..700
                            note = DLL3#12 chain
source                      1..700
                            mol_type = protein
                            organism = synthetic construct
SEQUENCE: 246
QVVLTQSPAI MSASPGEKVT ITCSASSSVT YIHWFQQNPG TSPKLWIYRT SYLASGVPAR     60
```

```
FSGSGSGTSY SLTISRMEAE DAATYYCQQR SSYPRTFGGG TKLEIKRTVA APSVFIFPPS    120
DEQLKSGTAS VVCLLNNFYP REAKVQWKVD NALQSGNSQE SVTEQDSKDS TYSLSSTLTL    180
SKADYEKHKV YACEVTHQGL SSPVTKSFNR GECGGGGSEG KSSGSGSESK STEGKSSGSG    240
SESKSTGGGG SQVQLQQPGA EFVQPGSSVK MSCKASGYAF SDYWITWVKQ RPGQGLEWIG    300
DIYPGSGSTK SSEKFKNRAT LTADTSSSTA YIQFSSLTPE DSAVYYCVSL YYYGSYYLDT    360
WGQGTTLTVS SASTKGPSVF PLAPSSKSTS GGTAALGCLV KDYFPEPVTV SWNSGALTSG    420
VHTFPAVLQS SGLYSLSSVV TVPSSSLGTQ TYICNVNHKP SNTKVDKRVE PKSCDKTHTC    480
PPCPAPEAAG GPSVFLFPPK PKDTLMISRT PEVTCVVVDV SHEDPEVKFN WYVDGVEVHN    540
AKTKPREEQY NSTYRVVSVL TVLHQDWLNG KEYKCKVSNK ALPAPIEKTI SKAKGQPREP    600
QVYTLPPSRE EMTKNQVSLW CLVKGFYPSD IAVEWESNGQ PENNYKTTPP VLDSDGSFFL    660
YSKLTVDKSR WQQGNVFSCS VMHEALHNHY TQKSLSLSPG                         700

SEQ ID NO: 247           moltype = AA  length = 706
FEATURE                  Location/Qualifiers
REGION                   1..706
                         note = DLL3#13 chain
source                   1..706
                         mol_type = protein
                         organism = synthetic construct
SEQUENCE: 247
DVLMTQTPLS LPVSLGDQAA ISCRSSQSIV HSNGNTYLEW YLQKPGQSPK VLIYKVSNRF     60
SGVPDRFSGS GSGTDFTLKI SRVEAEDLGV YYCFQGSHVP YTFGGGTKLE IKRTVAAPSV    120
FIFPPSDEQL KSGTASVVCL LNNFYPREAK VQWKVDNALQ SGNSQESVTE QDSKDSTYSL    180
SSTLTLSKAD YEKHKVYACE VTHQGLSSPV TKSFNRGECG GGGSEGKSSG SGSESKSTEG    240
KSSGSGSESK STGGGGSQIQ LVQSGPELKK PGETVKISCK ASGYTFTNYG VTWVKQAPGK    300
GLKWMGWINT YSGAPTYADD FNGRFALSLE TSASTAYLQI NNLKNEDTAT YFCARLDDYD    360
LYYFDYWGQG TALTVSSAST KGPSVFPLAP SSKSTSGGTA ALGCLVKDYF PEPVTVSWNS    420
GALTSGVHTF PAVLQSSGLY SLSSVVTVPS SSLGTQTYIC NVNHKPSNTK VDKRVEPKSC    480
DKTHTCPPCP APEAAGGPSV FLFPPKPKDT LMISRTPEVT CVVVDVSHED PEVKFNWYVD    540
GVEVHNAKTK PREEQYNSTY RVVSVLTVLH QDWLNGKEYK CKVSNKALPA PIEKTISKAK    600
GQPREPQVYT LPPSREEMTK NQVSLWCLVK GFYPSDIAVE WESNGQPENN YKTTPPVLDS    660
DGSFFLYSKL TVDKSRWQQG NVFSCSVMHE ALHNHYTQKS LSLSPG                   706

SEQ ID NO: 248           moltype = AA  length = 700
FEATURE                  Location/Qualifiers
REGION                   1..700
                         note = DLL3#14 chain
source                   1..700
                         mol_type = protein
                         organism = synthetic construct
SEQUENCE: 248
DIVLTQSPAS LSVSLGQRAT ISCKASQSVD YDGDSYMNWY QQKPGQPPKL LIYAASTLES     60
GIPARFSGSG SGTDFTLNIH PVEEEDAATY YCQQSDEDPW TFGGGTKLEI KRTVAAPSVF    120
IFPPSDEQLK SGTASVVCLL NNFYPREAKV QWKVDNALQS GNSQESVTEQ DSKDSTYSLS    180
STLTLSKADY EKHKVYACEV THQGLSSPVT KSFNRGECGG GGSEGKSSGS GSESKSTEGK    240
SSGSGSESKS TGGGGSQIQL QQSGPELVKP GVKISCKASG YTFTDYYIHW MKQRPGQGLE    300
WIGYIYPGNS YTAYNQKFKD KATLTADNPS STAYMQLSSL TSEDSAVYFC ARSGGSAMDY    360
WGQGTSVTVS SASTKGPSVF PLAPSSKSTS GGTAALGCLV KDYFPEPVTV SWNSGALTSG    420
VHTFPAVLQS SGLYSLSSVV TVPSSSLGTQ TYICNVNHKP SNTKVDKRVE PKSCDKTHTC    480
PPCPAPEAAG GPSVFLFPPK PKDTLMISRT PEVTCVVVDV SHEDPEVKFN WYVDGVEVHN    540
AKTKPREEQY NSTYRVVSVL TVLHQDWLNG KEYKCKVSNK ALPAPIEKTI SKAKGQPREP    600
QVYTLPPSRE EMTKNQVSLW CLVKGFYPSD IAVEWESNGQ PENNYKTTPP VLDSDGSFFL    660
YSKLTVDKSR WQQGNVFSCS VMHEALHNHY TQKSLSLSPG                         700

SEQ ID NO: 249           moltype = AA  length = 706
FEATURE                  Location/Qualifiers
REGION                   1..706
                         note = DLL3#15 chain
source                   1..706
                         mol_type = protein
                         organism = synthetic construct
SEQUENCE: 249
DIVLTQSPAS LAVSLGQRAT ISCKASQSVD YDGDSYLNWY QQKPGQPPKL LIYAASNLES     60
GIPARFSGSG SGTDFTLNIH PVEEEDAATY YCQQSDEDPR TFGGGTKLEI KRTVAAPSVF    120
IFPPSDEQLK SGTASVVCLL NNFYPREAKV QWKVDNALQS GNSQESVTEQ DSKDSTYSLS    180
STLTLSKADY EKHKVYACEV THQGLSSPVT KSFNRGECGG GGSEGKSSGS GSESKSTEGK    240
SSGSGSESKS TGGGGSQIQL VQSGPELKKP GETVKISCKA SGYTFTNYGM NWVKQAPGKG    300
LKWMGWINTY TGEPTYADDF KGRFAFSLET SASTAYLQIN NLKNEDMATY FCTKFHFSSN    360
GDAMDNWGQG TSVTVSSAST KGPSVFPLAP SSKSTSGGTA ALGCLVKDYF PEPVTVSWNS    420
GALTSGVHTF PAVLQSSGLY SLSSVVTVPS SSLGTQTYIC NVNHKPSNTK VDKRVEPKSC    480
DKTHTCPPCP APEAAGGPSV FLFPPKPKDT LMISRTPEVT CVVVDVSHED PEVKFNWYVD    540
GVEVHNAKTK PREEQYNSTY RVVSVLTVLH QDWLNGKEYK CKVSNKALPA PIEKTISKAK    600
GQPREPQVYT LPPSREEMTK NQVSLWCLVK GFYPSDIAVE WESNGQPENN YKTTPPVLDS    660
DGSFFLYSKL TVDKSRWQQG NVFSCSVMHE ALHNHYTQKS LSLSPG                   706

SEQ ID NO: 250           moltype = AA  length = 697
FEATURE                  Location/Qualifiers
REGION                   1..697
                         note = DLL3#16 chain
```

```
source                  1..697
                        mol_type = protein
                        organism = synthetic construct
SEQUENCE: 250
DIQMTQSPST LSASVGDRVT ITCRASQSVS DWLAWYQQKP GKAPKFLIYR ASSLESGVPS    60
RFSGSGSGTE FTLTISSLQP ADFATYYCQL YNSYSPTFGQ GTKVEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGECGGGGSE GKSSGSGSES KSTEGKSSGS   240
GSESKSTGGG GSEVHLVESG GGLVQPGGSL RLSCAASGFT FSSYWMTWVR QAPGKGLEWV   300
ANIKEDGSEK YYVDSVKGRF TISRDNAKNS LYLQMNSLRA EDTALYYCAR DWGYFDYWGQ   360
GTLVTVSSAS TKGPSVFPLA PSSKSTSGGT AALGCLVKDY FPEPVTVSWN SGALTSGVHT   420
FPAVLQSSGL YSLSSVVTVP SSSLGTQTYI CNVNHKPSNT KVDKRVEPKS CDKTHTCPPC   480
PAPEAAGGPS VFLFPPKPKD TLMISRTPEV TCVVVDVSHE DPEVKFNWYV DGVEVHNAKT   540
KPREEQYNST YRVVSVLTVL HQDWLNGKEY KCKVSNKALP APIEKTISKA KGQPREPQVY   600
TLPPSREEMT KNQVSLWCLV KGFYPSDIAV EWESNGQPEN NYKTTPPVLD SDGSFFLYSK   660
LTVDKSRWQQ GNVFSCSVMH EALHNHYTQK SLSLSPG                            697

SEQ ID NO: 251          moltype = AA   length = 698
FEATURE                 Location/Qualifiers
REGION                  1..698
                        note = DLL3#17 chain
source                  1..698
                        mol_type = protein
                        organism = synthetic construct
SEQUENCE: 251
DIQMTQSPAS LAASVGETVT ITCRASENIY YSLAWYQQKQ GKSPQLLIYN TNSLEDGVPS    60
RFSGSGSGTQ YSMKINSMQP EDTATYFCKQ AYDFPLTFGA GTKLELKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGECGGGGSE GKSSGSGSES KSTEGKSSGS   240
GSESKSTGGG GSQIQLQQSG PEVVKPGASV KISCKASGYT FISYYIHWVK QRPGQGLEWI   300
GWIYPGDGST NNNEKFKGKT TLTADKSSST AYMLLSSLTS EDSAVYFCAR GEGNAMDDWG   360
QGTSVTVSSA STKGPSVFPL APSSKSTSGG TAALGCLVKD YFPEPVTVSW NSGALTSGVH   420
TFPAVLQSSG LYSLSSVVTV PSSSLGTQTY ICNVNHKPSN TKVDKRVEPK SCDKTHTCPP   480
CPAPEAAGGP SVFLFPPKPK DTLMISRTPE VTCVVVDVSH EDPEVKFNWY VDGVEVHNAK   540
TKPREEQYNS TYRVVSVLTV LHQDWLNGKE YKCKVSNKAL PAPIEKTISK AKGQPREPQV   600
YTLPPSREEM TKNQVSLWCL VKGFYPSDIA VEWESNGQPE NNYKTTPPVL DSDGSFFLYS   660
KLTVDKSRWQ QGNVFSCSVM HEALHNHYTQ KSLSLSPG                           698

SEQ ID NO: 252          moltype = AA   length = 698
FEATURE                 Location/Qualifiers
REGION                  1..698
                        note = DLL3#18 chain
source                  1..698
                        mol_type = protein
                        organism = synthetic construct
SEQUENCE: 252
DIQMTQSPAS LAASVGETVT ITCRASENIY YSLAWYQQKQ GKSPQLLIYN ANSLEDGVPS    60
RFSGSGSGTQ YSMKINNMQP EDTATYFCKQ AYDVPLTFGA GTKLELKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGECGGGGSE GKSSGSGSES KSTEGKSSGS   240
GSESKSTGGG GSQVQLQQSG PDLVKPGASV KMSCEASGYT FTAYFIHWVK QKPGQGLEWI   300
GYIDPFNDDT NYNVKFKGKA TLTSDTSSSI AYMELSSLTS EDSSFYYCAR GTSATLDYWG   360
HGTTLTVSSA STKGPSVFPL APSSKSTSGG TAALGCLVKD YFPEPVTVSW NSGALTSGVH   420
TFPAVLQSSG LYSLSSVVTV PSSSLGTQTY ICNVNHKPSN TKVDKRVEPK SCDKTHTCPP   480
CPAPEAAGGP SVFLFPPKPK DTLMISRTPE VTCVVVDVSH EDPEVKFNWY VDGVEVHNAK   540
TKPREEQYNS TYRVVSVLTV LHQDWLNGKE YKCKVSNKAL PAPIEKTISK AKGQPREPQV   600
YTLPPSREEM TKNQVSLWCL VKGFYPSDIA VEWESNGQPE NNYKTTPPVL DSDGSFFLYS   660
KLTVDKSRWQ QGNVFSCSVM HEALHNHYTQ KSLSLSPG                           698

SEQ ID NO: 253          moltype = AA   length = 103
FEATURE                 Location/Qualifiers
REGION                  1..103
                        note = region of heavy chain
source                  1..103
                        mol_type = protein
                        organism = synthetic construct
SEQUENCE: 253
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKRVEP KSC                     103

SEQ ID NO: 254          moltype = AA   length = 330
FEATURE                 Location/Qualifiers
REGION                  1..330
                        note = Mouse
source                  1..330
                        mol_type = protein
                        organism = synthetic construct
SEQUENCE: 254
AKTTAPSVYP LAPVCGDTTG SSVTLGCLVK GYFPEPVTLT WNSGSLSSGV HTFPAVLQSD    60
```

```
LYTLSSSVTV TSSTWPSQSI TCNVAHPASS TKVDKKIEPR GPTIKPCPPC KCPAPNLLGG    120
PSVFIFPPKI KDVLMISLSP IVTCVVVDVS EDDPDVQISW FVNNVEVHTA QTQTHREDYN    180
STLRVVSALP IQHQDWMSGK EFKCKVNNKD LPAPIERTIS KPKGSVRAPQ VYVLPPPEEE    240
MTKKQVTLTC MVTDFMPEDI YVEWTNNGKT ELNYKNTEPV LDSDGSYFMY SKLRVEKKNW    300
VERNSYSCSV VHEGLHNHHT TKSFSRTPGK                                     330

SEQ ID NO: 255          moltype = AA   length = 107
FEATURE                 Location/Qualifiers
REGION                  1..107
                        note = Mouse
source                  1..107
                        mol_type = protein
                        organism = synthetic construct
SEQUENCE: 255
RADAAPTVSI FPPSSEQLTS GGASVVCFLN NFYPKDINVK WKIDGSERQN GVLNSWTDQD     60
SKDSTYSMSS TLTLTKDEYE RHNSYTCEAT HKTSTSPIVK SFNRNEC                  107

SEQ ID NO: 256          moltype = AA   length = 446
FEATURE                 Location/Qualifiers
REGION                  1..446
                        note = PD1-1 HC
source                  1..446
                        mol_type = protein
                        organism = synthetic construct
SEQUENCE: 256
EVMLVESGGG LVQPGGSLRL SCTASGFTFS ASAMSWVRQA PGKGLEWVAY ISGGGGDTYY     60
SSSVKGRFTI SRDNAKNSLY LQMNSLRAED TAVYYCARHS NVNYYAMDYW GQGTLVTVSS    120
ASTKGPSVFP LAPCSRSTSE STAALGCLVK DYFPEPVTVS WNSGALTSGV HTFPAVLQSS    180
GLYSLSSVVT VPSSSLGTKT YTCNVDHKPS NTKVDKRVES KYGPPCPPCP APEFLGGPSV    240
FLFPPKPKDT LMISRTPEVT CVVVDVSQED PEVQFNWYVD GVEVHNAKTK PREEQFNSTY    300
RVVSVLTVLH QDWLNGKEYK CKVSNKGLPS SIEKTISKAK GQPREPQVYT LPPSQEEMTK    360
NQVSLTCLVK GFYPSDIAVE WESNGQPENN YKTTPPVLDS DGSFFLYSRL TVDKSRWQEG    420
NVFSCSVMHE ALHNHYTQKS LSLSLG                                         446

SEQ ID NO: 257          moltype = AA   length = 218
FEATURE                 Location/Qualifiers
REGION                  1..218
                        note = PD1-1 LC
source                  1..218
                        mol_type = protein
                        organism = synthetic construct
SEQUENCE: 257
EIVLTQSPAT LSLSPGERAT MSCRASENID TSGISFMNWY QQKPGQAPKL LIYVASNQGS     60
GIPARFSGSG SGTDFTLTIS RLEPEDFAVY YCQQSKEVPW TFGQGTKLEI KRTVAAPSVF    120
IFPPSDEQLK SGTASVVCLL NNFYPREAKV QWKVDNALQS GNSQESVTEQ DSKDSTYSLS    180
STLTLSKADY EKHKVYACEV THQGLSSPVT KSFNRGEC                            218

SEQ ID NO: 258          moltype = AA   length = 446
FEATURE                 Location/Qualifiers
REGION                  1..446
                        note = PD1-2 HC
source                  1..446
                        mol_type = protein
                        organism = synthetic construct
SEQUENCE: 258
EVMLVESGGG LVQPGGSLRL SCTASGFTFS ASAMSWVRQA PGKGLEWVAY ISGGGGDTYY     60
SSSVKGRFTI SRDNAKNSLY LQMNSLRAED TAVYYCARHS NPNYYAMDYW GQGTLVTVSS    120
ASTKGPSVFP LAPCSRSTSE STAALGCLVK DYFPEPVTVS WNSGALTSGV HTFPAVLQSS    180
GLYSLSSVVT VPSSSLGTKT YTCNVDHKPS NTKVDKRVES KYGPPCPPCP APEFLGGPSV    240
FLFPPKPKDT LMISRTPEVT CVVVDVSQED PEVQFNWYVD GVEVHNAKTK PREEQFNSTY    300
RVVSVLTVLH QDWLNGKEYK CKVSNKGLPS SIEKTISKAK GQPREPQVYT LPPSQEEMTK    360
NQVSLTCLVK GFYPSDIAVE WESNGQPENN YKTTPPVLDS DGSFFLYSRL TVDKSRWQEG    420
NVFSCSVMHE ALHNHYTQKS LSLSLG                                         446

SEQ ID NO: 259          moltype = AA   length = 218
FEATURE                 Location/Qualifiers
REGION                  1..218
                        note = PD1-2 LC
source                  1..218
                        mol_type = protein
                        organism = synthetic construct
SEQUENCE: 259
EIVLTQSPAT LSLSPGERAT MSCRASENID TSGISFMNWY QQKPGQAPKL LIYVASNQGS     60
GIPARFSGSG SGTDFTLTIS RLEPEDFAVY YCQQSKEVPW TFGQGTKLEI KRTVAAPSVF    120
IFPPSDEQLK SGTASVVCLL NNFYPREAKV QWKVDNALQS GNSQESVTEQ DSKDSTYSLS    180
STLTLSKADY EKHKVYACEV THQGLSSPVT KSFNRGEC                            218

SEQ ID NO: 260          moltype = AA   length = 446
FEATURE                 Location/Qualifiers
```

```
REGION                    1..446
                          note = PD1-3 HC
source                    1..446
                          mol_type = protein
                          organism = synthetic construct
SEQUENCE: 260
EVMLVESGGG LVQPGGSLRL SCTASGFTFS KSAMSWVRQA PGKGLEWVAY ISGGGGDTYY    60
SSSVKGRFTI SRDNAKNSLY LQMNSLRAED TAVYYCARHS NVNYYAMDYW GQGTLVTVSS   120
ASTKGPSVFP LAPCSRSTSE STAALGCLVK DYFPEPVTVS WNSGALTSGV HTFPAVLQSS   180
GLYSLSSVVT VPSSSLGTKT YTCNVDHKPS NTKVDKRVES KYGPPCPPCP APEFLGGPSV   240
FLFPPKPKDT LMISRTPEVT CVVVDVSQED PEVQFNWYVD GVEVHNAKTK PREEQFNSTY   300
RVVSVLTVLH QDWLNGKEYK CKVSNKGLPS SIEKTISKAK GQPREPQVYT LPPSQEEMTK   360
NQVSLTCLVK GFYPSDIAVE WESNGQPENN YKTTPPVLDS DGSFFLYSRL TVDKSRWQEG   420
NVFSCSVMHE ALHNHYTQKS LSLSLG                                       446

SEQ ID NO: 261            moltype = AA  length = 218
FEATURE                   Location/Qualifiers
REGION                    1..218
                          note = PD1-3 LC
source                    1..218
                          mol_type = protein
                          organism = synthetic construct
SEQUENCE: 261
EIVLTQSPAT LSLSPGERAT MSCRASENID VSGISFMNWY QQKPGQAPKL LIYVASNQGS    60
GIPARFSGSG SGTDFTLTIS RLEPEDFAVY YCQQSKEVPW TFGQGTKLEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                          218

SEQ ID NO: 262            moltype = AA  length = 446
FEATURE                   Location/Qualifiers
REGION                    1..446
                          note = PD1-4 HC
source                    1..446
                          mol_type = protein
                          organism = synthetic construct
SEQUENCE: 262
EVMLVESGGG LVQPGGSLRL SCTASGFTFS KSAMSWVRQA PGKGLEWVAY ISGGGGDTYY    60
SSSVKGRFTI SRDNAKNSLY LQMNSLRAED TAVYYCARHS NVNYYAMDYW GQGTLVTVSS   120
ASTKGPSVFP LAPCSRSTSE STAALGCLVK DYFPEPVTVS WNSGALTSGV HTFPAVLQSS   180
GLYSLSSVVT VPSSSLGTKT YTCNVDHKPS NTKVDKRVES KYGPPCPPCP APEFLGGPSV   240
FLFPPKPKDT LMISRTPEVT CVVVDVSQED PEVQFNWYVD GVEVHNAKTK PREEQFNSTY   300
RVVSVLTVLH QDWLNGKEYK CKVSNKGLPS SIEKTISKAK GQPREPQVYT LPPSQEEMTK   360
NQVSLTCLVK GFYPSDIAVE WESNGQPENN YKTTPPVLDS DGSFFLYSRL TVDKSRWQEG   420
NVFSCSVMHE ALHNHYTQKS LSLSLG                                       446

SEQ ID NO: 263            moltype = AA  length = 218
FEATURE                   Location/Qualifiers
REGION                    1..218
                          note = PD1-4 LC
source                    1..218
                          mol_type = protein
                          organism = synthetic construct
SEQUENCE: 263
EIVLTQSPAT LSLSPGERAT MSCRASENID VSGISFMNWY QQKPGQAPKL LIYVASNQGS    60
GIPARFSGSG SGTDFTLTIS RLEPEDFAVY YCQQSKEVPW TFGQGTKLEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                          218

SEQ ID NO: 264            moltype = AA  length = 446
FEATURE                   Location/Qualifiers
REGION                    1..446
                          note = PD1-5 HC
source                    1..446
                          mol_type = protein
                          organism = synthetic construct
SEQUENCE: 264
EVMLVESGGG LVQPGGSLRL SCTASGFTFS KSAMSWVRQA PGKGLEWVAY ISGGGGDTYY    60
SSSVKGRFTI SRDNAKNSLY LQMNSLRAED TAVYYCARHS NVNYYAMDYW GQGTLVTVSS   120
ASTKGPSVFP LAPCSRSTSE STAALGCLVK DYFPEPVTVS WNSGALTSGV HTFPAVLQSS   180
GLYSLSSVVT VPSSSLGTKT YTCNVDHKPS NTKVDKRVES KYGPPCPPCP APEFLGGPSV   240
FLFPPKPKDT LMISRTPEVT CVVVDVSQED PEVQFNWYVD GVEVHNAKTK PREEQFNSTY   300
RVVSVLTVLH QDWLNGKEYK CKVSNKGLPS SIEKTISKAK GQPREPQVYT LPPSQEEMTK   360
NQVSLTCLVK GFYPSDIAVE WESNGQPENN YKTTPPVLDS DGSFFLYSRL TVDKSRWQEG   420
NVFSCSVMHE ALHNHYTQKS LSLSLG                                       446

SEQ ID NO: 265            moltype = AA  length = 218
FEATURE                   Location/Qualifiers
REGION                    1..218
                          note = PD1-5 LC
```

```
source                  1..218
                        mol_type = protein
                        organism = synthetic construct
SEQUENCE: 265
EIVLTQSPAT LSLSPGERAT MSCRASENID VSGISFMNWY QQKPGQAPKL LIYVASNQGS    60
GIPARFSGSG SGTDFTLTIS RLEPEDFAVY YCQQSKEVPW TFGQGTKLEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 266          moltype = AA  length = 15
FEATURE                 Location/Qualifiers
source                  1..15
                        mol_type = protein
                        organism = synthetic construct
SEQUENCE: 266
GGGGSGGGGS GGGGS                                                     15

SEQ ID NO: 267          moltype = AA  length = 25
FEATURE                 Location/Qualifiers
source                  1..25
                        mol_type = protein
                        organism = synthetic construct
SEQUENCE: 267
GGGGSGGGGS GGGGSGGGGS GGGGS                                          25

SEQ ID NO: 268          moltype = AA  length = 35
FEATURE                 Location/Qualifiers
source                  1..35
                        mol_type = protein
                        organism = synthetic construct
SEQUENCE: 268
GGGGSGGGGS GGGGSGGGGS GGGGSGGGGS GGGGS                               35

SEQ ID NO: 269          moltype = AA  length = 12
FEATURE                 Location/Qualifiers
source                  1..12
                        mol_type = protein
                        organism = synthetic construct
SEQUENCE: 269
GGGSGGGSGG GS                                                        12

SEQ ID NO: 270          moltype = AA  length = 20
FEATURE                 Location/Qualifiers
source                  1..20
                        mol_type = protein
                        organism = synthetic construct
SEQUENCE: 270
GGGSGGGSGG GSGGGSGGGS                                                20

SEQ ID NO: 271          moltype = AA  length = 28
FEATURE                 Location/Qualifiers
source                  1..28
                        mol_type = protein
                        organism = synthetic construct
SEQUENCE: 271
GGGSGGGSGG GSGGGSGGGS GGGSGGGS                                       28

SEQ ID NO: 272          moltype = AA  length = 15
FEATURE                 Location/Qualifiers
source                  1..15
                        mol_type = protein
                        organism = synthetic construct
SEQUENCE: 272
GGGSSGGGSS GGGSS                                                     15

SEQ ID NO: 273          moltype = AA  length = 25
FEATURE                 Location/Qualifiers
source                  1..25
                        mol_type = protein
                        organism = synthetic construct
SEQUENCE: 273
GGGSSGGGSS GGGSSGGGSS GGGSS                                          25
```

```
SEQ ID NO: 274        moltype = AA  length = 35
FEATURE               Location/Qualifiers
source                1..35
                      mol_type = protein
                      organism = synthetic construct
SEQUENCE: 274
GGGSSGGGSS GGGSSGGGSS GGGSSGGGSS GGGSS                                   35
```